US009704102B2

(12) United States Patent
Baraniuk et al.

(10) Patent No.: US 9,704,102 B2
(45) Date of Patent: Jul. 11, 2017

(54) SPARSE FACTOR ANALYSIS FOR ANALYSIS OF USER CONTENT PREFERENCES

(71) Applicant: WILLIAM MARSH RICE UNIVERSITY, Houston, TX (US)

(72) Inventors: Richard G. Baraniuk, Houston, TX (US); Andrew S. Lan, Houston, TX (US); Christoph E. Studer, Houston, TX (US); Andrew E. Waters, Sugar Land, TX (US)

(73) Assignee: William Marsh Rice University, Houston, TX (US)

( * ) Notice: Subject to any disclaimer, the term of this patent is extended or adjusted under 35 U.S.C. 154(b) by 467 days.

(21) Appl. No.: 14/214,841

(22) Filed: Mar. 15, 2014

(65) Prior Publication Data

US 2014/0279727 A1 Sep. 18, 2014

Related U.S. Application Data

(60) Provisional application No. 61/790,727, filed on Mar. 15, 2013.

(51) Int. Cl.
*G06F 17/00* (2006.01)
*G06F 17/20* (2006.01)
(Continued)

(52) U.S. Cl.
CPC ............. *G06N 99/005* (2013.01); *G09B 7/00* (2013.01)

(58) Field of Classification Search
None
See application file for complete search history.

(56) References Cited

U.S. PATENT DOCUMENTS

| 2004/0133532 | A1* | 7/2004 | Seitz | G09B 7/02 |
| | | | | 706/11 |
| 2012/0296967 | A1* | 11/2012 | Tao | G06Q 30/0251 |
| | | | | 709/204 |
| 2013/0091081 | A1* | 4/2013 | He | G06N 99/005 |
| | | | | 706/12 |

OTHER PUBLICATIONS

Ackerman, Terry A.; Mark J. Gierl, Cindy M. Walker—"Using Multidimensional Item Response Theory to Evaluate Educational and Psychological Tests" NCME Instructional Module, Sep. 2003, pp. 37-53, (17 pages).

(Continued)

*Primary Examiner* — Luis Sitiriche
*Assistant Examiner* — Viker Lamardo
(74) *Attorney, Agent, or Firm* — Meyertons Hood Kivlin Kowert & Goetzel, P.C.; Jeffrey C. Hood; Mark K. Brightwell

(57) ABSTRACT

A mechanism for discerning user preferences for categories of provided content. A computer receives response data including a set of preference values that have been assigned to content items by content users. Output data is computed based on the response data using a latent factor model. The output data includes at least: an association matrix that defines K concepts associated with the content items, wherein K is smaller than the number of the content items, wherein, for each of the K concepts, the association matrix defines the concept by specifying strengths of association between the concept and the content items; and a concept-preference matrix including, for each content user and each of the K concepts, an extent to which the content user prefers the concept. The computer may display a visual representation of the association strengths in the association matrix and/or the extents in the concept-preference matrix.

24 Claims, 38 Drawing Sheets

(51) Int. Cl.
G06N 99/00 (2010.01)
G09B 7/00 (2006.01)

(56) References Cited

OTHER PUBLICATIONS

Aharon, Michal; Michael Elad, Alfred M. Bruckstein—"K-SVD and its Non-Negative Variant for Dictionary Design" Proc. APIE 5914, Wavelets XI, Sep. 17, 2005, pp. 1-12, (12 pages).
Bachrach, Yoram; Tom Minka, John Guiver, Thore Graepel—"How to Grade a Test Without Knowing the Answers—a Bayesian Graphical Model for Adaptive Crowdsourcing and Aptitude Testing" Proceedings of the 29th International Conference on Machine Learning, 2012, Edinburgh, Scotland, UK, (8 pages).
Barnes, Tiffany—"The Q-matrix Method: Mining Student Response Data for Knowledge" Charlotte: University of North Carolina, 2005, (8 pages).
Beheshti, Behzad; Michel C. Desmarais, Rhouma Naceur—"Methods to Find the Number of Latent Skills" Proceedings of the 5th International Conference on Education Data Mining, 2012, pp. 81-86, Montreal, Quebec, Canada, (6 pages).
Bergner, Yoav; Stefan Droschler, Gerd Kortemeyer, Saif Rayyan, Daniel Seaton, and David E. Pritchard—"Model-Based Collaborative Filtering Analysis of Student Response Data: Machine-Learning Item Response Theory" Proceedings of the 5th International Conference on Educational Data Mining, Chaia, Greece, Jun. 19-21, 2012, pp. 95-102, (8 pages).
Chang, Hua-Hua and Zhiliang Ying—"Nonlinear Sequential Designs for Logistic Item Response Theory Models with Applications to Computerized Adaptive Tests" In: The Annals of Statistics, 2009, pp. 1466-1488, vol. 37, No. 3, Institute of Methematical Statistics (23 pages).
Chi, Min; Kenneth Koedinger, Geoff Gordon, Pamela Jordan, Kurt VanLehn—"Instructional Factors Analysis: A Cognitive Model for Multiple Instructional Interventions" 2011, (10 pages).
Goodfellow, Ian J.; Aaron Courville, Yoshua Bengio—"Large-Scale Feature Learning with Spike-and-Slab Sparse Coding" Proceedings of the 29th International Conference on Machine Learning, 2012, Edinburgh, Scotland, UK, (8 pages).
Hahn, P. Richard; Carlos M. Carvalho, James G. Scott—"A Sparse Factor-Analytic Probit Model for Congressional Voting Patterns" Dec. 2010, pp. 1-29, (29 pages).
Koren, Yehuda and Joe Sill—"OrdRec: An Ordinal Model for Predicting Personalization Item Rating Distributions" RecSys'11, Oct. 23-27, 2011, pp. 117-124, Chicago, Illinois, USA, (8 pages).
Lan, Andrew S.; Andrew E. Waters, Christoph Studer, and Richard G. Baraniuk—"Joint Sparse Factor Analysis and Topic Modeling for Learning Analytics (Poster)" NIPS 2012 Workshop: Personalizing Education with Machine Learning, Dec. 8, 2012, Lake Tahoe, California, (2 pages).
Lee, Seokho; Jianhua Z. Huang and Jianhua Hu—"Sparse Logistic Principal Components Analysis for Binary Data" In: The Annals of Applied Statistics, 2010, pp. 1579-1601, vol. 4, No. 3, Institute of Mathematical Statistics, (23 pages).
McDonald, Roderick P.—"A Basis for Multidimensional Item Response Theory" In: Applied Phychological Measurement, Jun. 2000, vol. 24. No. 2, pp. 99-114, Sage Publications, Inc. USA, (17 pages).
Nguyen, Thai-Nghe; Lucas Drumond, Tomas Hovath and Lars Schmidt-Thieme—"Multi-Relational Factorization Models for Predicting Student Performance" 2011, (10 pages).
Pavlik Jr. P.I.; H. Cen, and K.R. Koedinger—"Learning Factors Transfer Analysis: Using Learning Curve Analysis to Automatically Generate Domain Models" Proceedings of the 2nd International Conference on Educational Data Mining, 2009, pp. 121-130, Cordoba, Spain, (10 pages).
Schmidt, Mikkel N.; Ole Winther, and Lars Kai Hansen—"Bayesian Non-negative Matrix Factorization" Proceedings of the 8th International Conference on Independent Component Analysis and Signal Separation (ICA'09), 2009, Denmark, (8 pages).
Wang, Eric; Dehong Liu, Jorge Silva, David Dunson, and Lawrence Carin—"Joint Analysis of Time-Evolving Binary Matrices and Associated Documents" Duke University, Dec. 7, 2010, (9 pages).
Woolf, Beverly Park—Book: Building Intelligent Interactive Tutors: Student-Centered Strategies for Revolutionizing e-Learning, 2009, Morgan Kaufmann Publishers, Burlington, MA, USA, (480 pages).
Zhang, XianXing and Lawrence Carin—"Joint Modeling of a Matrix with Associated Test via Latent Binary Features" NIPS 2012, Dec. 3, 2012, Lake Tahoe, Nevada, USA (9 pages).
Zhu, Jun and Eric P. Xing—"Sparse Topical Coding" Feb. 14, 2012, Pittsburgh: Carnegie Mellon University, Pittsburgh, PA, USA (8 pages).

* cited by examiner

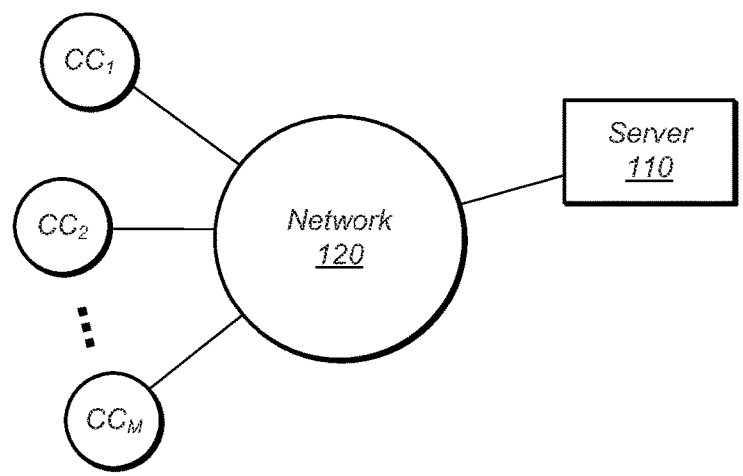
FIG. 1.0
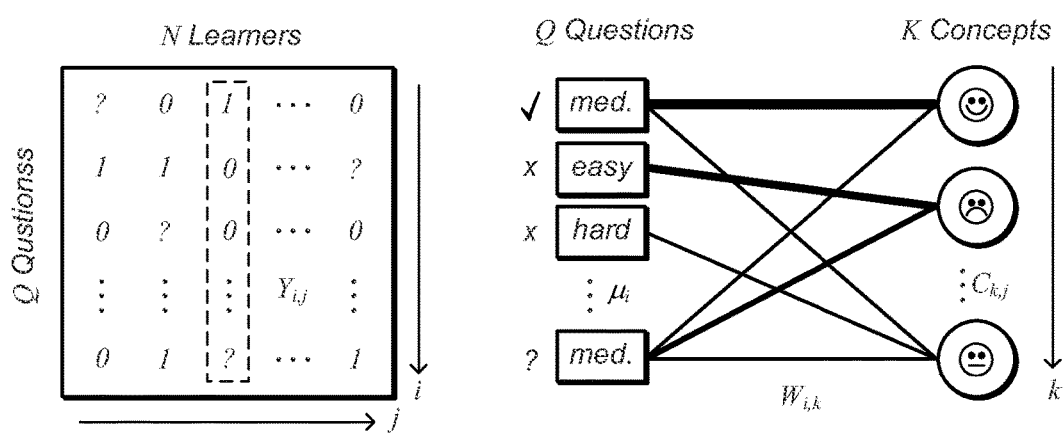
FIG. 1.1A
Graded learner–question
responses
FIG. 1.1B
Inferred question–concept
association graph

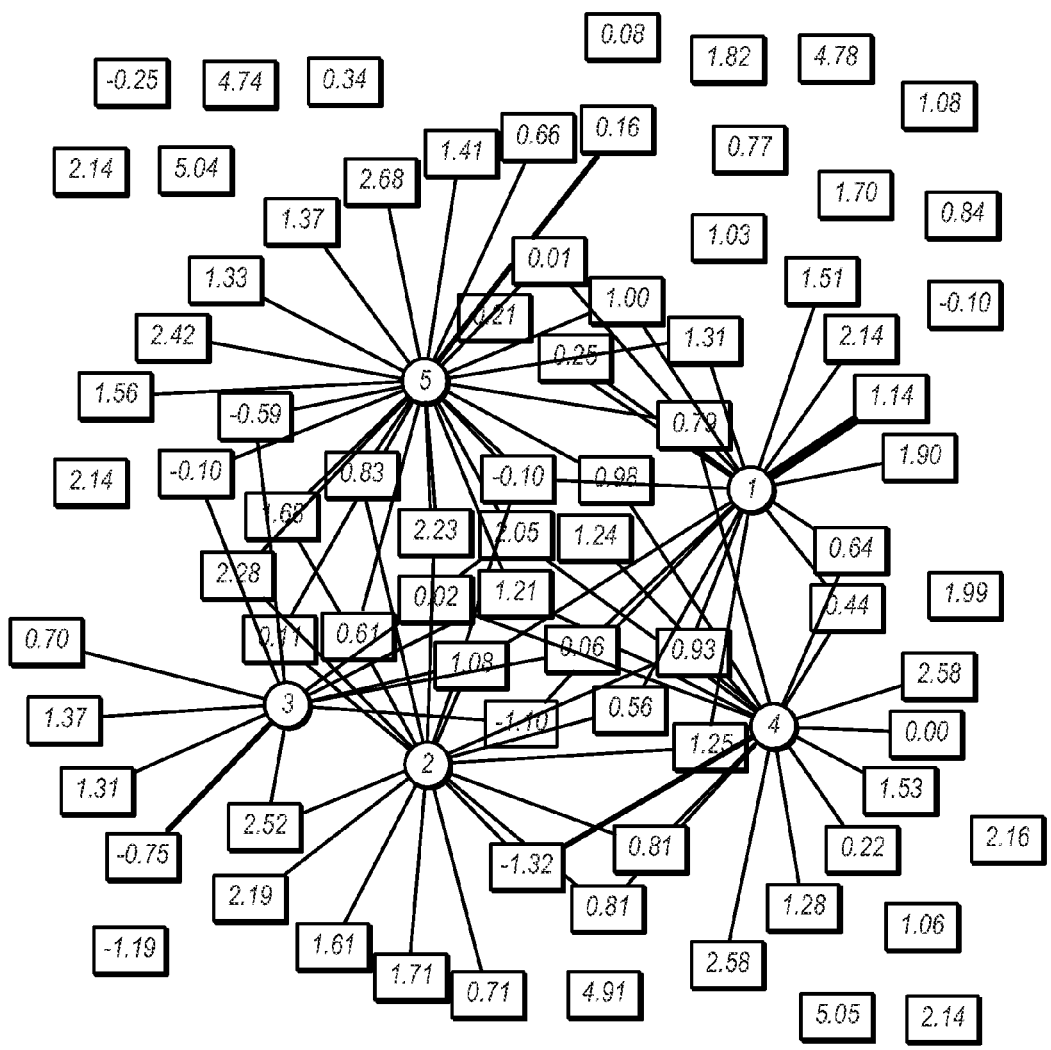
FIG. 1.2(a)
*Inferred question–concept association graph.*

| Concept 1 | | Concept 2 | | Concept 3 | |
|---|---|---|---|---|---|
| Changes to land | (45%) | Evidence of the past | (74%) | Alternative energy | (76%) |
| Properties of soil | (28%) | Mixtures and solutions | (14%) | Environmental changes | (19%) |
| Uses of energy | (27%) | Environmental changes | (12%) | Changes from heat | (5%) |

| Concept 4 | | Concept 5 | |
|---|---|---|---|
| Properties of Soil | (77%) | Formulation of fossil fuels | (54%) |
| Environmental changes | (17%) | Mixtures and solutions | (28%) |
| Classifying matter | (6%) | Uses of energy | (18%) |

Most important tags and relative weights for the estimated concepts.

Fig. 1.2(b)

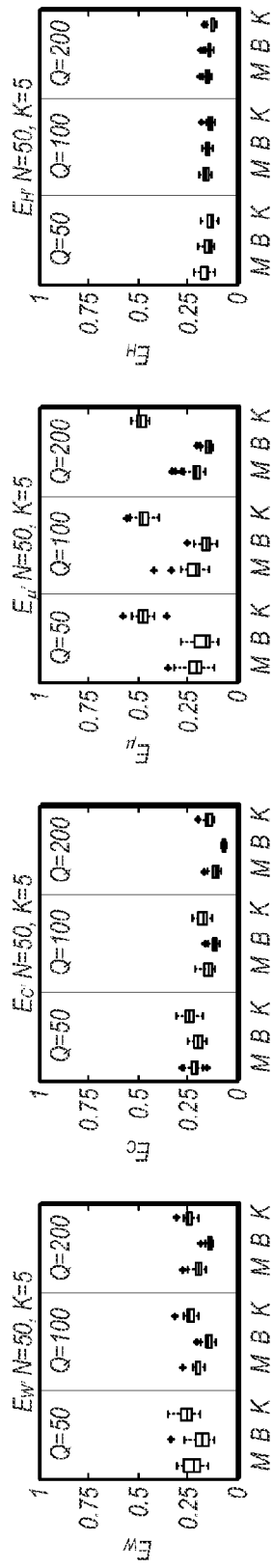
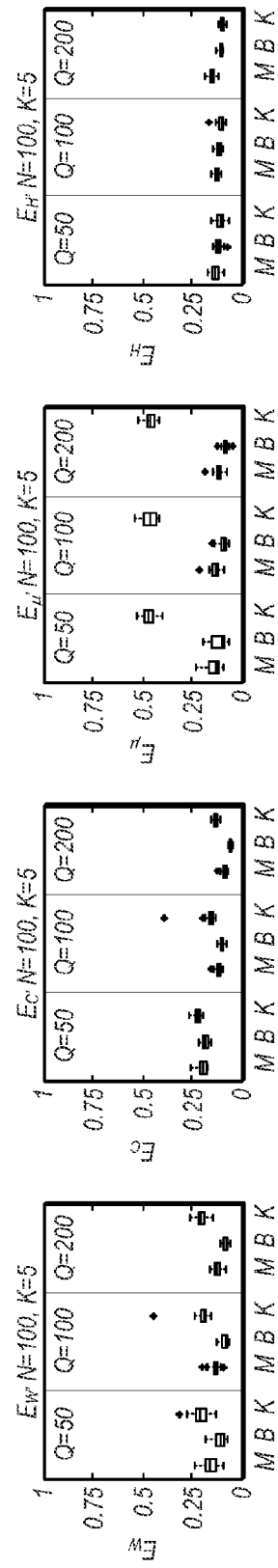
FIG. 1.3A  FIG. 1.3B  FIG. 1.3C  FIG. 1.3D
FIG. 1.3E  FIG. 1.3F  FIG. 1.3G  FIG. 1.3H

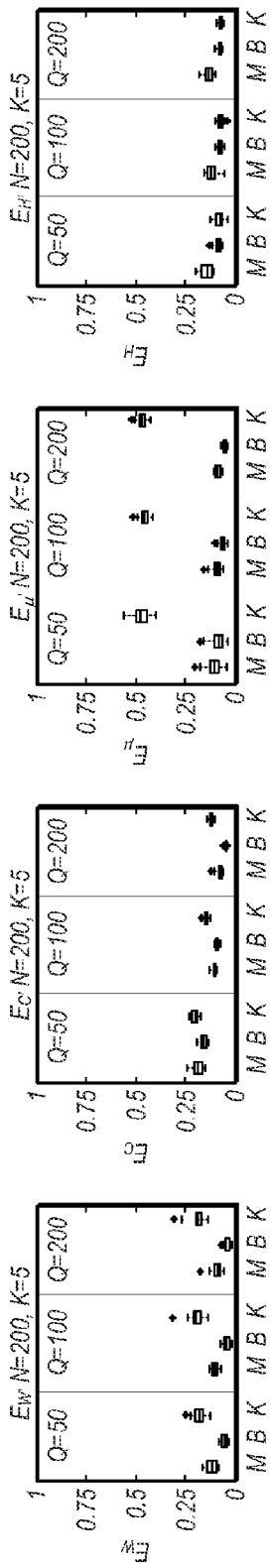

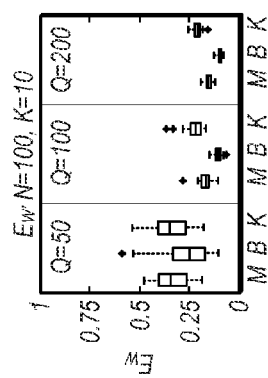
FIG. 1.3Q
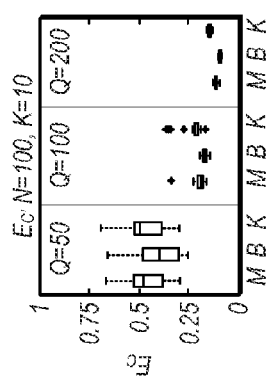
FIG. 1.3R
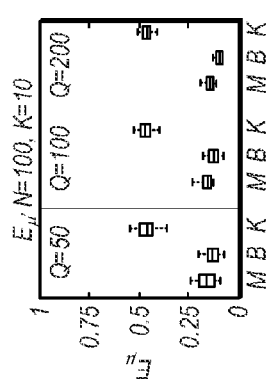
FIG. 1.3S
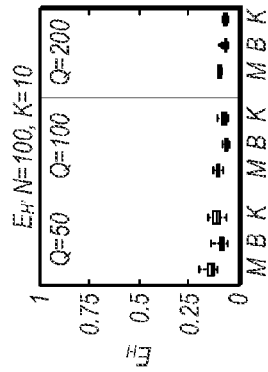
FIG. 1.3T
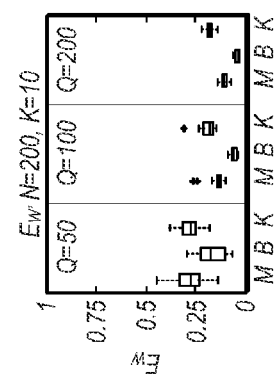
FIG. 1.3U
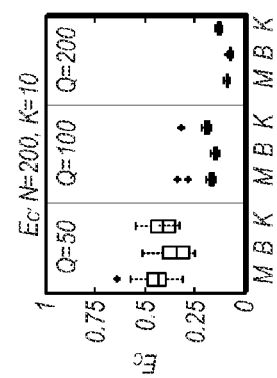
FIG. 1.3V
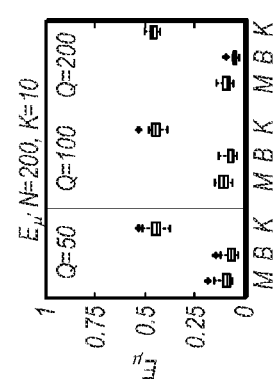
FIG. 1.3W
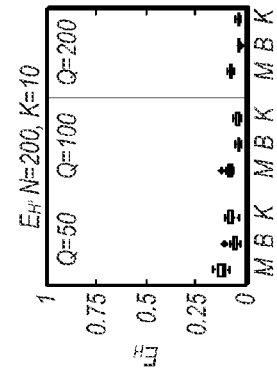
FIG. 1.3X

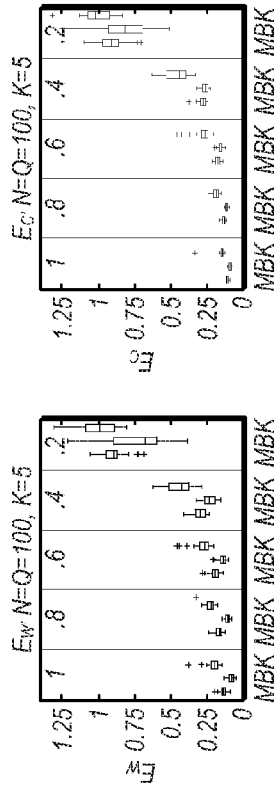
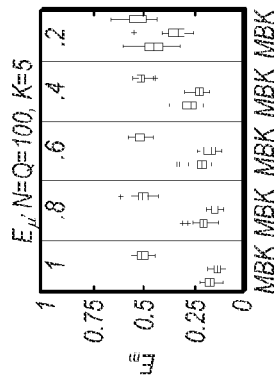
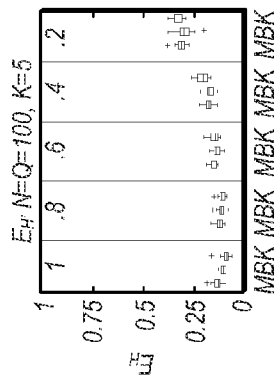
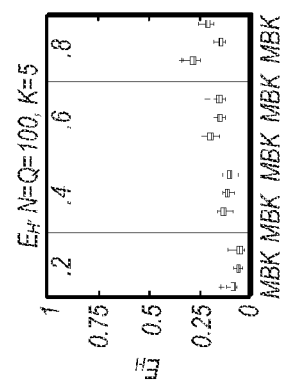
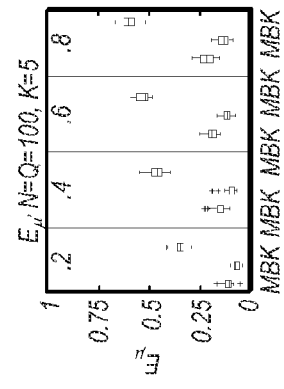
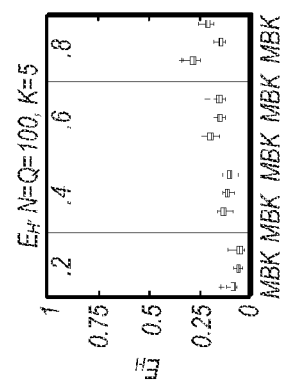
FIG. 1.4A FIG. 1.4B FIG. 1.4C FIG. 1.4D
FIG. 1.5A FIG. 1.5B FIG. 1.5C FIG. 1.5D

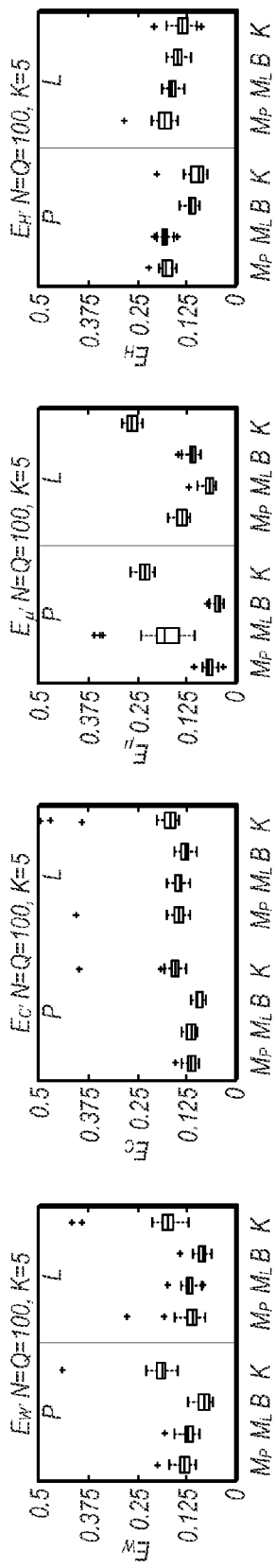
FIG. 1.6D FIG. 1.6C FIG. 1.6B FIG. 1.6A

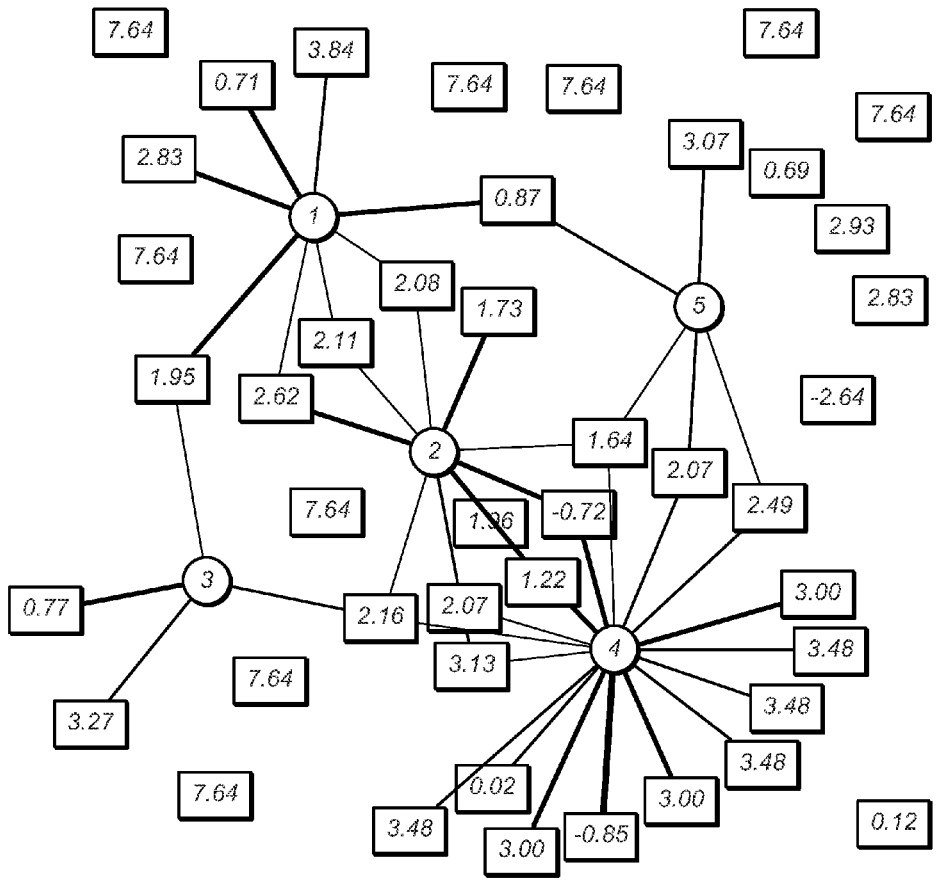
FIG. 1.7A
| Concept 1 | | Concept 2 | | Concept 3 | |
|---|---|---|---|---|---|
| Frequency Response | (46%) | Fourier Transform | (40%) | z-Transform | (66%) |
| Sampling Rate | (23%) | Laplace Transform | (36%) | Pole/Zero Plot | (22%) |
| Aliasing | (21%) | z-Transform | (24%) | Laplace Transform | (12%) |
| Concept 4 | | Concept 5 | |
|---|---|---|---|
| Fourier Transform | (43%) | Impulse Response | (74%) |
| Systems/Circuits | (31%) | Transfer Function | (15%) |
| Transfer Function | (26%) | Fourier Transform | (11%) |
FIG. 1.7B

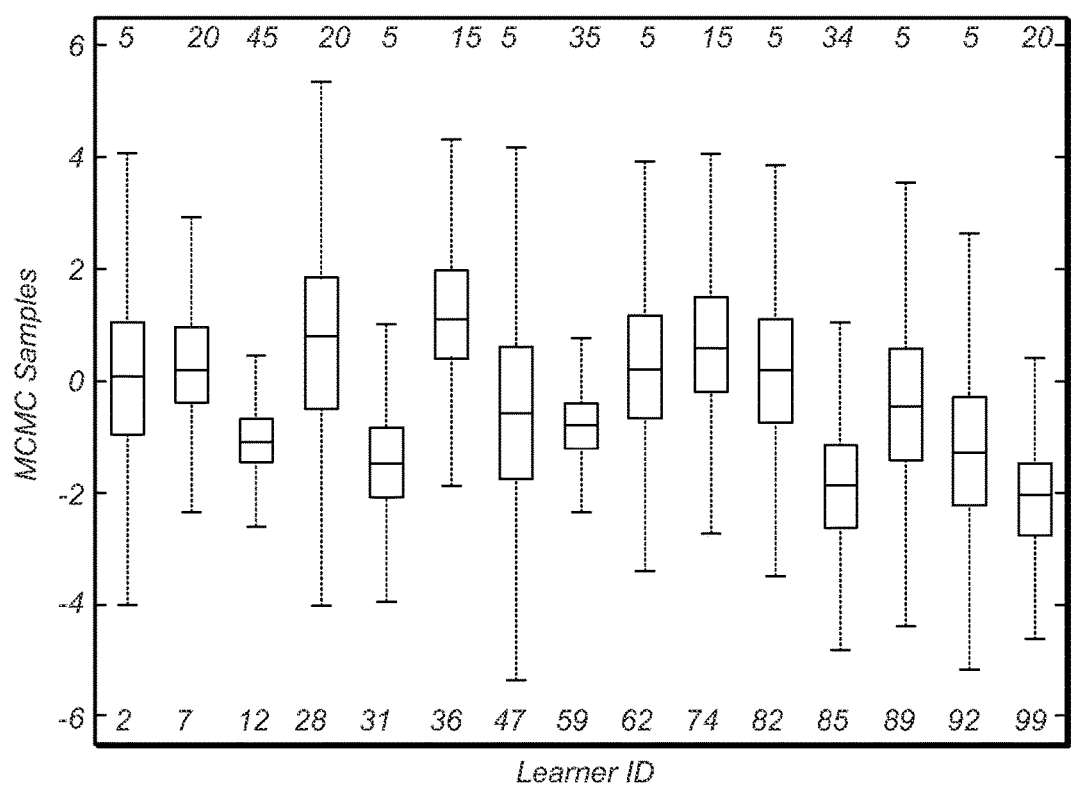
FIG. 1.8

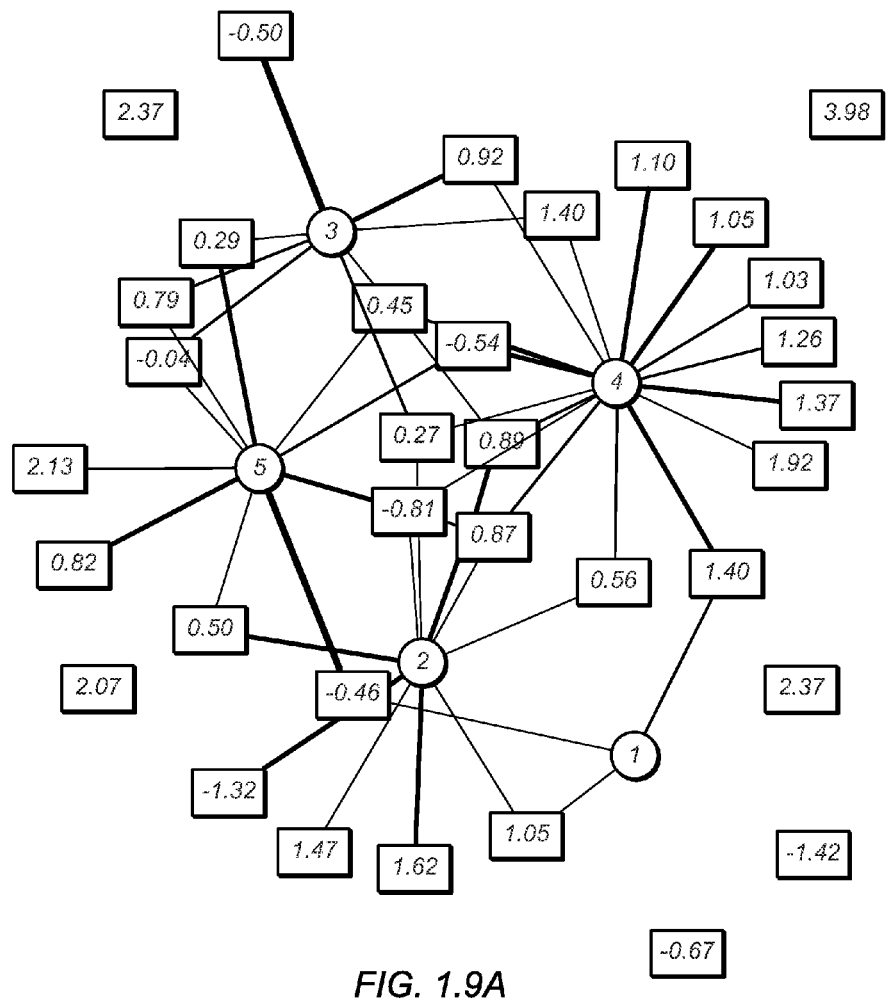
FIG. 1.9A
| Concept 1 | | Concept 2 | | Concept 2 | |
|---|---|---|---|---|---|
| Fractions | (46%) | Plotting Functions | (40%) | Geopmetry | (66%) |
| Solving Equations | (23%) | System of Equations | (36%) | Simplifying Expressions | (22%) |
| Arithmetic | (21%) | Simplifying Expressions | (24%) | Trigonometry | (12%) |
| Concept 4 | | Concept 5 | | | |
| Simplifying Expressions | (43%) | Trigonometry | (74%) | | |
| Trigonometry | (31%) | Slope | (15%) | | |
| Plotting Functions | (26%) | Solving Equations | (11%) | | |
FIG. 1.9B

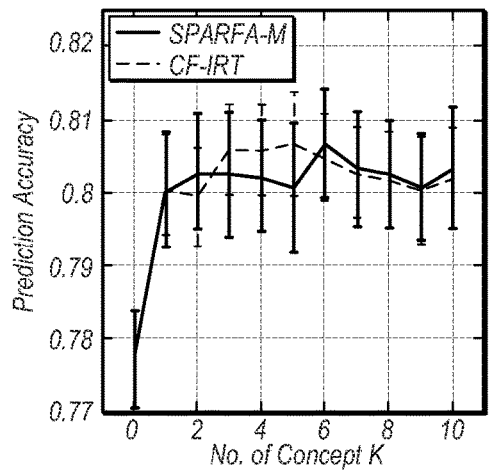
FIG. 1.10A
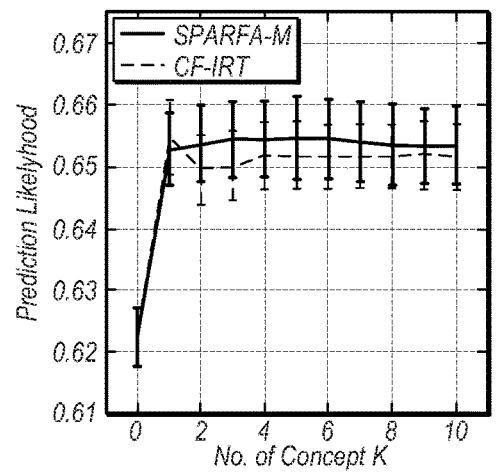
FIG. 1.10B
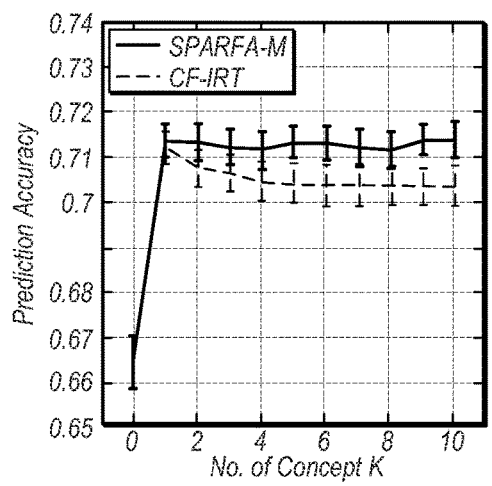
FIG. 1.10C
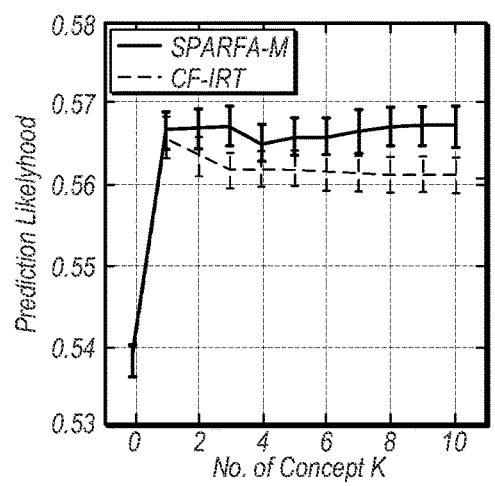
FIG. 1.10D

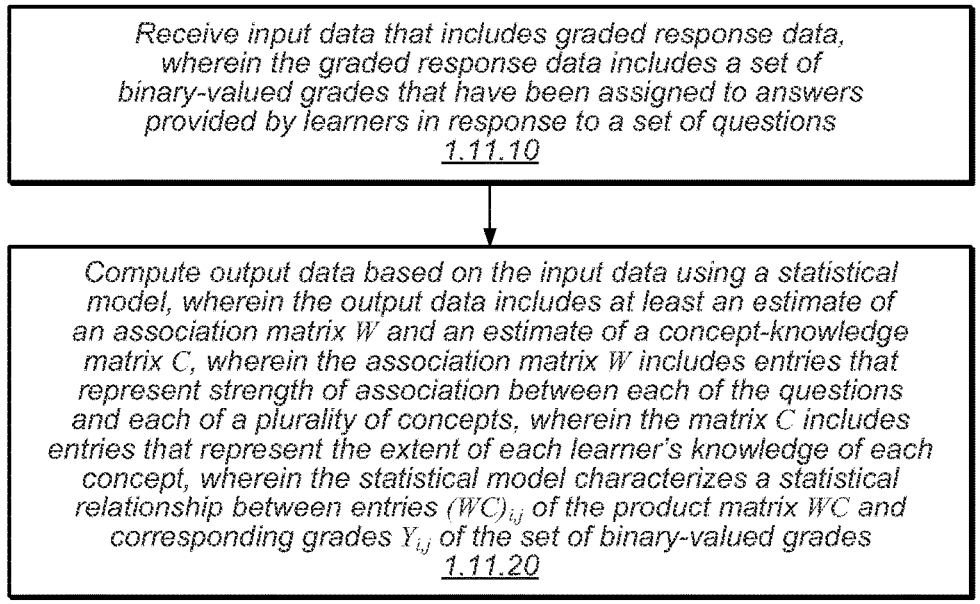
FIG. 1.11
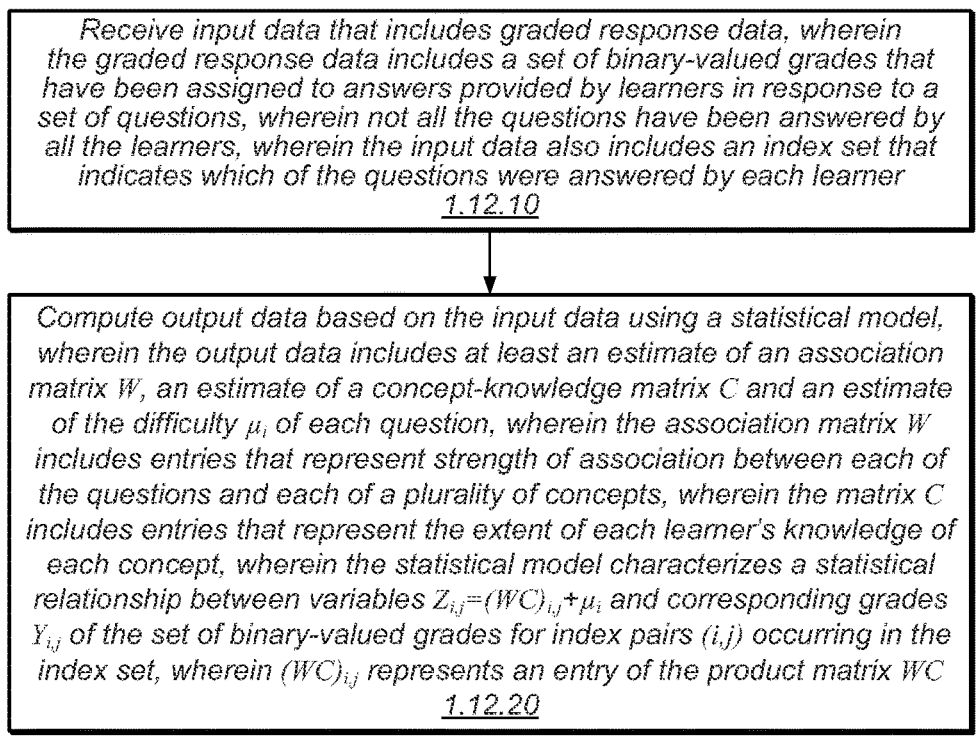
FIG. 1.12

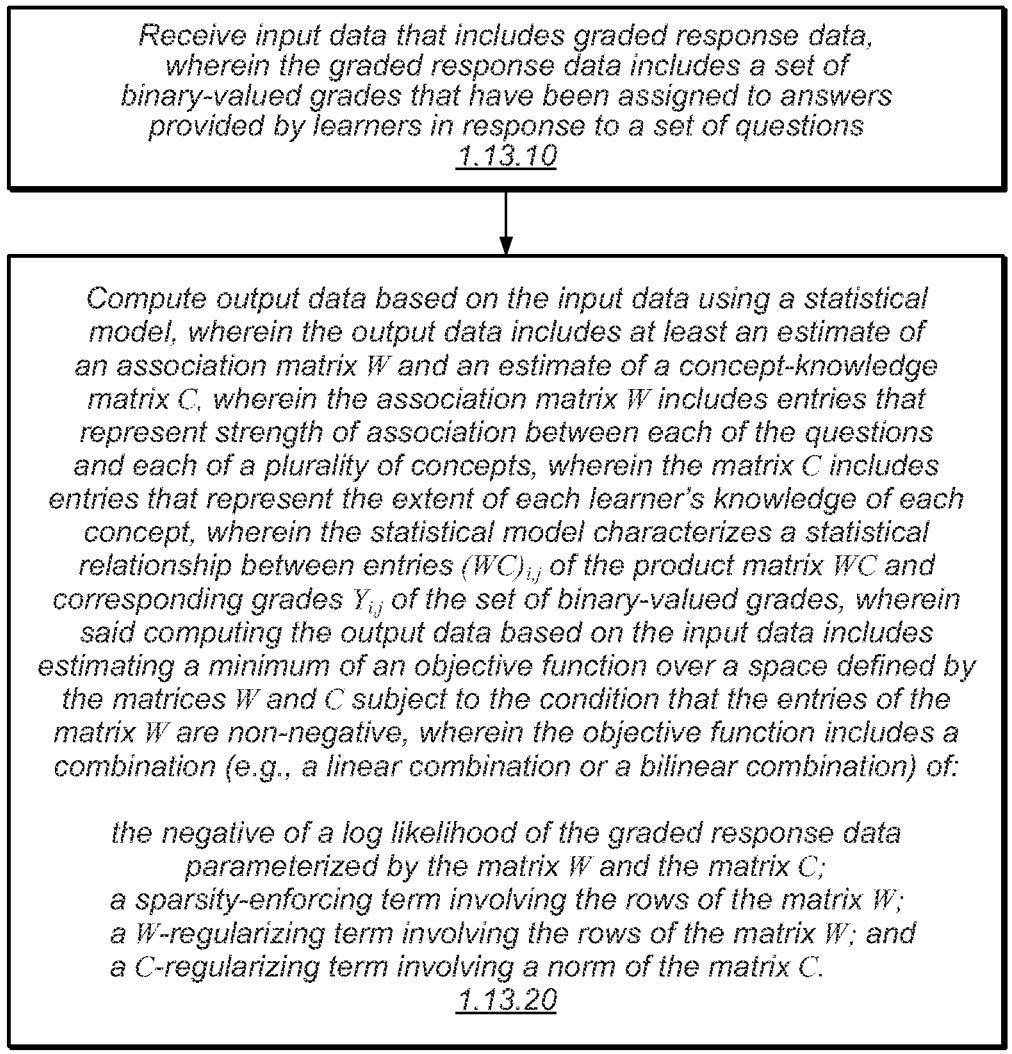
FIG. 1.13

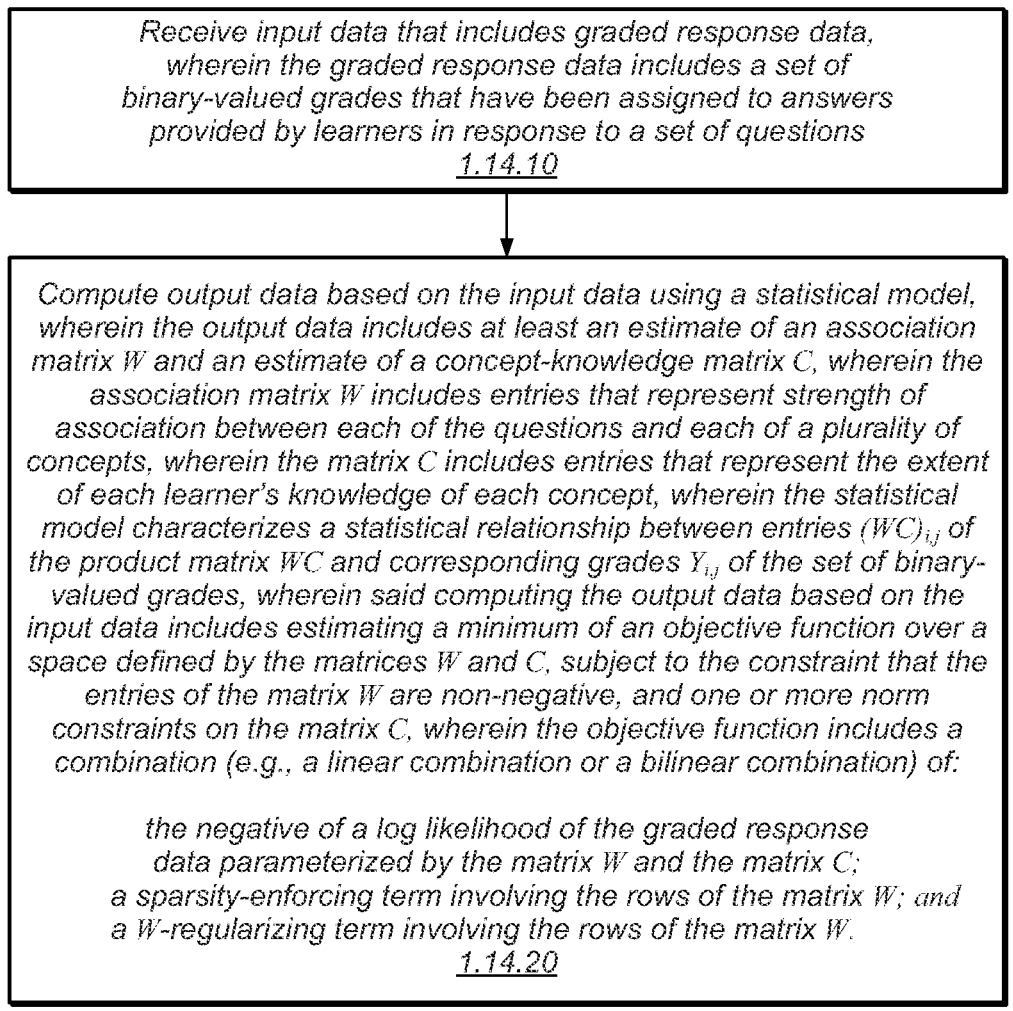
FIG. 1.14

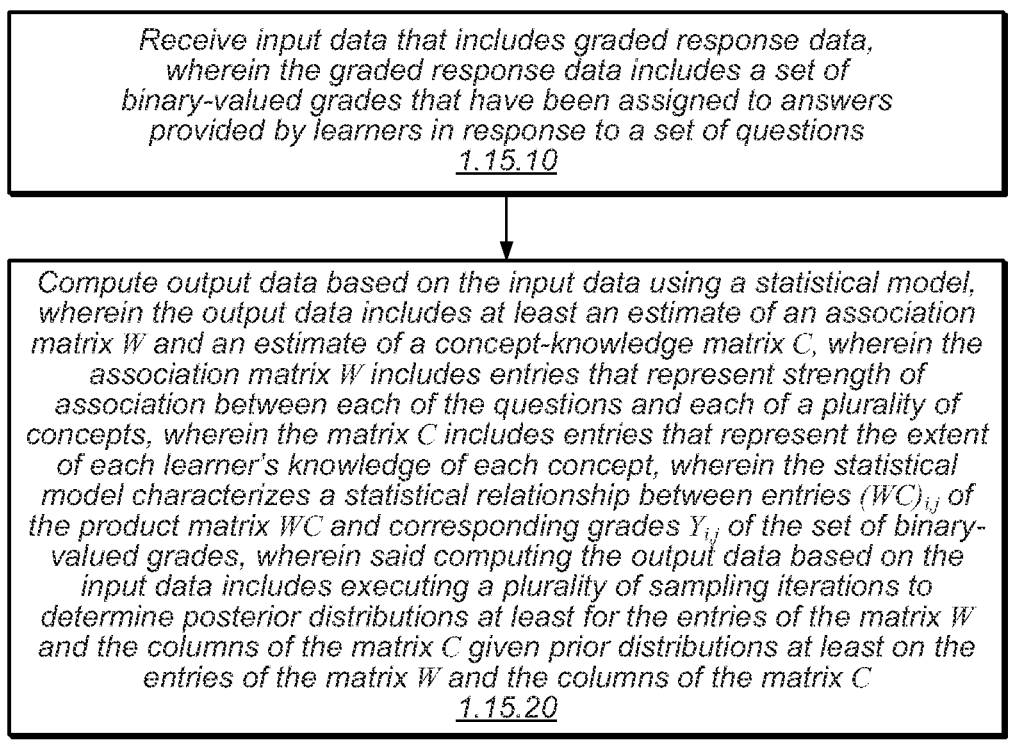
FIG. 1.15

Receive input data that includes a collection of $M$ tags, a $Q{\times}M$ matrix $T$ and a predetermined $Q{\times}K$ matrix $W$, wherein, for each question in a set of $Q$ questions, a corresponding subset of the $M$ tags have been assigned to the question, wherein for each question in the set of $Q$ questions, the matrix $T$ identifies the corresponding subset of the $M$ tags, wherein the matrix $W$ includes entries that represent strength of association between each of the $Q$ questions and each concept in a set of $K$ concepts
1.16.10

Compute an estimate of an $M{\times}K$ matrix $A$, wherein entries of the matrix $A$ represent strength of association between each of the $M$ tags and each of the $K$ concepts, wherein, for each column $a_k$ of the matrix $A$, said computing the estimate includes estimating a minimum of a corresponding objective function subject to a constraint that the entries in the column $a_k$ are non-negative, wherein the objective function comprises a combination of:

a first term that forces a distance between the matrix-vector product $Ta_k$ and the corresponding column $w_k$ of matrix $W$ to be small; and
    a second term that enforces sparsity on the column $a_k$
1.16.20

FIG. 1.16

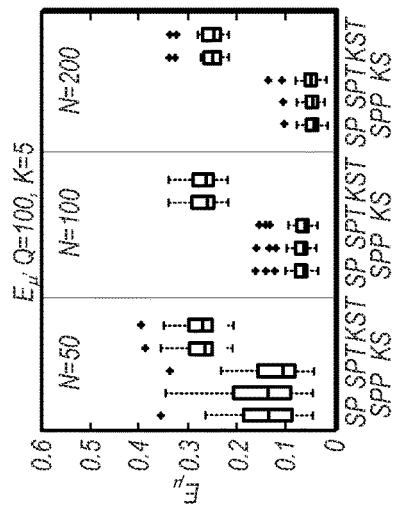
FIG. 2.1A
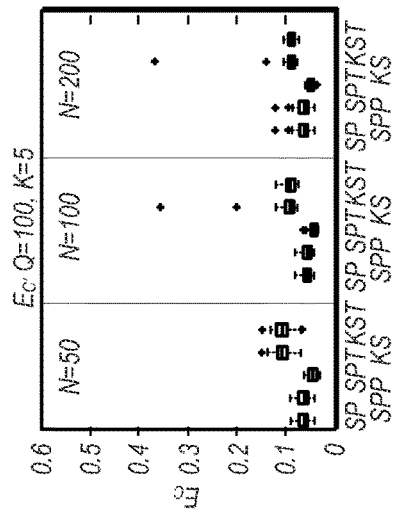
FIG. 2.1B
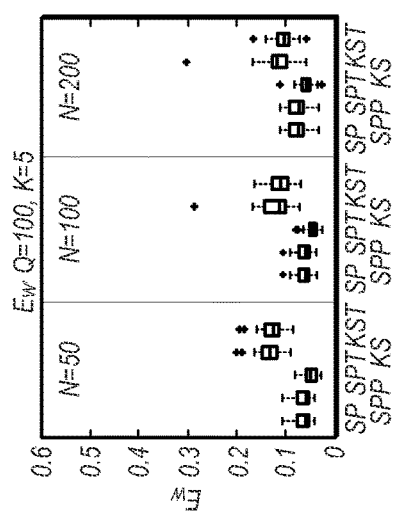
FIG. 2.1C
Impact of the number of learners, where $N$ is an element of $\{50, 100, 200\}$, with the number of questions $Q$ fixed.
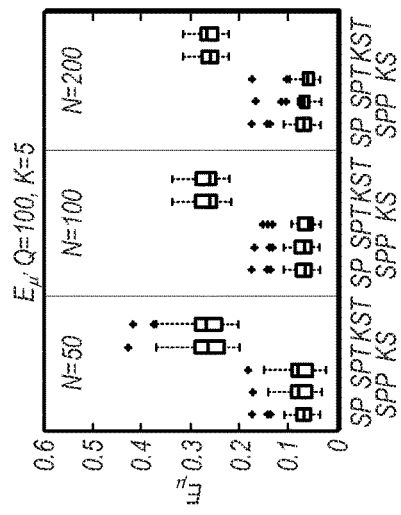
FIG. 2.1D
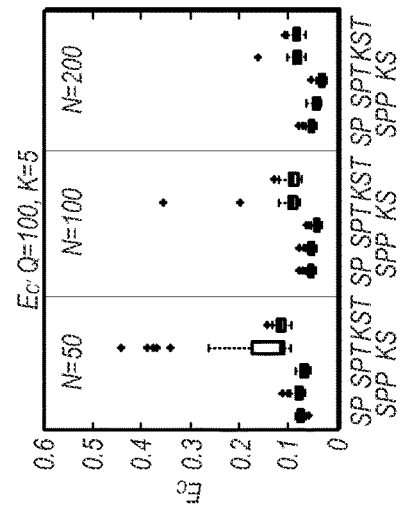
FIG. 2.1E
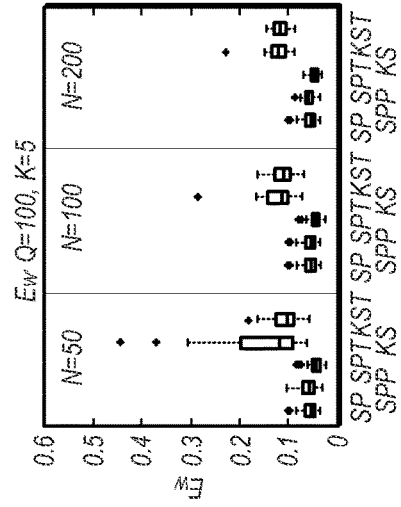
FIG. 2.1F
Impact of the number of learners, where $Q$ is an element of $\{50, 100, 200\}$, with the number of learners $N$ fixed.

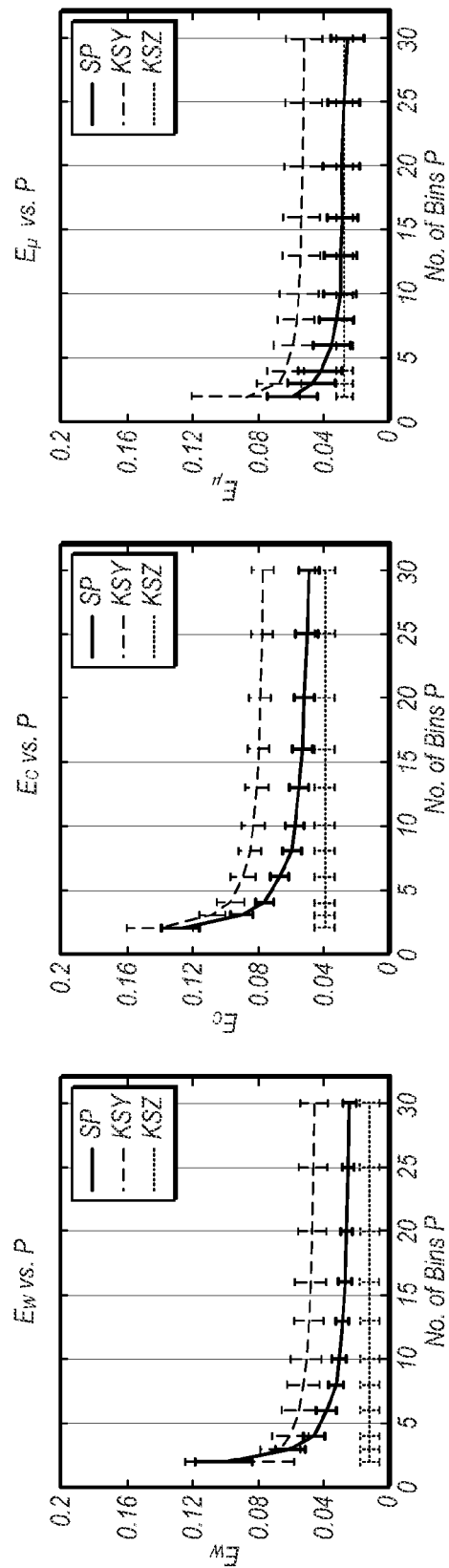
FIG. 2.2C  FIG. 2.2B  FIG. 2.2A

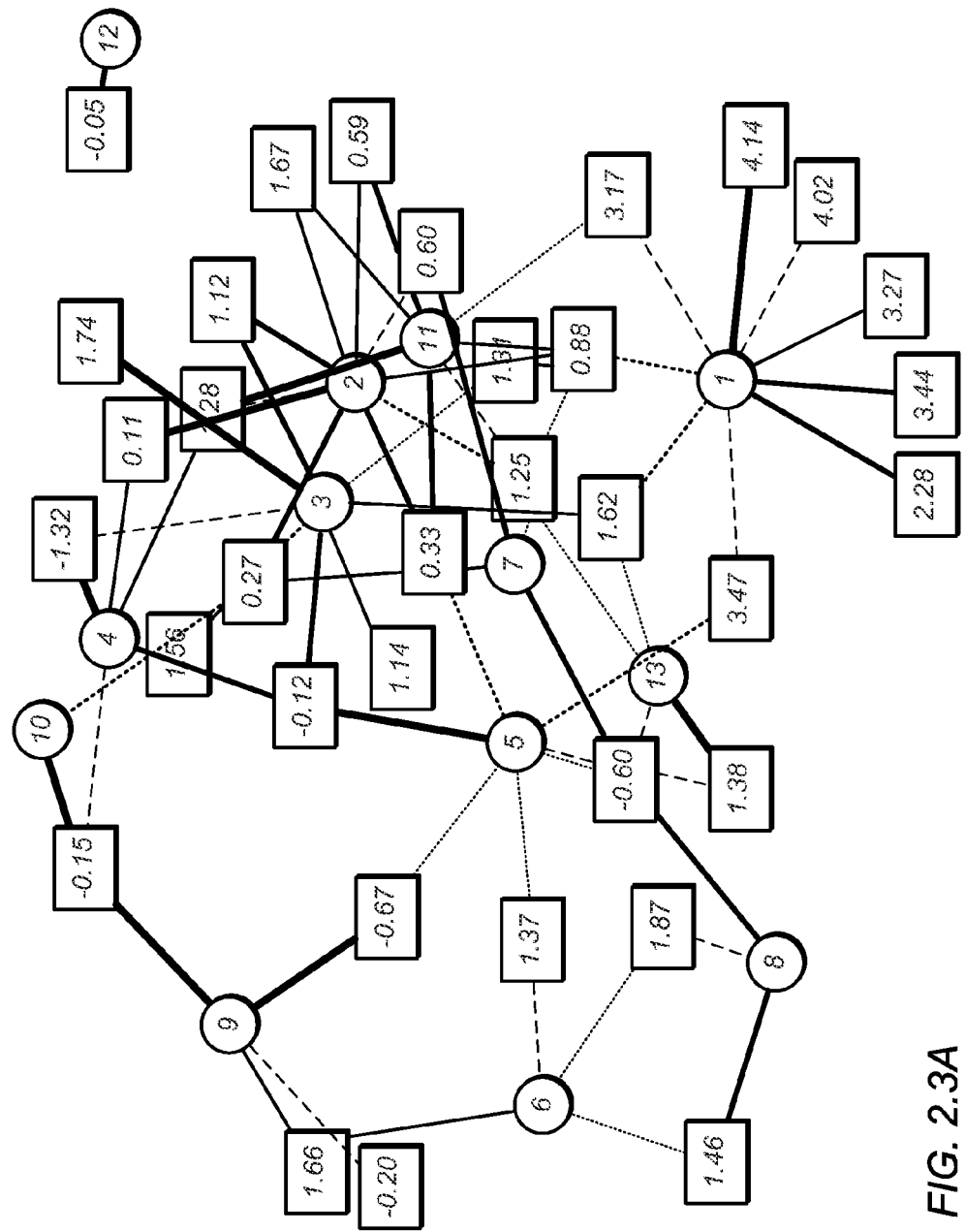
FIG. 2.3A

| Concept 1 | Concept 2 | Concept 3 | Concept 4 | Concept 5 |
|---|---|---|---|---|
| Arithmetic | Simplifying expressions | Solving equations | Fractions | Quadratic functions |
| Concept 6 | Concept 7 | Concept 8 | Concept 9 | Concept 10 |
| Geometry | Inequality | Slope | Trigonometry | Limits |
| Concept 11 | Concept 12 | Concept 13 | | |
| Polynomials | System equations | Plotting functions | | |

*FIG. 2.3B*

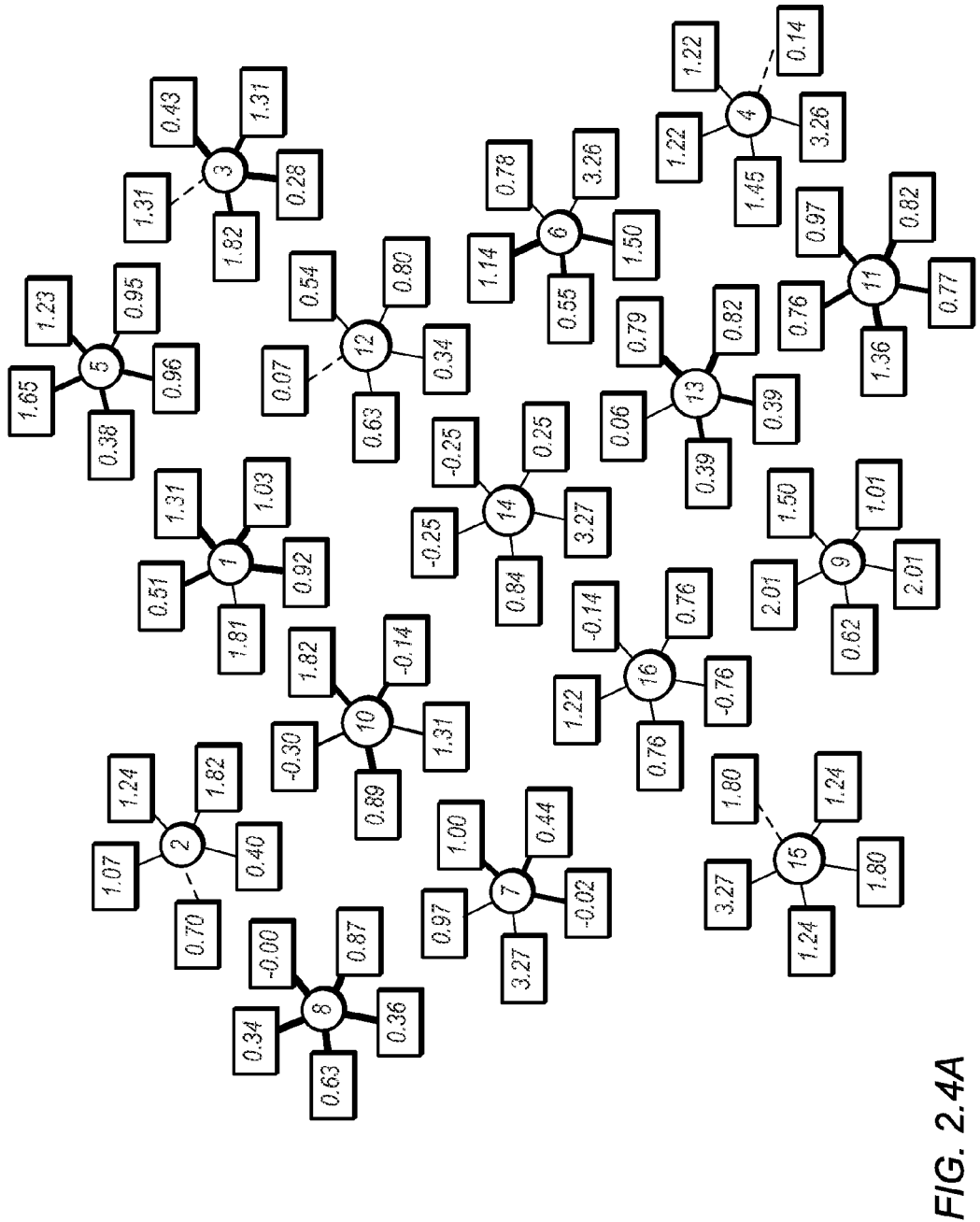
FIG. 2.4A

| Concept 1 | Concept 2 | Concept 3 | Concept 4 | Concept 5 |
|---|---|---|---|---|
| Classifying matter | Properties of water | Mixtures and solutions | Changes from heat | Uses of energy |
| Concept 6 | Concept 7 | Concept 8 | Concept 9 | Concept 10 |
| Circuits and electricity | Forces and motion | Formation of fossil fuels | Changes to land | Evidence of the past |
| Concept 11 | Concept 12 | Concept 13 | Concept 14 | Concept 15 | Concept 16 |
| Earth, sun and moon | Alternative energy | Properties of soil | Earth's forces | Food webs | Environmental changes |

FIG. 2.4B

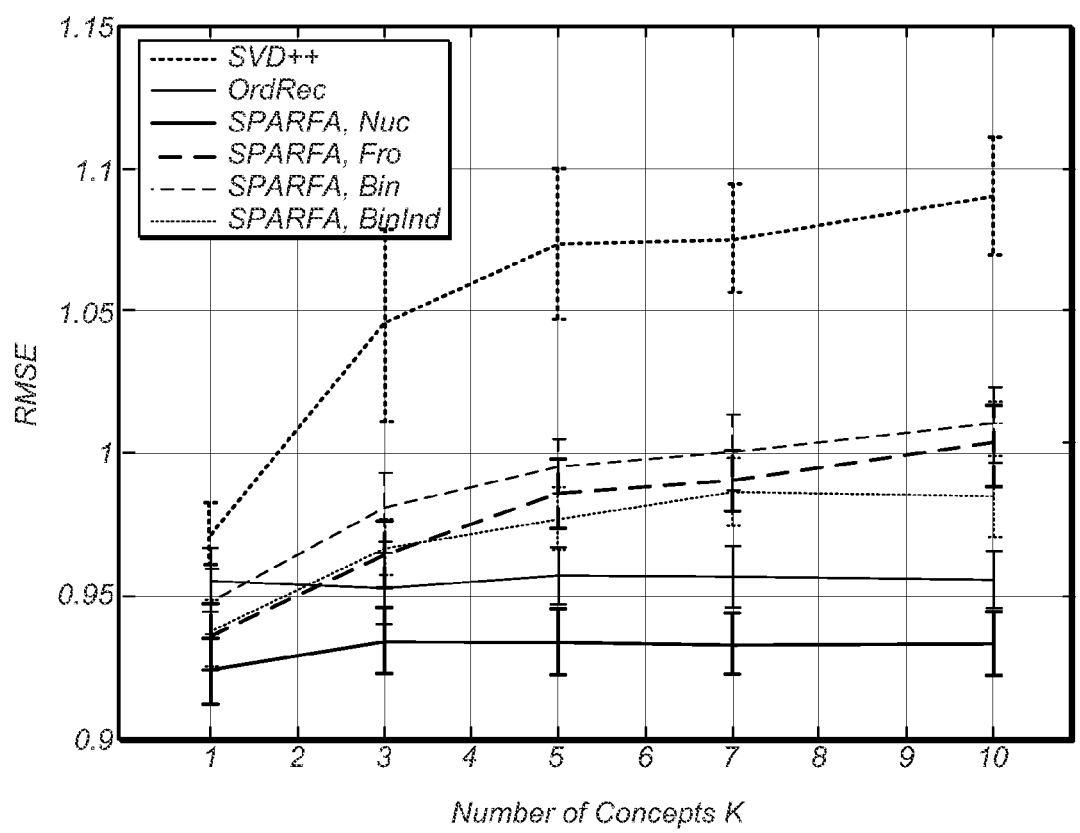
FIG. 2.5

```
┌─────────────────────────────────────────────┐
│ receive input data that includes graded response data, wherein
│ the graded response data includes a set of grades that have been
│ assigned to answers provided by learners in response to a set of
│ questions, wherein each of the grades has been selected from an
│ ordered set of P labels, wherein P is greater than or equal to two
│                    2.6.10
└─────────────────────────────────────────────┘
                       ↓
┌─────────────────────────────────────────────┐
│ operate on the input data to determine:
│
│ a set of K concepts that are implicit in the set of questions,
│ wherein K is smaller than the number of questions in the set
│ of questions, wherein the concepts are represented by an
│ association matrix whose entries characterize strengths of
│ association between the questions and the concepts; and
│
│ a learner knowledge matrix including, for each learner and
│ each of the K concepts, the extent of the learner's knowledge
│ of the concept
│                    2.6.20
└─────────────────────────────────────────────┘
```

*FIG. 2.6*

```
┌─────────────────────────────────────────────┐
│ receive input data that includes graded response data, wherein
│ the graded response data includes a set of grades that have been
│ assigned to answers provided by learners in response to a set of
│ questions, wherein each of the grades has been selected from an
│ ordered set of P labels, wherein P is greater than or equal to two
│                    2.7.10
└─────────────────────────────────────────────┘
                       ↓
┌─────────────────────────────────────────────┐
│ compute output data based on the input data using a statistical model,
│ wherein the output data includes at least an estimate of an association
│ matrix W and an estimate of a concept-knowledge matrix C, wherein the
│ association matrix W includes entries that represent strength of
│ association between each of the questions and each of a plurality of
│ concepts, wherein the matrix C includes entries that represent the extent
│ of each learner's knowledge of each concept, wherein the statistical
│ model characterizes a statistical relationship between entries $(WC)_{i,j}$ of
│ the product matrix $WC$ and corresponding grades $Y_{i,j}$ of the set of grades
│                    2.7.20
└─────────────────────────────────────────────┘
```

*FIG. 2.7*

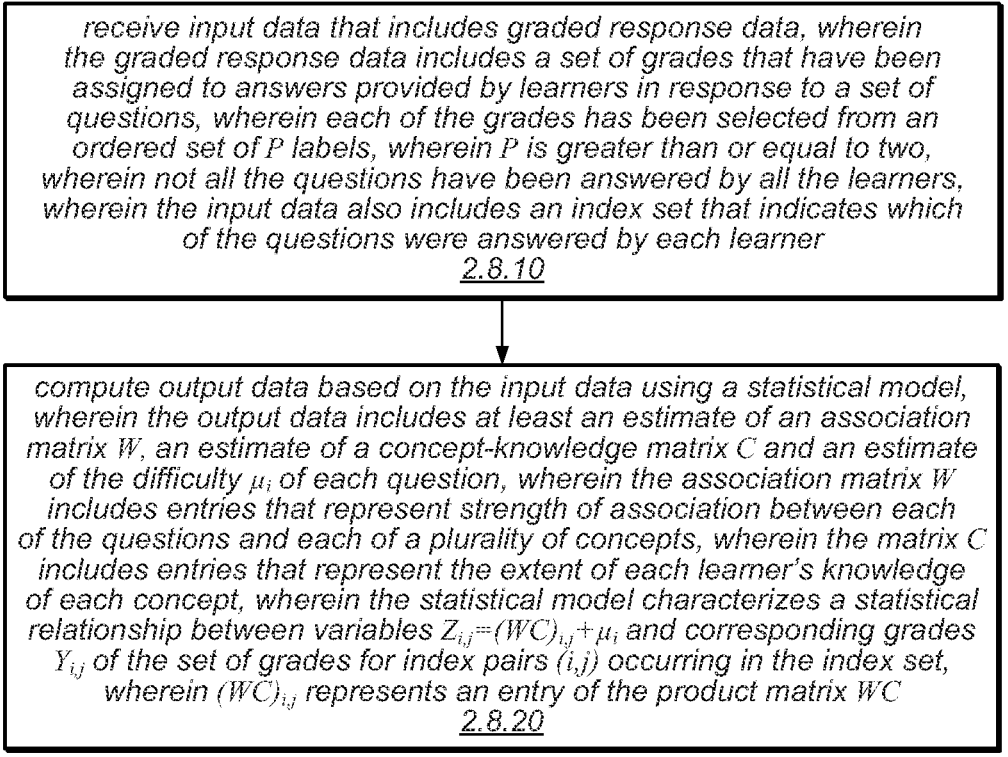
FIG. 2.8

Receive input data that includes graded response data, a collection of $N_T$ tags and a question-tag (QT) index set, wherein the graded response data includes a set of grades that have been assigned to answers provided by learners in response to a set of questions, wherein each of the grades has been selected from an ordered set of P labels, wherein P is greater than or equal to two, wherein the QT index set indicates, for each of the questions, which of the $N_T$ tags have been assigned to that question
2.9.10

Compute output data based on the input data using a statistical model, wherein the output data includes at least an estimate of an association matrix $W$ and an estimate of a concept-knowledge matrix $C$, wherein the association matrix $W$ includes entries that represent strength of association between each of the questions and each concept in a set of $N_T$ concepts, wherein the matrix $C$ includes entries that represent the extent of each learner's knowledge of each concept, wherein the statistical model characterizes a statistical relationship between entries $(WC)_{i,j}$ of the product matrix $WC$ and corresponding grades $Y_{i,j}$ of the set of grades, wherein said computing the output data based on the input data includes estimating a minimum of an objective function over a search space including a first subspace defined by the matrix $W$ and a second subspace defined by the matrix $C$, subject to conditions including a non-negativity constraint on the entries of the matrix $W$ and one or more norm constraints on the matrix $C$, wherein the objective function includes a combination (e.g., a linear combination or a bilinear combination) of:

a negative of a log likelihood of the graded response data parameterized by the matrix $W$ and the matrix $C$;

a sparsity-enforcing term involving restrictions of rows of the matrix $W$ to entries specified by a complement of the QT index set;

a regularizing term involving restrictions of rows of the matrix $W$ to entries specified by the QT index set.
2.9.20

FIG. 2.9 receive input data that includes graded response data, a collection of $N_T$ tags and a question-tag (QT) index set, where the graded response data includes a set of grades that have been assigned to answers provided by learners in response to a set of questions, where each of the grades has been selected from an ordered set of P labels, where P is greater than or equal to two, where the QT index set indicates, for each of the questions, which of the $N_T$ tags have been assigned to that question
2.10.10 compute output data based on the input data using a statistical model, where the output data includes at least an estimate of an association matrix W and an estimate of a concept-knowledge matrix C, where the association matrix W includes entries that represent strength of association between each of the questions and each concept of a set of K concepts, where the matrix C includes entries that represent the extent of each learner's knowledge of each concept, where the statistical model characterizes a statistical relationship between entries $(WC)_{i,j}$ of the product matrix WC and corresponding grades $Y_{i,j}$ of the set of grades, where said computing the output data based on the input data includes estimating a minimum of an objective function over a search space including a first subspace defined by the matrix W and a second subspace defined by the matrix C, subject to conditions including a non-negativity constraint on the entries of the matrix W and one or more norm constraints on the matrix C, where the objective function includes a combination (e.g., a linear combination or a bilinear combination) of:

a negative of a log likelihood of the graded response data parameterized by the matrix W and the matrix C;

a sparsity-enforcing term involving restrictions of rows of the matrix W to entries specified by a complement of the QT index set;

a regularizing term involving restrictions of rows of the matrix W to entries specified by the QT index set
2.10.20

FIG. 2.10

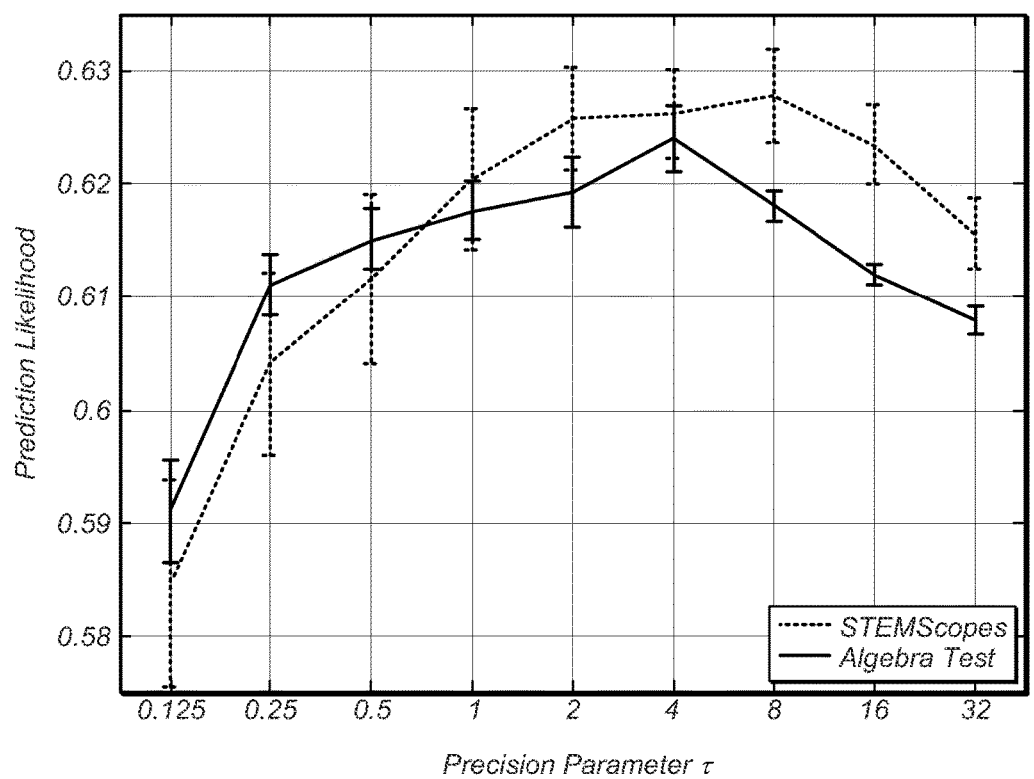
FIG. 3.1

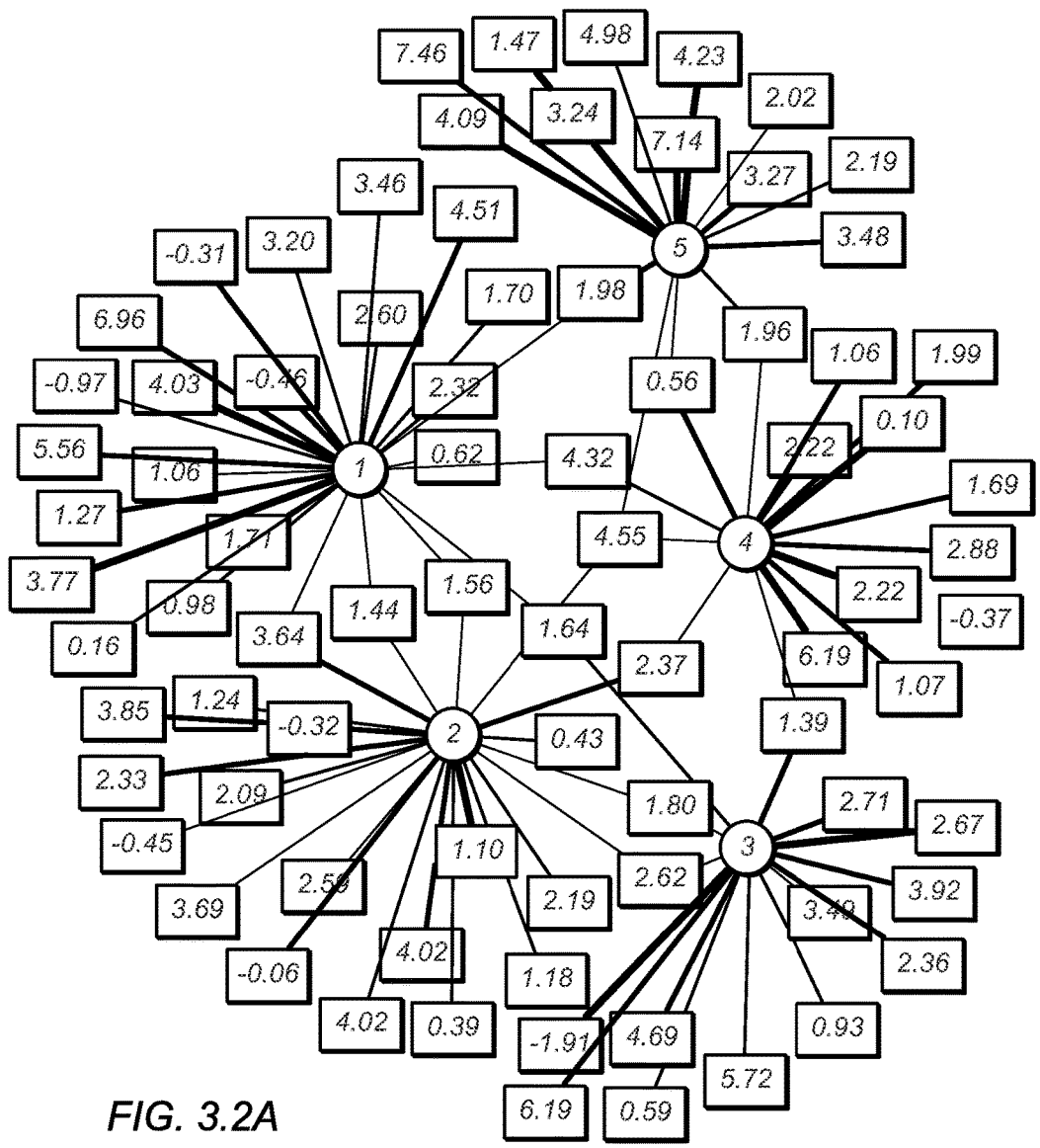
FIG. 3.2A
| Concept 1 | Concept 2 | Concept 3 | Concept 4 | Concept 5 |
|---|---|---|---|---|
| Energy | Water | Plants | Water | Water |
| Water | Percentage | Buffalo | Soil | Heat |
| Earth | Sand | Eat | Sample | Objects |
FIG. 3.2B

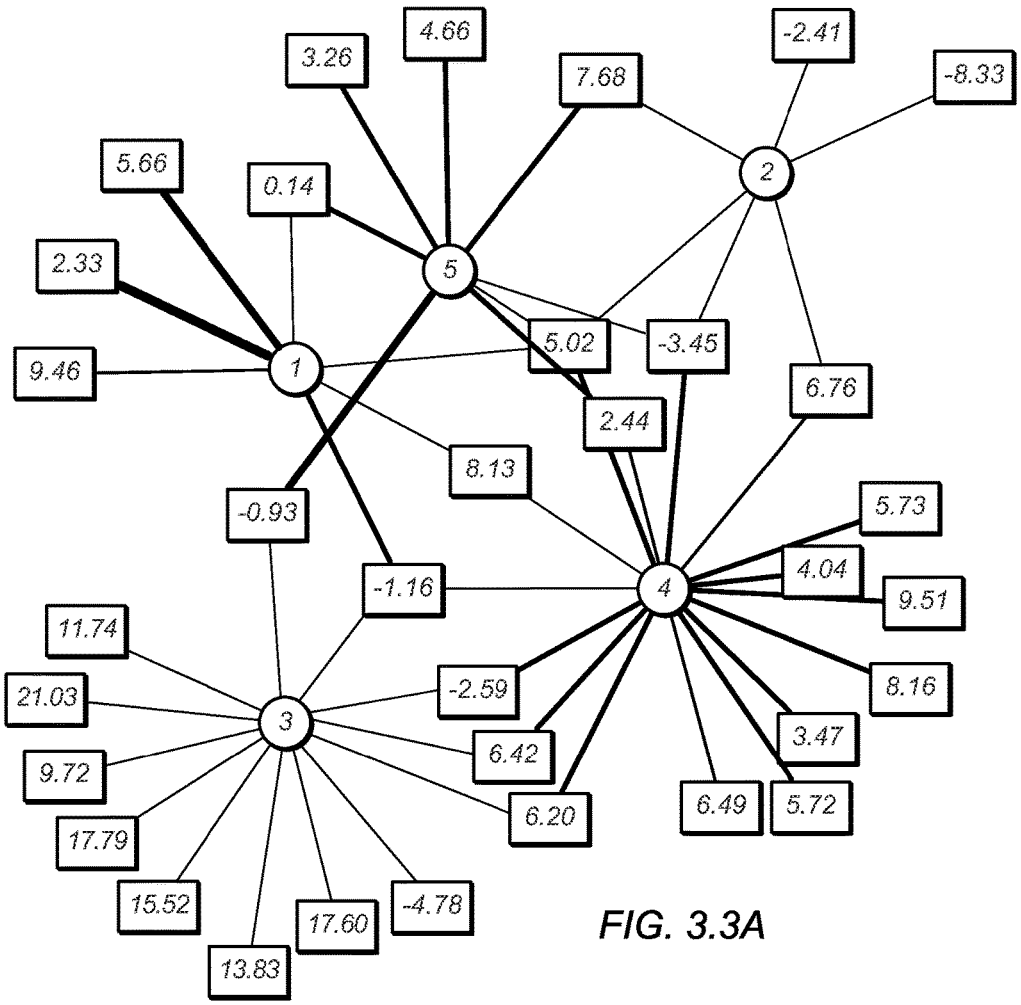
FIG. 3.3A
| Concept 1 | Concept 2 | Concept 2 |
|---|---|---|
| Solving Equations | Slope | Arithmetic |
| Quadratic Function | Fractions | Trigonometry |
| Fractions | Simplifying Expressions | System of Equations |
| Concept 4 | Concept 5 | |
|---|---|---|
| Simplifying Expressions | Inequality | |
| Factoring Polynomials | Plotting Functions | |
| Fractions | Geometry | |
FIG. 3.3B Receive input data including graded response data and word frequency data, wherein the graded response data includes a set of grades that have been assigned to answers provided by learners in response to a set of questions, wherein each of the questions is associated with a corresponding set of text, wherein the word frequency data is related to a vocabulary of words (or, a dictionary of terms) that has been derived from a union of the text sets over the questions, wherein the word frequency data indicates the frequency of occurrence of each vocabulary word in the text of each question
3.4.10

Estimate output data based on the input data, wherein the output data includes (a) strengths of association between the questions and concepts in a set of K concepts, (b) extents to which the learners have knowledge of the concepts and (c) strengths of association between the vocabulary words and the K concepts, wherein said estimating includes minimizing an objective with respect to (a), (b) and (c), wherein the objective includes at least:

a negative log likelihood of the graded response data parameterized at least by (a) and (b);

a negative log likelihood of the word frequency data parameterized at least by (a) and (c)
3.4.20

*FIG. 3.4*

Receive input data that includes graded response data and a word-frequency matrix $B$, wherein the graded response data includes a set of grades that have been assigned to answers provided by learners in response to a set of questions, wherein each of the grades has been selected from an ordered set of $P$ labels, wherein $P$ is greater than or equal to two, wherein each of the questions is associated with a corresponding set of text, wherein the matrix $B$ is related to a vocabulary of words (or, a dictionary of terms) that has been derived from a union of the text sets taken over the questions, wherein the matrix $B$ includes entries $B_{i,v}$ that indicate the frequency of occurrence of each vocabulary word in the text of each question
3.5.10

Compute output data based on the input data using a first statistical model and a second statistical model, wherein the output data includes at least an estimate of an association matrix $W$, an estimate of a concept-knowledge matrix $C$ and an estimate of a word-concept matrix $T$, wherein the association matrix $W$ includes entries that represent strength of association between each of the questions and each concept of a set of $K$ concepts, wherein the matrix $C$ includes entries that represent the extent of each learner's knowledge of each concept, wherein the matrix $T$ includes entries $T_{k,v}$ that represent a strength of association between each vocabulary word and each of the $K$ concepts, wherein the first statistical model characterizes a statistical relationship between entries $(WC)_{i,j}$ of the product matrix $WC$ and corresponding grades $Y_{i,j}$ of the set of grades, wherein the second statistical model characterizes a statistical relationship between entries $(WT)_{i,v}$ of the product matrix $WT$ and entries $B_{i,v}$ of the matrix $B$, wherein said computing the output data based on the input data includes estimating a minimum of an objective function over a search space defined by the matrix $W$, the matrix $C$ and the matrix $T$, subject to conditions including a non-negativity constraint on the entries of the matrix $W$ and the entries of the matrix $T$, wherein the objective function includes a combination (e.g., a linear combination or a bilinear combination) of:
(a) a negative of a log likelihood of the graded response data parameterized by the matrix $W$ and the matrix $C$;
(b) a negative of a log-likelihood of the entries of the matrix $B$ parameterized by the matrix $W$ and the matrix $C$;
(c) a sparsity-enforcing term involving rows of the matrix $W$;
(d) a first regularizing term involving columns of the matrix $C$; and
(e) a second regularizing term involving columns of the matrix $T$
3.5.20

FIG. 3.5

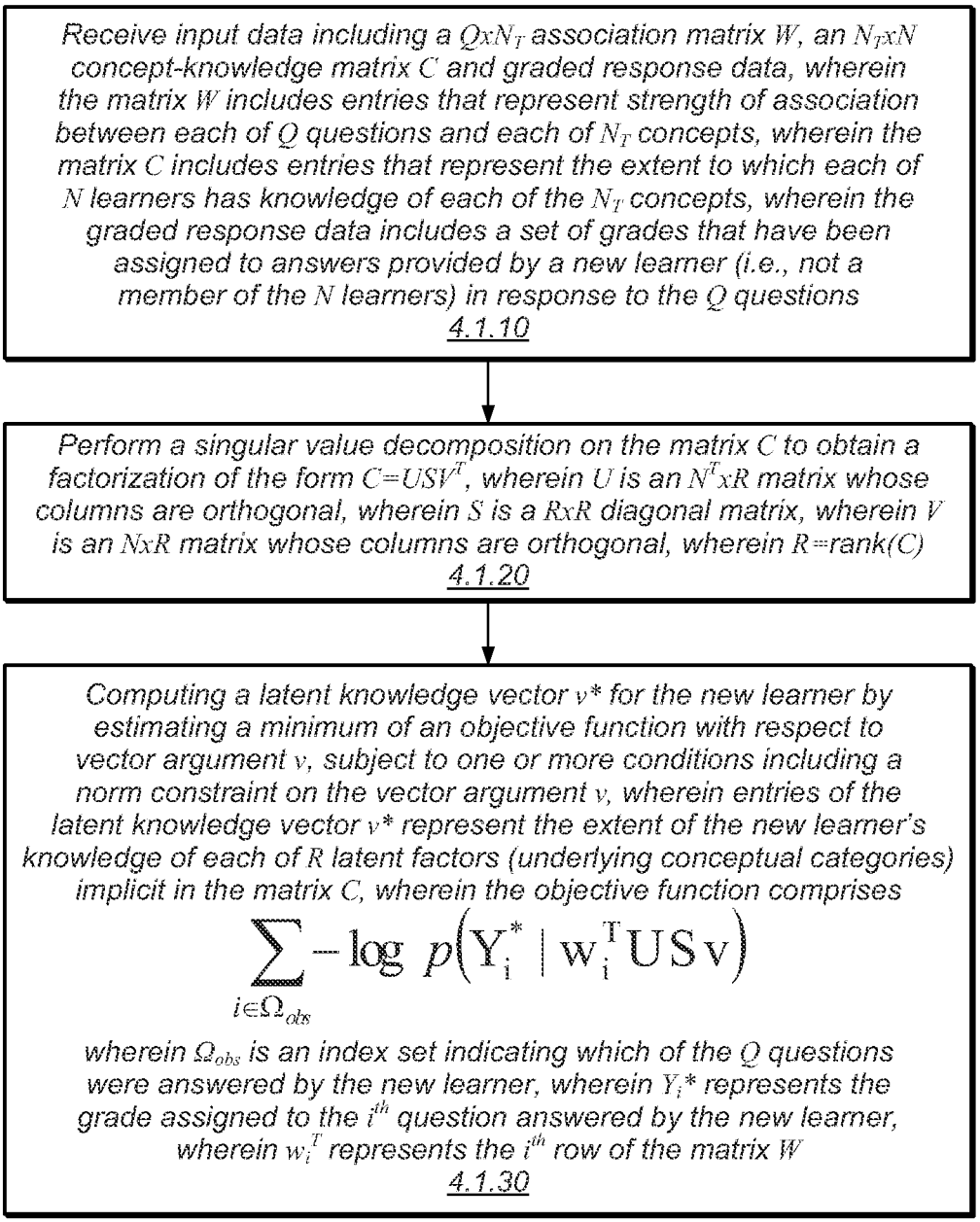
FIG. 4.1

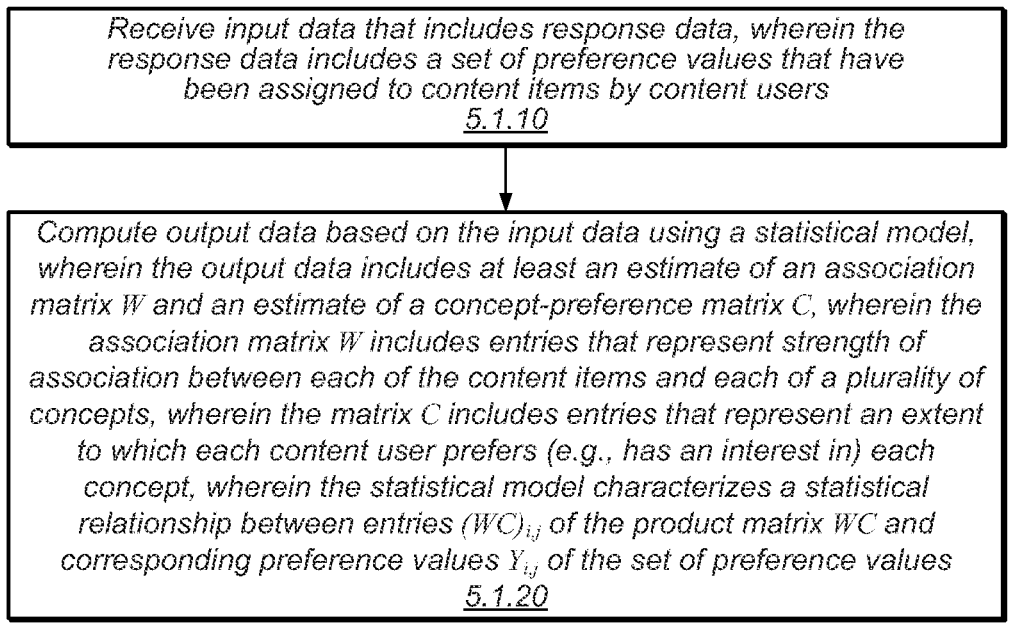
FIG. 5.1

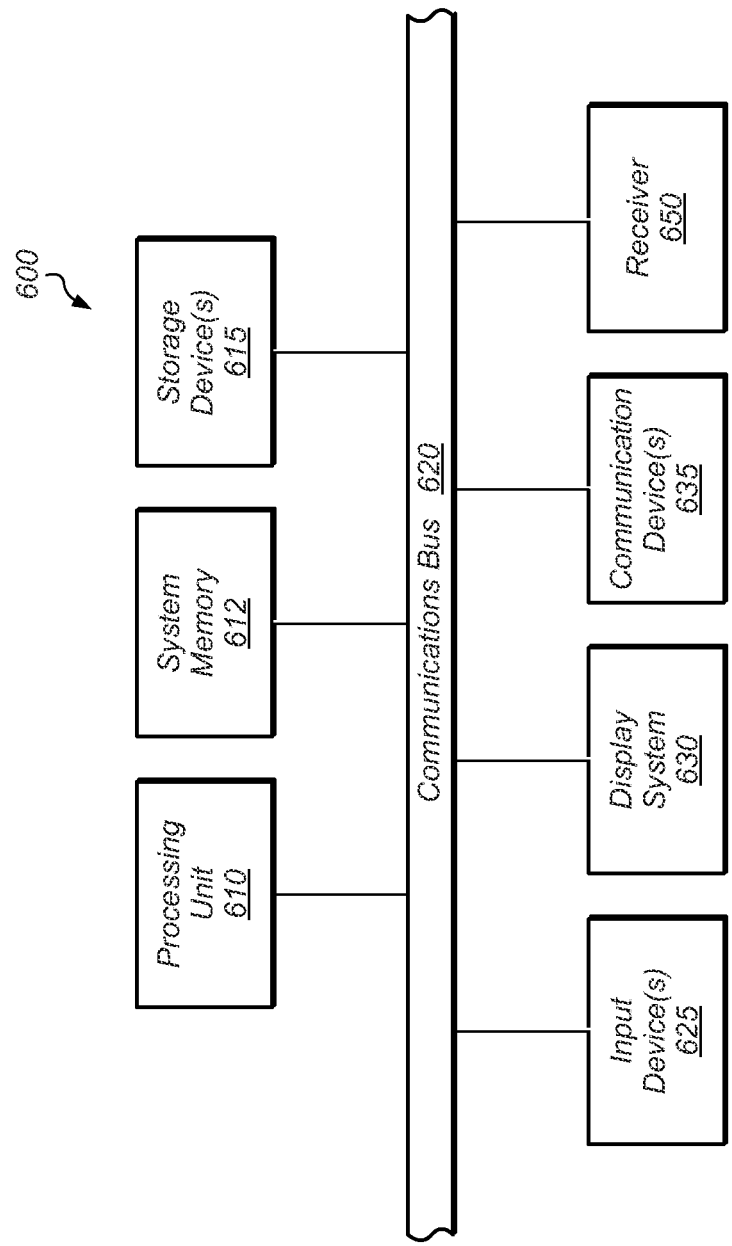
Fig. 6.1 receive input data that includes graded response data, wherein the graded response data includes a set of grades that have been assigned to answers provided by learners in response to a set of questions, wherein the grades are drawn from a universe of possible grades
_7.1.10_ compute output data based on the input data using a first latent factor model, wherein said computing is performed by the computer system, wherein the output data includes at least:
  an association matrix that defines a set of K concepts implicit in the set of questions, wherein K is smaller than the number of questions in the set of questions, wherein, for each of the K concepts, the association matrix defines the concept by specifying strengths of association between the concept and the questions; and
  a learner knowledge matrix including, for each learner and each of the K concepts, an extent of the learner's knowledge of the concept
_7.1.15_ display a visual representation of at least a subset of the association strengths in the association matrix and/or at least a subset of the extents in the learner knowledge matrix   _7.1.20_

FIG. 7.1 receive input data that includes response data, wherein the response data includes a set of preference values that have been assigned to content items by content users, wherein the preference values are drawn from a universe of possible values    8.1.10 compute output data based on the input data using a latent factor model, wherein the output data includes at least:
    an association matrix that defines a set of K concepts associated with the content items, wherein K is smaller than the number of the content items, wherein, for each of the K concepts, the association matrix defines the concept by specifying strengths of association between the concept and the content items; and
    a concept-preference matrix including, for each content user and each of the K concepts, an extent to which the content user prefers the concept    8.1.15 display a visual representation of at least a subset of the association strengths in the association matrix and/or at least a subset of the extents in the concept-preference matrix    8.1.20

*FIG. 8.1*

SPARSE FACTOR ANALYSIS FOR ANALYSIS OF USER CONTENT PREFERENCES

PRIORITY CLAIM DATA

This application claims the benefit of priority to U.S. Provisional Application No. 61/790,727, filed on Mar. 15, 2013, entitled "SPARSE Factor Analysis for Learning Analytics and Content Analytics", invented by Richard G. Baraniuk, Andrew S. Lan, Christoph E. Studer, and Andrew E. Waters, which is hereby incorporated by reference in its entirety as though fully and completely set forth herein.

STATEMENT OF GOVERNMENT RIGHTS

This invention was made with government support under NSF Grant No. IIS-1124535 awarded by the National Science Foundation, Office of Naval Research Grant No. N00014-10-1-0989 awarded by the U.S. Department of Defense, and Air Force Office of Scientific Research Grant No. FA9550-09-1-0432 also awarded by the U.S. Department of Defense. The government has certain rights in the invention.

FIELD OF THE INVENTION

The present invention relates to the field of machine learning, and more particularly, to mechanisms for: (a) exposing the underlying concepts implicit in content preferences expressed by users of content items, (b) estimating the extent of each user's preference of each of the concepts, and (c) estimating the strength of association of each content item with each of the concepts.

DESCRIPTION OF THE RELATED ART

Textbooks, lectures, and homework assignments were the answer to the main educational challenges of the 19th century, but they are the main bottleneck of the 21st century. Today's textbooks are static, linearly organized, time-consuming to develop, soon out-of-date, and expensive. Lectures remain a primarily passive experience of copying down what an instructor says and writes on a board (or projects on a screen). Homework assignments that are not graded for weeks provide poor feedback to learners (e.g., students) on their learning progress. Even more importantly, today's courses provide only a "one-size-fits-all" learning experience that does not cater to the background, interests, and goals of individual learners. Thus, there exists a need for systems and methods capable of providing a learning experience that is personalized to individual learners.

Furthermore, there exists a need for systems and methods capable of providing improved analysis of user preferences for content items, e.g., for online digital content items.

SUMMARY

In one set of embodiments, a method for facilitating personalized learning may include the following operations.

A computer may receive input data that includes graded response data. The graded response data includes a set of grades that have been assigned to answers provided by learners in response to a set of questions, where the grades are drawn from a universe of possible grades.

The computer computes output data based on the input data using a latent factor model. The output data may include at least: (a) an association matrix that defines a set of K concepts implicit in the set of questions, where K is smaller than the number of questions in the set of questions, where, for each of the K concepts, the association matrix defines the concept by specifying strengths of association between the concept and the questions; and (b) a learner knowledge matrix including, for each learner and each of the K concepts, an extent of the learner's knowledge of the concept. The computer may display (or direct the display of) a visual representation of at least a subset of the association strengths in the association matrix and/or at least a subset of the extents in the learner knowledge matrix.

The output data may be computed by performing a maximum likelihood sparse factor analysis (SPARFA) on the input data using the latent factor model, and/or, by performing a Bayesian sparse factor analysis on the input data using the latent factor model. Various methods for implementing maximum likelihood SPARFA and Bayesian SPARFA are disclosed herein.

In one set of embodiments, a method for exposing user preferences for conceptual categories of content items may involve the following operations.

A computer may receive input data that includes response data, where the response data includes a set of preference values that have been assigned to content items by content users, where the preference values are drawn from a universe of possible values, where said receiving is performed by a computer system.

The computer may compute output data based on the input data using a latent factor model, where said computing is performed by the computer system, where the output data includes at least: (a) an association matrix that defines a set of K concepts associated with the set of content items, where K is smaller than the number of the content items, where, for each of the K concepts, the association matrix defines the concept by specifying strengths of association between the concept and the content items; and (b) a concept-preference matrix including, for each content user and each of the K concepts, an extent to which the content user prefers the concept. The computer may display a visual representation of at least a subset of the association strengths in the association matrix and/or at least a subset of the extents in the concept-preference matrix.

The output data may be computed by performing a maximum likelihood sparse factor analysis (SPARFA) on the input data using the latent factor model, and/or, by performing a Bayesian sparse factor analysis on the input data using the latent factor model.

In some embodiments, the content items are provided via the Internet by an entity (e.g., a business entity or governmental agency or an educational institution) that maintains an online repository of content items.

Additional embodiments are described in U.S. Provisional Application No. 61/790,727, filed on Mar. 15, 2013.

BRIEF DESCRIPTION OF THE DRAWINGS

A better understanding of the present invention can be obtained when the following detailed description of the preferred embodiments is considered in conjunction with the following drawings.

FIG. 1.0 illustrates one embodiment of a client-server based architecture for providing personalized learning services to users (e.g., online users).

FIGS. 1.1A and 1.1B illustrate one embodiment of the SPARFA framework, which processes a (potentially incomplete) binary-valued dataset (left) of graded learner-question responses to estimate the underlying questions-concept association graph (right) and the abstract conceptual knowledge of each learner (illustrated here by the emotive faces for learner j=3, i.e., the column in FIG. 1A selected by the dashed box).

FIG. 1.2A illustrates a sparse question-concept association graph, and FIG. 1.2B illustrates the most important tags associated with each concept for a Grade 8 Earth Science test with N=135 learners answering Q=80 questions. Only 13.5% of all graded learner-question responses were observed.

FIGS. 1.3A-1.3X illustrate a performance comparison of SPARFA-M, SPARFA-B and KSVD+ for different problem sizes Q×N and numbers of concepts K. The performance naturally improves as the problem size increases, while both SPARFA algorithms outperform K-SVD+. (M denotes SPARFA-M, B denotes SPARFA-B, and K denotes KSVD+.)

FIGS. 1.4A-1.4D illustrate a performance comparison of SPARFA-M, SPARFA-B, and KSVD+ for different percentages of observed entries in Y. The performance degrades gracefully as the number of observations decreases, while the SPARFA algorithms outperform K-SVD+.

FIGS. 1.5A-1.5D illustrate a performance comparison of SPARFA-M, SPARFA-B, and KSVD+ for different sparsity levels in the rows in W. The performance degrades gracefully as the sparsity level increases, while the SPARFA algorithms outperform KSVD+.

FIGS. 1.6A-1.6D illustrate a performance comparison of SPARFA-M, SPARFA-B, and KSVD+ with probit/logit model mismatch; $M_P$ and $M_L$ indicate probit and logit SPARFA-M, respectively. In the left/right halves of each box plot, we generate Y according to the inverse probit/logit link functions. The performance degrades only slightly with mismatch, while both SPARFA algorithms outperform K-SVD+.

FIGS. 1.7A and 1.7B illustrate a question-concept association graph and the most important tags associated with each concept for an undergraduate DSP course with N=15 learners answering Q=44 questions. In the question-concept association graph (FIG. 1.7A), circles correspond to concepts and rectangles to questions; the values in each rectangle corresponds to that question's intrinsic difficulty. FIG. 1.7B is a table showing the most important tags and relative weights for the estimated concepts.

FIG. 1.8 illustrates for Concept No. 5 the knowledge estimates generated by one implementation of SPARFA-B for the STEMscopes data and a randomly selected subset of learners. The box-whisker plot shows the posterior variance of the Markov Chain Monte Carlo (MCMC) samples, with each box-whisker plot corresponding to a different learner in the dataset. Anonymized learner IDs are shown on the bottom, while the number of relevant questions answered by each learner answered is indicated on the top of the plot.

FIGS. 1.9A and 1.9B illustrate a question-concept association graph (FIG. 1.9A) and the most important tags (FIG. 1.9B) associated with each concept for a high-school algebra test carried out on Amazon Mechanical Turk with N=99 users answering Q=34 questions.

FIGS. 1.10A-D illustrates a performance comparison of SPARFA-M and CF-IRT on (a) prediction accuracy and (b) average prediction likelihood for the Mechanical Turk algebra test dataset, (c) prediction accuracy and (d) average prediction likelihood for the ASSISTment dataset. SPARFA-M achieves comparable or better performance than CF-IRT while enabling interpretability of the estimated latent concepts. (CF-IRT is an acronym for "Collaborative Filtering-Item Response Theory".)

FIG. 1.11 illustrates one embodiment of a method for performing learning analytics and content analytics.

FIG. 1.12 illustrates another embodiment of the method for performing learning analytics and content analytics.

FIG. 1.13 illustrates one embodiment of a method for performing learning analytics and content analytics using a maximum likelihood approach.

FIG. 1.14 illustrates another embodiment of the method for performing learning analytics and content analytics using the maximum likelihood approach.

FIG. 1.15 illustrates one embodiment of a method for performing learning analytics and content analytics using a Bayesian approach.

FIG. 1.16 illustrates one embodiment of a method for performing tag post-processing based on a collection of tags provided as input.

FIGS. 2.1A-2.1F illustrate a performance comparison of Ordinal SPARFA-M vs. KSVD+. "SP" denotes Ordinal SPARFA-M without given support Γ of W, "SPP" denotes the variant with estimated precision τ, and "SPT" denotes Ordinal SPARFA-Tag. "KS" stands for K-SVD+, and "KST" denotes its variant with given support F.

FIGS. 2.2A-2.2C illustrate a performance comparison of Ordinal SPARFA-M vs. K-SVD+ by varying the number of quantization bins. "SP" denotes Ordinal SPARFA-M, "KSY" denotes K-SVD+ operating on Y, and "KSZ" denotes K-SVD+ operating on Z in the unquantized data.

FIG. 2.3A is a question-concept association graph for a high-school algebra test with N=99 users answering Q=34 questions. Boxes represent questions; circles represent concepts.

FIG. 2.3B is a table showing the unique tag that is associated with each concept in the graph of FIG. 2.3A.

FIG. 2.4A illustrates a question-concept association graph for a grade 8 Earth Science course with N=145 learners answering Q=80 questions, where Y is highly incomplete with only 13.5% entries observed.

FIG. 2.4B is table showing the unique tag associated with each concept in the graph of FIG. 2.4A.

FIG. 2.5 illustrates prediction performance for one embodiment on the Mechanical Turk algebra test dataset. We compare the collaborative filtering methods SVD++ and OrdRec to various Ordinal SPARFA-M based methods: "Nuc" uses the nuclear norm constraint, "Fro" uses the Frobenius norm constraint, "Bin" and "BinInd" learn the bin boundaries, whereas "Bin" learns one set of bin boundaries for the entire dataset and "BinInd" learns individual bin boundaries for each question.

FIG. 2.6 illustrates one embodiment of a method for performing learning analytics and content analytics using ordinal sparse factor analysis.

FIG. 2.7 illustrates another embodiment of the method for performing learning analytics and content analytics using ordinal sparse factor analysis.

FIG. 2.8 illustrates yet another embodiment of the method for performing learning analytics and content analytics that integrates estimation of question difficulty.

FIG. 2.9 illustrates an embodiment of a method for performing learning analytics and content analytics that integrates information regarding a collection of tags that have been assigned to the questions (e.g., by instructors or question authors).

FIG. 2.10 illustrates another embodiment of the method for performing learning analytics and content analytics that integrates information regarding a collection of tags that have been assigned to the questions.

FIG. 3.1 illustrates average predicted likelihood on 20% holdout data in Y using SPARFA-Top with different precision parameters $\tau$. For $\tau \to \infty$ SPARFA-Top corresponds to SPARFA as described in section I.

FIGS. 3.2A-B illustrate a question-concept association graph (FIG. 3.2A) and most important keywords (FIG. 3.2B) recovered by one embodiment of SPARFA-Top for the STEMscopes dataset; boxes represent questions, circles represent concepts, and thick lines represent strong question-concept associations.

FIG. 3.3A-B illustrates a question-concept association graph (FIG. 3.3A) and the 3 most important keywords (FIG. 3.3B) recovered by one embodiment of SPARFA-Top for the algebra test dataset; boxes represent questions, circles represent concepts, and thick lines represent strong question-concept associations.

FIG. 3.4 illustrates one embodiment of a method for performing joint topic modeling and learning-and-content analytics.

FIG. 3.5 illustrates another embodiment of the method for performing joint topic modeling and learning-and-content analytics.

FIG. 4.1 illustrates one embodiment of a method for estimating the concept knowledge of a new learner after the concept knowledge matrix C and the question-concept association matrix W have been estimated.

FIG. 5.1 illustrates one embodiment of a method for estimating content preferences of content users and estimating content-concept associations.

FIG. 6.1 illustrates one example of a computer system that may be used to realize any of the method embodiments described herein.

FIG. 7.1 illustrates one embodiment of a method for facilitating personalized learning for a set of learners.

FIG. 8.1 illustrates one embodiment of method for discerning user content preferences.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terminology

A memory medium is a non-transitory medium configured for the storage and retrieval of information. Examples of memory media include: various kinds of semiconductor-based memory such as RAM and ROM; various kinds of magnetic media such as magnetic disk, tape, strip and film; various kinds of optical media such as CD-ROM and DVD-ROM; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., in different portions of an integrated circuit or on different integrated circuits in an electronic system or on different computers in a computer network.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

A computer system is any device (or combination of devices) having at least one processor that is configured to execute program instructions stored on a memory medium. Examples of computer systems include personal computers (PCs), laptop computers, tablet computers, mainframe computers, workstations, server computers, client computers, network or Internet appliances, hand-held devices, mobile devices such as media players or mobile phones, personal digital assistants (PDAs), computer-based television systems, grid computing systems, wearable computers, computers implanted in living organisms, computers embedded in head-mounted displays, computers embedded in sensors forming a distributed network, computers embedded in a camera devices or imaging devices or measurement devices, etc.

A programmable hardware element (PHE) is a hardware device that includes multiple programmable function blocks connected via a system of programmable interconnects. Examples of PHEs include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores).

In some embodiments, a computer system may be configured to include a processor (or a set of processors) and a memory medium, where the memory medium stores program instructions, where the processor is configured to read and execute the program instructions stored in the memory medium, where the program instructions are executable by the processor to implement a method, e.g., any of the various method embodiments described herein, or, any combination of the method embodiments described herein, or, any subset of any of the method embodiments described herein, or, any combination of such subsets.

I. Sparse Factor Analysis for Learning and Content Analytics

Abstract: In this patent we disclose, among other things, (a) a new model and algorithms for machine learning-based learning analytics, which estimate a learner's knowledge of the concepts underlying a domain, and (b) content analytics, which estimate the relationships among a collection of questions and those concepts. In some embodiments, our model represents the probability that a learner provides the correct response to a question in terms of three factors: their understanding of a set of underlying concepts, the concepts involved in each question, and each question's intrinsic difficulty. We estimate these factors given the graded responses to a collection of questions. The underlying estimation problem is ill-posed in general, especially when only a subset of the questions are answered. An observation that enables a well-posed solution is the fact that typical educational domains of interest involve only a relatively small number of key concepts. Leveraging this observation, we have developed both a bi-convex maximum-likelihood-based solution and a Bayesian solution to the resulting SPARse Factor Analysis (SPARFA) problem. In some embodiments, we also incorporate user-defined tags on questions to facilitate the interpretability of the estimated factors. Finally, we make a connection between SPARFA and noisy, binary-valued (1-bit) dictionary learning that is of independent interest.

I.1 Introduction

Textbooks, lectures, and homework assignments were the answer to the main educational challenges of the 19th century, but they are the main bottleneck of the 21st century. Today's textbooks are static, linearly organized, time-consuming to develop, soon out-of-date, and expensive. Lectures remain a primarily passive experience of copying down what an instructor says and writes on a board (or projects on a screen). Homework assignments that are not graded for weeks provide poor feedback to learners (e.g., students) on their learning progress. Even more importantly, today's courses provide only a "one-size-fits-all" learning experience that does not cater to the background, interests, and goals of individual learners.

I.1.1 The Promise of Personalized Learning

We envision a world where access to high-quality, personally tailored educational experiences is affordable to all of the world's learners. In some embodiments, the key is to integrate textbooks, lectures, and homework assignments into a personalized learning system (PLS) that closes the learning feedback loop by (i) continuously monitoring and analyzing learner interactions with learning resources in order to assess their learning progress and (ii) providing timely remediation, enrichment, or practice based on that analysis.

Some progress has been made over the past few decades on personalized learning; see, for example, the sizable literature on intelligent tutoring systems discussed in Psotka et al. (1988). (See the list of references given at the end of this section.) To date, the lionshare of fielded, intelligent tutors have been rule-based systems that are hard-coded by domain experts to give learners feedback for pre-defined scenarios (e.g., Koedinger et al. (1997), Brusilovsky and Peylo (2003), VanLehn et al. (2005), and Butz et al. (2006)). The specificity of such systems is counterbalanced by their high development cost in terms of both time and money, which has limited their scalability and impact in practice.

In a fresh direction, recent progress has been made on applying machine learning algorithms to mine learner interaction data and educational content. (See the overview articles by Romero and Ventura (2007) and Baker and Yacef (2009).) In contrast to rule-based approaches, machine learning-based PLSs promise to be rapid and inexpensive to deploy, which will enhance their scalability and impact. Indeed, the dawning age of "big data" provides new opportunities to build PLSs based on data rather than rules. In at least some embodiments, we conceptualize the architecture of a generic machine learning-based PLS to have three interlocking components as follows.

(A) Learning analytics: Algorithms that estimate what each learner does and does not understand based on data obtained from tracking their interactions with learning content.
(B) Content analytics: Algorithms that organize learning content such as text, video, simulations, questions, and feedback hints.
(C) Scheduling: Algorithms that use the results of learning and content analytics to suggest to each learner at each moment what they should be doing in order to maximize their learning outcomes, in effect closing the learning feedback loop.

I.1.2 Sparse Factor Analysis (Sparfa)

In this patent we disclose, among other things, a new model and a suite of algorithms for joint machine learning-based learning analytics and content analytics. In some embodiments, our model (developed in Section I.2) represents the probability that a learner provides the correct response to a given question in terms of three factors: their knowledge of the underlying concepts, the concepts involved in each question, and each question's intrinsic difficulty.

In one set of embodiments, a learning system may include a server 110 (e.g., a server controlled by a learning service provider) as shown in FIG. 1.0. The server may be configured to perform any of the various methods described herein. Client computers $CC_1, CC_2, \ldots, CC_M$ may access the server via a network 120 (e.g., the Internet or any other computer network). The persons operating the client computers may include learners, instructors, the authors of questions, the authors of educational content, etc. For example, learners may use client computers to access questions from the server and provide answers to the questions. The server may grade the questions automatically based on answers previously provided, e.g., by instructors or the authors of the questions. (Of course, an instructor and a question author may be one and the same in some situations.) Alternatively, the server may allow an instructor or other authorized person to access the answers that have been provided by learners. An instructor (e.g., using a client computer) may assign grades to the answers, and invoke execution of one or more of the computational methods described herein. Furthermore, learners may access the server to determine (e.g., view) their estimated concept-knowledge values for the concepts that have an extracted by the computational method(s), and/or, to view a graphical depiction of question-concept relationships determined by the computational method(s), and/or, to receive recommendations on further study or questions for further testing. The server may automatically determine the recommendations based on the results of the computational method(s), as variously described herein. In some embodiments, instructors or other authorized persons may access the server to perform one or more tasks such as: assigning tags (e.g., character strings) to the questions; drafting new questions; editing currently-existing questions; drafting or editing the text for answers to questions; drafting or editing the feedback text for questions; viewing a graphical depiction of question-concept relationships determined by the computational method(s); viewing the concept-knowledge values (or a graphical illustration thereof) for one or more selected learners; invoking and viewing the results of statistical analysis of the concept-knowledge values of a set of learners, e.g., viewing histograms of concept knowledge over the set of learners; sending and receiving messages to/from learners; uploading video and/or audio lectures (or more generally, educational content) for storage and access by the learners.

In another set of embodiments, a person (e.g., an instructor) may execute one or more of the presently-disclosed computational methods on a stand-alone computer, e.g., on his/her personal computer or laptop. Thus, the computational method(s) need not be executed in a client-server environment.

FIGS. 1.1(*a*) and 1.1(*b*) provide a graphical depiction of one example of our approach. As shown in FIG. 1.1(*a*), we may be provided with data relating to the correctness of the learners' responses to a collection of questions. We may encode these graded responses in a "gradebook". The gradebook may be represented by a matrix with entries $\{Y_{i,j}\}$, where $Y_{i,j}=1$ or 0 depending on whether learner j answers question i correctly or incorrectly, respectively. (In following sections, we also consider the more general case of a gradebook whose entries are values belonging to a set of P labels, with P≥2.) Question marks correspond to incomplete data due to unanswered or unassigned questions. Working left-to-right in FIG. 1.1(b), we assume that the collection of questions (rectangles) is related to a small number of abstract concepts (circles) by a bipartite graph, where the edge weight $W_{i,k}$ indicates the degree to which question i involves concept k. We also assume that question i has intrinsic difficulty $\mu_i$. Denoting learner j's knowledge of concept k by $C_{k,j}$, we calculate the probabilities that the learners answer the questions correctly in terms of WC+M, where W and C are matrix versions of $W_{i,k}$ and $C_{k,j}$, respectively, and M is a matrix containing the intrinsic question difficulty $\mu_i$ on row i. We transform the probability of a correct answer to an actual 1/0 correctness via a standard probit or logit link function.

Armed with this model and given incomplete observations of the graded learner-question responses $Y_{i,j}$, our goal is to estimate the factors W, C, and M. Such a factor-analysis problem is ill-posed in general, especially when each learner answers only a small subset of the collection of questions. Our first observation that enables a well-posed solution is the fact that typical educational domains of interest involve only a small number of key concepts (i.e., we have K<<N, Q in FIGS. 1.1). Consequently, W becomes a tall, narrow Q×K matrix that relates the questions to a small set of abstract concepts, while C becomes a short, wide K×N matrix that relates learner knowledge to that same small set of abstract concepts. Note that the concepts are "abstract" in that they will be estimated from the data rather than dictated by a subject matter expert. Our second key observation is that each question involves only a small subset of the abstract concepts. Consequently, the matrix W is sparsely populated. Our third observation is that the entries of W should be non-negative, since we postulate that having strong concept knowledge should never hurt a learner's chances to answer questions correctly. This constraint on W ensures that large positive values in C represent strong knowledge of the associated abstract concepts, which is important for a PLS to generate human-interpretable feedback to learners on their strengths and weaknesses.

Leveraging these observations, we propose below a suite of new algorithms for solving the SPARse Factor Analysis (SPARFA) problem. Section I.3 develops SPARFA-M, which uses an efficient bi-convex optimization approach to produce point estimates of the factors. Section I.4 develops SPARFA-B, which uses Bayesian factor analysis to produce posterior distributions of the factors. Since the concepts are abstract mathematical quantities estimated by the SPARFA algorithms, we develop a post-processing step in Section I.5 to facilitate interpretation of the estimated latent concepts by associating user-defined tags for each question with each abstract concept.

In Section I.6, we report on a range of experiments with a variety of synthetic and realworld data that demonstrate the wealth of information provided by the estimates of W, C, and M. As an example, FIGS. 1.2(a) and 1.2(b) provide the results for a dataset collected from learners using STEMscopes (2012), a science curriculum platform. The dataset comprises 145 Grade 8 learners from a single school district answering a manually tagged set of 80 questions on Earth science; only 13.5% of all graded learner-question responses were observed. We applied the SPARFA-B algorithm to retrieve the factors W, C, and M using 5 latent concepts. The resulting sparse matrix W is displayed as a bipartite graph in FIG. 1.2(a); circles denote the abstract concepts and boxes denote questions. Each question box is labeled with its estimated intrinsic difficulty $\mu_i$, with large positive values denoting easy questions. Links between the concept and question nodes represent the active (non-zero) entries of W, with thicker links denoting larger values $W_{i,k}$. Unconnected questions are those for which no concept explained the learners' answer pattern; such questions typically have either very low or very high intrinsic difficulty, resulting in nearly all learners answering them correctly or incorrectly. The tags provided in FIG. 1.2(b) enable human-readable interpretability of the estimated abstract concepts.

We envision a range of potential learning and content analytics applications for the SPARFA framework that go far beyond the standard practice of merely forming column sums of the "gradebook" matrix (with entries $Y_{i,j}$) to arrive at a final scalar numerical score for each learner (which is then often further quantized to a letter grade on a 5-point scale). Each column of the estimated C matrix can be interpreted as a measure of the corresponding learner's knowledge about the abstract concepts. Low values indicate concepts ripe for remediation, while high values indicate concepts ripe for enrichment. The sparse graph stemming from the estimated W matrix automatically groups questions into similar types based on their concept association; this graph makes it straightforward to find a set of questions similar to a given target question. Finally, the estimated M matrix (with entries $\mu_i$ on each row) provides an estimate of each question's intrinsic difficulty. This property enables an instructor to assign questions in an orderly fashion as well as to prune out potentially problematic questions that are either too hard, too easy, too confusing, or unrelated to the concepts underlying the collection of questions.

In Section I.7, we provide an overview of related work on machine learning-based personalized learning, and we conclude in Section I.8.

I.2. Statistical Model for Learning and Content Analytics

In some embodiments, our approach to learning and content analytics is based on a new statistical model that encodes the probability that a learner will answer a given question correctly in terms of three factors: (i) the learner's knowledge of a set of latent, abstract concepts, (ii) how the question is related to each concept, and (iii) the intrinsic difficulty of the question.

I.2.1 Model for Graded Learner Response Data

Let N denote the total number of learners, Q the total number of questions, and K the number of latent abstract concepts. We define $C_{k,j}$ as the concept knowledge of learner j on concept k, with large positive values of $C_{k,j}$ corresponding to a better chance of success on questions related to concept k. Stack these values into the column vector $c_j \in \mathbb{R}^K$, $j \in \{1, \ldots N\}$ and the K×N matrix $C=[c_1, \ldots, c_N]$. We further define $W_{i,k}$ as the question-concept association of question i with respect to concept k, with larger values denoting stronger involvement of the concept. Stack these values into the column vector $\overline{w}_i \in \mathbb{R}^K$, $i \in \{1, \ldots Q\}$ and the Q×K matrix $W=[\overline{w}_1, \ldots, \overline{w}_N]^T$. Finally, we define the scalar $\mu_i \in \mathbb{R}$ as the intrinsic difficulty of question i, with larger values representing easier questions. Stack these values into the column vector $\mu$ and form the Q×N matrix $M=\mu 1_{1 \times N}$ as the product of $\mu=[\mu_1, \ldots, \mu_Q]^T$ with the N-dimensional all-ones row vector $1_{1 \times N}$.

Given these definitions, we propose the following model for the binary-valued graded response variable $Y_{i,j} \in \{0,1\}$ for learner j on question i, with 1 representing a correct response and 0 an incorrect response:

$$Z_{i,j} = \bar{w}_i^T c_j + \mu_i, \forall (i,j),$$

$$Y_{i,j} \sim \mathrm{Ber}(\Phi(Z_{i,j})), (i,j) \in \Omega_{obs}. \quad (1)$$

Here, Ber(z) designates a Bernoulli distribution with success probability z, and $\Phi(z)$ denotes an inverse link function that maps a real value z to the success probability of a binary random variable. (Inverse link functions are often called response functions in the generalized linear models literature. See, e.g., Guisan et al. 2002.) Thus, the slack variable $\Phi(Z_{i,j}) \in [0,1]$ governs the probability of learner j answering question i correctly.

The set $\Omega_{obs} \subseteq \{1, \ldots Q\} \times \{1, \ldots N\}$ in (1) contains the indices associated with the observed graded learner response data. Hence, our framework is able to handle the case of incomplete or missing data, e.g., when the learners do not answer all of the questions. (Two common situations lead to missing learner response data. First, a learner might not attempt a question because it was not assigned or available to them. In this case, we simply exclude their response from obs. Second, a learner might not attempt a question because it was assigned to them but was too difficult. In this case, we treat their response as incorrect, as is typical in standard testing settings.) Stack the values $Y_{i,j}$ and $Z_{i,j}$ into the Q×N matrices Y and Z, respectively. We can conveniently rewrite (1) in matrix form as $$Y_{i,j} \sim \mathrm{Ber}(\Phi(Z_{i,j})), (i,j) \in \Omega_{obs},$$

with $Z = WC + M$. (2)

In some embodiments, we focus on the two most commonly used link functions in the machine learning literature. The inverse probit function is defined as $$\Phi_{pro}(x) = \int_{-\infty}^{x} \mathcal{N}(t) dt = \frac{1}{\sqrt{2\pi}} \int_{-\infty}^{x} e^{-t^2/2} dt, \quad (3)$$

where $$\mathcal{N}(t) = \frac{1}{\sqrt{2\pi}} e^{-t^2/2}$$

is the probability density function (PDF) of the standard normal distribution (with mean zero and variance one). The inverse logit link function is defined as $$\Phi_{log}(x) = \frac{1}{1+e^{-x}} \quad (4)$$

As we noted in the Introduction, W, C, and µ (or equivalently, M) have natural interpretations in real education settings. Column j of C can be interpreted as a measure of learner j's knowledge about the abstract concepts, with larger $C_{k,j}$ values implying more knowledge. The non-zero entries in W can be used to visualize the connectivity between concepts and questions (see FIG. 1.1(b) for an example), with larger $W_{i,k}$ values implying stronger ties between question i and concept k. The values of µ contains estimates of each question's intrinsic difficulty.

I.2.2 Joint Estimation of Concept Knowledge and Question-Concept Association

Given a (possibly partially observed) matrix of graded learner response data Y, we aim to estimate the learner concept knowledge matrix C, the question-concept association matrix W, and the question intrinsic difficulty vector µ. In practice, the latent factors W and C, and the vector µ will contain many more unknowns than we have observations in Y; hence, estimating W, C, and µ is, in general, an ill-posed inverse problem. The situation is further exacerbated if many entries in Y are unobserved.

To regularize this inverse problem, prevent over-fitting, improve identifiability, and enhance interpretability of the entries in W and C, we appeal to the following three observations regarding education that are reasonable for typical exam, homework, and practice questions at all levels. (If Z=WC, then for any orthonormal matrix H with $H^T H = I$, we have $Z = W H^T H C = \tilde{W}\tilde{C}$. Hence, the estimation of W and C is, in general, non-unique up to a unitary matrix rotation.) We will exploit these observations extensively in the sequel as fundamental assumptions:

(A1) Low-dimensionality: The number of latent, abstract concepts K is small relative to both the number of learners N and the number of questions Q. This implies that the questions are redundant and that the learners' graded responses live in a low-dimensional space. The parameter K dictates the concept granularity. Small K extracts just a few general, broad concepts, whereas large K extracts more specific and detailed concepts. Standard techniques like cross-validation (Hastie et al. (2010)) can be used to select K. We provide the corresponding details in Section I.6.3.

(A2) Sparsity: Each question should be associated with only a small subset of the concepts in the domain of the course/assessment. In other words, we assume that the matrix W is sparsely populated, i.e., contains mostly zero entries.

(A3) Non-negativity: A learner's knowledge of a given concept does not negatively affect their probability of correctly answering a given question, i.e., knowledge of a concept is not "harmful." In other words, the entries of W are non-negative, which provides a natural interpretation for the entries in C: Large values $C_{k,j}$ indicate strong knowledge of the corresponding concept, whereas negative values indicate weak knowledge.

In practice, N can be larger than Q and vice versa, and hence, we do not impose any additional assumptions on their values. Assumptions (A2) and (A3) impose sparsity and non-negativity constraints on W. Since these assumptions are likely to be violated under arbitrary unitary transforms of the factors, they help alleviate several well-known identifiability problems that arise in factor analysis.

We will refer to the problem of estimating W, C, and µ given the observations Y, under the assumptions (A1)-(A3) as the SPARse Factor Analysis (SPARFA) problem. We now develop two complementary algorithms to solve the SPARFA problem. In Section I.3, we introduce SPARFA-M, a computationally efficient matrix-factorization approach that produces point estimates of the quantities of interest, in contrast to the principal component analysis based approach in Lee et al. (2010). In Section I.4, we introduce SPARFA-B, a Bayesian approach that produces full posterior estimates of the quantities of interest.

I.3. Sparfa-M: Maximum Likelihood-Based Sparse Factor Analysis

Our first algorithm, SPARFA-M, solves the SPARFA problem using maximum-likelihood-based probit or logistic regression.

3.1 Problem Formulation

To estimate W, C, and µ, we maximize the likelihood of the observed data $Y_{i,j}$, $(i, j) \in \Omega_{obs}$ $$p(Y_{i,j}|\bar{w}_i, c_j) = \Phi(\bar{w}_i^T c_j)^{Y_{i,j}}(1-\Phi(\bar{w}_i^T c_j))^{1-Y_{i,j}}$$

given W, C, and µ and subject to the assumptions (A1), (A2), and (A3) from Section I.2.2. This likelihood yields the following optimization problem P*:

$$\underset{W,C}{\text{maximize}} \sum_{i,j \in \Omega_{obs}} \log p(Y_{i,j} | \bar{w}_i, c_j)$$

subject to $$\|\bar{w}_i\|_0 \leq s, \|\bar{w}_i\|_2 \leq \kappa \, \forall i,$$

$$W_{i,k} \geq 0 \, \forall i,k,$$

$$\|C\|_F \leq \xi.$$

Let us take a quick tour of the problem (P*) and its constraints. The intrinsic difficulty vector µ is incorporated as an additional column of W, and C is augmented with an all-ones row accordingly. We impose sparsity on each vector $\bar{w}_i$ to comply with (A2) by limiting its maximum number of nonzero coefficients using the constraint $\|\bar{w}_i\|_0 \leq s$; here $\|a\|_0$ counts the number of non-zero entries in the vector a. We enforce non-negativity on each entry $W_{i,k}$ to comply with (A3). Finally, we normalize the Frobenius norm of the concept knowledge matrix C to a given $\xi > 0$ to suppress arbitrary scalings between the entries in both matrices W and C.

Unfortunately, optimizing over the sparsity constraints $\|\bar{w}_i\|_0 \leq s$ requires a combinatorial search over all K-dimensional support sets having no more than s non-zero entries. Hence, (P*) cannot be solved efficiently in practice for the typically large problem sizes of interest. In order to arrive at an optimization problem P that can be solved with a reasonable computational complexity, we relax the sparsity constraints $\|\bar{w}_i\|_0 \leq s$ in (P*) to $l_1$-norm constraints. The $l_1$-norm constraints, the $l_2$-norm constraints and the Frobenius norm constraint are moved into the objective function via Lagrange multipliers:

$$(P) \underset{W,C:W_{i,k} \geq 0 \forall i,k}{\text{minimize}} - \sum_{i,j \in \Omega_{obs}} \log p(Y_{i,j} | \bar{w}_i, c_j) + \lambda \sum_i \|\bar{w}_i\|_1 + \frac{\mu}{2} \sum_i \|\bar{w}_i\|_2^2 + \frac{\gamma}{2} \sum_j \|c_j\|_2^2.$$

The first regularization term $\lambda \sum_i \|\bar{w}_i\|_1$ induces sparsity on each vector $\bar{w}_i$, with the single parameter $\lambda > 0$ controlling the sparsity level. Since one can arbitrarily increase the scale of the vectors $\bar{w}_i$ while decreasing the scale of the vectors $c_j$ accordingly (and vice versa) without changing the likelihood, we gauge these vectors using the second and third regularization terms $$\frac{\mu}{2} \sum_i \|\bar{w}_i\|_2^2$$

and $$\frac{\gamma}{2} \|C\|_F^2$$

with the regularization parameters µ>0 and γ>0, respectively. (The first $l_1$-norm regularization term in $(RR_1^+)$ already gauges the norm of the $\bar{w}_i$. The $l_2$-norm regularizer $$\frac{\mu}{2} \|\bar{w}_i\|_2^2$$

is included only to aid in establishing the convergence results for SPARFA-M as detailed in Section I.3.4.) We emphasize that since $\|C\|_F^2 = \Sigma_j \|c_j\|_2^2$, we can impose a regularizer on each column rather than the entire matrix C, which facilitates the development of the efficient algorithm detailed below.

I.3.2 the Sparfa-M Algorithm

Since the first negative log-likelihood term in the objective function of (P) is convex in the product WC for both the probit and the logit functions (see, e.g., Hastie et al. (2010)), and since the rest of the regularization terms are convex in either W or C while the nonnegativity constraints on $W_{i,k}$ are with respect to a convex set, the problem (P) is biconvex in the individual factors W and C. More importantly, with respect to blocks of variables $\bar{w}_i$, $c_j$, the problem (P) is block multi-convex in the sense of Xu and Yin (2012).

SPARFA-M is an alternating optimization approach to (approximately) solving (P) that proceeds as follows. We initialize W and C with random entries and then iteratively optimize the objective function of (P) for both factors in an alternating fashion. Each outer iteration involves solving two kinds of inner subproblems. In the first subproblem, we hold W constant and separately optimize each block of variables in $c_j$; in the second subproblem, we hold C constant and separately optimize each block of variables $\bar{w}_i$. Each subproblem is solved using an iterative method; see Section I.3.3 for the respective algorithms. The outer loop is terminated whenever a maximum number of outer iterations $I_{max}$ is reached, or if the decrease in the objective function of (P) is smaller than a certain threshold.

The two subproblems constituting the inner iterations of SPARFA-M correspond to the following convex $l_1/l_2$-norm and $l_2$-norm regularized regression (RR) problems:

$$(RR_1^+) \min_{\bar{w}_i : W_{i,k} \geq 0 \forall k} - \sum_{j:(i,j) \in \Omega_{obs}} \log p(Y_{i,j} | \bar{w}_i, c_j) + \lambda \|\bar{w}_i\|_1 + \frac{\mu}{2}\|\bar{w}_i\|_2^2$$

$$(RR_2) \min_{c_j} - \sum_{i:(i,j) \in \Omega_{obs}} \log p(Y_{i,j} | \bar{w}_i, c_j) + \frac{\gamma}{2}\|c_j\|_2^2.$$

We develop two novel first-order methods that efficiently solve $(RR_1^+)$ and $(RR_2)$ for both probit and logistic regression. These methods scale well to high-dimensional problems, in contrast to existing second-order methods. In addition, the probit link function makes the explicit computation of the Hessian difficult, which is only required for second-order methods. Therefore, we build our algorithm on the fast iterative soft-thresholding algorithm (FISTA) framework developed in Beck and Teboulle (2009), which enables the development of efficient first-order methods with accelerated convergence.

I.3.3 Accelerated First-Order Methods for Regularized Probit/Logistic Regression The FISTA framework (Beck and Teboulle (2009)) iteratively solves optimization problems whose objective function is given by $f(\cdot) + g(\cdot)$, where $f(\cdot)$ is a continuously differentiable convex function and $g(\cdot)$ is convex but potentially non-smooth. This approach is particularly well-suited to the inner subproblem (RR$_1^+$) due to the presence of the non-smooth $l_1$-norm regularizer and the non-negativity constraint. Concretely, we associate the log-likelihood function plus the $l_2$-norm regularizer $$\frac{\mu}{2}\|\bar{w}_i\|_2^2$$

with $f(\cdot)$ and the $l_1$-norm regularization term with $g(\cdot)$. For the inner subproblem (RR$_2$), we associate the log-likelihood function with $f(\cdot)$ and the $l_2$-norm regularization term with $g(\cdot)$. (Of course, both $f(\cdot)$ and $g(\cdot)$ are smooth for (RR$_2$). Hence, we could also apply an accelerated gradient-descent approach instead, e.g., as described in Nesterov 2007.)

Each FISTA iteration consists of two steps: (i) a gradient-descent step in $f(\cdot)$ and (ii) a shrinkage step determined by $g(\cdot)$. For simplicity of exposition, we consider the case where all entries in Y are observed, i.e., $\Omega_{obs} = \{1, \ldots Q\} \times \{1, \ldots N\}$; the extension to the case with missing entries in Y is straightforward. We will derive the algorithm for the case of probit regression first and then point out the departures for logistic regression.

For (RR$_1^+$), the gradients of $f(\bar{w}_i)$ with respect to the ith block of regression coefficients $\bar{w}_i$ are given by $$\nabla f_{pro}^i = \nabla_{\bar{w}_i}^{pro}\left(-\sum_j \log p_{pro}(Y_{i,j} \mid \bar{w}_i, c_j) + \frac{\mu}{2}\|\bar{w}_i\|_2^2\right) \quad (5)$$
$$= -CD^i(\bar{y}^i - p_{pro}^i) + \mu\bar{w}_i,$$

where $\bar{y}^i$ is an N×1 column vector corresponding to the transpose of the ith row of Y. $p_{pro}^i$ is an N×1 vector whose jth element equals the probability of $Y_{i,j}$ being 1; that is, $p_{pro}(Y_{i,j}=1|\bar{w}_i, c_j) = \Phi_{pro}(\bar{w}_i^T c_j)$. The entries of the N×N diagonal matrix are given by $$D_{j,}^i = \frac{\mathcal{N}(\bar{w}_i^T c_j)}{\Phi_{pro}(\bar{w}_i^T c_j)(1 - \Phi_{pro}(\bar{w}_i^T c_j))}$$

The gradient step in each FISTA iteration $l=1, 2, \ldots$ corresponds to $$\bar{w}_i^{l+1} \leftarrow \bar{w}_i^l - t_l \nabla f_{pro}^i, \quad (6)$$

where $t_l$ is a suitable step-size. To comply with (A3), the shrinkage step in (RR$_1^+$) corresponds to a non-negative soft-thresholding operation $$\bar{w}_i^{l+1} \leftarrow \max\{\bar{w}_i^{l+1} - \lambda t_l, 0\}, \quad (7)$$

For (RR$_2$), the gradient step becomes $$\hat{c}_j^{l+1} \leftarrow c_j^l - t_l \nabla f_{pro}^i,$$

which is the same as (5) and (6) after replacing C with $W^T$ and $\mu$ with $\gamma$. The shrinkage step for (RR$_2$) is the simple re-scaling $$c_j^{l+1} \leftarrow \frac{1}{1 + \gamma t_l}\hat{c}_j^{l+1}. \quad (8)$$

In the logistic regression case, the steps (6), (7), and (8) remain the same but the gradient changes to $$\nabla f_{log}^i = \nabla_{\bar{w}_i}^{log}\left(-\sum_j \log p_{log}(Y_{i,j} \mid \bar{w}_i, c_j) + \frac{\mu}{2}\|\bar{w}_i\|_2^2\right) \quad (9)$$
$$= -C(\bar{y}^i - p_{log}^i) + \mu\bar{w}_i,$$

where the N×1 vector $p_{log}^i$ has elements $$p_{log}(Y_{i,j}=1|\bar{w}_i, c_j) = \Phi_{log}(\bar{w}_i^T c_j).$$

The above steps require a suitable step-size $t_l$ to ensure convergence to the optimal solution. A common approach that guarantees convergence is to set $t_l = 1/L$, where L is the Lipschitz constant of $f(\cdot)$ (see Beck and Teboulle (2009) for the details). The Lipschitz constants for both the probit and logit cases are analyzed in Theorem 1 below. Alternatively, one can also perform backtracking, which—under certain circumstances—can be more efficient; see (Beck and Teboulle, 2009, p. 194) for more details.

I.3.4 Convergence Analysis of Sparfa-M

While the SPARFA-M objective function is guaranteed to be non-increasing over the outer iterations (Boyd and Vandenberghe (2004)), the factors W and C do not necessarily converge to a global or local optimum due to its biconvex (or more generally, block multi-convex) nature. It is difficult, in general, to develop rigorous statements for the convergence behavior of block multi-convex problems. Nevertheless, we can establish the global convergence of SPARFA-M from any starting point to a critical point of the objective function using recent results developed in Xu and Yin (2012). The convergence results below appear to be novel for both sparse matrix factorization as well as dictionary learning.

I.3.4.1 Convergence Analysis of Regularized Regression Using Fista

In order to establish the SPARFA-M convergence result, we first adapt the convergence results for FISTA in Beck and Teboulle (2009) to prove convergence on the two subproblems (RR$_1^+$) and (RR$_2$). The following theorem is a consequence of (Beck and Teboulle, 2009, Thm. 4.4) combined with Lemmata 4 and 5 in Appendix A. If back-tracking is used to select step-size $t_l$ (Beck and Teboulle, 2009, p. 194), then let $\alpha$ correspond to the backtracking parameter. Otherwise set $\alpha = 1$ and for (RR$_1^+$) let $t_l = 1/L_1$ and for (RR$_2$) let $t_l = 1/L_2$. In Lemma 5, we compute that $L_1 = \sigma_{max}^2(C) + \mu$ and $L_2 = \sigma_{max}^2(W) + \gamma$ for the probit case, and $$L_1 = \frac{1}{4}\sigma_{max}^2(C) + \mu$$

and $$L_2 = \frac{1}{4}\sigma_{max}^2(W) + \gamma$$

for the logit case.

Theorem 1 (Linear Convergence of RR Using FISTA) Given i and j, let $$F_1(\bar{w}_i) = -\sum_{j:(i,j)\in\Omega_{obs}} \log p(Y_{i,j} \mid \bar{w}_i, c_j) + \lambda\|\bar{w}_i\|_1 + \frac{\mu}{2}\|\bar{w}_i\|_2^2,$$

$$W_{i,k} \geq 0 \,\forall\, k,$$

$$F_2(c_j) = -\sum_{i:(i,j)\in\Omega_{obs}} \log p(Y_{i,j} \mid \bar{w}_i, c_j) + \frac{\gamma}{2}\|c_j\|_2^2$$

be the cost functions of $(RR_1^+)$ and $(RR_2)$, respectively. Then, we have $$F_1(\overline{w}_i^l) - F_1(\overline{w}_i^*) \leq \frac{2\alpha L_1 \|\overline{w}_i^0 - \overline{w}_i^*\|^2}{(l+1)^2},$$

$$F_2(c_j^l) - F_1(c_j^*) \leq \frac{2\alpha L_2 \|c_j^0 - c_j^*\|^2}{(l+1)^2},$$

where $\overline{w}_i^0$ and $c_j^0$ are the initialization points of $(RR_1^+)$ and $(RR_2)$, $\overline{w}_i^l$ and $c_j^l$ designate the solution estimates at the lth inner iteration, and $\overline{w}_i^*$ and $c_j^*$ denote the optimal solutions.

In addition to establishing convergence, Theorem 1 reveals that the difference between the cost functions at the current estimates and the optimal solution points, $F_1(\overline{w}_i^l) - F_1(\overline{w}_i^*)$ and $F_2(c_j^l) - F_1(c_j^*)$, decrease as $O(l^{-2})$.

I.3.4.2 Convergence Analysis of Sparfa-M

We are now ready to establish global convergence of SPARFA-M to a critical point. To this end, we first define $x = [\overline{w}_1^T, \ldots, \overline{w}_Q^T, c_1^T, \ldots, c_N^T]^T \in \mathbb{R}^{(N+Q)K}$ and rewrite the objective function (P) of SPARFA-M as follows:

$$F(x) = -\sum_{(i,j) \in \Omega_{obs}} \log p(Y_{i,j} | \overline{w}_i, c_j) + \lambda \sum_i \|\overline{w}_i\|_1 + \frac{\mu}{2} \sum_i \|\overline{w}_i\|_2^2 + \sum_{i,k} \delta(W_{i,k} < 0) + \frac{\gamma}{2} \sum_j \|c_j\|_2^2$$

with the indicator function $\delta(z<0) = \infty$ if $z<0$ and 0 otherwise. Note that we have re-formulated the non-negativity constraint as a set indicator function and added it to the objective function of (P). Since minimizing $F(x)$ is equivalent to solving (P), we can now use the results developed in Xu and Yin (2012) to establish the following convergence result for the SPARFA-M algorithm.

Theorem 2 (Global Convergence of SPARFA-M)

From any starting point $x^0$, let $\{x^r\}$ be the sequence of estimates generated by the SPARFA-M algorithm with $t=1, 2, \ldots$ as the outer iteration number. Then, the sequence $\{x^r\}$ converges to the finite limit point $\hat{x}$, which is a critical point of (P). Moreover, if the starting point $x^0$ is within a close neighborhood of a global optimum of (P), then SPARFA-M converges to this global optimum.

Since the problem (P) is bi-convex in nature, we cannot guarantee that SPARFA-M always converges to a global optimum from an arbitrary starting point. Nevertheless, the use of multiple randomized initialization points can be used to increase the chance of being in the close vicinity of a global optimum, which improves the (empirical) performance of SPARFA-M (see Section I.3.5 for details). Note that we do not provide the convergence rate of SPARFA-M, since the associated parameters in (Xu and Yin, 2012, Thm. 2.9) are difficult to determine for the model at hand; a detailed analysis of the convergence rate for SPARFA-M is part of ongoing work.

I.3.5 Algorithmic Details and Improvements for Sparfa-M

In this section, we outline a toolbox of techniques that improve the empirical performance of SPARFA-M and provide guidelines for choosing the key algorithm parameters.

I.3.5.1 Reducing Computational Complexity in Practice

To reduce the computational complexity of SPARFA-M in practice, we can improve the convergence rates of $(RR_1^+)$ and $(RR_2)$. In particular, the regularizer $$\frac{\mu}{2} \|\overline{w}_i\|_2^2$$

in $(RR_1^+)$ has been added to (P) to facilitate the proof of Theorem 2. This term, however, typically slows down the (empirical) convergence of FISTA, especially for large values of $\mu$. We therefore set $\mu$ to a small positive value (e.g., $\mu = 10^{-4}$), which leads to fast convergence of $(RR_1^+)$ while still guaranteeing convergence of SPARFA-M.

Selecting the appropriate (i.e., preferably large) step-sizes $t_l$ in (6), (7), and (8) is also crucial for fast convergence. In Lemmata 4 and 5, we derive the Lipschitz constants L for $(RR_1^+)$ and $(RR_2)$, which enables us to set the step-sizes $t_l$ to the constant value $t=1/L$. In all of our experiments below, we exclusively use constant step-sizes, since we observed that backtracking ((Beck and Teboulle, 2009, p. 194)) provided no advantage in terms of computational complexity for SPARFA-M.

To further reduce the computational complexity of SPARFA-M without degrading its empirical performance noticeably, we have found that instead of running the large number of inner iterations it typically takes to converge, we can run just a few (e.g., 10) inner iterations per outer iteration.

I.3.5.2 Reducing the Chance of Getting Stuck in Local Minima

The performance of SPARFA-M strongly depends on the initialization of W and C, due to the bi-convex nature of (P). We have found that running SPARFA-M multiple times with different starting points and picking the solution with the smallest overall objective function delivers excellent performance. In addition, we can deploy the standard heuristics used in the dictionary-learning literature (Aharon et al., 2006, Section IV-E) to further improve the convergence towards a global optimum. For example, every few outer iterations, we can evaluate the current W and C. If two rows of C are similar (as measured by the absolute value of the inner product between them), then we re-initialize one of them as an i.i.d. Gaussian vector. Moreover, if some columns in W contain only zero entries, then we re-initialize them with i.i.d. Gaussian vectors.

I.3.5.3 Parameter Selection

The input parameters to SPARFA-M include the number of concepts K and the regularization parameters $\gamma$ and $\lambda$. The number of concepts K is a user-specified value. In practice, cross-validation could be used to select K if the task is to predict missing entries of Y, (see Section I.6.3). The sparsity parameter $\lambda$ and the $l_2$-norm penalty parameter $\gamma$ strongly affect the output of SPARFA-M; they can be selected using any of a number of criteria, including the Bayesian information criterion (BIC) or cross-validation, as detailed in Hastie et al. (2010). Both criteria resulted in similar performance in all of the experiments reported in Section I.6.

I.3.6 Related Work on Maximum Likelihood-Based Sparse Factor Analysis

Sparse logistic factor analysis has previously been studied in Lee et al. (2010) in the principal components analysis context. There are three major differences with the SPARFA framework. First, Lee et al. (2010) do not impose the non-negativity constraint on W that is critical for the interpretation of the estimated factors. Second, they impose an orthonormality constraint on C that does not make sense in educational scenarios. Third, they optimize an upper bound on the negative log-likelihood function in each outer iteration, in contrast to SPARFA-M, which optimizes the exact cost functions in $(RR_1^+)$ and $(RR_2)$.

The problem (P) shares some similarities with the method for missing data imputation outlined in (Mohamed et al., 2012, Eq. 7). However, the problem (P) studied here includes an additional non-negativity constraint on W and the regularization term $$\frac{\mu}{2}\sum_i \|\bar{w}_i\|_2^2$$

that are important for the interpretation of the estimated factors and the convergence analysis. Moreover, SPARFA-M utilizes the accelerated FISTA framework as opposed to the more straightforward but less efficient gradient descent method in Mohamed et al. (2012).

SPARFA-M is capable of handling both the inverse logit and inverse probit link functions. For the inverse logit link function, one could solve $(RR_1^+)$ and $(RR_2)$ using an iteratively reweighted second-order algorithm as in Hastie et al. (2010), Minka (2003), Lee et al. (2006), Park and Hastie (2008), or an interior-point method as in Koh et al. (2007). However, none of these techniques extend naturally to the inverse probit link function, which is essential for some applications, e.g., in noisy compressive sensing recovery from 1-bit measurements (e.g., Jacques et al. (2013) or Plan and Vershynin (2012). Moreover, second-order techniques typically do not scale well to high-dimensional problems due to the necessary computation of the Hessian. In contrast, SPARFA-M scales favorably thanks to its accelerated first-order FISTA optimization, which avoids the computation of the Hessian.

I.4. Sparfa-B: Bayesian Sparse Factor Analysis

Our second algorithm, SPARFA-B, solves the SPARFA problem using a Bayesian method based on Markov chain Monte-Carlo (MCMC) sampling. In contrast to SPARFA-M, which computes point estimates for each of the parameters of interest, SPARFA-B computes full posterior distributions for W, C, and $\mu$.

While SPARFA-B has a higher computational complexity than SPARFA-M, it has several notable benefits in the context of learning and content analytics. First, the full posterior distributions enable the computation of informative quantities such as credible intervals and posterior modes for all parameters of interest. Second, since MCMC methods explore the full posterior space, they are not subject to being trapped indefinitely in local minima, which is possible with SPARFA-M. Third, the hyperparameters used in Bayesian methods generally have intuitive meanings, in contrary to the regularization parameters of optimization-based methods like SPARFA-M. These hyperparameters can also be specially chosen to incorporate additional prior information about the problem.

I.4.1 Problem Formulation

As discussed in Section I.2.2, we require the matrix W to be both sparse (A2) and nonnegative (A3). We enforce these assumptions through the following prior distributions that are a variant of the well-studied spike-slab model (West, 2003; Ishwaran and Rao, 2005) adapted for non-negative factor loadings:

$$W_{i,k} \sim r_k \mathrm{Exp}(\lambda_k) + (1 - r_k)\delta_0 \qquad (10)$$

$$\lambda_k \sim Ga(\alpha, \beta),$$

and $$r_k \sim \mathrm{Beta}(e, f).$$

Here, $$\mathrm{Exp}(x \mid \lambda) \sim \lambda e^{-\lambda x},$$

$$x \geq 0,$$

and $$Ga(x \mid \alpha, \beta) \sim \frac{\beta^\alpha x^{\alpha-1} e^{-\beta x}}{\Gamma(\alpha)},$$

$$x \geq 0,$$

$\delta_0$ is the Dirac delta function, and $\alpha$, $\beta$, e, f are hyperparameters. The model (10) uses the latent random variable $r_k$ to control the sparsity via the hyperparameters e and f. This set of priors induces a conjugate form on the posterior that enables efficient sampling. We note that both the exponential rate parameters $\lambda_k$ as well as the inclusion probabilities $r_k$ are grouped per factor. The remaining priors used in the proposed Bayesian model are summarized as $$c_j \sim N(0, V), V \sim IW(V_0, h), \text{ and } \mu \sim N(\mu_0, v_\mu), \qquad (11)$$

where $V_0$, h, $\mu_0$, $v_\mu$ are hyperparameters.

I.4.2 the Sparfa-B Algorithm

We obtain posterior distribution estimates for the parameters of interest through an MCMC method based on the Gibbs' sampler. To implement this, we must derive the conditional posteriors for each of the parameters of interest. We note again that the graded learner response matrix Y will not be fully observed, in general. Thus, our sampling method must be equipped to handle missing data.

The majority of the posterior distributions follow from standard results in Bayesian analysis and will not be derived in detail here. The exception is the posterior distribution of $W_{i,k}$, $\forall i$, k. The spike-slab model that enforces sparsity in W requires first sampling $W_{i,k} \neq 0 | Z$, C, $\mu$ and then sampling $W_{i,k} | Z$, C, $\mu$, for all $W_{i,k} \neq 0$. These posterior distributions differ from previous results in the literature due to our assumption of an exponential (rather than a normal) prior on $W_{i,k}$. We next derive these two results in detail.

I.4.2.1 Derivation of Posterior Distribution of $W_{i,K}$

We seek both the probability that an entry $W_{i,k}$ is active (non-zero) and the distribution of $W_{i,k}$ when active given our observations. The following theorem states the final sampling results.

Theorem 3 (Posterior Distributions for W)

For all $i=1, \ldots, Q$ and all $k=1, \ldots, K$, the posterior sampling results for $W_{i,k} = 0 | Z, C, \mu$ and $W_{i,k} | Z, C, \mu, W_{i,k} \neq 0$ are given by $$\hat{R}_{i,k} = p(W_{i,j} = 0 \mid Z, C, \mu)$$

$$= \frac{\frac{\mathcal{N}^r(\hat{M}_{i,k}, \hat{S}_{i,k}, \lambda_k)}{\mathrm{Exp}(0 \mid \lambda_k)}(1 - r_k)}{\frac{\mathcal{N}^r(\hat{M}_{i,k}, \hat{S}_{i,k}, \lambda_k)}{\mathrm{Exp}(0 \mid \lambda_k)}(1 - r_k) + r_k},$$

$$W_{i,k} \mid Z, C, \mu, W_{i,k} \neq 0 \sim \mathcal{N}^r(\hat{M}_{i,k}, \hat{S}_{i,k}, \lambda_k),$$

-continued $$\hat{M}_{i,k} = \frac{\sum_{j:(i,j)\in\Omega_{obs}}\left((Z_{i,j}-\mu_i)-\sum_{k'\neq k}W_{i,k'}C_{k',j}\right)C_{k,j}}{\sum_{j:(i,j)\in\Omega_{obs}}C_{k,j}^2}$$

$$\hat{S}_{i,k} = \left(\sum_{j:(i,j)\in\Omega_{obs}}C_{k,j}^2\right)^{-1},$$

where $$\mathcal{N}^r(x\mid m,s,\lambda) = \frac{e^{\lambda m-\lambda^2 s/2}}{\sqrt{2\pi s}\,\Phi\!\left(\frac{m-\lambda s}{\sqrt{s}}\right)}e^{-\frac{(x-m)^2}{2s-\lambda m}}$$

represents a rectified normal distribution (see Schmidt et al. (2009)).

I.4.2.2 Sampling Methodology

SPARFA-B carries out the following MCMC steps to compute posterior distributions for all parameters of interest:
1. For all $(i,j)\in\Omega_{obs}$, draw $Z_{i,j}\sim N((WC)_{i,j}+\mu_i, 1)$, truncating above 0 if $Y_{i,j}=1$, and truncating below 0 if $Y_{i,j}=0$.
2. For all $i=1,\ldots,Q$, draw $\mu_i\sim N(m_i,v)$ with $v=(v_\mu^{-1}+n')^{-1}$, $m_i=\mu_0+v\Sigma_{j:(i,j)\in\Omega_{obs}}(Z_{i,j}-\bar{w}_i^T c_j)$, and n' the number of learners responding to question i.
3. For all $j=1,\ldots,N$, draw $c_j\sim N(m_j, M_j)$ with $M_j=(V^{-1}+\tilde{W}^T\tilde{W})^{-1}$, and $m_j=M_j\tilde{W}^T(\tilde{z}_j-\tilde{\mu})$. The notation $\tilde{()}$ denotes the restriction of the vector or matrix to the set of rows $i:(i,j)\in\Omega_{obs}$.
4. Draw $V\sim IW(V_0+C^TC, N+h)$.
5. For all $i=1,\ldots,Q$ and $k=1,\ldots,K$, draw $W_{i,k}\sim\hat{R}_{i,k}\mathcal{N}^r(\hat{M}_{i,k},\hat{S}_{i,k})+(1-\hat{R}_{i,k})\delta_0$, where $\hat{R}_{i,k}$, $\hat{M}_{i,k}$ and $\hat{S}_{i,k}$ are as stated in Theorem 3.
6. For all $k=1,\ldots,K$, let $b_k$ define the number of active (i.e., non-zero) entries of $\bar{w}_k$. Draw $\lambda_k\sim Ga(a+b_k, \beta+\Sigma_{i=1}^Q W_{i,k})$.
7. For all $k=1,\ldots,K$, draw $r_k\sim Beta(e+b_k, f+Q-b_k)$, with $b_k$ defined as in Step 6.

I.4.3 Algorithmic Details and Improvements for Sparfa-B

Here we discuss some several practical issues for efficiently implementing SPARFA-B, selecting the hyperparameters, and techniques for easy visualization of the SPARFA-B results.

I.4.3.1 Improving Computational Efficiency

The Gibbs sampling scheme of SPARFA-B enables efficient implementation in several ways. First, draws from the truncated normal in Step 1 of Section I.4.2.2 are decoupled from one another, allowing them to be performed independently and, potentially, in parallel. Second, sampling of the elements in each column of W can be carried out in parallel by computing the relevant factors of Step 5 in matrix form. Since K<<Q, N by assumption (A1), the relevant parameters are recomputed only a relatively small number of times. One taxing computation is the calculation of the covariance matrix $M_j$ for each $j=1,\ldots,N$ in Step 3.

This computation is necessary, since we do not constrain each learner to answer the same set of questions which, in turn, changes the nature of the covariance calculation for each individual learner. For data sets where all learners answer the same set of questions, this covariance matrix is the same for all learners and, hence, can be carried out once per MCMC iteration.

I.4.3.2 Parameter Selection

The selection of the hyperparameters is performed at the discretion of the user. As is typical for Bayesian methods, non-informative (broad) hyperparameters can be used to avoid biasing results and to allow for adequate exploration of the posterior space. Tighter hyperparameters can be used when additional side information is available. For example, prior information from subject matter experts might indicate which concepts are related to which questions or might indicate the intrinsic difficulty of the questions. Since SPARFA-M has a substantial speed advantage over SPARFA-B, it may be advantageous to first run SPARFA-M and then use its output to help in determining the hyperparameters or to initialize the SPARFA-B variables directly.

I.4.3.3 Post-Processing for Data Visualization

As discussed above, the generation of posterior statistics is one of the primary advantages of SPARFA-B. However, for many tasks, such as visualization of the retrieved knowledge base, it is often convenient to post-process the output of SPARFA-B to obtain point estimates for each parameter. For many Bayesian methods, simply computing the posterior mean is often sufficient. This is the case for most parameters computed by SPARFA-B, including C and µ. The posterior mean of W, however, is generally non-sparse, since the MCMC will generally explore the possibility of including each entry of W. Nevertheless, we can easily generate a sparse W by examining the posterior mean of the inclusion statistics contained in $\hat{R}_{i,k}$, $\forall i$, k. Concretely, if the posterior mean of $\hat{R}_{i,k}$ is small, then we set the corresponding entry of $W_{i,k}$ to zero. Otherwise, we set $W_{i,k}$ to its posterior mean. We will make use of this method throughout the experiments presented in Section I.6.

I.4.4 Related Work on Bayesian Sparse Factor Analysis

Sparsity models for Bayesian factor analysis have been well-explored in the statistical literature (West, 2003; Tipping, 2001; Ishwaran and Rao, 2005). One popular avenue for promoting sparsity is to place a prior on the variance of each component in W (see, e.g., Tipping (2001), Fokoue (2004), and Pournara and Wernisch (2007)). In such a model, large variance values indicate active components, while small variance values indicate inactive components. Another approach is to model active and inactive components directly using a form of a spike-slab model due to West (2003) and used in Goodfellow et al. (2012), Mohamed et al. (2012), and Hahn et al. (2012):

$$W_{i,k}\sim r_k N(0,\nu_k)+(1-r_k)\delta_0, \nu_k\sim IG(\alpha,\beta), \text{ and } r_k\sim Beta(e, f).$$

The approach employed in (10) utilizes a spike-slab prior with an exponential distribution, rather than a normal distribution, for the active components of W. We chose this prior for several reasons: First, it enforces the non-negativity assumption (A3). Second, it induces a posterior distribution that can be both computed in closed form and sampled efficiently. Third, its tail is slightly heavier than that of a standard normal distribution, which improves the exploration of quantities further away from zero.

A sparse factor analysis model with non-negativity constraints that is related to the one proposed here was discussed in Meng et al. (2010), although their methodology is quite different from ours. Specifically, they impose non-negativity on the (dense) matrix C rather than on the sparse factor loading matrix W. Furthermore, they enforce non-negativity using a truncated normal rather than an exponential prior. (One could alternatively employ a truncated normal distribution on the support [0, +∞) for the active entries in W. In experiments with this model, we found a slight, though noticeable, improvement in prediction performance on real-data experiments using the exponential prior.)

I.5. Tag Analysis: Post-Processing to Interpret the Estimated Concepts

So far we have developed SPARFA-M and SPARFA-B to estimate W, C, and μ (or equivalently, M) in (2) given the partial binary observations in Y. Both W and C encode a small number of latent concepts. As we initially noted, the concepts are "abstract" in that they are estimated from the data rather than dictated by a subject matter expert. In this section we develop a principled post-processing approach to interpret the meaning of the abstract concepts after they have been estimated from learner responses, which is important if our results are to be usable for learning analytics and content analytics in practice. Our approach applies when the questions come with a set of user-generated "tags" or "labels" that describe in a free-form manner what ideas underlie each question.

We develop a post-processing algorithm for the estimated matrices W and C that estimates the association between the latent concepts and the user-generated tags, enabling concepts to be interpreted as a "bag of tags." Additionally, we show how to extract a personalized tag knowledge profile for each learner. The efficacy of our tag-analysis framework will be demonstrated in the real-world experiments in Section I.6.2.

I.5.1 Incorporating Question-Tag Information

Suppose that a set of tags has been generated for each question that represent the topic(s) or theme(s) of each question. The tags could be generated by the course instructors, subject matter experts, learners, or, more broadly, by crowd-sourcing. In general, the tags provide a redundant representation of the true knowledge components, i.e., concepts are associated to a "bag of tags."

Assume that there is a total number of M tags associated with the Q questions. We form a Q×M matrix T, where each column of T is associated to one of the M pre-defined tags. We set $T_{i,m}=1$ if tag m∈{1, ..., M} is present in question i and 0 otherwise. Now, we postulate that the question association matrix W extracted by SPARFA can be further factorized as W=TA, where A is an M×K matrix representing the tags-to-concept mapping. This leads to the following additional assumptions.

(A4) Non-negativity: The matrix A is non-negative. This increases the interpretability of the result, since concepts should not be negatively correlated with any tags, in general.

(A5) Sparsity: Each column of A is sparse. This ensures that the estimated concepts relate to only a few tags.

I.5.2 Estimating the Concept-Tag Associations and Learner-Tag Knowledge

The assumptions (A4) and (A5) enable us to extract A using $l_1$-norm regularized nonnegative least-squares as described in Hastie et al. (2010) and Chen et al. (1998). Specifically, to obtain each column $a_k$ of A, k=1, ..., K, we solve the following convex optimization problem, a non-negative variant of basis pursuit denoising:

$$(BPDN_+) \quad \text{minimize}_{a_k : A_{m,k} \geq 0 \forall m} \frac{1}{2}\|w_k - Ta_k\| + \eta \|a_k\|_1.$$

Here, $w_k$ represents the $k^{th}$ column of W, and the parameter η controls the sparsity level of the solution $a_k$.

We propose a first-order method derived from the FISTA framework in Beck and Teboulle (2009) to solve $(BPDN_+)$. The algorithm consists of two steps: A gradient step with respect to the $l_2$-norm penalty function, and a projection step with respect to the $l_1$-norm regularizer subject to the non-negative constraints on $a_k$. By solving $(BPDN_+)$ for k=1, ..., K, and building A=[$a_1$, ..., $a_K$], we can (i) assign tags to each concept based on the non-zero entries in A and (ii) estimate a tag-knowledge profile for each learner.

I.5.2.1 Associating Tags to Each Concept

Using the concept-tag association matrix A we can directly associate tags to each concept estimated by the SPARFA algorithms. We first normalize the entries in $a_k$ such that they sum to one. With this normalization, we can then calculate percentages that show the proportion of each tag that contributes to concept k corresponding to the non-zero entries of $a_k$. This concept tagging method typically will assign multiple tags to each concept, thus, enabling one to identify the coarse meaning of each concept (see Section I.6.2 for examples using real-world data).

I.5.2.2 Learner Tag Knowledge Profiles

Using the concept-tag association matrix A, we can assess each learner's knowledge of each tag. To this end, we form an M×N matrix U=AC, where the $U_{m,j}$ characterizes the knowledge of learner j of tag m. This information could be used, for example, by a PLS to automatically inform each learner which tags they have strong knowledge of and which tags they do not. Course instructors can use the information contained in U to extract measures representing the knowledge of all learners on a given tag, e.g., to identify the tags for which the entire class lacks strong knowledge. This information would enable the course instructor to select future learning content that deals with those specific tags. A real-world example demonstrating the efficacy of this framework is shown below in Section I.6.2.1.

I.6. Experiments

In this section, we validate SPARFA-M and SPARFA-B on both synthetic and real-world educational data sets. First, using synthetic data, we validate that both algorithms can accurately estimate the underlying factors from binary-valued observations and characterize their performance under different circumstances. Specifically, we benchmark the factor estimation performance of SPARFA-M and SPARFA-B against a variant of the well-established K-SVD algorithm (Aharon et al. (2006)) used in dictionary-learning applications. Second, using real-world graded learner-response data we demonstrate the efficacy SPARFA-M (both probit and logit variants) and of SPARFA-B for learning and content analytics. Specifically, we showcase how the estimated learner concept knowledge, question-concept association, and intrinsic question difficulty can support machine learning-based personalized learning.

Finally, we compare SPARFA-M against the recently proposed binary-valued collaborative filtering algorithm CF-IRT (Bergner et al. 2012) that predicts unobserved learner responses.

I.6.1 Synthetic Data Experiments

We first characterize the estimation performance of SPARFA-M and SPARFA-B using synthetic test data generated from a known ground truth model. We generate instances of W, C, and μ under pre-defined distributions and then generate the binary-valued observations Y according to (2).

Our report on the synthetic experiments is organized as follows. In Section I.6.1.1, we outline K-SVD+, a variant of the well-established K-SVD dictionary-learning (DL) algorithm originally proposed in Aharon et al. (2006); we use it as a baseline method for comparison to both SPARFA algorithms. In Section I.6.1.2 we detail the performance metrics. We compare SPARFA-M, SPARFA-B, and K-SVD+ as we vary the problem size and number of concepts (Section I.6.1.3), observation incompleteness (Section I.6.1.4), and the sparsity of W (Section I.6.1.5). In the above-referenced experiments, we simulate the observation matrix Y via the inverse probit link function and use only the probit variant of SPARFA-M in order to make a fair comparison with SPARFA-B. In a real-world situation, however, the link function is generally unknown. In Section I.6.1.6 we conduct model-mismatch experiments, where we generate data from one link function but analyze assuming the other.

In all synthetic experiments, we average the results of all performance measures over 25 Monte-Carlo trials, limited primarily by the computational complexity of SPARFA-B, for each instance of the model parameters we control.

I.6.1.1 Baseline Algorithm: K-Svd+

Since we are not aware of any existing algorithms to solve (2) subject to the assumptions (A1)-(A3), we deploy a novel baseline algorithm based on the well-known K-SVD algorithm of Aharon et al. (2006), which is widely used in various dictionary learning settings but ignores the inverse probit or logit link functions. Since the standard K-SVD algorithm also ignores the non-negativity constraint used in the SPARFA model, we develop a variant of the non-negative K-SVD algorithm proposed in Aharon et al. (2005) that we refer to as K-SVD+. In the sparse coding stage of K-SVD+, we use the non-negative variant of orthogonal matching pursuit (OMP) outlined in Bruckstein et al. (2008); that is, we enforce the non-negativity constraint by iteratively picking the entry corresponding to the maximum inner product without taking its absolute value. We also solve a non-negative least-squares problem to determine the residual error for the next iteration. In the dictionary update stage of K-SVD+, we use a variant of the rank-one approximation algorithm detailed in (Aharon et al., 2005, FIG. 4), where we impose non-negativity on the elements in W but not on the elements of C.

K-SVD+ has as input parameters the sparsity level of each row of W. In what follows, we provide K-SVD+ with the known ground truth for the number of non-zero components in order to obtain its best-possible performance. This will favor K-SVD+ over both SPARFA algorithms, since, in practice, such oracle information is not available.

I.6.1.2 Performance Measures

In each simulation, we evaluate the performance of SPARFA-M, SPARFA-B, and K-SVD+ by comparing the fidelity of the estimates $\hat{W}$, $\hat{C}$, and $\hat{\mu}$ to the ground truth W, C, and $\mu$. Performance evaluation is complicated by the facts that (i) SPARFA-B outputs posterior distributions rather than simple point estimates of the parameters and (ii) factor-analysis methods are generally susceptible to permutation of the latent factors. We address the first concern by post-processing the output of SPARFA-B to obtain point estimates for W, C, and $\mu$ as detailed in Section I.4.3.3 using $\hat{R}_{i,k}$<0.35 for the threshold value. We address the second concern by normalizing the columns of W, $\hat{W}$ and the rows of C, $\hat{C}$ to unit $l_2$-norm, permuting the columns of $\hat{W}$ and $\hat{C}$ to best match the ground truth, and then compare W and C with the estimates $\hat{W}$ and $\hat{C}$. We also compute the Hamming distance between the support set of W and that of the (column-permuted) estimate $\hat{W}$. To summarize, the performance measures used in the sequel are $$E_W = \frac{\|W - \hat{W}\|_F^2}{\|W\|_F^2},$$

-continued $$E_C = \frac{\|C - \hat{C}\|_F^2}{\|C\|_F^2},$$

$$E_\mu = \frac{\|\mu - \hat{\mu}\|_2^2}{\|\mu\|_2^2},$$

$$E_H = \frac{\|H - \hat{H}\|_F^2}{\|H\|_F^2}.$$

where $H \in \{0,1\}^{Q \times K}$ with $H_{i,k}=1$ if $W_{i,k}>0$ and $H_{i,k}=0$ otherwise. The Q×K matrix $\hat{H}$ is defined analogously using $\hat{W}$.

I.6.1.3 Impact of Problem Size and Number of Concepts

In this experiment, we study the performance of SPARFA vs. KSVD+ as we vary the number of learners N, the number of questions Q, and the number of concepts K.

Experimental Setup:

We vary the number of learners N and the number of questions $Q \in \{50,100,200\}$, and the number of concepts $K \in \{5,10\}$. For each combination of (N, Q, K), we generate W, C, $\mu$ and Y according to (10) and (11) with $$v_\mu = 1, \lambda_k = \frac{2}{3} \forall k,$$

and $V_0 = I_K$. For each instance, we choose the number of non-zero entries in each row of W as DU(1,3) where DU(a, b) denotes the discrete uniform distribution in the range a to b. For each trial, we run the probit version of SPARFA-M, SPARFA-B, and K-SVD+ to obtain the estimates $\hat{W}$, $\hat{C}$, $\hat{\mu}$ and calculate $\hat{H}$. For all of the synthetic experiments with SPARFA-M, we set the regularization parameters $\gamma=0.1$ and select $\lambda$ using the BIC (Hastie et al. (2010)). For SPARFA-B, we set the hyperparameters to h=K+1, $v_\mu=1$, $\alpha=1$, $\beta=1.5$, e=1, and f=1.5; moreover, we burn-in the MCMC for 30,000 iterations and take output samples over the next 30,000 iterations.

Results and Discussion:

FIGS. 1.3A-X shows box-and-whisker plots for the three algorithms and the four performance measures. We observe that the performance of all of the algorithms generally improves as the problem size increases. Moreover, SPARFA-B has superior performance for $E_W$, $E_C$, and $E_\mu$. We furthermore see that both SPARFA-B and SPARFA-M outperform K-SVD+ on $E_W$, $E_C$, and especially $E_\mu$. K-SVD+ performs very well in terms of $E_H$ (slightly better than both SPARFA-M and SPARFA-B) due to the fact that we provide it with the oracle sparsity level, which is, of course, not available in practice. SPARFA-B's improved estimation accuracy over SPARFA-M comes at the price of significantly higher computational complexity. For example, for N=Q=200 and K=5, SPARFA-B requires roughly 10 minutes on a 3.2 GHz quad-core desktop PC, while SPARFA-M and K-SVD+ require only 6 s.

In summary, SPARFA-B is well-suited to small problems where solution accuracy or the need for confidence statistics are the key factors; SPARFA-M, in contrast, is destined for analyzing large-scale problems where low computational complexity (e.g., to generate immediate learner feedback) is important.

I.6.1.4 Impact of the Number of Incomplete Observations

In this experiment, we study the impact of the number of observations in Y on the performance of the probit version of SPARFA-M, SPARFA-B, and K-SVD+.

Experimental Setup:

We set N=Q=100, K=5, and all other parameters as in Section I.6.1.3. We then vary the percentage $P_{obs}$ of entries in Y that are observed as 100%, 80%, 60%, 40%, and 20%. The locations of missing entries are generated i.i.d. and uniformly over the entire matrix.

Results and Discussion:

FIGS. 1.4A-D show that the estimation performance of all methods degrades gracefully as the percentage of missing observations increases. Again, SPARFA-B outperforms the other algorithms on $E_W$, $E_C$, and $E_\mu$. K-SVD+ performs worse than both SPARFA algorithms except on $E_H$, where it achieves comparable performance. We conclude that SPARFA-M and SPARFA-B can both reliably estimate the underlying factors, even in cases of highly incomplete data.

I.6.1.5 Impact of Sparsity Level

In this experiment, we study the impact of the sparsity level in W on the performance of the probit version of SPARFA-M, SPARFA-B, and K-SVD+.

Experimental Setup:

We choose the active entries of W i.i.d. Ber(q) and vary $q \in \{0.2, 0.4, 0.6, 0.8\}$ to control the number of non-zero entries in each row of W. All other parameters are set as in Section I.6.1.3. This data-generation method allows for scenarios in which some rows of W contain no active entries as well as all active entries. We set the hyperparameters for SPARFA-B to h=K+1=6, $v_\mu=1$, and e=1, and f=1.5. For q=0.2 we set $\alpha=2$ and $\beta=5$. For q=0.8 we set $\alpha=5$ and $\beta=2$. For all other cases, we set $\alpha=\beta=2$.

Results and Discussion:

FIGS. 1.5A-D show that sparser W lead to lower estimation errors. This demonstrates that the SPARFA algorithms are well-suited to applications where the underlying factors have a high level of sparsity. SPARFA-B outperforms SPARFA-M across all metrics. The performance of K-SVD+ is worse than both SPARFA algorithms except on the support estimation error $E_H$, which is due to the fact that K-SVD+ is aware of the oracle sparsity level.

I.6.1.6 Impact of Model Mismatch

In this experiment, we examine the impact of model mismatch by using a link function for estimation that does not match the true link function from which the data is generated.

Experimental Setup:

We fix N=Q=100 and K=5, and set all other parameters as in Section I.6.1.3. Then, for each generated instance of W, C, and $\mu$, we generate $Y_{pro}$ and $Y_{log}$ according to both the inverse probit link and the inverse logit link, respectively. We then run SPARFA-M (both the probit and logit variants), SPARFA-B (which uses only the probit link function), and K-SVD+ on both $Y_{pro}$ and $Y_{log}$.

Results and Discussion:

FIGS. 1.6A-D show that model mismatch does not severely affect $E_W$, $E_C$, and $E_H$ for both SPARFA-M and SPARFA-B. However, due to the difference in the functional forms between the probit and logit link functions, model mismatch does lead to an increase in $E_\mu$ for both SPARFA algorithms. We also see that K-SVD+ performs worse than both SPARFA methods, since it ignores the link function.

I.6.2 Real Data Experiments

We next test the SPARFA algorithms on three real-world educational datasets. Since all variants of SPARFA-M and SPARFA-B obtained similar results in the synthetic data experiments in Section I.6.1, for the sake of brevity, we will often show the results for only one of the algorithms for each dataset. In what follows, we select the sparsity penalty parameter $\lambda$ in SPARFA-M using the BIC as described in Hastie et al. (2010) and choose the hyperparameters for SPARFA-B to be largely non-informative.

I.6.2.1 Undergraduate Dsp Course

Dataset:

We analyze a very small dataset consisting of N=15 learners answering Q=44 questions taken from the final exam of an introductory course on digital signal processing (DSP) taught at Rice University in Fall 2011 (ELEC 301, Rice University (2011)). There is no missing data in the matrix Y.

Analysis:

We estimate W, C, and $\mu$ from Y using the logit version of SPARFA-M assuming K=5 concepts to achieve a concept granularity that matches the complexity of the analyzed dataset. Since the questions had been manually tagged by the course instructor, we deploy the tag-analysis approach proposed in Section I.5. Specifically, we form a 44×12 matrix T using the M=12 available tags and estimate the 12×5 concept-tag association matrix A in order to interpret the meaning of each retrieved concept. For each concept, we only show the top 3 tags and their relative contributions. We also compute the 12×15 learner tag knowledge profile matrix U.

Results and Discussion:

FIG. 1.7(a) visualizes the estimated question-concept association matrix $\hat{W}$ as a bipartite graph consisting of question and concept nodes. (To avoid the scaling identifiability problem that is typical in factor analysis, we normalize each row of C to unit $l_2$-norm and scale each column of W accordingly prior to visualizing the bipartite graph. This enables us to compare the strength of question-concept associations across different concepts.) In the graph, circles represent the estimated concepts and squares represent questions, with thicker edges indicating stronger question-concept associations (i.e., larger entries $\hat{W}_{i,k}$). Questions are also labeled with their estimated intrinsic difficulty $\mu_i$, with larger positive values of $\mu_i$ indicating easier questions. Note that ten questions are not linked to any concept. All Q=15 learners answered these questions correctly; as a result nothing can be estimated about their underlying concept structure. FIG. 1.7(b) provides the concept-tag association (top 3 tags) for each of the 5 estimated concepts.

Table 1 provides Learner 1's knowledge of the various tags relative to other learners. Large positive values mean that Learner 1 has strong knowledge of the tag, while large negative values indicate a deficiency in knowledge of the tag.

TABLE 1

Selected Tag Knowledge of Learner 1

| | |
|---|---|
| z-transform | 1.09 |
| Impulse response | −1.80 |
| Transfer function | −0.50 |
| Fourier transform | 0.99 |
| Laplace transform | −0.77 |

Table 2 shows the average tag knowledge of the entire class, computed by averaging the entries of each row in the learner tag knowledge matrix U as described in Section I.5.2.2.

TABLE 2

Average Tag Knowledge of All Learners

| | |
|---|---|
| z-transform | 0.04 |
| Impulse response | −0.03 |

TABLE 2-continued

Average Tag Knowledge of All Learners

| Transfer function | −0.10 |
|---|---|
| Fourier transform | 0.11 |
| Laplace transform | −0.03 |

Table 1 indicates that Learner 1 has particularly weak knowledges of the tag "Impulse response." Armed with this information, a PLS could automatically suggest remediation about this concept to Learner 1. Table 2 indicates that the entire class has (on average) weak knowledge of the tag "Transfer function." With this information, a PLS could suggest to the class instructor that they provide remediation about this concept to the entire class.

I.6.2.2 Grade 8 Science Course

Dataset The STEMscopes dataset was introduced in Section I.1.2. There is substantial missing data in the matrix Y, with only 13.5% of its entries observed.

Analysis:

We compare the results of SPARFA-M and SPARFA-B on this data set to highlight the pros and cons of each approach. For both algorithms, we select K=5 concepts. For SPARFA-B, we fix reasonably broad (non-informative) values for all hyperparameters. For $\mu_0$ we calculate the average rate of correct answers $p_s$ on observed graded responses of all learners to all questions and use $\mu_i = \Phi_{pro}^{-1}(p_s)$. The variance $v_\mu$ is left sufficiently broad to enable adequate exploration of the intrinsic difficulty for each questions. Point estimates of W, C, and $\mu$ are generated from the SPARFA-B posterior distributions using the methods described in Section I.4.3.3. Specifically, an entry $\hat{W}_{i,k}$ that has a corresponding active probability $\hat{R}_{i,k} < 0.55$ is thresholded to 0. Otherwise, we set $\hat{W}_{i,k}$ to its posterior mean. On a 3.2 GHz quad-core desktop PC, SPARFA-M converged to its final estimates in 4s, while SPARFA-B required 10 minutes.

Results and Discussion:

Both SPARFA-M and SPARFA-B deliver comparable factorizations. The estimated question-concept association graph for SPARFA-B is shown in FIG. 1.2(a), with the accompanying concept-tag association in FIG. 1.2(b). Again we see a sparse relationship between questions and concepts. The few outlier questions that are not associated with any concept are generally those questions with very low intrinsic difficulty or those questions with very few responses.

One advantage of SPARFA-B over SPARFA-M is its ability to provide not only point estimates of the parameters of interest but also reliability information for those estimates. This reliability information can be useful for decision making, since it enables one to tailor actions according to the associated uncertainty. If there is considerable uncertainty regarding learner mastery of a particular concept, for example, it may be a more appropriate use of time of the learner to ask additional questions that reduce the uncertainty, rather than assigning new material for which the learner may not be adequately prepared.

We demonstrate the utility of SPARFA-B's posterior distribution information on the learner concept knowledge matrix C. FIG. 1.8 shows box-whisker plots of the MCMC output samples over 30,000 iterations (after a burn-in period of 30,000 iterations) for a set of learners for Concept 5. Each box-whisker plot corresponds to the posterior distribution for a different learner. These plots enable us to visualize both the posterior mean and variance associated with the concept knowledge estimates $\hat{c}_j$. As one would expect, the estimation variance tends to decrease as the number of answered questions increases (shown in the top portion of FIG. 1.8).

The exact set of questions answered by a learner also affects the posterior variance of our estimate, as different questions convey different levels of information regarding a learner's concept mastery. An example of this phenomenon is observed by comparing Learners 7 and 28. Each of these two learners answered 20 questions and had a nearly equal number of correct answers (16 and 17, respectively). A conventional analysis that looked only at the percentage of correct answers would conclude that both learners have similar concept mastery. However, the actual set of questions answered by each learner is not the same, due to their respective instructors assigning different questions. While SPARFA-B finds a similar posterior mean for Learner 7 and Learner 28, it finds very different posterior variances, with considerably more variance for Learner 28. The SPARFA-B posterior samples shed additional light on the situation at hand. Most of the questions answered by Learner 28 are deemed easy (defined as having intrinsic difficulties $\hat{\mu}_i$ larger than one). Moreover, the remaining, more difficult questions answered by Learner 28 show stronger affinity to concepts other than Concept 5. In contrast, roughly half of the questions answered by Learner 7 are deemed hard and all of these questions have stronger affinity to Concept 5. Thus, the questions answered by Learner 28 convey only weak information about the knowledge of Concept 5, while those answered by Learner 7 convey strong information. Thus, we cannot determine from Learner 28's responses whether they have mastered Concept 5 well or not. Such SPARFA-B posterior data would enable a PLS to quickly assess this scenario and tailor the presentation of future questions to Learner 28—in this case, presenting more difficult questions related to Concept 5 would reduce the estimation variance on their concept knowledge and allow a PLS to better plan future educational tasks for this particular learner.

Second, we demonstrate the utility of SPARFA-B's posterior distribution information on the question-concept association matrix W. Accurate estimation of W enables course instructors and content authors to validate the extent to which problems measure knowledge across various concepts. In general, there is a strong degree of commonality between the results of SPARFA-M and SPARFA-B, especially as the number of learners answering a question grow. We present some illustrative examples of support estimation on W for both SPARFA algorithms in Table 3. Table 3 provides a comparison of SPARFA-M and SPARFA-B for three selected questions and the K=5 estimated concepts in the STEMscopes dataset. For SPARFA-M, the labels "Yes" and "No" indicate whether a particular concept was detected in the question. For SPARFA-B, we show the posterior inclusion probability (in percent), which indicates the percentage of iterations in which a particular concept was sampled.

|  |  | C1 | C2 | C3 | C4 | C5 |
|---|---|---|---|---|---|---|
| Q3 (27 responses) | M | Yes | No | No | No | Yes |
|  | B | 94% | 36% | 48% | 18% | 80% |
| Q56 (5 responses) | M | No | No | No | No | No |
|  | B | 30% | 30% | 26% | 31% | 31% |
| Q72 (6 responses) | M | No | No | No | No | Yes |
|  | B | 61% | 34% | 29% | 36% | 58% |

We use the labels "Yes"/"No" to indicate inclusion of a concept by SPARFA-M and show the posterior inclusion probabilities for each concept by SPARFA-B. Here, both SPARFA-M and SPARFA-B agree strongly on both Question 3 and Question 56. Question 72 is answered by only 6 learners, and SPARFA-M discovers a link between this question and Concept 5. SPARFA-B proposes Concept 5 in 58% of all MCMC iterations, but also Concept 1 in 60% of all MCMC iterations. Furthermore, the proposals of Concept 1 and Concept 5 are nearly mutually exclusive; in most iterations only one of the two concepts is proposed, but both are rarely proposed jointly. This behavior implies that SPARFA-B has found two competing models that explain the data associated with Question 72. To resolve this ambiguity, a PLS would need to gather more learner responses.

I.6.2.3 Algebra Test Administered on Amazon Mechanical Turk

For a final demonstration of the capabilities the SPARFA algorithms, we analyze a dataset from a high school algebra test carried out by Daniel Calderón of Rice University on Amazon Mechanical Turk, a crowd-sourcing marketplace (Amazon Mechanical Turk (2012)).

Dataset:

The dataset consists of $N=99$ learners answering $Q=34$ questions covering topics such as geometry, equation solving, and visualizing function graphs. Calderón manually labeled the questions from a set of $M=10$. The dataset is fully populated, with no missing entries.

Analysis:

We estimate $W$, $C$, $\mu$ from the fully populated 34×99 binary-valued matrix $Y$ using the logit version of SPARFA-M assuming $K=5$ concepts. We deploy the tag-analysis approach proposed in Section I.5 to interpret each concept. Additionally, we calculate the likelihoods of the responses using (1) and the estimates $\hat{W}$, $\hat{C}$, $\hat{\mu}$. The results from SPARFA-M are summarized in FIGS. 1.9A and 1.9B. We detail the results of our analysis for Questions 19-26 in Table 4 and for Learner 1 in Table 5.

TABLE 4

Graded responses and their underlying concepts for Learner 1
(1 designates a correct response and 0 an incorrect response).

| Question number | 19 | 20 | 21 | 22 |
|---|---|---|---|---|
| Learner's graded response | 1 | 1 | 0 | 1 |
| Correct answer likelihood | 0.79 | 0.71 | 0.11 | 0.21 |
| Underlying concepts | 1 | 1, 5 | 5 | 2, 3, 4 |
| Intrinsic difficulty | −1.42 | −0.46 | −0.67 | 0.27 |
| Question number | 23 | 24 | 25 | 26 |
| Learner's graded response | 1 | 0 | 0 | 0 |
| Correct answer likelihood | 0.93 | 0.23 | 0.43 | 0.00 |
| Underlying concepts | 3, 5 | 2, 4 | 1, 4 | 2, 4 |
| Intrinsic difficulty | 0.79 | 0.56 | 1.40 | −0.81 |

TABLE 5

Estimated concept knowledge for Learner 1

| Concept number | 1 | 2 | 3 | 4 | 5 |
|---|---|---|---|---|---|
| Concept knowledge | 0.46 | −0.35 | 0.72 | −1.67 | 0.61 |

Results and Discussion:

With the aid of SPARFA, we can analyze the strengths and weaknesses of each learner's concept knowledge both individually and relative to other users. We can also detect outlier responses that are due to guessing, cheating, or carelessness. The values in the estimated concept knowledge matrix measure each learner's concept knowledge relative to all other learners. The estimated intrinsic difficulties of the questions provide a relative measure that summarizes how all users perform on each question.

Let us now consider an example in detail; see Table 4 and Table 5. Learner 1 incorrectly answered Questions 21 and 26 (see Table 4), which involve Concepts 1 and 2. Their knowledge of these concepts is not heavily penalized, however (see Table 5), due to the high intrinsic difficulty of these two questions, which means that most other users also incorrectly answered them. User 1 also incorrectly answered Questions 24 and 25, which involve Concepts 2 and 4. Their knowledge of these concepts is penalized, due to the low intrinsic difficulty of these two questions, which means that most other users correctly answered them. Finally, Learner 1 correctly answered Questions 19 and 20, which involve Concepts 1 and 5. Their knowledge of these concepts is boosted, due to the high intrinsic difficulty of these two questions.

SPARFA can also be used to identify each user's individual strengths and weaknesses. Continuing the example, Learner 1 needs to improve their knowledge of Concept 4 (associated with the tags "Simplifying expressions", "Trigonometry," and "Plotting functions") significantly, while their deficiencies on Concepts 2 and 3 are relatively minor.

Finally, by investigating the likelihoods of the graded responses, we can detect outlier responses, which would enables a PLS to detect guessing and cheating. By inspecting the concept knowledge of Learner 1 in Table 5, we can identify insufficient knowledge of Concept 4. Hence, Learner 1's correct answer to Question 22 is likely due to a random guess, since the predicted likelihood of providing the correct answer is estimated at only 0.21.

I.6.3 Predicting Unobserved Learner Responses

We now compare SPARFA-M against the recently proposed binary-valued collaborative filtering algorithm CF-IRT (Bergner et al. (2012)) in an experiment to predict unobserved learner responses.

Dataset and Experimental Setup:

In this section, we study both the Mechanical Turk algebra test dataset and a portion of the ASSISTment dataset (Pardos and Heffernan (2010)). The ASSISTment dataset consists of $N=403$ learners answering $Q=219$ questions, with 25% of the responses observed (see Vats et al. (2013) for additional details on the dataset). In each of the 25 trials we run for both datasets, we hold out 20% of the observed learner responses as a test set, and train both the logistic variant of SPARFA-M and CF-IRT on the rest. (In order to arrive at a fair comparison, we choose to use the logistic variant of SPARFA-M, since CF-IRT also relies on a logistic model.) The regularization parameters of both algorithms are selected using 4-fold cross-validation on the training set. We use two performance metrics to evaluate the performance of these algorithms, namely (i) the prediction accuracy, which corresponds to the percentage of correctly predicted unobserved responses, and (ii) the average prediction likelihood $$\frac{1}{|\Omega_{obs}|} \sum_{i,j:(i,j)\in\Omega_{obs}} p(Y_{i,j} | \bar{w}_i, c_j)$$

of the unobserved responses, as proposed in González-Brenes and Mostow (2012), for example.

Results and Discussion:

FIG. 1.10 shows the prediction accuracy and prediction likelihood for both the Mechanical Turk algebra test dataset and the ASSISTment dataset. We see that SPARFA-M delivers comparable (sometimes slightly superior) prediction performance to CF-IRT in predicting unobserved learner responses.

Furthermore, we see from FIG. 1.10 that the prediction performance varies little over different values of K, meaning that the specific choice of K has little influence on the prediction performance within a certain range. This phenomenon agrees with other collaborative filtering results (see, e.g., Koren et al. (2009); Koren and Sill (2011)). Consequently, the choice of K essentially dictates the granularity of the abstract concepts we wish to estimate. We choose K=5 in the real data experiments of Section I.6.2 when we visualize the question-concept associations as bipartite graphs, as it provides a desirable granularity of the estimated concepts in the datasets. We emphasize that SPARFA-M is able to provide interpretable estimated factors while achieving comparable (or slightly superior) prediction performance than that achieved by CF-IRT, which does not provide interpretability. This feature of SPARFA is key for the development of PLSs, as it enables an automated way of generating interpretable feedback to learners in a purely data-driven fashion.

I.7. Related Work on Machine Learning-Based Personalized Learning

A range of different machine learning algorithms have been applied in educational contexts. Bayesian belief networks have been successfully used to probabilistically model and analyze learner response data (e.g., Krudysz et al. (2006); Woolf (2008); Krudysz and McClellan (2011)). Such models, however, rely on predefined question-concept dependencies (that are not necessarily the true dependencies governing learner responses) and primarily only work for a single concept. In contrast, SPARFA discovers question-concept dependencies from solely the graded learner responses to questions and naturally estimates multi-concept question dependencies.

Modeling question-concept associations has been studied in Barnes (2005), Thai-Nghe et al. (2011a), Thai-Nghe et al. (2011b), and Desmarais (2011). The approach in Barnes (2005) characterizes the underlying question-concept associations using binary values, which ignore the relative strengths of the question-concept associations. In contrast, SPARFA differentiates between strong and weak relationships through the real-valued weights $W_{i,k}$. The matrix and tensor factorization methods proposed in Barnes (2005), Thai-Nghe et al. (2011a), and Thai-Nghe et al. (2011b) treat graded learner responses as real but deterministic values. In contrast, the probabilistic framework underlying SPARFA provides a statistically principled model for graded responses; the likelihood of the observed graded responses provides even more explanatory power.

Existing intelligent tutoring systems capable of modeling question-concept relations probabilistically include Khan Academy (Dijksman and Khan (2011); Hu (2011)) and the system of Bachrach et al. (2012). Both approaches, however, are limited to dealing with a single concept. In contrast, SPARFA is built from the ground up to deal with multiple latent concepts.

A probit model for graded learner responses is used in Desmarais (2011) without exploiting the idea of low-dimensional latent concepts. In contrast, SPARFA leverages multiple latent concepts and therefore can create learner concept knowledge profiles for personalized feedback. Moreover, SPARFA-M is compatible with the popular logit model.

The recent results developed in Beheshti et al. (2012) and Bergner et al. (2012) address the problem of predicting the missing entries in a binary-valued graded learner response matrix. Both papers use low-dimensional latent factor techniques specifically developed for collaborative filtering, as, e.g., discussed in Linden et al. (2003) and Herlocker et al. (2004).

While predicting missing correctness values is an important task, these methods do not take into account the sparsity and non-negativity of the matrix W; this inhibits the interpretation of the relationships among questions and concepts. In contrast, SPARFA accounts for both the sparsity and non-negativity of W, which enables the interpretation of the value $C_{k,j}$ as learner j's knowledge of concept k.

There is a large body of work on item response theory (IRT), which uses statistical models to analyze and score graded question response data (see, e.g., Lord (1980), Baker and Kim (2004), and Reckase (2009) for overview articles). The main body of the IRT literature builds on the model developed by Rasch (1993) and has been applied mainly in the context of adaptive testing (e.g., in the graduate record examination (GRE) and graduate management (GMAT) tests Chang and Ying (2009), Thompson (2009), and Linacre (1999)). While the SPARFA model shares some similarity to the model in Rasch (1993) by modeling question concept association strengths and intrinsic difficulties of questions, it also models each learner in terms of a multi-dimensional concept knowledge vector. This capability of SPARFA is in stark contrast to the Rasch model, where each learner is characterized by a single, scalar ability parameter. Consequently, the SPARFA framework is able to provide stronger explanatory power in the estimated factors compared to that of the conventional Rasch model. We finally note that multi-dimensional variants of IRT have been proposed in McDonald (2000), Yao (2003), and Reckase (2009). We emphasize, however, that the design of these algorithms leads to poor interpretability of the resulting parameter estimates.

I.8. Conclusions

In section I, we have formulated a new approach to learning and content analytics, which is based on a new statistical model that encodes the probability that a learner will answer a given question correctly in terms of three factors: (i) the learner's knowledge of a set of latent concepts, (ii) how the question related to each concept, and (iii) the intrinsic difficulty of the question. We have proposed two algorithms, SPARFA-M and SPARFA-B, to estimate the above three factors given incomplete observations of graded learner question responses. SPARFA-M uses an efficient Maximum Likelihood-based bi-convex optimization approach to produce point estimates of the factors, while SPARFA-B uses Bayesian factor analysis to produce posterior distributions of the factors. In practice, SPARFA-M is beneficial in applications where timely results are required; SPARFA-B is favored in situations where posterior statistics are required. We have also introduced a novel method for incorporating user-defined tags on questions to facilitate the interpretability of the estimated factors. Experiments with both synthetic and real world education datasets have demonstrated both the efficacy and robustness of the SPARFA algorithms.

The quantities estimated by SPARFA can be used directly in a range of PLS functions. For instance, we can identify the knowledge level of learners on particular concepts and diagnose why a given learner has incorrectly answered a particular question or type of question. Moreover, we can discover the hidden relationships among questions and latent concepts, which is useful for identifying questions that do and do not aid in measuring a learner's conceptual knowledge. Outlier responses that are either due to guessing or cheating can also be detected. In concert, these functions can enable a PLS to generate personalized feedback and recommendation of study materials, thereby enhancing overall learning efficiency.

Various extensions and refinements to the SPARFA framework developed here have been proposed recently. Most of these results aim at improving interpretability of the SPARFA model parameters. In particular, a variant of SPARFA-M that analyzes ordinal rather than binary-valued responses and directly utilizes tag information in the probabilistic model has been detailed in Lan et al. (2013a). Another variant of SPARFA-M that further improves the interpretability of the underlying concepts via the joint analysis of graded learner responses and question/response text has been proposed in Lan et al. (2013b). A nonparametric Bayesian variant of SPARFA-B that estimates both the number of concepts K as well as the reliability of each learner from data has been developed in Fronczyk et al. (2013). The results of this nonparametric method confirm our choice of K=5 concepts for the realworld educational datasets considered in Section I.6.2.

Before closing, we would like to point out a connection between SPARFA and dictionary learning that is of independent interest. This connection can be seen by noting that (2) for both the probit and inverse logit functions is statistically equivalent to (see Rasmussen and Williams (2006)):

$$Y_{i,j} = [\text{sign}(WC+M+N)]_{i,j}, i,j:(i,j) \in \overline{\Omega}_{obs},$$

where sign(·) denotes the entry-wise sign function and the entries of N are i.i.d. and drawn from either a standard Gaussian or standard logistic distribution. Hence, estimating W, C, and M (or equivalently, μ) is equivalent to learning a (possibly overcomplete) dictionary from the data Y. The key departures from the dictionary-learning literature (Aharon et al. (2006); Mairal et al. (2010)) and algorithm variants capable of handling missing observations (Studer and Baraniuk (2012)) are the binary-valued observations and the non-negativity constraint on W. Note that the algorithms developed in Section I.3 to solve the sub-problems by holding one of the factors W or C fixed and solving for the other variable can be used to solve noisy binary-valued (or 1-bit) compressive sensing or sparse signal recovery problems, e.g., as studied in Boufounos and Baraniuk (2008), Jacques et al. (2013), and Plan and Vershynin (2012). Thus, the proposed SPARFA algorithms can be applied to a wide range of applications beyond education, including the analysis of survey data, voting patterns, gene expression, and signal recovery from noisy 1-bit compressive measurements.

I.9 References

M. Aharon, M. Elad, and A. M. Bruckstein. K-SVD and its non-negative variant for dictionary design. In *Proc. SPIE Conf. on Wavelets*, volume 5914, pages 327-339, July 2005.

M. Aharon, M. Elad, and A. M. Bruckstein. K-SVD: An algorithm for designing overcomplete dictionaries for sparse representation. *IEEE Transactions on Signal Processing*, 54(11):4311-4322, December 2006.

Amazon Mechanical Turk, September 2012. URL https://www.mturk.com/mturk/welcome.

Y. Bachrach, T. P. Minka, J. Guiver, and T. Graepel. How to grade a test without knowing the answers—a Bayesian graphical model for adaptive crowdsourcing and aptitude testing. In *Proc. 29th Intl. Conf. on Machine Learning*, pages 1183-1190, June 2012.

F. B. Baker and S. H. Kim. *Item Response Theory: Parameter Estimation Techniques*. Marcel Dekker Inc., 2nd edition, 2004.

R. Baker and K. Yacef. The state of educational data mining in 2009: A review and future visions. *Journal of Educational Data Mining*, 1(1):3-17, October 2009.

T. Barnes. The Q-matrix method: Mining student response data for knowledge. In *Proc. AAAI Workshop Educational Data Mining*, July 2005.

A. Beck and M. Teboulle. A fast iterative shrinkage-thresholding algorithm for linear inverse problems. *SIAM Journal on Imaging Science*, 2(1):183-202, March 2009.

B. Beheshti, M. Desmarais, and R. Naceur. Methods to find the number of latent skills. In *Proc. 5th Intl. Conf. on Educational Data Mining*, pages 81-86, June 2012.

Y. Bergner, S. Droschler, G. Kortemeyer, S. Rayyan, D. Seaton, and D. Pritchard. Model-based collaborative filtering analysis of student response data: Machine-learning item response theory. In *Proc. 5th Intl. Conf. on Educational Data Mining*, pages 95-102, June 2012.

J. Bolte, A. Daniilidis, and A. Lewis. The Ł ojasiewicz inequality for nonsmooth subanalytic functions with applications to subgradient dynamical systems. *SIAM Journal on Optimization*, 17(4):1205-1223, December 2006.

P. T. Boufounos and R. G. Baraniuk. 1-bit compressive sensing. In *Proc. Conf. on Information Science and Systems (CISS)*, March 2008.

S. Boyd and L. Vandenberghe. *Convex Optimization*. Cambridge University Press, 2004.

A. M. Bruckstein, M. Elad, and M. Zibulevsky. On the uniqueness of nonnegative sparse solutions to underdetermined systems of equations. *IEEE Transactions on Information Theory*, 54(11):4813-4820, November 2008.

P. Brusilovsky and C. Peylo. Adaptive and intelligent web-based educational systems. *Intl. Journal of Artificial Intelligence in Education*, 13(2-4):159-172, April 2003.

C. J. Butz, S. Hua, and R. B. Maguire. A web-based Bayesian intelligent tutoring system for computer programming. *Web Intelligence and Agent Systems*, 4(1):77-97, November 2006.

H. Chang and Z. Ying. Nonlinear sequential designs for logistic item response theory models with applications to computerized adaptive tests. *The Annals of Statistics*, 37(3):1466-1488, June 2009.

S. S. Chen, D. L. Donoho, and M. A. Saunders. Atomic decomposition by basis pursuit. *SIAM Journal on Scientific Computing*, 20(1):33-61, March 1998.

J. T. Chu. On bounds for the normal integral. *IEEE Transactions on Signal Processing*, 42(1/2):263-265, June 1955.

M. Desmarais. Conditions for effectively deriving a Q-matrix from data with non-negative matrix factorization. In *Proc. 4th Intl. Conf. on Educational Data Mining*, pages 41-50, July 2011.

J. A. Dijksman and S. Khan. Khan Academy: the world's free virtual school. In *APS Meeting Abstracts*, page 14006, March 2011.

ELEC 301, Rice University. Introduction to signals and systems, May 2011. URL http://dsp.rice.edu/courses/elec301.

A. Fischer. On sums of subanalytic functions. *Preprint*, 2008.

E. Fokoue. Stochastic determination of the intrinsic structure in Bayesian factor analysis. Technical report, Statistical and Applied Mathematical Sciences Institute, June 2004.

K. Fronczyk, A. E. Waters, M. Guindani, R. G. Baraniuk, and M. Vannucci. A Bayesian infinite factor model for learning and content analytics. *Computational Statistics and Data Analysis*, June 2013, submitted.

J. P. González-Brenes and J. Mostow. Dynamic cognitive tracing: Towards unified discovery of student and cognitive models. In *Proc. 5th Intl. Conf. on Educational Data Mining*, pages 49-56, June 2012.

I. Goodfellow, A. Courville, and Y. Bengio. Large-scale feature learning with spike-and-slab sparse coding. In *Proc. 29th Intl. Conf. on Machine Learning*, pages 1439-1446, July 2012.

A. Guisan, T. C. Edwards Jr, and T. Hastie. Generalized linear and generalized additive models in studies of species distributions: setting the scene. *Ecological Modelling*, 157(2-3):89-100, November 2002.

P. R. Hahn, C. M. Carvalho, and J. G. Scott. A sparse factor-analytic probit model for congressional voting patterns. *Journal of the Royal Statistical Society*, 61(4):619-635, August 2012.

H. H. Harman. *Modern Factor Analysis*. The University of Chicago Press, 1976.

T. Hastie, R. Tibshirani, and J. Friedman. *The Elements of Statistical Learning*. Springer, 2010.

J. L. Herlocker, J. A. Konstan, L. G. Terveen, and J. T. Riedl. Evaluating collaborative filtering recommender systems. *ACM Transactions on Information Systems*, 22(1):5-53, January 2004.

R. A. Horn and C. R. Johnson. *Topics in Matrix Analysis*. Cambridge University Press, 1991.

D. Hu, "How Khan Academy is using machine learning to assess student mastery". (Online: http://david-hu.com/, November 2011.)

Hemant Ishwaran and J Sunil Rao. Spike and slab variable selection: frequentist and Bayesian strategies. *Annals of Statistics*, 33(2):730-773, April 2005.

L. Jacques, J. N. Laska, P. T. Boufounos, and R. G. Baraniuk. Robust 1-bit compressive sensing via binary stable embeddings of sparse vectors. *IEEE Transaction Info Theory*, 59(4), April 2013.

Knewton. Knewton adaptive learning: Building the world's most powerful recommendation engine for education, June 2012 (Online: http://www.knewton.com/adaptive-learning-white-paper/).

K. R. Koedinger, J. R. Anderson, W. H. Hadley, and M. A. Mark. Intelligent tutoring goes to school in the big city. *Intl. Journal of Artificial Intelligence in Education*, 8(1):30-43, 1997.

K. Koh, S. Kim, and S. Boyd. An interior-point method for large-scale l1-regularized logistic regression. *Journal of Machine Learning Research*, 8:1519-1555, 2007.

Y. Koren and J. Sill. OrdRec: an ordinal model for predicting personalized item rating distributions. In *Proc. of the 5th ACM Conf. on Recommender Systems*, pages 117-124, October 2011.

Y. Koren, R. Bell, and C. Volinsky. Matrix factorization techniques for recommender systems. *Computer*, 42(8):30-37, August 2009.

S. G. Krantz and H. R. Parks. *A Primer of Real Analytic Functions*. Birkhauser, 2002.

G. A. Krudysz and J. H. McClellan. Collaborative system for signal processing education. In 2011 *IEEE Intl. Conf. on Acoustics, Speech and Signal Processing (ICASSP)*, pages 2904-2907, May 2011.

G. A. Krudysz, J. S. Li, and J. H. McClellan. Web-based Bayesian tutoring system. In $12^{th}$ *Digital Signal Processing Workshop—4th Signal Processing Education Workshop*, pages 129-134, September 2006.

A. S. Lan, C. Studer, A. E. Waters, and R. G. Baraniuk. Tag-aware ordinal sparse factor analysis for learning and content analytics. In *Proc. 6th Intl. Conf. on Educational Data Mining*, pages 90-97, July 2013a.

A. S. Lan, C. Studer, A. E. Waters, and R. G. Baraniuk. Joint topic modeling and factor analysis of textual information and graded response data. In *Proc. 6th Intl. Conf. on Educational Data Mining*, pages 324-325, July 2013b.

S. Lee, H. Lee, P. Abbeel, and A. Y. Ng. Efficient '1 regularized logistic regression. In *Proc. National Conf. on Artificial Intelligence*, volume 21, pages 401-408, 2006.

S. Lee, J. Z. Huang, and J. Hu. Sparse logistic principal components analysis for binary data. *Annals of Applied Statistics*, 4(3):1579-1601, September 2010.

N. Li, W. W. Cohen, and K. R. Koedinger. A machine learning approach for automatic student model discovery. In *Proc. 4th Intl. Conf. on Educational Data Mining*, pages 31-40, July 2011.

J. M. Linacre. Understanding Rasch measurement: Estimation methods for Rasch measures. *Journal of Outcome Measurement*, 3(4):382-405, 1999.

G. Linden, B. Smith, and J. York. Amazon.com recommendations: Item-to-item collaborative filtering. *Internet Computing, IEEE*, 7(1):76-80, January 2003.

W. J. V. D. Linden and editors Glas, C. A. W. *Computerized Adaptive Testing: Theory and Practice*. Kluwer Academic Publishers, 2000.

F. M. Lord. *Applications of Item Response Theory to Practical Testing Problems*. Erlbaum Associates, 1980.

J. Mairal, F. Bach, J. Ponce, and G. Sapiro. Online learning for matrix factorization and sparse coding. *Journal of Machine Learning Research*, 11:19-60, 2010. R. P. McDonald. A basis for multidimensional item response theory. *Applied Psychological Measurement*, 247(2):99-114, June 2000.

J. Meng, J. Zhang, Y. Qi, Y. Chen, and Y. Huang. Uncovering transcriptional regulatory networks by sparse Bayesian factor model. *EURASIP Journal on Advances in Signal Processing*, 2010(3):1-18, March 2010.

T. P. Minka, "A comparison of numerical optimizers for logistic regression", Technical report, 2003, http://citeseerx.ist.psu.edu/viewdoc/download?doi=10.1.1.85.7017&rep=rep1&type=pdf.

S. Mohamed, K. Heller, and Z. Ghahramani, "Bayesian and 11 approaches for sparse unsupervised learning", In *Proc. 29th Intl. Conf. on Machine Learning*, pages 751-758, July 2012.

R. C. Murray, K. VanLehn, and J. Mostow, "Looking ahead to select tutorial actions: A decision-theoretic approach", *Intl. Journal of Artificial Intelligence in Education*, 14(3-4):235-278, December 2004.

Y. Nesterov, "Gradient methods for minimizing composite objective function", Technical report, Université Catholique de Louvain, September 2007.

M. R. Norvick, "The axioms and principal results of classical test theory", *Journal of Mathematical Psychology*, 3(1):1-18, February 1966.

F. W. J. Olver, editor, *NIST Handbook of Mathematical Functions*, Cambridge University Press, 2010.

Z. A. Pardos and N. T. Heffernan, "Modeling individualization in a bayesian networks implementation of knowledge tracing", In *User Modeling, Adaptation, and Personalization*, volume 6075, pages 255-266. Springer, June 2010.

M. Y. Park and T. Hastie, "Penalized logistic regression for detecting gene interactions", *Biostatistics*, 9(1):30-50, January 2008.

Y. Plan and R. Vershynin, "Robust 1-bit compressed sensing and sparse logistic regression: A convex programming approach", Information Theory, IEEE Transactions on (Volume: 59, Issue: 1).

I. Pournara and L. Wernisch, "Factor analysis for gene regulatory networks and transcription factor activity profiles", *BMC Bioinformatics*, 8(1):61, February 2007.

J. Psotka, L. D. Massey, and editors Mutter, S. A. Intelligent Tutoring Systems Lessons Learned, *Lawrence Erlbaum Associates*, 1988.

A. N. Rafferty, E. Brunskill, T. L. Griffiths, and P. Shafto, "Faster teaching by POMDP planning", In *Proc. 15th Intl. Conf. on Artificial Intelligence in Education*, pages 280-287, June 2011.

G. Rasch, *Probabilistic Models for Some Intelligence and Attainment Tests*. MESA Press, 1993.

C. E. Rasmussen and C. K. I. Williams, *Gaussian Process for Machine Learning*. MIT Press, 2006.

M. D. Reckase, *Multidimensional Item Response Theory*. Springer Publishing Company, Incorporated, 1st edition, 2009.

C. Romero and S. Ventura, "Educational data mining: A survey from 1995 to 2005", *Expert Systems with Applications*, 33(1):135-146, July 2007.

M. N. Schmidt, O. Winther, and L. K. Hansen, "Bayesian non-negative matrix factorization", In *Independent Component Analysis and Signal Separation*, volume 5441, pages 540-547, March 2009.

J. C. Stamper, T. Barnes, and M. Croy, "Extracting student models for intelligent tutoring systems", In *Proc. National Conf. on Artificial Intelligence*, volume 22, pages 113-147, July 2007.

STEMscopes, STEMscopes science education, September 2012. URL http://stemscopes.com/.

C. Studer and R. G. Baraniuk, "Dictionary learning from sparsely corrupted or compressed signals", In *IEEE Intl. Conf. on Acoustics, Speech and Signal Processing (ICASSP)*, pages 3341-3344, March 2012.

N. Thai-Nghe, L. Drumond, T. Horvath, and L. Schmidt-Thieme, "Multi-relational factorization models for predicting student performance", *KDD Workshop on Knowledge Discovery in Educational Data (KDDinED)*, August 2011a.

N. Thai-Nghe, T. Horvath, and L. Schmidt-Thieme, "Factorization models for forecasting student performance", In *Proc. 4th Intl. Conf. on Educational Data Mining*, pages 11-20, July 2011b.

N. A. Thompson, "Item selection in computerized classification testing", *Educational and Psychological Measurement*, 69(5):778-793, October 2009.

M. E. Tipping, "Sparse Bayesian learning and the relevance vector machine", *Journal of Machine Learning Research*, 1:211-244, 2001.

K. VanLehn, C. Lynch, K. Schulze, J. A. Shapiro, R. Shelby, L. Taylor, D. Treacy, A. Weinstein, and M. Wintersgill, "The Andes physics tutoring system: Lessons learned", *Intl. Journal of Artificial Intelligence in Education*, 15(3): 147-204, September 2005.

D. Vats, C. Studer, A. S. Lan, L. Carin, and R. G. Baraniuk, "Test size reduction for concept estimation", In *Proc. 6th Intl. Conf. on Educational Data Mining*, pages 292-295, July 2013.

M. West, Bayesian factor regression models in the "large p, small n" paradigm. *Bayesian Statistics*, 7:723-732, September 2003.

B. P. Woolf, *Building Intelligent Interactive Tutors: Student-centered Strategies for Revolutionizing E-learning*, Morgan Kaufman Publishers, 2008.

Y. Xu and W. Yin, "A block coordinate descent method for multi-convex optimization with applications to nonnegative tensor factorization and completion", Technical report, Rice University CAAM, September 2012.

L. Yao, *BMIRT: Bayesian Multivariate Item Response Theory*. CTb/McGraw-Hill, 2003.

In one set of embodiments, a method 1.11 for performing learning analytics and content analytics may include the operations shown in FIG. 1.11. (The method 1.11 may also include any subset of the features, element and embodiment described above.)

At 1.11.10, a computer system may receive input data that includes graded response data. The graded response data may include a set of binary-valued grades that have been assigned to answers provided by learners in response to a set of questions.

At 1.11.20, the computer system may compute output data based on the input data using a statistical model, where the output data includes at least an estimate of an association matrix W and an estimate of a concept-knowledge matrix C, e.g., as variously described above. The association matrix W includes entries that represent strength of association between each of the questions and each of a plurality of concepts. The matrix C includes entries that represent the extent of each learner's knowledge of each concept. (We define $C_{k,j}$ as the concept knowledge of the $j^{th}$ learner on the $k^{th}$ concept, with larger positive values of $C_{k,j}$ corresponding to a better chance of success on questions related to the $k^{th}$ concept.) The statistical model characterizes a statistical relationship between entries $(WC)_{i,j}$ of the product matrix WC and corresponding grades $Y_{i,j}$ of the set of binary-valued grades.

In some embodiments, the method 1.11 may also include displaying a graph based on the estimated association matrix W. The graph may represent an estimated strength of association between each of the questions and each of the plurality of concepts.

In some embodiments, the graph is a bipartite graph that includes: concept nodes corresponding to the concepts; question nodes corresponding to the questions; and links between at least a subset of the concept nodes and at least a subset of the question nodes. Each of the links may be displayed in a manner that visually indicates the estimated strength of association between a corresponding one of the concepts and a corresponding one of the questions.

In some embodiments, for each question, the output data includes a corresponding estimate of difficulty of the question. In these embodiments, the action of displaying the graph may include displaying the difficulty estimate for each question within the corresponding question node. The graph may indicate the difficulty of each question in any of various ways, e.g., by displaying numeric values, by means of a mapping of difficulty to color, by grayscale, intensity value, symbolic label, emoticon, etc.

In some embodiments, the method 1.11 also includes modifying the set of questions to form a modified question set. The action of modifying the set of equations may include one or more of: (a) removing one or more of the questions that are too easy (e.g., any question whose respective difficulty $\mu_i$ is less than a given difficulty threshold); (b) removing one or more of the questions that are too difficult (e.g., any question whose respective difficulty $\mu_i$ is greater than a given difficulty threshold); and (c) removing one or more of the questions that are not sufficiently strongly associated with any of the concepts, as indicated by the estimated matrix W (e.g., any question where the corresponding row of the estimated matrix W has infinity-norm less than a given threshold value). In some embodiments, the modification of the set of questions may be performed in response to user input, e.g., user input after having displayed the graph, and thus, having given the user an opportunity to understand the information represented in the graph. The user input may specify the question(s) to be removed. Alternatively, the user input may simply invoke an automated pruning algorithm that performs the modification, e.g., based on predetermined thresholds, or adaptively determined thresholds.

In some embodiments, the method 1.11 may include: receiving one or more additional questions from a content author, e.g., after having displayed the graph; and appending the one or more additional questions to the set of questions. For example, if a given one of the concepts is associated with fewer questions than other ones of the concepts, a content author or instructor may wish to add one or more questions involving the given concept.

In some embodiments, the method 1.11 may include: receiving input from a content author, e.g., after having displayed the graph, where the received input specifies edits to a selected one of the questions (e.g., edits to a question that is too easy or too difficult as indicated by the corresponding difficulty estimate); and editing the selected question as specified by the received input.

In some embodiments, the above-described action 1.11.10 (i.e., receiving the input data) includes receiving the binary-values grades from one or more remote computers over a network, e.g., from one or more remote computers operated by one or more instructors.

In some embodiments, the method 1.11 also includes receiving the answers from the learners. For example, the computer system may be a server computer configured to administer questions to the learners and receive answers from the learners via the Internet or other computer network. The learners may operate respective client computers in order to access the server.

In some embodiments, the computer system may be operated by an Internet-based educational service. In some embodiments, the computer system is realized by a cluster or network of computers operating under the control of an educational service provider.

In some embodiments, the computer system is a portable device, e.g., an e-reader, a tablet computer, a laptop, a portable media player, a specialized learning computer, etc.

In some embodiments, the computer system is a desktop computer.

In some embodiments, the output data is useable to select one or more new questions for at least one of the learners.

In some embodiments, not all the learners have answered all the questions. In these embodiments, the output data is usable to select (or recommend) for a given learner a subset of that learner's unanswered questions for additional testing of the learner. (For example, if a column of the estimated matrix C, corresponding to a given learner, has one or more entries smaller than a given threshold, the method/system may select the subset based on (a) the one or more corresponding columns of the estimated W matrix and (b) information indicating which of the questions were answered by the learner.)

In some embodiments, the method 1.11 may also include displaying one or more new questions via a display device (e.g., in response to a request submitted by the learner).

In some embodiments, the method 1.11 may also include, for a given one of the learners, determining one or more of the concepts that are not sufficiently understood by the learner based on a corresponding column of the estimated matrix C, and selecting educational content material for the learner based on said one or more determined concepts. The method 1.11 may also include transmitting a message to the given learner indicating the selected educational content material.

In some embodiments, the method 1.11 may also include transmitting a message to a given one of the learners, where the message contains the values of entries in a selected column of the estimated matrix C, where the selected column is a column that corresponds to the given learner.

In some embodiments, the method 1.11 may also include, for a given one of the learners, determining one or more of the concepts that are not sufficiently understood by the learner based on a corresponding column of the estimated matrix C, and selecting one or more additional questions (e.g., easier questions, or questions explaining the one or more concepts in a different way) for the learner based on said one or more determined concepts.

In some embodiments, the method 1.11 may also include transmitting a message to the given learner indicating the selected one or more additional questions.

In some embodiments, for each question, the output data includes a corresponding estimate of difficulty of the question. In these embodiments, the above-described statistical model may characterize a statistical relationship between $(WC)_{i,j}+\mu_i$ and the corresponding binary-valued grade $Y_{i,j}$, where $\mu_i$ represents the difficulty of the $i^{th}$ question.

In some embodiments, the statistical model is of the form:

$$Z_{i,j}=(WC)_{i,j}+\mu_i$$

$$Y_{i,j} \sim \text{Ber}(\Phi(Z_{i,j})),$$

where Ber(z) represents the Bernoulli distribution with success probability z, where $\Phi$ is a sigmoid function.

In some embodiments, the statistical model is of the form:

$$Z_{i,j}=(WC)_{i,j}+\mu_i$$

$$Y_{i,j} \sim \text{Ber}(\Phi(Z_{i,j})),$$

where Ber(z) represents the Bernoulli distribution with success probability z, where $\Phi(z)$ denotes an inverse link function that maps a real value z to the success probability of a binary random variable. For example, the inverse link function $\Phi$ may be an inverse probit function or an inverse logit function.

In some embodiments, the matrix W is augmented with an extra column including the difficulties $\mu_i$, and the matrix C is augmented with an extra row including all ones. In these embodiments, the action of computing the output data based on the input data may include estimating a minimum of an objective function over a space defined by matrices W and C subject to the condition that the entries of matrix W are non-negative. The objective function may include a combination (e.g., a linear combination or a bilinear combination) of: (a) the negative of a log likelihood of the graded response data parameterized by the matrix W and the matrix C; (b) a sparsity-enforcing term involving the rows of the matrix W;

(c) a W-regularizing term involving the rows of the matrix W; and (d) a C-regularizing term involving a norm of the matrix C.

A regularizing term may be interpreted as either a convex (or block multiconvex) extension of the objective function or the constraint set that imposes additional structure on the involved term, such as minimum energy (e.g., via $l_2$ or Frobenius-norm regularization), sparsity (e.g., via $l_1$ or Huber-norm regularization), density (e.g., via $l_\infty$-norm regularization), low rankness (e.g., via nuclear or max norm regularization), minimum condition number, and bounded range (e.g., non-negativity) or a combination thereof. Minimum condition number may be imposed using the method described by Zhaosong Li and Ting Kei Pong in "Minimizing Condition Number via Convex Programming", SIAM Journal on Matrix Analysis and Applications, Vol. 32, No. 4, pp. 1193-1211, November 2011.

In some embodiments, the action of estimating the minimum of the objective function includes executing a plurality of outer iterations. Each of the outer iterations may include: (1) for each row of the matrix W, estimating a minimum of a corresponding row-related subobjective function over a space defined by that row, subject to the condition that entries within the row are non-negative, where the corresponding row-related subobjective function includes said negative of the log likelihood, a sparsity-enforcing term for that row and a regularizing term for that row; and (2) for each column of the matrix C, estimating a minimum of a corresponding column-related subobjective function over a space defined by that column, where the corresponding column-related subobjective function includes said negative of the log likelihood and a regularizing term for the column.

In some embodiments, the method 1.11 may also include, for an $i^{th}$ one of the questions that was not answered by the $j^{th}$ learner, predicting a probability that the $j^{th}$ learner would achieve a grade of correct if he/she had answered the $i^{th}$ question. The action of predicting said probability may include: computing a dot product between the $i^{th}$ row of the estimated matrix W and the $j^{th}$ column of the estimated matrix C; adding the computed dot product to the estimated difficulty $\mu_i$ of the $i^{th}$ question to obtain a sum value; and evaluating the inverse link function on the sum value.

In some embodiments, the action of computing the output data based on the input data includes executing a plurality of Monte Carlo iterations to determine posterior distributions for the entries of the matrix W, the columns of the matrix C and the difficulty values $\mu_i$ assuming prior distributions on the entries of the matrix W, the columns of the matrix C and the difficulty values $\mu_i$. (In one embodiment, the difficulty values may be known, e.g., provided as part of the input data. Thus, the difficulty values may be omitted from the set of prior distributions and from the set of computed posterior distributions.)

In some embodiments, the method 1.11 may also include computing expected values of the posterior distributions to obtain the estimate for the matrix W and the estimate for the matrix C as well as an estimate for the difficulty values.

In some embodiments, for each column $c_j$ of the matrix C, the corresponding prior distribution is a multivariate distribution (e.g., a multivariate normal distribution) with zero mean and covariance matrix V. The covariance matrix V may be assigned a predetermined probability distribution.

In some embodiments, for each entry $W_{i,k}$ of the matrix W, the corresponding prior distribution is an affine combination of a Dirac delta distribution and a second distribution (e.g., an exponential distribution), where a coefficient of the affine combination is itself assigned a third distribution.

In some embodiments, the Monte Carlo iterations are based on Markov Chain Monte-Carlo (MCMC) sampling.

In some embodiments, the above-described action of estimating the minimum of the objective function is performed prior to the plurality of Monte Carlo iterations in order to initialize the matrix W and the matrix C for said plurality of Monte Carlo iterations.

In some embodiments, each of said Monte Carlo iterations includes, for each index pair (i,j) where the $j^{th}$ learner did not answer the $i^{th}$ question, drawing a sample grade $Y_{i,j}(k)$ according to the distribution $$Ber(\Phi(W_i C_j + \mu_i)),$$

where k is an iteration index, where $W_i$ is a current estimate for the $i^{th}$ row of the matrix W, where $C_j$ is a current estimate for the $j^{th}$ column of the matrix C, where the set $\{Y_{i,j}(k)\}$ of samples represents a probability distribution of the grade that would be achieved by the $i^{th}$ learner if he/she were to answer the $i^{th}$ question.

In some embodiments, the method 1.11 may also include computing a probability that the $j^{th}$ learner would achieve a correct grade on the $i^{th}$ question based on the set $\{Y_{i,j}(k)\}$ of samples. (The computed probability may be displayed to the $j^{th}$ learner in response to a request from that learner, or, displayed to an instructor in response to a request from the instructor.)

In some embodiments, each of said Monte Carlo iterations includes: (1) for each index pair (i,j) where the $j^{th}$ learner did not answer the $i^{th}$ question, drawing a grade value $Y_{i,j}$ according to the probability distribution parameterized by $$Ber(\Phi(W_i C_j + \mu_i)),$$

where k is an iteration index, where $W_i$ is a current estimate for the $i^{th}$ row of the matrix W, where $C_j$ is a current estimate for the $j^{th}$ column of the matrix C; (2) for each index pair (i,j) in a global set corresponding to all possible question-learner pairings, computing a value for variable $Z_{i,j}$ using a corresponding distribution whose mean is $(WC)_{i,j} + \mu_i$ and whose variance is a predetermined constant value, and truncating the value $Z_{i,j}$ based on the corresponding grade value $Y_{i,j}$; and (3) computing a sample for each of said posterior distributions using the grade values $\{Y_{i,j}: (i,j)$ in the global set$\}$.

In some embodiments, the number of the concepts is determined by the number of rows in the matrix C, where the concepts are latent concepts implicit in the graded response data, where the concepts are extracted from the graded response data by said computing the output data.

In some embodiments, the set of binary-valued grades does not include a grade for every possible learner-question pair. In these embodiments, the input data for method 1.11 includes an index set identifying the learner-question pairs that are present in the set of binary-valued grades. The computation(s) in any of the above-described embodiments may be limited to the set of binary-values grades using the index set.

In some embodiments, each row of the matrix W corresponds to respective one of the questions, where each column of the matrix W corresponds to a respective one of the concepts, where each of the rows of the matrix C corresponds to a respective one of the concepts, where each of the columns of the matrix C corresponds to respective one of the learners.

In some embodiments, one or more parameters used by the method are selected using cross-validation (e.g., parameters such as the coefficients of the terms forming the objective function in the maximum likelihood approach.

In one set of embodiments, a method 1.12 for performing learning analytics and content analytics may include the operations shown in FIG. 1.12. (Furthermore, method 1.12 may include any subset of the features, elements and embodiments described above.)

At 1.12.10, a computer system may receive input data that includes graded response data, where the graded response data includes a set of binary-valued grades that have been assigned to answers provided by learners in response to a set of questions, where not all the questions have been answered by all the learners, where the input data also includes an index set that indicates which of the questions were answered by each learner.

At 1.12.20, the computer system may compute output data based on the input data using a statistical model, where the output data includes at least an estimate of an association matrix W, an estimate of a concept-knowledge matrix C and an estimate of the difficulty $\mu_i$ of each question. The association matrix W includes entries that represent strength of association between each of the questions and each of a plurality of concepts. The matrix C includes entries that represent the extent of each learner's knowledge of each concept. The statistical model characterizes a statistical relationship between variables $Z_{i,j}=(WC)_{i,j}+\mu_i$ and corresponding grades $Y_{i,j}$ of the set of binary-valued grades for index pairs (i,j) occurring in the index set, where $(WC)_{i,j}$ represents an entry of the product matrix WC.

Binary-Valued Max Likelihood SPARFA

In one set of embodiments, a method 1.13 for performing learning analytics and content analytics may include the operations shown in FIG. 1.13. (Furthermore, the method 1.13 may include any subset of the features, elements and embodiments described above.)

At 1.13.10, a computer system may receive input data that includes graded response data, where the graded response data includes a set of binary-valued grades that have been assigned to answers provided by learners in response to a set of questions, e.g., as variously described above.

At 1.13.20, the computer system may compute output data based on the input data using a statistical model. The output data may include at least an estimate of an association matrix W and an estimate of a concept-knowledge matrix C, where the association matrix W includes entries that represent strength of association between each of the questions and each of a plurality of concepts, where the matrix C includes entries that represent the extent of each learner's knowledge of each concept. The statistical model characterizes a statistical relationship between entries $(WC)_{i,j}$ of the product matrix WC and corresponding grades $Y_{i,j}$ of the set of binary-valued grades. The action of computing the output data based on the input data includes estimating a minimum of an objective function over a space defined by the matrices W and C subject to the condition that the entries of the matrix W are non-negative. The objective function may includes a combination (e.g., a linear combination or a bilinear combination) of: the negative of a log likelihood of the graded response data parameterized by the matrix W and the matrix C; a sparsity-enforcing term involving the rows of the matrix W; a W-regularizing term involving the rows of the matrix W; and a C-regularizing term involving a norm of the matrix C. The output data may be stored in a memory.

In some embodiments, not all the questions have been answered by all the learners. In these embodiments, the input data may include an index set identifying for each learner the questions that were answered by that learner. The above-described log likelihood of the graded response data may be a sum of log probability terms over index pairs (i,j) occurring in the index set, where i is a question index, where j is a learner index.

In some embodiments, the norm of the matrix C is the Frobenius norm of the matrix C.

In some embodiments, the sparsity-enforcing term is a sum of the 1-norms of the respective rows of the matrix W.

In some embodiments, the W-regularizing term is a sum of squared 2-norms of the respective columns of the matrix W.

In some embodiments, for each question, the output data includes a corresponding estimate of difficulty of the question. In these embodiments, the statistical model may be of the form:

$$Z_{i,j}=(WC)_{i,j}+\mu_i$$

$$Y_{i,j} \sim \text{Ber}(\Phi(Z_{i,j})),$$

where $\mu_i$ represents the difficulty of the $i^{th}$ question of the set of questions, where Ber(z) represents the Bernoulli distribution with success probability z, where $\Phi(z)$ denotes an inverse link function that maps a real value z to the success probability of a binary random variable.

In some embodiments, the inverse link function $\Phi$ is an inverse probit function or an inverse logit function.

In some embodiments, the matrix W is augmented with an extra column including the difficulties $\mu_i$, and the matrix C is augmented with an extra row whose entries are all the same constant value. In these embodiments, the action of estimating the minimum of the objective function may include executing a plurality of outer iterations. Each of the outer iterations may include: (1) for each row of the matrix W, estimating a minimum of a corresponding row-related subobjective function over a space defined by that row, subject to the condition that entries within the row are non-negative, where the corresponding row-related subobjective function includes said negative of the log likelihood, a sparsity-enforcing term for that row and a regularizing term for that row; and (2) for each column of the matrix C, estimating a minimum of a corresponding column-related subobjective function over a space defined by that column, where the corresponding column-related subobjective function includes said negative of the log likelihood and a regularizing term for the column.

For each row of the matrix W, the action of estimating the minimum of the corresponding row-related subobjective function may include performing a plurality of descent-and-shrink (DAS) iterations. Each of the DAS iterations may include: a gradient-descent step on a function f defined by a scalar multiple of the regularizing term for said row; and a shrinkage step determined by a function g defined by a scalar multiple of the sparsity-enforcing term for said row. A step size of the gradient-descent step may be determined by a reciprocal of a Lipschitz constant of the function f. Alternatively, the step size of the gradient-descent step may be determined empirically. For example, the step size may be selected to be greater than 1/L, where L is an estimated value or a guess of the Lipschitz constant of the function f. As another example, the step size may be selected based on knowledge of convergence rate of previous executions of the method on previous sets of answered questions. The gradient descent step of each DAS iteration may be an inexact minimization along a current descent direction, e.g., based on backtracking line search or any of a wide variety of related techniques. Examples of related techniques include the bisection, Newton-Raphson, or Nelder-Mead method.

In some embodiments, the number of DAS iterations per row of the matrix W per outer iteration is small (e.g., approximately 10, or less than 20, or less than 30).

For each column of the matrix C, the action of estimating the minimum of the corresponding column-related subobjective function may include performing a plurality of descent-and-shrink (DAS) iterations. Each of the DAS iterations may include: a gradient-descent step on a function f defined by the negative of the log likelihood; and a shrinkage step determined by a function g defined by the regularizing term for said column. A step size of the gradient-descent step may be determined by a reciprocal of a Lipschitz constant of the function f. Alternatively, the step size of the gradient-descent step may be determined empirically. (For example, the step size may be selected to be greater than 1/L, where L is an estimated value or a guess of the Lipschitz constant of the function f. As another example, the step size may be selected based on knowledge of convergence rate of previous executions of the method on previous sets of answered questions.) The gradient descent step of each DAS iteration may be an inexact minimization along a current descent direction, e.g., based on backtracking line search or a related technique such as the bisection, Newton-Raphson, or Nelder-Mead method.

In some embodiments, the number of DAS iterations per column of the matrix C per outer iteration is small (e.g., approximately 10, or less than 20, or less than 30).

In some embodiments, for each row of the matrix W, the corresponding row-related subobjective function is a linear combination of said negative of the log likelihood, the sparsity-enforcing term for that row and the regularizing term for that row. The coefficient $\mu$ of the regularizing term within the linear combination may be set to a relatively small value to increase convergence rate.

In some embodiments, the method 1.13 may include: after a first number of the outer iterations, computing inner products between rows of a current estimate of the matrix W; determining a pair of the rows are sufficiently similar (i.e., having inner product smaller than a predetermined threshold); re-initializing one of the rows of the pair as a random vector (e.g., an i.i.d.); and performing additional outer iterations. (The term "i.i.d." means "independent and identically distributed".)

In some embodiments, the method 1.13 may also include: after a first number of the outer iterations, determining whether any of the columns of a current estimate of the matrix W is essentially equal to the zero vector (e.g., by determining if the entries of the column are all smaller than a predetermined threshold); and for each such essentially zero column, re-initializing the column as a random vector.

In some embodiments, the method 1.13 may also include receiving user input specifying the number K of the concepts, where the number of rows in the matrix C is K, where the number of columns in the matrix W is K.

In some embodiments, the action of estimating the minimum of the objective function is executed a plurality of times with different initial conditions. The method 1.13 may then select the estimated matrix W and the estimated matrix C (and perhaps also the estimated difficulty values) from the execution that obtains the smallest overall value for the objective function.

In some embodiments, not all of the questions are answered by all the learners. In these embodiments, the method 1.13 may also include: for an $n^{th}$ one of the questions that was not answered by the $m^{th}$ learner, predicting a probability that the $m^{th}$ learner would achieve a grade of correct if he/she had answered the $n^{th}$ question. The action of predicting said probability may include: computing a dot product between the $n^{th}$ row of the estimated matrix W and the $m^{th}$ column of the estimated matrix C; adding the computed dot product to the estimated difficulty $\mu_n$ of the $n^{th}$ question to obtain a sum value; and evaluating the inverse link function on the sum value.

In some embodiments, the input data includes an index set identifying for each learner the questions that were answered by that learner. The index set may contain index pairs, where each index pair (i,j) indicates that the $i^{th}$ question was answered by the $j^{th}$ learner. The number K of the concepts may be selected based on an application of a cross-validation technique to all pairs (i,j) occurring in the index set.

In some embodiments, the matrix W is augmented with an extra column including the difficulties $\mu_i$, and the matrix C is augmented with an extra row whose entries are all the same constant value (e.g., the constant value 1). The action of estimating the minimum of the objective function may include executing a plurality of outer iterations. Each of the outer iterations may include: (1) for each row of the matrix W, estimating a minimum of a corresponding row-related subobjective function over a space defined by that row, subject to the condition that entries within the row are non-negative, where the corresponding row-related subobjective function includes said negative of the log likelihood and two or more additional terms, where each of said two or more additional terms involves a corresponding norm acting on a corresponding subset of said row, where a first of the two or more additional terms controls sparsity of a first subset of said row, where a second of the two or more additional terms imposes regularization on a second subset of said row (e.g., the subsets may be disjoint subsets or perhaps overlapping subsets of the entries within the row); and (2) for each column of the matrix C, estimating a minimum of a corresponding column-related subobjective function over a space defined by that column, where the corresponding column-related subobjective function includes said negative of the log likelihood and two or more additional terms, where a first of the two or more additional terms imposes sparsity on a first subset of the entries within the matrix C, where a second of the two or more additional terms imposes regularization on a second subset of the entries within the matrix C.

In one set of embodiments, a method 1.14 for performing learning analytics and content analytics may include the operations shown in FIG. 1.12. (Furthermore, the method 1.14 may include any subset of the features, elements and embodiments described above.)

At 1.14.10, a computer system may receive input data that includes graded response data, where the graded response data includes a set of binary-valued grades that have been assigned to answers provided by learners in response to a set of questions.

At 1.14.20, the computer system may compute output data based on the input data using a statistical model. The output data may include at least an estimate of an association matrix W and an estimate of a concept-knowledge matrix C. The association matrix W includes entries that represent strength of association between each of the questions and each of a plurality of concepts. The matrix C includes entries that represent the extent of each learner's knowledge of each concept. The statistical model characterizes a statistical relationship between entries $(WC)_{i,j}$ of the product matrix WC and corresponding grades $Y_{i,j}$ of the set of binary-valued grades. The action of computing the output data based on the input data may include estimating a minimum of an objective function over a space defined by the matrices W and C, subject to the constraint that the entries of the matrix W are non-negative, and one or more norm constraints on the matrix C. The objective function may include a combination (e.g., a linear combination or a bilinear combination) of: the negative of a log likelihood of the graded response data parameterized by the matrix W and the matrix C; a sparsity-enforcing term involving the rows of the matrix W; and a W-regularizing term involving the rows of the matrix W.

In some embodiments, a first of the one or more norm constraints is the constraint that a norm of the matrix C is less than a predetermined size. The norm of the matrix C may be, e.g., a Frobenius norm or a nuclear norm or a max-norm of the matrix C.

In some embodiments, for each question, the output data includes a corresponding estimate of difficulty of the question. In these embodiments, the statistical model may be of the form:

$$Z_{i,j} = (WC)_{i,j} + \mu_i$$

$$Y_{i,j} \sim \text{Ber}(\Phi(Z_{i,j})),$$

where $\mu_i$ represents the difficulty of the $i^{th}$ question of the set of questions, where Ber(z) represents the Bernoulli distribution with success probability z, where $\Phi(z)$ denotes an inverse link function that maps a real value z to the success probability of a binary random variable.

In some embodiments, the matrix W is augmented with an extra column including the difficulties $\mu_i$, and the matrix C is augmented with an extra row whose entries are all the same constant value (e.g., the constant 1). The action of estimating the minimum of the objective function may include executing a plurality of outer iterations. Each of the outer iterations may include: (1) for each row of the matrix W, estimating a minimum of a corresponding row-related subobjective function over a space defined by that row, subject to the constraint that entries within the row are non-negative, where the corresponding row-related subobjective function includes said negative of the log likelihood, a sparsity-enforcing term for that row and a regularizing term for that row; and (2) estimating a minimum of a corresponding C-related subobjective function over a space defined by the matrix C, subject to the constraint that a norm of the matrix C is less than the predetermined size, where the C-related subobjective function includes said negative of the log likelihood.

In other embodiments, each of the outer iterations includes: (1*) for each row of the matrix W, estimating a minimum of a corresponding row-related subobjective function over a space defined by that row, subject to the constraint that entries within the row are non-negative, where the corresponding row-related subobjective function includes said negative of the log likelihood and two or more additional terms, where each of said two or more additional terms involves a corresponding norm acting on a corresponding subset of said row, where a first of the two or more additional terms controls sparsity of a first subset of said row, where a second of the two or more additional terms imposes regularization on a second subset of said row (e.g., the subsets may be disjoint subsets or perhaps overlapping subsets of the entries within the row); and (2*) estimating a minimum of a corresponding C-related subobjective function over a space defined by the matrix C, subject to two or more constraints, where the C-related subobjective function includes said negative of the log likelihood, where a first of the two or more constraints is that a first norm acting on a first subset of the entries in the matrix C is less than a first constant value, where a second of the two or more constraints is that a second norm acting on a second subset of the entries within the matrix C is less than a second constant value. (For example, the first norm may be a Frobenius norm and the second norm may be a nuclear norm.)

In one set of embodiments, a method 1.15 for performing learning analytics and content analytics may include the operations shown in FIG. 1.15. (Furthermore, the method 1.15 may include any subset of the features, elements and embodiments described above.)

At 1.15.10, a computer system may receive input data that includes graded response data, where the graded response data includes a set of binary-valued grades that have been assigned to answers provided by learners in response to a set of questions.

At 1.15.20, the computer system may compute output data based on the input data using a statistical model, where the output data includes at least an estimate of an association matrix W and an estimate of a concept-knowledge matrix C, where the association matrix W includes entries that represent strength of association between each of the questions and each of a plurality of concepts, where the matrix C includes entries that represent the extent of each learner's knowledge of each concept, where the statistical model characterizes a statistical relationship between entries $(WC)_{i,j}$ of the product matrix WC and corresponding grades $Y_{i,j}$ of the set of binary-valued grades, where said computing the output data based on the input data includes executing a plurality of sampling iterations to determine posterior distributions at least for the entries of the matrix W and the columns of the matrix C given prior distributions at least on the entries of the matrix W and the columns of the matrix C.

In some embodiments, each of the sampling iterations includes computing samples for each of the posterior distributions.

In some embodiments, the method 1.15 may also include storing the posterior distributions in a memory.

In some embodiments, the action of computing the output data includes computing expected values of the posterior distributions to obtain the estimate for the matrix W and the estimate for the matrix C.

In some embodiments, for each question, the output data includes a corresponding estimate of difficulty of the question. In these embodiments, the statistical model may characterize a statistical relationship between $(WC)_{i,j} + \mu_i$ and the corresponding binary-valued grade $Y_{i,j}$, where $\mu_i$ represents the difficulty of the $i^{th}$ question. Furthermore, the above-described prior distributions may include prior distributions on the difficulties $\mu_i$, and the above-described posterior distributions may include posterior distributions on the difficulties $\mu_i$.

In some embodiments, the statistical model is of the form:

$$Z_{i,j} = (WC)_{i,j} + \mu_i$$

$$Y_{i,j} \sim \text{Ber}(\Phi(Z_{i,j})),$$

where Ber(z) represents the Bernoulli distribution with success probability z, where $\Phi(z)$ denotes an inverse link function that maps a real value z to the success probability of a binary random variable.

In some embodiments, the input data also includes an index set that includes index pairs, where each index pair (i,j) indicates that learner j answered the $i^{th}$ question. Each component $W_{i,k}$ of the matrix W may be assigned a corresponding prior distribution of the form $r_k f(\lambda_k) + (1 - r_k)\delta_0$, where f is a distribution that is parameterized by parameter $\lambda_k$ and defined on the non-negative real axis, where $\delta_0$ is the Dirac delta distribution. The parameter $r_k$ and the parameter $\lambda_k$ may each be assigned a corresponding predetermined distribution. Furthermore, each of the above-described sampling iterations may include:

(a) for each index pair (i,j) in the index set, computing a value for $Z_{i,j}$ using a corresponding distribution whose mean is $(WC)_{i,j}+\mu_i$ and whose variance is a predetermined constant value;

(b) for i=1, ..., Q, computing a corresponding sum $S_i$ of difference values $Z_{i,j}-(WC)_{i,j}$ over index values j such that (i,j) is in the index set, and drawing a corresponding value of difficulty $\mu_i$ based on a corresponding distribution having mean $m_i$ and variance $v$, where the mean $m_i$ is a predetermined function of sum $S_i$, where the variance $v$ is a predetermined function of a parameter $v_\mu$ and the number $n'_i$ of learners who answered the $i^{th}$ question, where Q is the number of the questions;

(c) for j=1, ..., N, computing a corresponding covariance matrix $M_j$ and a mean vector $m_j$, and drawing column $c_j$ of matrix C from a multivariate distribution having mean vector $m_j$ and covariance $M_j$, where the covariance matrix $M_j$ is computed based on a current instance of a matrix V and a matrix $\tilde{W}$, where the matrix $\tilde{W}$ comprises the rows $w_i^T$ of the matrix W such that there is at least one index pair of the form (i,j) in the index set, where mean vector $m_j$ is computed based on the covariance matrix $M_j$, the matrix $\tilde{W}$ and the difference vector $\tilde{z}_j-\tilde{\mu}$, where the vector $\tilde{z}_j$ comprises the elements $Z_{i,j}$ where (i,j) belongs to the index set, where the vector $\tilde{\mu}$ comprises the difficulties $\mu_i$ such that there is at least one index pair of the form (i,j) in the index set, where N is the number of learners;

(d) drawing a new instance of the matrix V from a distribution whose parameters are determined by a matrix $V_0$, the matrix C, the number N and a parameter h;

(e) for all i=1, ..., Q and k=1, ..., K, drawing a value of $W_{i,k}$ from a distribution of the form $\hat{R}_{i,k}g(\hat{M}_{i,k}, \hat{S}_{i,k})+(1-\hat{R}_{i,k})\delta_0$, where g is a function of the value $\hat{M}_{i,k}$ and the value $\hat{S}_{i,k}$, where $\hat{R}_{i,k}$ is a parameter that depends on the parameter $r_k$, the parameter $\lambda_k$, the value $\hat{M}_{i,k}$ and the value $\hat{S}_{i,k}$, where the value $\hat{M}_{i,k}$ computed based on corresponding selected entries of the matrix W, corresponding selected entries of the matrix C, and corresponding selected ones of the values $\{Z_{i,j}\}$, where the value $\hat{S}_{i,k}$ is computed based on corresponding selected values of the matrix C, where K is the number of the concepts;

(f) for k=1, ..., K, drawing a value of parameter $\lambda_k$ based on a distribution parameterized by $\alpha+b_k$ and $\beta+u_k$, where $b_k$ is the number of active entries in the $k^{th}$ row of the matrix W, where $u_k$ is the sum of the values in the $k^{th}$ column of the matrix W, where $\alpha$ and $\beta$ are predetermined constant values; and (g) for k=1, ..., K, drawing a value of parameter $r_k$ based on a distribution parameterized by $e+b_k$ and $f+Q-b_k$, where e and f are predetermined constant values.

In some embodiments, the distribution f is an exponential distribution $\text{Exp}(\lambda_k)$.

In some embodiments, the action of computing the value for $Z_{i,j}$ includes: drawing a value $n_{i,j}$ of a normal distribution whose mean is $(WC)_{i,j}+\mu_i$ and whose variance is the predetermined constant value; setting the value $Z_{i,j}=\max\{0,n_{i,j}\}$ if $Y_{i,j}$ equals one; and setting the value $Z_{i,j}=\min\{0,n_{i,j}\}$ if $Y_{i,j}$ equals zero.

In some embodiments, the action of drawing the value of the parameter $r_k$ is based on a Beta distribution parameterized by $e+b_k$ and $f+Q-b_k$.

In some embodiments, the action of drawing the value of the parameter $\lambda_k$ is based on a Gamma distribution parameterized by $\alpha+b_k$ and $\beta+u_k$.

In some embodiments, the function g is a rectified normal distribution.

In some embodiments, the action of computing the output data includes computing expected values of the posterior distributions to obtain the estimate for the matrix W and the estimate for the matrix C as well as estimates for the respective difficulties $\mu_i$.

In some embodiments, a plurality of iterations of operation (a) are performed in parallel, e.g., using a plurality of processor cores in parallel, or using a plurality of interconnected computers operating in parallel, or using dedicated digital circuitry such as an ASIC having a plurality of parallel units, etc.

In some embodiments, the operation (e) includes drawing the values $W_{i,k}$ of each column of the matrix C in parallel.

In some embodiments, the input data also includes an index set that includes index pairs, where each index pair (i,j) indicates that learner j answered the $i^{th}$ question. Each component $W_{i,k}$ of the matrix W may be assigned a corresponding prior distribution of the form $r_k f(\lambda_k)+(1-r_k)\delta_0$, where f is a distribution that is parameterized by parameter $\lambda_k$ and defined on the non-negative real axis, where $\delta_0$ is the Dirac delta distribution. The parameter $r_k$ and the parameter $\lambda_k$ may each be assigned a corresponding predetermined distribution. Each of said sampling iterations may include:

(a) for each index pair (i,j) in a set complement of the index set, drawing a grade value $Y_{i,j}$ according to the distribution $$\text{Ber}(\Phi(W_i C_j+\mu_i)),$$

where k is an iteration index, where $W_i$ is a current estimate for the $i^{th}$ row of the matrix W, where $C_j$ is a current estimate for the $j^{th}$ column of the matrix C;

(b) for each index pair (i,j) in a global set corresponding to all possible question-learner pairings, computing a value for $Z_{i,j}$ using a corresponding distribution whose mean is $(WC)_{i,j}+\mu_i$ and whose variance is a predetermined constant value, and truncating the value $Z_{i,j}$ based on the corresponding grade value $Y_{i,j}$;

(c) for i=1, ..., Q, computing a corresponding sum $S_i$ of values $Z_{i,j}-(WC)_{i,j}$ over all j=1, ..., N, where N in the number of the learners, and drawing a corresponding value of difficulty $\mu_i$ based on a corresponding distribution having mean $m_i$ and variance $v$, where the mean $m_i$ is a predetermined function of sum $S_i$, where the variance $v$ is a predetermined function of a parameter $v_\mu$ and the number N of learners, where Q is the number of the questions;

(d) for j=1, ..., N, computing a corresponding mean vector and drawing a sample column $c_j$ of matrix C from a multivariate distribution having mean vector $m_j$ and covariance M, where the covariance matrix M is computed based on a current instance of a matrix V and the matrix W, where the mean vector $m_j$ is computed based on the covariance matrix M, the matrix W and the difference vector $z_j-\mu$, where the vector $z_j$ comprises the values $\{Z_{i,j}: i=1, ..., Q\}$, where the vector $\mu$ comprises the difficulties $\mu_i$;

(e) drawing a new instance of the matrix V from a distribution whose parameters are determined by a matrix $V_0$, the matrix C, the number N and a parameter h;

(f) for all i=1, ..., Q and k=1, ..., K, drawing a value of $W_{i,k}$ from a distribution of the form $\hat{R}_{i,k}g(\hat{M}_{i,k}, \hat{S}_{i,k})+(1-\hat{R}_{i,k})\delta_0$, where g is a function of the value $\hat{M}_{i,k}$ and the value $\hat{S}_{i,k}$, where $\hat{R}_{i,k}$ is a parameter that depends on the parameter $r_k$, the parameter $\lambda_k$, the value $\hat{M}_{i,k}$ and the value $\hat{S}_{i,k}$, where the value $\hat{M}_{i,k}$ is computed based on the matrix C, the values $\{Z_{i,j}: j=1, ..., N\}$, the values $\{W_{i,k'}: k'\neq k\}$, where the value $\hat{S}_{i,k}$ is computed based on values from the $k^{th}$ row of the matrix C, where K is the number of the concepts;

(g) for k=1, ..., K, drawing a value of parameter $\lambda_k$ based on a distribution parameterized by $\alpha+b_k$ and $\beta+u_k$, where $b_k$ is the number of active entries in the $k^{th}$ row of the matrix W, where $u_k$ is the sum of the values in the $k^{th}$ column of the matrix W, where $\alpha$ and $\beta$ are predetermined constant values; and (h) for k=1, ..., K, drawing a value of parameter $r_k$ based on a distribution parameterized by $e+b_k$ and $f+Q-b_k$, where e and f are predetermined constant values.

In some embodiments, the action of computing the output data includes: computing a mean value $E[\hat{R}_{i,k}]$ for each parameter $\hat{R}_{i,k}$; and sparsifying the matrix W by conditionally setting entries $W_{i,k}$ of the matrix W to zero if the corresponding mean value $E[\hat{R}_{i,k}]$ is smaller than a predetermined threshold value.

In some embodiments, the method 1.15 may also include: performing a singular value decomposition on a matrix Y to obtain the decomposition $Y=USV^T$, where S is a diagonal matrix, where U and V are orthogonal matrices, where the matrix Y is a matrix formed from the grade values $Y_{i,j}$; and prior to a first of the sampling iterations, initializing the matrix W and the matrix C according to the expressions W=U*sqrt(S) and $C=sqrt(S)*V^T$.

Tag Post-Processing

In one set of embodiments, a method 1.16 for tag processing may be performed as shown in FIG. 1.16. (The method 1.16 may also include any subset of the features, elements and embodiments described above.)

At 1.16.10, a computer system may receive input data that includes a collection of M tags (e.g., character strings), a Q×M matrix T and a predetermined Q×K matrix W. For each question in a set of Q questions, a corresponding subset of the M tags have been assigned to the question (e.g., by instructors, content domain experts, authors of the questions, crowd sourcing, etc.). For each question in the set of Q questions, the matrix T identifies the corresponding subset of the M tags. The matrix W includes entries that represent strength of association between each of the Q questions and each concept in a set of K concepts.

At 1.16.20, the computer system may compute an estimate of an M×K matrix A, where entries of the matrix A represent strength of association between each of the M tags and each of the K concepts. For each column $a_k$ of the matrix A, the action of computing the estimate includes estimating a minimum of a corresponding objective function subject to a constraint that the entries in the column $a_k$ are non-negative. The objective function may include a combination of: a first term that forces a distance between the matrix-vector product $Ta_k$ and the corresponding column $w_k$ of matrix W to be small; and a second term that enforces sparsity on the column $a_k$. The computer system may store the estimated matrix A in a memory.

In some embodiments, the questions are questions that have been provided to learners (e.g., as part of one or more tests).

In some embodiments, the M tags are character strings that have been defined by one or more users, where each of the M tags represents a corresponding idea or principle. (For example, the tags may represent ideas that are relevant to the content domain for which the questions have been designed.)

In some embodiments, the method 1.16 also includes receiving user input from one or more users (e.g., via the Internet or other computer network) that defines the collection of M tags (e.g., as character strings).

In some embodiments, the method 1.16 also includes receiving user input from one or more users (e.g., via the Internet or other computer network) that assigns one or more tags from the collection of M tags to a currently-identified one of the Q questions.

In some embodiments, for at least one of the rows $a_k$ of the matrix A, the corresponding objective function is a linear combination of the first term and the second term. The first term may be the squared two-norm of the difference $w_k - Ta_k$. The second term may be the one-norm of the column $a_k$.

In some embodiments, a coefficient of the second term in the linear combination controls an extent of sparsity of the column $a_k$.

In some embodiments, for each row $a_k$ of the matrix A, the action of estimating the minimum of the corresponding objective function subject to the non-negativity constraint includes performing a plurality of iterations. Each iteration may include: performing a gradient descent step with respect to the first term; and performing a projection step with respect to the second term and subject to the non-negativity constraint.

In some embodiments, the method 1.16 may also include, for each of the K concepts, analyzing the corresponding column $a_k$ of the matrix A to determine a corresponding subset of the M tags that are strongly associated with the concept.

In some embodiments, the action of analyzing the corresponding column includes: normalizing the column $a_k$; and determining a subset of the entries in the normalized column that exceed a given threshold.

In some embodiments, the method 1.16 may also include for one or more of the K concepts, displaying the one or more corresponding subsets of tags.

In some embodiments, the method 1.16 may also include displaying a bipartite graph based on the estimated matrix A, where the bipartite graph includes tag nodes and concept nodes and links between at least a subset of the tag nodes and at least a subset of the concept nodes. The tag nodes represent the M tags, and the concept nodes represent the K concepts.

In some embodiments, the input data also includes a predetermined K×N concept-knowledge matrix C, where the matrix C includes entries that represent the extent to which each of N learners has knowledge of each of the K concepts. In these embodiments, the method 1.16 may also include: (1) multiplying the estimated matrix A by the matrix C to obtain product matrix U=AC, where each entry $U_{m,j}$ of the product matrix U represents the extent of the $j^{th}$ learner's knowledge of the category defined by the $m^{th}$ tag; and (2) storing the product matrix U in a memory medium.

In some embodiments, the method 1.16 may also include transmitting a column $U_j$ of the product matrix U to remote computer operated by the $j^{th}$ learner (e.g., after password authentication), thereby informing the $j^{th}$ learner of his/her extent of knowledge for each of the M tags.

In some embodiments, the method 1.16 may also include: operating on row $U_m$ of the product matrix U to compute a measure of how well the N learners understood the category defined by the $m^{th}$ tag (e.g., by averaging the entries in the row $U_m$); and storing the measure in a memory medium.

In some embodiments, the method 1.16 may also include transmitting the measure to a remote computer (e.g., a computer operated by an instructor) in response to a request from the remote computer.

In some embodiments, the method 1.16 may also include displaying the measure via a display device.

In some embodiments, the method 1.16 may also include: operating on rows of the product matrix U to compute corresponding measures of how well the N learners as a whole understood the categories defined by the respective tags of the collection of M tags; and storing the computed measures in a memory medium.

In some embodiments, the method 1.16 may also include selecting future instructional content for at least a subset of the N learners based on the computed measures (e.g., based on the one or more tags whose computed measures are less than a given threshold).

II. Tag-Aware Ordinal Sparse Factor Analysis for Learning and Content Analytics Abstract: Machine learning offers novel ways and means to design personalized learning systems (PLSs) where each student's educational experience is customized in real time depending on their background, learning goals, and performance to date. SPARse Factor Analysis (SPARFA) is a novel framework for machine learning-based learning analytics, which estimates a learner's knowledge of the concepts underlying a domain, and content analytics, which estimates the relationships among a collection of questions and those concepts. In some embodiments, SPARFA jointly learns the associations among the questions and the concepts, learner concept knowledge profiles, and the underlying question difficulties, solely based on the correct/incorrect graded responses of a population of learners to a collection of questions. In this section (i.e., section II), we extend the SPARFA framework to enable: (i) the analysis of graded responses on an ordinal scale (partial credit) rather than a binary scale (correct/incorrect); (ii) the exploitation of tags/labels for questions that partially describe the question-concept associations. The resulting Ordinal SPARFATag framework greatly enhances the interpretability of the estimated concepts. We demonstrate using real educational data that Ordinal SPARFA-Tag outperforms both SPARFA (as described in section I) and existing collaborative filtering techniques in predicting missing learner responses.

II.1 Introduction

Today's education system typically provides only a "one-size-fits-all" learning experience that does not cater to the background, interests, and goals of individual learners. Modern machine learning (ML) techniques provide a golden opportunity to reinvent the way we teach and learn by making it more personalized and, hence, more efficient and effective. The last decades have seen a great acceleration in the development of personalized learning systems (PLSs), which can be grouped into two broad categories: (i) high-quality, but labor-intensive rule-based systems designed by domain experts that are hard-coded to give feedback in pre-defined scenarios, and (ii) more affordable and scalable ML-based systems that mine various forms of learner data in order to make performance predictions for each learner.

II.1.1 Learning and Content Analytics

Learning analytics (LA, estimating what a learner understands based on data obtained from tracking their interactions with learning content) and content analytics (CA, organizing learning content such as questions, instructional text, and feedback hints) enable a PLS to generate automatic, targeted feedback to learners, their instructors, and content authors. In the section above (i.e., section I), we described a new framework for LA and CA based on SPARse Factor Analysis (SPARFA). SPARFA includes a statistical model and convex-optimization-based inference algorithms for analytics that leverage the fact that the knowledge in a given subject can typically be decomposed into a small set of latent knowledge components that we term concepts. Leveraging the latent concepts and based only on the graded binary-valued responses (i.e., correct/incorrect) to a set of questions, SPARFA jointly estimates (i) the associations among the questions and the concepts (via a "concept graph"), (ii) learner concept knowledge profiles, and (iii) the underlying question difficulties.

II.1.2 Contributions

In this section (i.e., section II), we develop Ordinal SPARFA-Tag, an extension to the SPARFA framework that enables the exploitation of the additional information that is often available in educational settings. First, Ordinal SPARFA-Tag exploits the fact that responses are often graded on an ordinal scale (partial credit), rather than on a binary scale (correct/incorrect). Second, Ordinal SPARFA-Tag exploits tags/labels (i.e., keywords characterizing the underlying knowledge component related to a question) that can be attached by instructors and other users to questions. Exploiting pre-specified tags within the estimation procedure provides significantly more interpretable question-concept associations. Furthermore, our statistical framework can discover new concept-question relationships that would not be in the pre-specified tag information but, nonetheless, explain the graded learner-response data.

We showcase the superiority of Ordinal SPARFA-Tag compared to the methods in section I via a set of synthetic "ground truth" simulations and on a variety of experiments with real-world educational datasets. We also demonstrate that Ordinal SPARFA-Tag outperforms existing state-of-the-art collaborative filtering techniques in terms of predicting missing ordinal learner responses.

II.2 Statistical Model

We assume that the learners' knowledge level on a set of abstract latent concepts govern the responses they provide to a set of questions. The SPARFA statistical model characterizes the probability of learners' binary (correct/incorrect) graded responses to questions in terms of three factors: (i) question-concept associations, (ii) learners' concept knowledge, and (iii) intrinsic question difficulties; details can be found in section II.2. In this section, we will first extend the SPARFA framework to characterize ordinal (rather than binary-valued) responses, and then impose additional structure in order to model real-world educational behavior more accurately.

II.2.1 Model for Ordinal Learner Response Data

Suppose that we have N learners, Q questions, and K underlying concepts. Let $Y_{i,j}$ represent the graded response (i.e., score) of the $j^{th}$ learner to the $i^{th}$ question, which are from a set of P ordered labels, i.e., $Y_{i,j} \in O$, where $O = \{1, \ldots P\}$. For the $i^{th}$ question, with $i \in \{1, \ldots, Q\}$, we propose the following model for the learner-response relationships:

$$Z_{i,j} = w_i^T c_j + \mu_i, \forall (i,j),$$

$$Y_{i,j} = Q(Z_{i,j} + \epsilon_{i,j}), \epsilon_{i,j} \sim N(0, 1/\tau_{i,j}), (i,j) \in \Omega_{obs}.$$

where the column vector $w_i \in \mathbb{R}^K$ models the concept associations; i.e., it encodes how question i is related to each concept. Let the column vector $c_j \in \mathbb{R}^K$, $j \in \{1, \ldots, N\}$, represent the latent concept knowledge of the $j^{th}$ learner, with its $k^{th}$ component representing the $j^{th}$ learner's knowledge of the $k^{th}$ concept. The scalar $\mu_i$ models the intrinsic difficulty of question i, with large positive value of $\mu$ for an easy question. The quantity $\tau_{i,j}$ models the uncertainty of learner j answering question i correctly/incorrectly and N(0, $1/\tau_{i,j}$) denotes a zero-mean Gaussian distribution with precision parameter $\tau_{i,j}$, which models the reliability of the observation of learner j answering question i. We will further assume $\tau_{i,j}=\tau$, meaning that all the observations have the same reliability. (Accounting for learner/question-varying reliabilities is straightforward and omitted for the sake of brevity.) The slack variable $Z_{i,j}$ in (1) governs the probability of the observed grade $Y_{i,j}$. The set $$\Omega_{obs} \subseteq \{1, \ldots, Q\} \times \{1, \ldots, N\}$$

contains the indices associated to the observed learner-response data, in case the response data is not fully observed.

In (1), $Q(\cdot):\mathbb{R} \to O$ is a scalar quantizer that maps a real number into P ordered labels according to $$Q(x)=p \text{ if } \omega_{p-1} < x \le \omega_p, p \in O,$$

where $\{\omega_0, \ldots, \omega_P\}$ is the set of quantization bin boundaries satisfying $\omega_0 < \omega_1 < \ldots < \omega_{P-1} < \omega_P$, with $\omega_0$ and $\omega_P$ denoting the lower and upper bound of the domain of the quantizer $Q(\cdot)$. (In most situations, we have $\omega_0 = -\infty$ and $\omega_P = \infty$.) This quantization model leads to the equivalent input-output relation $$Z_{i,j} = w_i^T c_j + \mu_i, \quad (2)$$

$\forall (i,j)$, and $$p(Y_{i,j} = p \mid Z_{i,j}) = \int_{\omega_{p-1}}^{\omega_p} \mathcal{N}(s \mid Z_{i,j}, 1/\tau_{i,j}) ds$$
$$= \Phi(\tau(\omega_p - Z_{i,j})) - \Phi(\tau(\omega_{p-1} - Z_{i,j})),$$

$(i,j) \in \Omega_{obs}$.

where $\Phi(x) = \int_{-\infty}^x \mathcal{N}(s\mid 0,1) ds$ denotes the inverse probit function, with $\mathcal{N}(s\mid 0,1)$ representing the value of a standard normal evaluated at s. (The extension to a logistic-based model is straightforward.)

We can conveniently rewrite (1) and (2) in matrix form as $Z=WC, \forall (i,j)$, and $p(Y_{i,j}|Z_{i,j}) = \Phi(\tau(U_{i,j} - Z_{i,j})) - \Phi(\tau(L_{i,j} - Z_{i,j}))$, $(i,j) \in \Omega_{obs}$, (3)

where Y and Z are Q×N matrices. The Q×(K+1) matrix W is formed by concatenating $[w_1, \ldots, w_Q]^T$ with the intrinsic difficulty vector $\mu$ and C is a (K+1)×N matrix formed by concatenating the K×N matrix $[c_1, \ldots, c_N]$ with an all-ones row vector $1_{1 \times N}$. We furthermore define the Q×N matrices U and L to contain the upper and lower bin boundaries corresponding to the observations in Y, i.e., we have $U_{i,j} = \omega_{Y_{i,j}}$ and $L = \omega_{Y_{i,j}-1}, \forall (i,j) \in \Omega_{obs}$.

We emphasize that the statistical model proposed above is significantly more general than the original SPARFA model proposed in [24], which is a special case of (1) with P=2 and $\tau=1$. The precision parameter $\tau$ does not play a central role in [24] (it has been set to $\tau=1$), since the observations are binary-valued with bin boundaries $\{-\infty, 0, \infty\}$. For ordinal responses (with P>2), however, the precision parameter $\tau$ significantly affects the behavior of the statistical model and, hence, we estimate the precision parameter $\tau$ directly from the observed data.

II.2.2 Fundamental Assumptions

Estimating W, $\mu$ and C from Y is an ill-posed problem, in general, since there are more unknowns than observations and the observations are ordinal (and not real-valued). To ameliorate the illposedness, section I proposed three assumptions accounting for real-world educational situations:

(A1) Low-dimensionality: Redundancy exists among the questions in an assessment, and the observed graded learner responses live in a low-dimensional space, i.e., K<<N, Q.

(A2) Sparsity: Each question measures the learners' knowledge on only a few concepts (relative to N and Q), i.e., the question-concept association matrix W is sparse.

(A3) Non-negativity: The learners' knowledge on concepts does not reduce the chance of receiving good score on any question, i.e., the entries in W are non-negative. Therefore, large positive values of the entries in C represent good concept knowledge, and vice versa.

Although these assumptions are reasonable for a wide range of educational contexts (see section I for a detailed discussion), they are hardly complete. In particular, additional information is often available regarding the questions and the learners in some situations. Hence, we impose one additional assumption:

(A4) Oracle support: Instructor-provided tags on questions provide prior information on some question-concept associations. In particular, associating each tag with a single concept will partially (or fully) determine the locations of the non-zero entries in W.

As we will see, assumption (A4) significantly improves the limited interpretability of the estimated factors W and C over the conventional SPARFA framework of section I, which relies on a (somewhat ad-hoc) postprocessing step to associate instructor provided tags with concepts. In contrast, we utilize the tags as "oracle" support information on W within the model, which enhances the explanatory performance of the statistical framework, i.e., it enables to associate each concept directly with a predefined tag. Note that user-specified tags might not be precise or complete. Hence, the proposed estimation algorithm must be capable of discovering new question-concept associations and removing predefined associations that cannot be explained from the observed data.

II.3 Algorithm

We start by developing Ordinal SPARFA-M, a generalization of SPARFA-M from section I to ordinal response data. Then, we detail Ordinal SPARFA-Tag, which considers prespecified question tags as oracle support information of W, to estimate W, C, and $\tau$, from the ordinal response matrix Y while enforcing the assumptions (A1)-(A4).

II.3.1 Ordinal Sparfa-M

To estimate W, C, and $\tau$ in (3) given Y, we maximize the log-likelihood of Y subject to (A1)-(A4) by solving $$\text{minimize}_{W,C,\tau} -\Sigma_{i,j \in \Omega_{obs}} \log p(Y_{i,j}|\tau w_i^T c_j) + \lambda \Sigma_i \|w_i\|_1 \quad (P)$$

subject to $W \ge 0, \tau > 0, \|C\| \le \eta$.

Here, the likelihood of each response is given by (2). The regularization term imposes sparsity on each vector $w_i$ to account for (A2). To prevent arbitrary scaling between W and C, we gauge the norm of the matrix C by applying a matrix norm constraint $\|C\| \le \eta$. For example, the Frobenius norm constraint $\|C\|_F \le \eta$ can be used. Alternatively, the nuclear norm constraint $\|C\|_* \le \eta$ can also be used, promoting low-rankness of C [9], motivated by the facts that (i) reducing the number of degrees-of-freedom in C helps to prevent overfitting to the observed data and (ii) learners can often be clustered into a few groups due to their different demographic backgrounds and learning preferences.

The log-likelihood of the observations in (P) is concave in the product [36]. Consequently, the problem (P) is tri-convex, in the sense that the problem obtained by holding two of the three factors W, C, and $\tau$ constant and optimizing the third one is convex. Therefore, to arrive at a practicable way of solving (P), we propose the following computationally efficient block coordinate descent approach, with W, C, and $\tau$ as the different blocks of variables.

The matrices W and C are initialized as i.i.d. standard normal random variables, and we set $\tau=1$. We then iteratively optimize the objective of (P) for all three factors in round-robin fashion. Each (outer) iteration consists of three phases: first, we hold W and $\tau$ constant and optimize C; second, we hold C and $\tau$ constant and separately optimize each row vector $w_i$; third, we hold W and C fixed and optimize over the precision parameter $\tau$. These three phases form the outer loop of Ordinal SPARFA-M.

The sub-problems for estimating W and C correspond to the following ordinal regression (OR) problems [12]:

$$\text{minimize}_{w_i: W_{i,k} \geq 0 \forall k} -\Sigma_j \log p(Y_{i,j}|\tau w_i^T c_j) + \lambda \|w_i\|_1, \quad \text{(OR-W)}$$

$$\text{minimize}_{C: \|C\| \leq \eta} -\Sigma_{i,j} \log p(Y_{i,j}|\tau w_i^T c_j). \quad \text{(OR-C)}$$

To solve (OR-W) and (OR-C), we deploy the iterative first-order methods detailed below. To optimize the precision parameter $\tau$, we compute the solution to $$\text{minimize}_{\tau>0} -\Sigma_{i,j:(i,j)\in\Omega_{obs}} \log(\Phi(\tau(U_{i,j}-w_i^T c_j)) - \Phi(\tau(L_{i,j}-w_i^T c_j))),$$

via the secant method [26].

Instead of fixing the quantization bin boundaries $\{\omega_0, \ldots, \omega_P\}$ introduced in Sec. II.2 and optimizing the precision and intrinsic difficulty parameters, one can fix $\tau=1$ and optimize the bin boundaries instead, an approach used in, e.g., [21]. We emphasize that optimization of the bin boundaries can also be performed straightforwardly via the secant method, iteratively optimizing each bin boundary while keeping the others fixed. We omit the details for the sake of brevity. Note that we have also implemented variants of Ordinal SPARFA-M that directly optimize the bin boundaries, while keeping $\tau$ constant; the associated prediction performance is shown in Sec. 4.3.

II.3.2 First-Order Methods for Regularized Ordinal Regression

As in [24], we solve (OR-W) using the FISTA framework [4]. (OR-C) also falls into the FISTA framework, by rewriting the convex constraint $\|C\| \leq \eta$ as a penalty term $\delta(C: \|C\| > \eta)$ and treat it as a non-smooth regularizer, where $\delta(C: \|C\| > \eta)$ is the delta function, equaling 0 if $\|C\| \leq \eta$ and $\infty$ otherwise. Each iteration of both algorithms consists of two steps: A gradient-descent step and a shrinkage/projection step. Take (OR-W), for example, and let $f(w_i) = -\Sigma_j \log p(Y_{i,j}|\tau w_i^T c_j)$. Then, the gradient step is given by $$\nabla f = \nabla_{w_i}(-\Sigma_j \log p(Y_{i,j}|\tau w_i^T c_j)) = -Cp. \quad (4)$$

Here, we assume $\Omega_{obs} = \{1, \ldots, Q\} \times \{1, \ldots, N\}$ for simplicity; a generalization to the case of missing entries in Y is straightforward. Furthermore, p is a N×1 vector, with the $j^{th}$ element equal to $$\frac{\mathcal{N}(\tau(U_{i,j} - Z_{i,j})) - \mathcal{N}(\tau(L_{i,j} - Z_{i,j}))}{\Phi(\tau(U_{i,j} - Z_{i,j})) - \Phi(\tau(L_{i,j} - Z_{i,j}))},$$

where $\Phi(\cdot)$ is the inverse probit function. The gradient step and the shrinkage step for $w_i$ corresponds to $$\hat{w}_i^{l+1} \leftarrow w_i^l - t_l \nabla f, \quad (5)$$

and $$w_i^{l+1} \leftarrow \max\{\hat{w}_i^{l+1} - \lambda t_l, 0\}, \quad (6)$$

respectively, where $t_l$ is a suitable step-size. For (OR-C), the gradient with respect to each column $c_j$ is given by substituting $W^T$ for C and $c_j$ for $w_i$ in (4). Then, the gradient for C is formed by aggregating all these individual gradient vectors for $c_j$ into a corresponding gradient matrix.

For the Frobenius norm constraint $\|C\|_F \leq \eta$, the projection step is given by [7]

$$C^{l+1} \leftarrow \begin{cases} \hat{C}^{l+1} & \text{if } \|\hat{C}^{l+1}\|_F \leq \eta \\ \eta \frac{\hat{C}^{l+1}}{\|\hat{C}^{l+1}\|_F} & \text{otherwise} \end{cases}. \quad (7)$$

For the nuclear-norm constraint $\|C\|_* \leq \eta$, the projection step is given by $$C^{l+1} \leftarrow U \text{diag}(s) V^T, \text{ with } s = \text{Proj}_\eta(\text{diag}(S)), \quad (8)$$

where $\hat{C}^{l+1} = USV^T$ denotes the singular value decomposition, and $\text{Proj}_\eta(\cdot)$ is the projection onto the $l_1$-ball with radius $\eta$ (see, e.g., [16] for the details).

The update steps (5), (6), and (7) (or (8)) require a suitable step-size $t_l$ to ensure convergence. We consider a constant step-size and set $t_l$ to the reciprocal of the Lipschitz constant [4]. The Lipschitz constants correspond to $\tau^2 \sigma_{max}(C)$ for (OR-W) and $\tau^2 \sigma_{max}(W)$ for (OR-C), with $\sigma_{max}(X)$ representing the maximum singular value of X.

II.3.3 Ordinal Sparfa-Tag

We now develop the Ordinal SPARFA-Tag algorithm that incorporates (A4). Assume that the total number of tags associated with the Q questions equal K (each of the K concepts correspond to a tag), and define the set $\Gamma = \{(i,k):$ question i has tag k$\}$ as the set of indices of entries in W identified by pre-defined tags, and $\bar{\Gamma}$ as the set of indices not in $\Gamma$, we can rewrite the optimization problem (P) as:

$$(P_\Gamma) \text{ minimize}_{W,C,\tau} - \sum_{i,j \in \Omega_{obs}} \log p(Y_{i,j} | \tau w_i^T c_j) + \lambda \sum_i \|w_i^{(\bar{\Gamma})}\|_1 + \gamma \sum_i \frac{1}{2} \|w_i^{(\Gamma)}\|_2^2$$

subject to $$W \geq 0, \tau > 0, \|C\| \leq \eta.$$

Here, $w_i^{(\Gamma)}$ is a vector of those entries in $w_i$ belonging to the set $\Gamma$, while $w_i^{(\bar{\Gamma})}$ is a vector of entries in $w_i$ not belonging to $\Gamma$. The $l_2$-penalty term on $w_i^{(\Gamma)}$ regularizes the entries in W that are part of the (predefined) support of W; we set $\gamma = 10^{-6}$ in all our experiments. The $l_1$-penalty term on $w_i^{(\bar{\Gamma})}$ induces sparsity on the entries in W that are not predefined but might be in the support of W. Reducing the parameter $\lambda$ enables one to discover new question-concept relationships (corresponding to new non-zero entries in W) that were not contained in $\Gamma$.

The problem $(P_\Gamma)$ is solved analogously to the approach described in Sec. 3.2, except that we split the W update step into two parts that operate separately on the entries indexed by Γ and Γ̄. For the entries in Γ̄, the projection step corresponds to $$w_i^{(\bar{\Gamma}),l+1} \leftarrow \max\{\hat{w}_i^{(\bar{\Gamma}),l+1}/(1+\gamma t_l), 0\}, \quad (6)$$

The step for the entries indexed by Γ is given by (6). Since Ordinal SPARFA-Tag is tri-convex, it does not necessarily converge to a global optimum. Nevertheless, we can leverage recent results in [24, 35] in order to show that Ordinal SPARFA-Tag converges to a local optimum from an arbitrary starting point. Furthermore, if the starting point is within a close neighborhood of a global optimum of (P), then Ordinal SPARFA-Tag converges to this global optimum.

II.4 Experiments

We first showcase the performance of Ordinal SPARFA-Tag on synthetic data to demonstrate its convergence to a known ground truth. We then demonstrate the ease of interpretation of the estimated factors by leveraging instructor provided tags in combination with a Frobenius or nuclear norm constraint for two real educational datasets. We finally compare the performance of Ordinal SPARFA-M to state-of-the-art collaborative filtering techniques on predicting unobserved ordinal learner responses.

II.4.1 Synthetic Data

Since no suitable baseline algorithm has been proposed in the literature, we compare the performance of Ordinal SPARFA-Tag and a non-negative variant of the popular K-SVD dictionary learning algorithm [1], referred to as K-SVD+ we have detailed in [24]. We consider both the case when the precision τ is known a-priori and also when it must be estimated. In all synthetic experiments, the algorithm parameters λ and γ are selected according to Bayesian information criterion (BIC) [17]. All experiments are repeated for 25 Monte-Carlo trials.

In all synthetic experiments, we retrieve estimates of all factors, $\hat{W}$, $\hat{C}$, and $\hat{\mu}$. For Ordinal SPARFA-M and K-SVD+, the estimates $\hat{W}$ and $\hat{C}$ are re-scaled and permuted as in [24]. We consider the following error metrics:

$$E_W = \frac{\|W - \hat{W}\|_F^2}{\|W\|_F^2},$$

$$E_C = \frac{\|C - \hat{C}\|_F^2}{\|C\|_F^2},$$

$$E_\mu = \frac{\|\mu - \hat{\mu}\|_2^2}{\|\mu\|_2^2}.$$

We generate the synthetic test data W, C, μ as in [24, Eq. 10] with K=5, $\mu_0$=0, $v_\mu$=1, $\lambda_k$=0.66 $\forall k$, and $V_0=I_K$. Y is generated according to (3), with P=5 bins and $$\{\omega_0, \ldots, \omega_5\} = \{-1, -2.1, -0.64, 0.64, 2.1, 1\},$$

such that the entries of Z fall evenly into each bin. The number of concepts K for each question is chosen uniformly in {1, 2, 3}. We first consider the impact of problem size on estimation error in FIG. 2.2. To this end, we fix Q=100 and sweep N∈{50, 100, 200} for K=5 concepts, and then fix N=100 and sweep Q∈{50, 100, 200}.

Impact of problem size: We first study the performance of Ordinal SPARFA-M versus K-SVD+ while varying the problem size parameters Q and N. The corresponding box-and-whisker plots of the estimation error for each algorithm are shown in FIGS. 2.1A-2.1F. In FIGS. 2.1A-C, we fix the number of questions Q and plot the errors $E_W$, $E_C$ and $E_\mu$ for the number of learners N∈{50, 100, 200}. In FIGS. 2.1D-F, we fix the number of learners N and plot the errors $E_W$, $E_C$ and $E_\mu$ for the number of questions Q∈{50, 100, 200}. It is evident that $E_W$, $E_C$ and $E_\mu$ decrease as the problem size increases for all considered algorithms. Moreover, Ordinal SPARFA-M has superior performance to K-SVD+ in all cases and for all error metrics. Ordinal SPARFA-Tag and the oracle support provided versions of K-SVD outperform Ordinal SPARFAM and K-SVD+. We furthermore see that the variant of Ordinal SPARFA-M without knowledge of the precision τ performs as well as knowing τ; this implies that we can accurately learn the precision parameter directly from data.

Impact of the number of quantization bins: We now consider the effect of the number of quantization bins P in the observation matrix Y on the performance of our algorithms. We fix N=Q=100, K=5 and generate synthetic data as before up to Z in (3). For this experiment, a different number of bins P is used to quantize Z into Y. The quantization boundaries are set to $\{\Phi^{-1}(0), \Phi^{-1}(1/P), \ldots, \Phi^{-1}(1)\}$. To study the impact of the number of bins needed for Ordinal SPARFA-M to provide accurate factor estimates that are comparable to algorithms operating with real-valued observations, we also run K-SVD+ directly on the Z values (recall (3)) as a base-line. FIGS. 2.2A-C shows that the performance of Ordinal SPARFA-M consistently outperforms K-SVD+. We furthermore see that all error measures decrease by about half when using 6 bins, compared to 2 bins (corresponding to binary data). Hence, ordinal SPARFA-M clearly outperforms the conventional SPARFA model [24], when ordinal response data is available. As expected, Ordinal SPARFA-M approaches the performance of K-SVD+ operating directly on Z (unquantized data) as the number of quantization bins P increases.

II.4.2 Real-World Data

We now demonstrate the superiority of Ordinal SPARFA-Tag compared to regular SPARFA as in [24]. In particular, we show the advantages of using tag information directly within the estimation algorithm and of imposing a nuclear norm constraint on the matrix C. For all experiments, we apply Ordinal SPARFA-Tag to the graded learner response matrix Y with oracle support information obtained from instructor-provided question tags. The parameters λ and γ are selected via cross-validation.

Algebra test: We analyze a dataset from a high school algebra test carried out on Amazon Mechanical Turk [2], a crowd-sourcing marketplace. The dataset consists of N=99 users answering Q=34 multiple choice questions covering topics such as geometry, equation solving, and visualizing function graphs. The questions were manually labeled with a set of 13 tags. The dataset is fully populated, with no missing entries. A domain expert manually mapped each possible answer to one of P=4 bins, i.e., assigned partial credit to each choice as follows: totally wrong (p=1), wrong (p=2), mostly correct (p=3), and correct (p=4).

FIG. 2.3A shows the question-concept association map estimated by Ordinal SPARFA-Tag using the Frobenius norm constraint $\|C\|_F \leq \eta$. Circles represent concepts, and squares represent questions (labeled by their intrinsic difficulty $\mu_i$). Large positive values of $\mu_i$ indicate easy questions; negative values indicate hard questions. Connecting lines indicate whether a concept is present in a question; thicker lines represent stronger question-concept associations. Black solid lines represent the question-concept associations estimated by Ordinal SPARFA-Tag, corresponding to the entries in W as specified by Γ. Dashed lines represent the "mislabeled" associations (entries of W in Γ) that are estimated to be zero. Dotted lines represent new discovered associations, i.e., entries in W that were not in Γ that were discovered by Ordinal SPARFA-Tag.

By comparing FIGS. 2.3A and B with FIGS. 1.9A and B, we can see that Ordinal SPARFA-Tag provides unique concept labels, i.e., one tag is associated with one concept; this enables precise interpretable feedback to individual learners, as the values in C represent directly the tag knowledge profile for each learner. This tag knowledge profile can be used by a PLS to provide targeted feedback to learners. The estimated question-concept association matrix can also serve as useful tool to domain experts or course instructors, as they indicate missing and inexistent tag-question associations.

Grade 8 Earth Science course: As a second example of Ordinal SPARFA-Tag, we analyze a Grade 8 Earth Science course dataset [31]. This dataset contains N=145 learners answering Q=80 questions and is highly incomplete (only 13.5% entries of Y are observed). The matrix Y is binary-valued; domain experts labeled all questions with 16 tags.

The result of Ordinal SPARFA-Tag with the nuclear norm constraint $\|C\|_* \leq \eta$ on C is shown in FIGS. 2.4A and B. The estimated question-concept associations mostly matches those pre-defined by domain experts. Note that our algorithm identified some question-concept associations to be non-existent (indicated with dashed lines). Moreover, no new associations have been discovered, verifying the accuracy of the pre-specified question tags from domain experts. Comparing to the question-concept association graph of the high school algebra test in FIGS. 2.3A and B, we see that for this dataset, the pre-specified tags represent disjoint knowledge components, which is indeed the case in the underlying question set. Interestingly, the estimated concept matrix C has rank 3; note that we are estimating K=13 concepts. This observation suggests that all learners can be accurately represented by a linear combination of only 3 different "eigen-learner" vectors. Further investigation of this clustering phenomenon is part of on-going research.

II.4.3 Predicting Unobserved Learner Responses

We now compare the prediction performance of ordinal SPARFA-M on unobserved learner responses against state-of-the-art collaborative filtering techniques: (i) SVD++ in [20], which treats ordinal values as real numbers, and (ii) OrdRec in [21], which relies on an ordinal logit model. We compare different variants of Ordinal SPARFA-M: (i) optimizing the precision parameter, (ii) optimizing a set of bins for all learners, (iii) optimizing a set of bins for each question, and (iv) using the nuclear norm constraint on C. We consider the Mechanical Turk algebra test, hold out 20% of the observed learner responses as test sets, and train all algorithms on the rest. The regularization parameters of all algorithms are selected using 4-fold cross-validation on the training set. FIG. 2.5 shows the root mean square error (RMSE)

$$\sqrt{\frac{1}{|\Omega_{obs}|} \sum_{i,j:(i,j) \in \Omega_{obs}} \|Y_{i,j} - \hat{Y}_{i,j}\|_2^2}$$

where $\hat{Y}_{i,j}$ is the predicted score for $Y_{i,j}$, averaged over 50 trials. FIG. 2.5 demonstrates that the nuclear norm variant of Ordinal SPARFA-M outperforms OrdRec, while the performance of other variants of ordinal SPARFA are comparable to OrdRec. SVD++ performs worse than all compared methods, suggesting that the use of a probabilistic model considering ordinal observations enables accurate predictions on unobserved responses. We furthermore observe that the variants of Ordinal SPARFA-M that optimize the precision parameter or bin boundaries deliver almost identical performance. We finally emphasize that Ordinal SPARFA-M not only delivers superior prediction performance over the two state-of-the-art collaborative filtering techniques in predicting learner responses, but it also provides interpretable factors, which is key in educational applications.

II.5 Related Work

A range of different ML algorithms have been applied in educational contexts. Bayesian belief networks have been successfully used to probabilistically model and analyze learner response data in order to trace learner concept knowledge and estimate question difficulty (see, e.g., [13, 22, 33, 34]). Such models, however, rely on predefined question-concept dependencies (that are not necessarily accurate), in contrast to the framework presented here that estimates the dependencies solely from data.

Item response theory (IRT) uses a statistical model to analyze and score graded question response data [25, 29]. Our proposed statistical model shares some similarity to the Rasch model [28], the additive factor model [10], learning factor analysis [19, 27], and the instructional factors model [11]. These models, however, rely on pre-defined question features, do not support disciplined algorithms to estimate the model parameters solely from learner response data, or do not produce interpretable estimated factors. Several publications have studied factor analysis approaches on learner responses [3, 14, 32], but treat learner responses as real and deterministic values rather than ordinal values determined by statistical quantities. Several other results have considered probabilistic models in order to characterize learner responses [5, 6], but consider only binary-valued responses and cannot be generalized naturally to ordinal data.

While some ordinal factor analysis methods, e.g., [21], have been successful in predicting missing entries in datasets from ordinal observations, our model enables interpretability of the estimated factors, due to (i) the additional structure imposed on the learner-concept matrix (non-negativity combined with sparsity) and (ii) the fact that we associate unique tags to each concept within the estimation algorithm.

II.6 Conclusions

We have significantly extended the SPARse Factor Analysis (SPARFA) framework of [24] to exploit (i) ordinal learner question responses and (ii) instructor generated tags on questions as oracle support information on the question-concept associations. We have developed a new algorithm to compute an approximate solution to the associated ordinal factor-analysis problem. Our proposed Ordinal SPARFA-Tag framework not only estimates the strengths of the pre-defined question-concept associations provided by the instructor but can also discover new associations. Moreover, the algorithm is capable of imposing a nuclear norm constraint on the learner-concept matrix, which achieves better prediction performance on unobserved learner responses than state-of-the-art collaborative filtering techniques, while improving the interpretability of the estimated concepts relative to the user-defined tags.

The Ordinal SPARFA-Tag framework enables a PLS to provide readily interpretable feedback to learners about their latent concept knowledge. The tag-knowledge profile can, for example, be used to make personalized recommendations to learners, such as recommending remedial or enrichment material to learners according to their tag (or concept)

knowledge status. Instructors also benefit from the capability to discover new question-concept associations underlying their learning materials.

II.7 References

[1] M. Aharon, M. Elad, and A. M. Bruckstein. K-SVD: An algorithm for designing overcomplete dictionaries for sparse representation. *IEEE Trans Sig. Proc.*, 54(11): 4311-4322, December 2006.

[2] Amazon Mechanical Turk, http://www.mturk.com/mturk/welcome, September 2012.

[3] T. Barnes. The Q-matrix method: Mining student response data for knowledge. In *Proc. AAAI EDM Workshop*, July 2005.

[4] A. Beck and M. Teboulle. A fast iterative shrinkage-thresholding algorithm for linear inverse problems. *SIAM J. on Imaging Science*, 2(1):183-202, March 2009.

[5] B. Beheshti, M. Desmarais, and R. Naceur. Methods to find the number of latent skills. In *Proc. $5^{th}$ Intl. Conf. on EDM*, pages 81-86, June 2012.

[6] Y. Bergner, S. Droschler, G. Kortemeyer, S. Rayyan, D. Seaton, and D. Pritchard. Model-based collaborative filtering analysis of student response data: Machine-learning item response theory. In *Proc. 5th Intl. Conf. on EDM*, pages 95-102, June 2012.

[7] S. Boyd and L. Vandenberghe. *Convex Optimization*. Cambridge University Press, 2004.

[8] P. Brusilovsky and C. Peylo. Adaptive and intelligent web-based educational systems. *Intl. J. of Artificial Intelligence in Education*, 13(2-4):159-172, April 2003.

[9] J. F. Cai, E. J. Candes, and Z. Shen. A singular value thresholding algorithm for matrix completion. *SIAM J. on Optimization*, 20(4):1956-1982, March 2010.

[10] H. Cen, K. R. Koedinger, and B. Junker. Learning factors analysis—a general method for cognitive model evaluation and improvement. In M. Ikeda, K. D. Ashley, and T. W. Chan, editors, *Intelligent Tutoring Systems*, volume 4053 of *Lecture Notes in Computer Science*, pages 164-175. Springer, June 2006.

[11] M. Chi, K. Koedinger, G. Gordon, and P. Jordan. Instructional factors analysis: A cognitive model for multiple instructional interventions. In *Proc. 4th Intl. Conf. on EDM*, pages 61-70, July 2011.

[12] W. Chu and Z. Ghahramani. Gaussian processes for ordinal regression. *J. of Machine Learning Research*, 6:1019-1041, July 2005.

[13] A. T. Corbett and J. R. Anderson. Knowledge tracing: Modeling the acquisition of procedural knowledge. *User modeling and user-adapted interaction*, 4(4):253-278, December 1994.

[14] M. Desmarais. Conditions for effectively deriving a Q-matrix from data with non-negative matrix factorization. In *Proc. 4th Intl. Conf. on EDM*, pages 41-50, July 2011.

[15] J. A. Dijksman and S. Khan. Khan Academy: The world's free virtual school. In *APS Meeting Abstracts*, page 14006, March 2011.

[16] J. Duchi, S. Shalev-Shwartz, Y. Singer, and T. Chandra. Efficient projections onto the l1-ball for learning in high dimensions. In *Proc. 25th Intl. Conf. on ML*, pages 272-279, July 2008.

[17] T. Hastie, R. Tibshirani, and J. Friedman. *The Elements of Statistical Learning*. Springer, 2010.

[18] D. Hu. How Khan academy is using machine learning to assess student mastery. Online: http://davidhu.com, November 2011.

[19] K. R. Koedinger, E. A. McLaughlin, and J. C. Stamper. Automated student model improvement. In *Proc. 5th Intl. Conf on EDM*, pages 17-24, June 2012.

[20] Y. Koren, R. Bell, and C. Volinsky. Matrix factorization techniques for recommender systems. *Computer*, 42(8): 30-37, August 2009.

[21] Y. Koren and J. Sill. OrdRec: an ordinal model for predicting personalized item rating distributions. In *Proc. of the 5th ACM Conf. on Recommender Systems*, pages 117-124, October 2011.

[22] G. A. Krudysz and J. H. McClellan. Collaborative system for signal processing education. In *Proc. IEEE ICASSP*, pages 2904-2907, May 2011.

[23] J. A. Kulik. Meta-analytic studies of findings on computer-based instruction. *Technology assessment in education and training*, pages 9-33, 1994.

[24] A. S. Lan, A. E. Waters, C. Studer, and R. G. Baraniuk. Sparse factor analysis for learning and content analytics", Submitted on 22 Mar. 2013 (v1), last revised 19 Jul. 2013, http://arxiv.org/abs/1303.5685.

[25] F. M. Lord. Applications of Item Response Theory to Practical Testing Problems. Erlbaum Associates, 1980.

[26] J. Nocedal and S. Wright. *Numerical Optimization*. Springer Verlag, 1999.

[27] P. I. Pavlik, H. Cen, and K. R. Koedinger. Learning factors transfer analysis: Using learning curve analysis to automatically generate domain models. In *Proc. 2nd Intl. Conf. on EDM*, pages 121-130, July 2009.

[28] G. Rasch. Probabilistic Models for Some Intelligence and Attainment Tests. MESA Press, 1993.

[29] M. D. Reckase. *Multidimensional Item Response Theory*. Springer Publishing Company Incorporated, 2009.

[30] C. Romero and S. Ventura. Educational data mining: A survey from 1995 to 2005. *Expert Systems with Applications*, 33(1):135-146, July 2007.

[31] STEMscopes Science Education. http://stemscopes.com, September 2012.

[32] N. Thai-Nghe, T. Horvath, and L. Schmidt-Thieme. Factorization models for forecasting student performance. In *Proc. 4th Intl. Conf. on EDM*, pages 11-20, July 2011.

[33] K. Wauters, P. Desmet, and W. Van Den Noortgate. Acquiring item difficulty estimates: a collaborative effort of data and judgment. In *Proc. 4th Intl. Conf. on EDM*, pages 121-128, July 2011.

[34] B. P. Woolf Building Intelligent Interactive Tutors: Student-centered Strategies for Revolutionizing E-learning Morgan Kaufman Publishers, 2008.

[35] Y. Xu and W. Yin. A block coordinate descent method for multi-convex optimization with applications to non-negative tensor factorization and completion. Technical report, Rice University CAAM, September 2012.

[36] A. Zymnis, S. Boyd, and E. Candes. Compressed sensing with quantized measurements. *IEEE Sig. Proc. Letters*, 17(2):149-152, February 2010.

In one set of embodiments, a method 2.6 may include the operations shown in FIG. 2.6. (The method 2.6 may also include any subset of the features, elements and embodiments described above and below.)

At 2.6.10, a computer system may receive input data that includes graded response data, where the graded response data includes a set of grades that have been assigned to answers provided by learners in response to a set of questions. Each of the grades has been selected from an ordered set of P labels, where P is greater than or equal to two.

At 2.6.20, the computer system may operate on the input data to determine: (a) a set of K concepts that are implicit in the set of questions, where K is smaller than the number of questions in the set of questions, where the concepts are represented by an association matrix whose entries characterize strengths of association between the questions and the concepts; and (b) a learner knowledge matrix including, for each learner and each of the K concepts, the extent of the learner's knowledge of the concept. The computer system may store the association matrix and the learner knowledge matrix.

In some embodiments, the action of operating on the input data also includes determining an intrinsic difficulty of each question in the set of questions.

In some embodiments, the action of operating on the input data includes performing a maximum-likelihood-based factor analysis, e.g., as variously described in this patent disclosure.

In some embodiments, the input data also includes a set of $N_T$ tags and tag assignment information, where $N_T$ is greater than or equal to K. The tag assignment information may indicate, for each of the questions, which of the $N_T$ tags have been assigned to that question. The action of operating on the input data may include performing a maximum-likelihood-based factor analysis using an objective function. The objective function may include a term involving a restriction of the matrix W, where the restriction is specified by the tag association information, e.g., as variously described below.

In one set of embodiments, a method 2.7 for performing content analytics and learning analytics may include the operations shown in FIG. 2.7. (The method 2.7 may also include any subset of the features, elements and embodiments described above.)

At 2.7.10, a computer system may receive input data that includes graded response data, where the graded response data includes a set of grades that have been assigned to answers provided by learners in response to a set of questions. Each of the grades has been selected from an ordered set of P labels, where P is greater than or equal to two.

At 2.7.20, the computer system may compute output data based on the input data using a statistical model, where the output data includes at least an estimate of an association matrix W and an estimate of a concept-knowledge matrix C. The association matrix W includes entries that represent strength of association between each of the questions and each of a plurality of concepts. The matrix C includes entries that represent the extent of each learner's knowledge of each concept. The statistical model may characterize a statistical relationship between entries $(WC)_{i,j}$ of the product matrix WC and corresponding grades $Y_{i,j}$ of the set of grades. The computer system may store the output data in memory.

In some embodiments, the action of receiving the input data includes receiving the grades from one or more remote computers over a network (e.g., from one or more remote computers operated by one or more instructors).

In some embodiments, for each question, the output data includes a corresponding estimate of difficulty of the question. In these embodiments, the statistical model may characterize a statistical relationship between $(WC)_{i,j} + \mu_i$ and the corresponding grade $Y_{i,j}$, where $\mu_i$ represents the difficulty of the $i^{th}$ question.

In some embodiments, the statistical model is of the form:

$$Z_{i,j} = (WC)_{i,j} + \mu_i$$

$$Y_{i,j} = g(Z_{i,j} + \epsilon_{i,j}),$$

where $Z_{i,j}$ represents an ideal real-valued grade for the answer provided by the $j^{th}$ learner to the $i^{th}$ question, where $\epsilon_{i,j}$ represents random measurement noise (or uncertainty in measurement), where g is a quantizer function that maps from the real line into the set of labels.

In some embodiments, the noise $\epsilon_{i,j}$ is modeled by a normal random variable with zero mean and variance equal to $1/\tau_{i,j}$, and $\tau_{i,j}$ represents the reliability of observation of the answer provided by the $j^{th}$ learner to the $i^{th}$ question. (In one embodiment, all of the reliabilities $\tau_{i,j}$ are equal.)

In some embodiments, the set of labels is $\{1, 2, \ldots, P\}$, and the quantizer function g is associated with an ordered set $\{\omega_0, \omega_1, \ldots, \omega_{P-1}, \omega_P\}$ of real numbers, where the value g(z) of the quantizer function g at argument value z is equal to p if z is in the interval $\omega_{p-1} < z < \omega_p$.

In some embodiments, the matrix W is augmented with an extra column including the difficulties $\mu_i$, where the matrix C is augmented with an extra row including all ones. In these embodiments, the action of computing the output data based on the input data includes estimating a minimum of an objective function over a space defined by the matrix W, the matrix C and the reliabilities $\{\tau_{i,j}\}$, subject to constraints including a non-negativity constraint on the entries of matrix W, a positivity constraint on the reliabilities $\{\tau_{i,j}\}$, and one or more norm constraints on the matrix C. The objective function may include a combination (e.g., a linear combination or a bilinear combination) of: the negative of a log likelihood of the graded response data parameterized by the matrix W, the matrix C and the reliabilities $\{\tau_{i,j}\}$; and a sparsity-enforcing term involving the rows of the matrix W.

In some embodiments, the one or more norm constraints on the matrix C include a constraint on the Frobenius norm of the matrix C and/or a constraint on the nuclear norm of the matrix C and/or a constraint on the max norm of the matrix C.

The max norm may be defined as $$\|C\|_{max} = \min_{U,V} \{\|U\|_{2,\infty} \|V\|_{2,\infty} : C = UV^T\}.$$

The notation $\|A\|_{2,\infty}$ may be defined as $$\|A\|_{2,\infty} = \max_j \sqrt{\Sigma_k A_{j,k}^2}.$$

In some embodiments, the reliabilities $\{\tau_{i,j}\}$ are all equal to the same variable $\tau$.

In some embodiments, the action of estimating the minimum of the objective function includes executing a plurality of outer iterations. Each of the outer iterations may include: (1) for each row of the matrix W, estimating a minimum of a corresponding row-related subobjective function over a space defined by that row, subject to the condition that entries within the row are non-negative, where the corresponding row-related subobjective function includes said negative of the log likelihood and a sparsity-enforcing term for that row; (2) estimating a minimum of a C-related subobjective function over a space defined by that the matrix C, subject to the one or more norm constraints on the matrix C, where the C-related subobjective function includes said negative of the log likelihood; and (3) estimating a minimum of said negative of the log likelihood over the space defined by the reliabilities $\{\tau_{i,j}\}$ subject to the positivity constraint on the reliabilities $\{\tau_{i,j}\}$.

In some embodiments, each of the outer iterations also includes performing a squash operation after said estimating the minimum of the C-related subobjective function, where the squash operation projects a current estimate of the matrix C onto a max-norm ball, e.g., as described in J. Lee et al., "Practical Large-Scale Optimization for Max-norm Regularization", in Advances in Neural Information Processing Systems (NIPS) 2010.

In some embodiments, the matrix W is initialized by populating its entries with values drawn from a random variable on the non-negative real numbers, or, with values determined by taking the absolute value of samples drawn from a zero mean random variable (such as a normal random variable).

In some embodiments, the matrix C is initialized by populating its entries with values drawn from a zero-mean random variable.

In some embodiments, for each row of the matrix W, the action of estimating the minimum of the corresponding row-related subobjective function includes performing a plurality of descent-and-shrink (DAS) iterations. Each of the DAS iterations may include: a gradient-descent step on a function f defined by said negative of the log likelihood; and a shrinkage step that (a) displaces entries of the row in the negative direction based on a current step size and (b) applies a thresholding operation to the displaced entries to enforce non-negativity of the displaced entries.

In some embodiments, the action of estimating the minimum of the C-related subobjective function includes performing a plurality of descent-and-shrink (DAS) iterations. Each of the DAS iterations may include: a gradient-descent step on a function f defined by said negative of the log likelihood; and a shrinkage step that scales the matrix C so that it has Frobenius norm equal to $\eta$ if its Frobenius norm is not already less than or equal to $\eta$, where $\eta$ is a predetermined positive value.

In some embodiments, the shrinkage step also includes: performing a singular value decomposition of the matrix C to obtain a factorization of the form $C=USV^T$, where the matrix S is diagonal; projecting the diagonal of the matrix S onto the $L_1$-ball of radius $\beta$ to obtain a projection vector s, where $\beta$ is a predetermined positive value; and computing an update to the matrix C according to the relation $$C=S\mathrm{diag}(s)V^T.$$

In some embodiments, the action of computing the output data based on the input data includes estimating a minimum of an objective function over a space defined by the matrix W and the matrix C, subject to constraints including a non-negativity constraint on the entries of matrix W, and one or more norm constraints on the matrix C. The objective function may include a combination (e.g., a linear combination or a bilinear combination) of: the negative of a log likelihood of the graded response data parameterized by the matrix W and the matrix C; and a sparsity-enforcing term involving the rows of the matrix W.

In some embodiments, the method 2.7 may also include, for an $i^{th}$ one of the questions that was not answered by the $j^{th}$ learner, predicting a probability that the $j^{th}$ learner would achieve any grade in the set of P labels if he/she had answered the $i^{th}$ question. The action of predicting the probability may include: computing a dot product between the $i^{th}$ row of the estimated matrix W and the $j^{th}$ column of the estimated matrix C; adding the computed dot product to the estimated difficulty $\mu_i$ of the $i^{th}$ question to obtain a sum value; and evaluating an inverse link function that corresponds to the quantizer function g on the sum value.

In some embodiments, method 2.7 may include predicting the expected grade that the $j^{th}$ learner would achieve if he/she had answered the $i^{th}$ question, where the predicted grade is determined by taking the expectation (i.e., computing the average) of the predicted grade distribution over all P labels.

In some embodiments, the number of the concepts is determined by the number of rows in the matrix C, and the concepts are latent concepts (i.e., implicit in the graded response data), where the concepts are extracted from the graded response data by said computing the output data.

In some situations, the set of grades does not include a grade for every possible learner-question pair, and said input data includes an index set identifying the learner-question pairs that are present in the set of grades. The computation(s) described in any of the above-described embodiments may be limited to the set of grades using the index set.

In some embodiments, each row of the matrix W corresponds to respective one of the questions; each column of the matrix W corresponds to a respective one of the concepts; each of the rows of the matrix C corresponds to a respective one of the concepts; and each of the columns of the matrix C corresponds to respective one of the learners.

In one set of embodiments, a method 2.8 for performing learning analytics and content analytics may include the operations shown in FIG. 2.8. (Method 2.8 may also include any subset of the features, elements and embodiments described above.)

At 2.8.10, a computer system may receive input data that includes graded response data, where the graded response data includes a set of grades that have been assigned to answers provided by learners in response to a set of questions, where each of the grades has been selected from an ordered set of P labels, where P is greater than or equal to two, where not all the questions have been answered by all the learners, where the input data also includes an index set that indicates which of the questions were answered by each learner.

At 2.8.20, the computer system may compute output data based on the input data using a statistical model, where the output data includes at least an estimate of an association matrix W, an estimate of a concept-knowledge matrix C and an estimate of the difficulty $\mu_i$ of each question, where the association matrix W includes entries that represent strength of association between each of the questions and each of a plurality of concepts, where the matrix C includes entries that represent the extent of each learner's knowledge of each concept, where the statistical model characterizes a statistical relationship between variables $Z_{i,j}=(WC)_{i,j}+\mu_i$ and corresponding grades $Y_{i,j}$ of the set of grades for index pairs (i,j) occurring in the index set, where $(WC)_{i,j}$ represents an entry of the product matrix WC.

Ordinal SPARFA-Tag

In one set of embodiments, a method 2.9 for jointly performing topic modeling and learning-and-content analytics may include the operations shown in FIG. 2.9. (The method 2.9 may also include any subset of the features, elements and embodiments described above.)

At 2.9.10, a computer system may receive input data that includes graded response data, a collection of $N_T$ tags and a question-tag (QT) index set, where the graded response data includes a set of grades that have been assigned to answers provided by learners in response to a set of questions. Each of the grades has been selected from an ordered set of P labels, where P is greater than or equal to two. The QT index set indicates, for each of the questions, which of the $N_T$ tags have been assigned to that question.

At 2.9.20, the computer system may compute output data based on the input data using a statistical model. The output data may include at least an estimate of an association matrix W and an estimate of a concept-knowledge matrix C. The association matrix W includes entries that represent strength of association between each of the questions and each concept in a set of $N_T$ concepts. The matrix C includes entries that represent the extent of each learner's knowledge of each concept. The statistical model may characterize a statistical relationship between entries $(WC)_{i,j}$ of the product matrix WC and corresponding grades $Y_{i,j}$ of the set of grades. The action of computing the output data based on the input data may include estimating a minimum of an objective function over a search space including a first subspace defined by the matrix W and a second subspace defined by the matrix C, subject to conditions including a non-negativity constraint on the entries of the matrix W and one or more norm constraints on the matrix C. The objective function may include a combination (e.g., a linear combination or a bilinear combination) of: (a) a negative of a log likelihood of the graded response data parameterized by the matrix W and the matrix C; (b) a sparsity-enforcing term involving restrictions of rows of the matrix W to entries specified by a complement of the QT index set; and (c) a regularizing term involving restrictions of rows of the matrix W to entries specified by the QT index set. The computer system may store the estimated association matrix W and the estimated tag-knowledge matrix C in a memory.

In some situations, the rank of the matrix C is the same as the number of tags $N_T$. In other situations, rank(C) may be smaller than $N_T$.

In some embodiments, not all the questions have been answered by all the learners. Thus, the input data may also include a learner-question (LQ) index set. The LQ index set indicates, for each of the learners, which of the questions were answered by that learner. The above-described log likelihood may be restricted to index pairs (i,j) such that the $j^{th}$ learner answered the $i^{th}$ question, as indicated by the LQ index set.

In some embodiments, the above-described combination (that defines the objective function) includes a linear combination of the negative log likelihood, the sparsity enforcing term and the regularizing term. A coefficient of the sparsity enforcing term in the linear combination may be used to control how sparse is a submatrix of the matrix W corresponding to the complement of the index set QT. Equivalently, the coefficient of the sparsity enforcing term may be used to control an extent to which the method is able to learn new question-concept relationships not indicated (or implied) by the QT index set.

In some embodiments, for each question, the output data includes a corresponding estimate of difficulty of the question. In these embodiments, the statistical model may be of the form:

$Z_{i,j}=(WC)_{i,j}+\mu_i$ $Y_{i,j}=g(Z_{i,j}+\epsilon_{i,j})$, where $\mu_i$ represents the difficulty of the $i^{th}$ question, where $Z_{i,j}$ represents an ideal real-valued grade for the answer provided by the $j^{th}$ learner to the $i^{th}$ question, where $\epsilon_{i,j}$ represents random measurement noise (or uncertainty in measurement), where g is a quantizer function that maps from the real number line into the set of labels.

In some embodiments, the noise $\epsilon_{i,j}$ is modeled by a random variable with zero mean and variance equal to $1/\tau_{i,j}$, where $\tau_{i,j}$ represents reliability of observation of the answer provided by the $j^{th}$ learner to the $i^{th}$ question. In these embodiments, the log likelihood of the graded response data may be parameterized by the reliabilities (in addition to being parameterized by the matrix W and the matrix C); the search space may include a third subspace corresponding to the reliabilities; and the above-described constraints may include a positivity constraint on the reliabilities $\{\tau_{i,j}\}$. (In one embodiment, all of the reliabilities $\tau_{i,j}$ are equal.)

Maximum Likelihood Ordinal SPARFA-Tag

In some embodiments, the matrix W is augmented with an extra column including the difficulties $\mu_i$; the matrix C is augmented with an extra row including all ones; and the action of estimating the minimum of the objective function includes executing a plurality of outer iterations. Each of the outer iterations may include: (1) for each row of the matrix W, estimating a minimum of a corresponding first row-related subobjective function over a space defined by a first restriction vector, which is a restriction of the row to entries selected by the complement of the QT index set, where the corresponding first row-related subobjective function includes said negative of the log likelihood and a sparsity-enforcing term for that first restriction vector; and (2) for each row of the matrix W, estimating a minimum of a corresponding second row-related subobjective function over a space defined by a second restriction vector, which is a restriction of the row to entries selected by the QT index set, where the corresponding second row-related subobjective function includes said negative of the log likelihood and a regularizing-term for that second restriction vector.

In some embodiments, each outer iteration also includes: (3) estimating a minimum of a C-related subobjective function over the second subspace defined by the matrix C, subject to the one or more norm constraints on the matrix C, where the C-related subobjective function includes said negative of the log likelihood; and (4) estimating a minimum of said negative of the log likelihood over the third space defined by the reliabilities $\{\tau_{i,j}\}$, subject to the positivity constraint on the reliabilities $\{\tau_{i,j}\}$.

In some embodiments, for each row of the matrix W, the action of estimating the minimum of the corresponding first row-related subobjective function includes performing a plurality of descent-and-shrink (DAS) iterations, where each of the DAS iterations includes: a gradient-descent step on the first row-related subobjective function; and a shrinkage step that (a) displaces entries of the second restriction vector towards zero based on a current step size and (b) applies a thresholding operation to the displaced entries to enforce non-negativity of the displaced entries.

In some embodiments, for each row of the matrix W, the action of estimating the minimum of the corresponding second row-related subobjective function includes performing a plurality of descent-and-shrink (DAS) iterations. Each of the DAS iterations may include: a gradient-descent step on the second row-related subobjective function; and a shrinkage step that (a) displaces entries of the second restriction vector in the negative direction based on a current step size and (b) applies a thresholding operation to the displaced entries to enforce non-negativity of the displaced entries.

In one set of embodiments, a method 2.10 for jointly performing topic modeling and learning-and-content analytics may include the operations shown in FIG. 2.10. (The method 2.10 may also include any subset of the features, elements and embodiments described above.)

At 2.10.10, a computer system may receive input data that includes graded response data, a collection of $N_T$ tags and a question-tag (QT) index set, where the graded response data includes a set of grades that have been assigned to answers provided by learners in response to a set of questions, where each of the grades has been selected from an ordered set of P labels, where P is greater than or equal to two, where the QT index set indicates, for each of the questions, which of the $N_T$ tags have been assigned to that question.

At 2.10.20, the computer system may compute output data based on the input data using a statistical model, where the output data includes at least an estimate of an association matrix W and an estimate of a concept-knowledge matrix C, where the association matrix W includes entries that represent strength of association between each of the questions and each concept of a set of K concepts, where the matrix C includes entries that represent the extent of each learner's knowledge of each concept, where the statistical model characterizes a statistical relationship between entries $(WC)_{i,j}$ of the product matrix WC and corresponding grades $Y_{i,j}$ of the set of grades, where said computing the output data based on the input data includes estimating a minimum of an objective function over a search space including a first subspace defined by the matrix W and a second subspace defined by the matrix C, subject to conditions including a non-negativity constraint on the entries of the matrix W and one or more norm constraints on the matrix C, where the objective function includes a combination (e.g., a linear combination or a bilinear combination) of: (a) a negative of a log likelihood of the graded response data parameterized by the matrix W and the matrix C; (b) a sparsity-enforcing term involving restrictions of rows of the matrix W to entries specified by a complement of the QT index set; and (c) a regularizing term involving restrictions of rows of the matrix W to entries specified by the QT index set. The computer system may store the estimated association matrix W and the estimated concept-knowledge matrix C in a memory.

III. Joint Topic Modeling and Factor Analysis of Textual Information and Graded Response Data Abstract: Modern machine learning methods are critical to the development of large-scale personalized learning systems (PLS) that cater directly to the needs of individual learners. The recently developed SPARse Factor Analysis (SPARFA) framework provides a new statistical model and algorithms for machine learning-based learning analytics, which estimate a learner's knowledge of the latent concepts underlying a domain, and content analytics, which estimate the relationships among a collection of questions and the latent concepts. SPARFA estimates these quantities given only the graded responses to a collection of questions. In order to better interpret the estimated latent concepts, SPARFA relies on a post-processing step that utilizes user-defined tags (e.g., topics or keywords) available for each question. In this section (i.e., section III), we relax the need for user-defined tags by extending SPARFA to jointly process both graded learner responses and the text of each question and its associated answer(s) or other feedback. Our purely data-driven approach (i) enhances the interpretability of the estimated latent concepts without the need of explicitly generating a set of tags or performing a post-processing step, (ii) improves the prediction performance of SPARFA, and (iii) scales to large test/assessments where human annotation would prove burdensome. We demonstrate the efficacy of the proposed approach on two real educational datasets.

III.1 Introduction

Traditional education typically provides a "one-size-fits-all" learning experience, regardless of the potentially different backgrounds, abilities, and interests of individual learners. Recent advances in machine learning enable the design of computer-based systems that analyze learning data and provide feedback to the individual learner. Such an approach has great potential to revolutionize today's education by offering a high-quality, personalized learning experience to learners on a global scale.

III.1.1 Personalized Learning Systems

Several efforts have been devoted into building statistical models and algorithms for learner data analysis. In [5], we proposed a personalized learning system (PLS) architecture with two main ingredients: (i) learning analytics (analyzing learner interaction data with learning materials and questions to provide personalized feedback) and (ii) content analytics (analyzing and organizing learning materials including questions and text documents). We introduced the SPARse Factor Analysis (SPARFA) framework for learning and content analytics, which decomposes assessments into different knowledge components that we call concepts. SPARFA automatically extracts (i) a question-concept association graph, (ii) learner concept understanding profiles, and (iii) the intrinsic difficulty of each question, solely from graded binary learner responses to a set of questions; see FIG. 3.2 for an example of a graph extracted by SPARFA. This framework enables a PLS to provide personalized feedback to learners on their concept knowledge, while also estimating the question-concept relationships that reveal the structure of the underlying knowledge base of a course. The original SPARFA framework (described in section I) extracts the concept structure of a course from binary-valued question-response data. The latent concepts are "abstract" in the sense that they are estimated from the data rather than dictated by a subject matter expert.

To make the concepts interpretable by instructors and learners, SPARFA performs an ad hoc post-processing step to fuse instructor provided question tags to each estimated concept. Requiring domain experts to label the questions with tags is an obvious limitation to the approach, since such tags are often incomplete or inaccurate and thus provide insufficient or unreliable information. Inspired by the recent success of modern text processing algorithms, such as latent Dirichlet allocation (LDA) [3], we posit that the text associated with each question can potentially reveal the meaning of the estimated latent concepts without the need of instructor-provided question tags. Such a data-driven approach would be advantageous as it would easily scale to domains with thousands of questions. Furthermore, directly incorporating textual information into the SPARFA statistical model could potentially improve the estimation performance of the approach.

III.1.2 Contributions

In this section (i.e., section III), we propose SPARFA-Top, which extends the SPARFA framework of section I to jointly analyze both graded learner responses to questions and the text of the question, response, or feedback. We augment the SPARFA model by statistically modeling the word occurrences associated with the questions as Poisson distributed.

We develop a computationally efficient block-coordinate descent algorithm that, given only binary-valued graded response data and associated text, estimates (i) the question-concept associations, (ii) learner concept knowledge profiles, (iii) the intrinsic difficulty of each question, and (iv) a list of most important keywords associated with each estimated concept. SPARFA-Top is capable of automatically generating a human readable interpretation for each estimated concept in a purely data driven fashion (i.e., no manual labeling of the questions is required), thus enabling a PLS to automatically recommend remedial or enrichment material to learners that have low/high knowledge level on a given concept. Our experiments on real-world educational datasets indicate that SPARFA-Top significantly outperforms both SPARFA and other baseline algorithms for learning and content analytics.

III.2 the Sparfa-Top Model

We start by summarizing the SPARFA framework of section I, and then extend it by modeling word counts extracted from textual information available for each question. We then detail the SPARFATop algorithm, which jointly analyzes binary-valued graded learner responses to questions as well as question text to generate (i) a question-concept association graph and (ii) keywords for each estimated concept.

III.2.1 Sparse Factor Analysis (Sparfa)

SPARFA assumes that graded learner response data consist of N learners answering a subset of Q questions that involve K≪Q, N underlying (latent) concepts. Let the column vector $c_j \in \mathbb{R}^K$, $j \in \{1, \ldots, N\}$, represent the latent concept knowledge of the $j^{th}$ learner, let $w_i \in \mathbb{R}^K$, $i \in \{1, \ldots, Q\}$, represent the associations of question i to each concept, and let the scalar $\mu_i \in \mathbb{R}$ represent the intrinsic difficulty of question i. The student-response relationship is modeled as $$Z_{i,j} = w_i^T c_j + \mu_i, \forall i,j, \quad (1A)$$

$$Y_{i,j} \sim \text{Ber}(\Phi(\tau_{i,j} Z_{i,j})), \quad (1B)$$

$$(i,j) \in \Omega_{obs}, \quad (1C)$$

where $Y_{i,j} \in \{0,1\}$ corresponds to the observed binary-valued graded response variable of the $j^{th}$ learner to the $i^{th}$ question, where 1 and 0 indicate correct and incorrect responses, respectively. Ber(z) designates a Bernoulli distribution with success probability z, and $$\Phi(x) = \frac{1}{1+e^{-x}}$$

denotes the inverse logit link function, which maps a real value to the success probability $z \in [0,1]$. The set $\Omega_{obs}$ contains the indices of the observed entries (i.e., the observed data may be incomplete). The precision parameter $\tau_{i,j}$ models the reliability of the observed binary graded response $Y_{i,j}$. Larger values of $\tau_{i,j}$ indicate higher reliability on the observed graded learner responses, while smaller values indicate lower reliability. The original SPARFA model (i.e., the SPARFA model of section I) corresponds to the special case where $\tau_{i,j} = \tau = 1$. For the sake of simplicity, we will use the same assumption throughout this work. To address the fundamental identifiability issue in factor analysis and to account for real-world educational scenarios, section I imposed specific constraints on the model (1). Concretely, every row $w_i$ of the question-concept association matrix W is assumed to be sparse and non-negative. The sparsity assumption dictates that one expects each question to be related to only a few concepts, which is typical for most education scenarios. The non-negativity assumption characterizes the fact that knowledge of a particular concept does not hurt one's ability of answering a question correctly.

III.2.2 Sparfa-Top: Joint Analysis of Learner Responses and Textual Information

SPARFA (as described in section I) utilizes a post-processing step to link pre-defined tags with the inferred latent concepts. We now introduce a novel approach to jointly consider graded learner response and associated textual information, in order to directly associate keywords with the estimated concepts.

Assume that we observe the word-question occurrence matrix $B \in \mathbb{N}^{Q \times V}$, where V corresponds to the size of the vocabulary, i.e., the number of unique words that have occurred among the Q questions. Each entry $B_{i,j}$ represents how many times the $v^{th}$ word occurs in the associated text of the $i^{th}$ question; as is typical in the topic model literature, common stop words ("the", "and", "in" etc.) are excluded from the vocabulary. The word occurrences in B are modeled as follows:

$$A_{i,v} = w_i^T t_v \text{ and } B_{i,v} \sim \text{Pois}(A_{i,v}), \forall i,v, \quad (2)$$

where $t_v \in \mathbb{R}_+^K$ is a non-negative column vector that characterizes the expression of the $v^{th}$ word in every concept. (Since the Poisson rate $A_{i,v}$ must be strictly positive, we may assume that $A_{i,v} \geq \epsilon$ with $\epsilon$ being a small positive number in all experiments. For example, in some embodiments, $\epsilon = 10^{-6}$.) Inspired by the topic model proposed in [12], the entries of the word-occurrence matrix $B_{i,v}$ in (2) are assumed to be Poisson distributed, with rate parameters $A_{i,v}$.

We emphasize that the models (1) and (2) share the same question-concept association vector, which implies that the relationships between questions and concepts manifested in the learner responses are assumed to be exactly the same as the question-topic relationships expressed as word co-occurrences. Consequently, the question-concept associations generating the question-associated text are also sparse and non-negative, coinciding with the standard assumptions made in the topic model literature [3, 9].

III.3 Sparfa-Top Algorithm

We now develop the SPARFA-Top algorithm by using block multiconvex optimization, to jointly estimate W, C, $\mu$, and $T = [t_1, \ldots, t_V]$ from the observed student-response matrix Y and the word-frequency matrix B. Specifically, we seek to solve the following optimization problem:

$$\underset{W,C,T: W_{i,k} \geq 0 \forall i,k T_{k,v} \geq 0 \forall k,v}{\text{minimize}} \sum_{i,j \in \Omega_{obs}} -\log p(Y_{i,j} \mid w_i^T c_j + \mu_i, \tau) + \quad (3)$$

$$\sum_{i,v} -\log p(B_{i,v} \mid w_i^T t_v) + \lambda \sum_i \|w_i\|_1 + \frac{\gamma}{2} \sum_j \|c_j\|_2^2 + \frac{\eta}{2} \sum_v \|t_v\|_2^2.$$

Here, the probabilities $p(Y_{i,j} \mid w_i^T c_j + \mu_i, \tau)$ and $p(B_{i,v} \mid w_i^T t_v)$ follow the statistical models in (1) and (2), respectively. The $l_1$-norm penalty term $\|w_i\|_1$ induces sparsity on the question-concept matrix W. The $l_2$-norm penalty terms $$\frac{\gamma}{2} \sum_j \|c_j\|_2^2$$

and $$\frac{\eta}{2} \sum_v \|t_v\|_2^2$$

gauge the norms of the matrices C and T. To simplify the notation, the intrinsic difficulty vector $\mu$ is added as an additional column of W and with C augmented with an additional all-ones row.

The optimization problem (3) is block multi-convex, i.e., the subproblem obtained by holding two of the three factors W, C, and T fixed and optimizing for the other is convex. This property inspires us to deploy a block coordinate descent approach to compute an approximate to (3). The SPARFA-Top algorithm starts by initializing W, C, and T with random matrices and then optimizes each of these three factors iteratively until convergence. The subproblems of optimizing over W and C are solved iteratively using algorithms relying on the FISTA framework (see [2] for the details).

The subproblem of optimizing over C with W and T fixed was detailed in section I. The subproblem of optimizing over T with W and C fixed is separable in each column of T, with the problem for $t_v$ being:

$$\underset{t_v: T_{k,v} \geq 0 \forall k}{\text{minimize}} \sum_i -\log p(B_{i,v} \mid w_i^T t_v) + \frac{\eta}{2} \sum_v \|t_v\|_2^2 \quad (4)$$

The gradient of the objective function with respect to $t_v$ is:

$$\nabla_{t_v} \sum_i -\log p(B_{i,v} \mid w_i^T t_v) + \frac{\eta}{2} \sum_v \|t_v\|_2^2 = W^T r + \eta t_v, \quad (5)$$

where r is a Q×1 vector with its $i^{th}$ element being $$r_i = 1 - \frac{B_{i,v}}{w_i^T t_v}.$$

By setting this gradient to zero, we obtain the close form solution $$t_v = (W^T W + \eta I)^{-1} W^T b_v,$$

where $b_v$ denotes the $v^{th}$ column of B.

The subproblem of optimizing over W with C and T fixed is also separable in each row of W. The problem for each $w_i$ is:

$$\min_{w_i: W_{i,k} \geq 0 \forall k} \left\{ \begin{array}{l} Y_{i,j} \mid w_i^T c_j + \mu_i, \tau) + \\ \sum_{i,v} -\log p(B_{i,v} \mid w_i^T t_v) + \\ \lambda \sum_i \|w_i\|_1 \end{array} \right\}, \quad (6)$$

which can be efficiently solved using FISTA. Specifically, analogous to [5, Eq. 5], the gradient of the smooth part of the objective function with respect to $w_i$ corresponds to:

$$\nabla w_i \Sigma_{j:(i,j) \in \Omega_{obs}} -\log p(Y_{i,j} \mid w_i^T c_j + \mu_i, \tau) +$$

$$\Sigma_{i,v} -\log p(B_{i,v} \mid w_i^T t_v) = -C^T(y_i - p) + T^T s, \quad (6)$$

where $y_i$ represents the transpose of the $i^{th}$ row of Y, p represents a N×1 vector with $p_j = 1/(1 + e^{-w_i^T c_j})$ as its $j^{th}$ element, and s is a N×1 vector with $$s_v = 1 - \frac{B_{i,v}}{w_i^T t_v}$$

as its $v^{th}$ element. The projection step is a soft-thresholding operation, as detailed in Eq. 7 of section I. The step-sizes are chosen via back-tracking line search as described in [4].

Note that we treat τ as a fixed parameter. Alternatively, one could estimate this parameter within the algorithm by introducing an additional step that optimizes over τ. A throughout analysis of this approach is left for future work.

III.4 Experiments

We now demonstrate the efficacy of SPARFA-Top on two real-world educational datasets: an $8^{th}$ grade Earth science course dataset provided by STEMscopes [7] and a high-school algebra test dataset administered on Amazon's Mechanical Turk [1], a crowdsourcing marketplace. The STEMscopes dataset consists of 145 learners answering 80 questions, with only 13.5% of the total question/answer pairs being observed. The question-associated text vocabulary consists of 326 words, excluding common stop-words. The algebra test dataset consist of 99 users answering 34 questions, with the question-answer pairs fully observed. We manually assign tags to each question from a set of 13 predefined keywords. The regularization parameters λ, γ and η, together with the precision parameter τ of SPARFA-Top, are selected via cross-validation. In FIG. 3.1, we show the prediction likelihood defined by $$p(Y_{i,j} \mid w_i^T c_j + \mu_i, \tau), (i,j) \in \Omega_{obs}$$

for SPARFA-Top on 20% holdout entries in Y and for varying precision values τ. We see that textual information can slightly improve the prediction performance of SPARFA-Top over SPARFA (which corresponds to τ→∞), for both the STEMscopes dataset and the algebra test dataset. The reason for (albeit slightly) improving the prediction performance is the fact that textual information reveals additional structure underlying a given test/assessment.

FIGS. 3.2A-B and 3.3A-B show the question-concept association graphs along with the recovered intrinsic difficulties, as well as the top three words characterizing each concept. Compared to SPARFA (see section I), we observe that SPARFA-Top is able to relate all questions to concepts, including those questions that were found in section I to be unrelated to any concept. Furthermore, FIGS. 3.2A-B and 3.3A-B demonstrate that SPARFA-Top is capable of automatically generating an interpretable summary of the true meaning of each concept.

III.5 Conclusions

We have introduced the SPARFA-Top framework, which extends the SPARFA of section I by jointly analyzing both the binary-valued graded learner responses to a set of questions and the text associated with each question via a topic model. As our experiments have shown, our purely data driven approach avoids the manual assignment of tags to each question and significantly improves the interpretability of the estimated concepts by automatically associating keywords extracted from question text to each estimated concept.

III.6 References

[1] Amazon Mechanical Turk, http://www.mturk.com/mturk/welcome, September 2012.

[2] A. Beck and M. Teboulle. A fast iterative shrinkage-thresholding algorithm for linear inverse problems. *SIAM J. on Imaging Science*, 2(1):183-202, March 2009.

[3] D. M. Blei, A. Y. Ng, and M. I. Jordan. Latent Dirichlet allocation. *JMLR*, 3:993-1022, January 2003.

[4] S. Boyd and L. Vandenberghe. *Convex Optimization*. Cambridge University Press, 2004.

[5] A. S. Lan, A. E. Waters, C. Studer, and R. G. Baraniuk. Sparse Factor Analysis for Learning and Content Analytics, Submitted on 22 Mar. 2013 (v1), last revised 19 Jul. 2013, http://arxiv.org/abs/1303.5685.

[6] H. Lee, R. Raina, A. Teichman, and A. Ng. Exponential family sparse coding with applications to self-taught learning In *Proc. 21st Intl. Joint Conf. on Artificial Intelligence*, pages 1113-1119, July 2009.

[7] STEMscopes Science Education. http://stemscopes.com, September 2012.

[8] E. Wang, D. Liu, J. Silva, D. Dunson, and L. Carin. Joint analysis of time-evolving binary matrices and associated documents. *Advances in neural information processing systems (NIPS)*, December 2010.

[9] S. Williamson, C. Wang, K. Heller, and D. Blei. The IBP compound Dirichlet process and its application to focused topic modeling process and its application to focused topic modeling. *In Proc. 27th Intl. Conf. on Machine Learning*, pages 1151-1158, June 2010.

[10] Y. Xu and W. Yin. A block coordinate descent method for multiconvex optimization with applications to nonnegative tensor factorization and completion. Technical report, Rice University CAAM, September 2012.

[11] X. X. Zhang and L. Carin. Joint modeling of a matrix with associated text via latent binary features. *Advances in neural information* processing systems (NIPS), December 2012.

[12] J. Zhu and E. P. Xing. Sparse topical coding. In *Proc. 27th Conf. on* Uncertainty in Artificial Intelligence, March 2011.

In one set of embodiments, a method 3.4 for performing joint text-based topic modeling and content-and-learning analytics may include the operations shown in FIG. 3.4. (The method 3.4 may also include any subset of the features, elements and embodiments described above.)

At 3.4.10, a computer system may receive input data including graded response data and word frequency data, where the graded response data includes a set of grades that have been assigned to answers provided by learners in response to a set of questions, where each of the questions is associated with a corresponding set of text, where the word frequency data is related to a vocabulary of words (or, a dictionary of terms) that has been derived from a union of the text sets over the questions, where the word frequency data indicates the frequency of occurrence of each vocabulary word in the text set of each question.

At 3.4.20, the computer system may estimate output data based on the input data, where the output data includes (a) strengths of association between the questions and concepts in a set of K concepts, (b) extents to which the learners have knowledge of the concepts and (c) strengths of association between the vocabulary words and the K concepts, where said estimating includes minimizing an objective with respect to (a), (b) and (c). The objective may includes at least: a negative log likelihood of the graded response data parameterized at least by (a) and (b); a negative log likelihood of the word frequency data parameterized at least by (a) and (c). The computer system may store the output data in a memory.

In one set of embodiments, a method 3.5 for performing joint topic modeling and content-and-learning analytics may include the operations shown in FIG. 3.5. (The method 3.5 may also include any subset of the features, elements and embodiments described above.)

At 3.5.10, a computer system may receive input data that includes graded response data and a word-frequency matrix B, where the graded response data includes a set of grades that have been assigned to answers provided by learners in response to a set of questions, where each of the grades has been selected from an ordered set of P labels, where P is greater than or equal to two, where each of the questions is associated with a corresponding set of text, where the matrix B is related to a vocabulary of words (or, a dictionary of terms) that has been derived from a union of the text sets taken over the questions, where the matrix B includes entries $B_{i,v}$ that indicate the frequency of occurrence of each vocabulary word in the text set of each question.

At 3.5.20, the computer system may compute output data based on the input data using a first statistical model and a second statistical model, where the output data includes at least an estimate of an association matrix W, an estimate of a concept-knowledge matrix C and an estimate of a word-concept matrix T, where the association matrix W includes entries that represent strength of association between each of the questions and each concept of a set of K concepts, where the matrix C includes entries that represent the extent of each learner's knowledge of each concept, where the matrix T includes entries $T_{k,v}$ that represent a strength of association between each vocabulary word and each of the K concepts, where the first statistical model characterizes a statistical relationship between entries $(WC)_{i,j}$ of the product matrix WC and corresponding grades $Y_{i,j}$ of the set of grades, where the second statistical model characterizes a statistical relationship between entries $(WT)_{i,v}$ of the product matrix WT and entries $B_{i,v}$ of the matrix B, where said computing the output data based on the input data includes estimating a minimum of an objective function over a search space defined by the matrix W, the matrix C and the matrix T, subject to conditions including a non-negativity constraint on the entries of the matrix W and the entries of the matrix T, where the objective function includes a combination (e.g., a linear combination or a bilinear combination) of: (a) a negative of a log likelihood of the graded response data parameterized by the matrix W and the matrix C; (b) a negative of a log-likelihood of the entries of the matrix B parameterized by the matrix W and the matrix C; (c) a sparsity-enforcing term involving rows of the matrix W; (d) a first regularizing term involving columns of the matrix C; and (e) a second regularizing term involving columns of the matrix T. The computer system may store the estimated association matrix W and the estimated concept-knowledge matrix C and the estimated word-concept matrix T in a memory.

In some embodiments, the text set for each question includes one or more of: a text of the question itself; a solution text for the question (e.g., a solution text provided by an instructor or an author of the question); feedback text for the question (e.g., feedback provided by the test designers, content experts, education experts, etc.); any documents that are related to the question.

In some embodiments, the method 3.5 may also include displaying a graph (via a display device) based on the estimated matrix T. The graph may include concept nodes, word nodes and links between the words nodes and the concept nodes. The concept nodes correspond to the K concepts. The word nodes correspond to a least a subset of the vocabulary words. Each of the links indicates the strength of association between a respective one of the K concepts and a respective one of the vocabulary words.

In some embodiments, the method 3.5 may also include displaying a table (via a display device) based on the estimated matrix T, where the table displays the K concepts, and for each concept, a corresponding list of one or more of the vocabulary words that are associated with the concept. (For example, a threshold may be applied to select the one or more words that are most strongly associated with each concept. The word list for each concept may be ordered according to strength of word-concept association.)

In some embodiments, the method 3.5 may also include generating the vocabulary from the text sets.

In some embodiments, the action of generating the vocabulary includes excluding from the vocabulary any words in the text sets that occur on a list of stop words.

In some embodiments, one or more of the words in the vocabulary are compound terms, where each compound term includes two or more atomic words. Thus, a vocabulary word might be an atomic word or a compound term. For example, in a Calculus test, the questions might include atomic words such as "derivative", "integral", "limit", and compound terms such as "L'Hopital's Rule", "Chain Rule", "Power Rule".

In some embodiments, the method 3.5 may also include: receiving user input (e.g., from one or more instructors) specifying text to be included in the text set associated with a selected one of the questions (e.g., prior to generation of the vocabulary); and incorporating the specified text into the text set associated with the selected question in response to said user input.

In some embodiments, the method 3.5 may also include adding a new question to the set of questions in response to user input, where said adding the new question includes receiving question text (and, perhaps also solution text) for the new question, and creating a text set for the new question, where the text set includes the question text (and the solution text if provided).

In some embodiments, the method 3.5 may also include displaying a graph based on the estimated matrix W. The graph may include: concept nodes corresponding to the concepts; question nodes corresponding to the questions; and links between at least a subset of the concept nodes and at least a subset of the question nodes, where each of the concept nodes is labeled with a corresponding set of one or more vocabulary words selected based on a corresponding row of the matrix T (e.g., based on entries in the corresponding row that are larger than a given threshold).

In some embodiments, the method 3.5 may also include: (1) receiving user input identifying a word in the vocabulary, where the user input is received from one of the learners (e.g., from a remote computer via the internet or other computer network); (2) selecting a concept corresponding to the identified word based on a corresponding column of the matrix T (e.g., based on the entry in the corresponding column with largest magnitude); and (3) selecting one or more questions based on a column of the matrix W that corresponds to the selected concept (e.g., based on one or entries of the column that exceed a given threshold); and (4) providing (or transmitting) the one or more questions to the learner.

In some embodiments, the method 3.5 may also include computing a vector of weight values for a $j^{th}$ one of the learners, where each of the weight values in said vector represents the extent of the $j^{th}$ learner's knowledge of a category defined by a respective one of the words in the vocabulary. For example, the vector of weight values may be computed by multiplying a transpose of the $j^{th}$ column of the matrix C by a trimmed version of the matrix T. The trimmed version of the matrix T may be generated by keeping only the $n_{trim}$ largest entries in each row of the matrix T. (Recall, each row of the matrix corresponds to respective one of the concepts, and has entries corresponding to the words in the vocabulary.)

In some embodiments, the method 3.5 may also include: selecting one or more words in the vocabulary based on entries in the vector of weight values that are less than a given threshold; and transmitting (or displaying) the selected one or more words to the $j^{th}$ learner (e.g., as an indication of ideas that he/she needs to study further).

In some embodiments, not all the questions have been answered by all the learners. Thus, the input data may include a learner-question (LQ) index set, where the LQ index set indicates, for each of the learners, which of the questions were answered by that learner. In these embodiments, the log likelihood of the graded response data may be restricted based on index pairs (i,j) such that the $j^{th}$ learner answered the $i^{th}$ question, as indicated by the LQ index set.

In some embodiments, the above-described combination (that defines the objective function) is a linear combination. The coefficient of the sparsity enforcing term in the linear combination may be used to control how sparse is the matrix W. The coefficient of the first regularizing term in the linear combination may be used to control an extent of regularization imposed on the columns of the matrix C. The coefficient of the second regularizing term in the linear combination may be used to control an extent of regularization imposed on the columns of the matrix T.

In some embodiments, the number P of labels is two, where, for each question, the output data includes a corresponding estimate of difficulty of the question, where the first statistical model is of the form:

$$Z_{i,j} = (WC)_{i,j} + \mu_i$$

$$Y_{i,j} \sim \text{Ber}(\Phi(\tau_{i,j} Z_{i,j})),$$

where $Z_{i,j}$ represents an ideal real-valued grade for the answer provided by the $j^{th}$ learner to the $i^{th}$ question, where $\mu_i$ represents the difficulty of the $i^{th}$ question, where $\Phi(x)$ represents an inverse link function, where Ber(z) denotes the Bernoulli distribution evaluated at z, where $\tau_{i,j}$ represents a reliability of measurement of the corresponding grade $Y_{i,j}$ of the set of grades. (In some embodiments, all $\tau_{i,j}$ are equal.)

In some embodiments, all $\tau_{i,j}$ are equal to one, and $$Y_{i,j} \sim \text{Ber}(\Phi(Z_{i,j})),$$

where "~" means "is distributed as", in the sense of probability theory and statistics.

In some embodiments, the second statistical model is of the form $B_{i,v} \sim \text{Pois}\{(WT)_{i,v}\}$, where Pois{x} denotes the Poisson distribution evaluated at x.

In some embodiments, the matrix W is augmented with an extra column including the difficulties $\mu_i$, and the matrix C is augmented with an extra row including all ones. The action of estimating the minimum of the objective function may include executing a plurality of outer iterations. Each of the outer iterations may include: (1) estimating a minimum of a first subobjective function over a space defined by the matrix C, where the first subobjective function includes (a) and (d); (2) for each column of the matrix T, estimating a minimum of a corresponding column-related subobjective function over a space defined by that column, subject to a non-negativity constraint on the entries of that column, where the corresponding column-related subobjective function includes a combination of (b) and a regularizing term for the column; and (3) for each row of the matrix W, estimating a minimum of a corresponding row-related subobjective function over a space defined by that row, subject to a non-negativity constraint on the entries of that row, where the corresponding row-related subobjective function includes a combination of (a), (b) and a sparsity-enforcing term for the row.

In some embodiments, for each column of the matrix T, said estimating the minimum of the corresponding column-related subobjective function includes evaluating a closed-form solution for said minimum.

In some embodiments, for each row of the matrix W, said estimating the minimum of the corresponding row-related subobjective function includes performing a plurality of descent-and-shrink (DAS) iterations. Each of the DAS iterations may include: a gradient-descent step on the row-related subobjective function; and a shrinkage step that (i) displaces entries of the row in the negative direction based on a current step size and (ii) applies a thresholding operation to the displaced entries to enforce non-negativity of the displaced entries.

IV. Two Extensions for Sparfa

Summary: In this section, we describe two extensions to the SPARFA framework of section I. The first extension corresponds to an alternative way of imposing low-rankness into the concept understanding matrix C, which has the potential to deliver superior performance than the nuclear norm suggested in section II. The second extension enables one to distinguish concept knowledge from the underlying latent factors; this method is capable of delivering more accurate concept knowledge estimates for new students entering the system, while avoiding to solve the entire SPARFA problem from scratch.

IV.1. Alternative Low-Rank Model: The Max-Norm

In the SPARFA framework of section I, we are interested in solving $$(SPARFA) \begin{cases} \underset{W,C}{\text{minimize}} & -\sum_{i,j \in \Omega_{obs}} \log p(Y_{i,j} \mid \tau w_i^T c_j) + \lambda \sum_i \|w_i\|_1 \\ \text{subject to} & W \geq 0, \tau > 0, \|C\| \leq \eta \end{cases}$$

with $Y_{i,j}$, i, $j \in \Omega_{obs}$ being the observed graded learner responses. In section II, we proposed to use the nuclear norm $\|C\|_* \leq \eta$ in the constraint of (SPARFA) in order to enforce low-rankness in C.

In the collaborative filtering literature, an attractive alternative to the nuclear norm has been introduced in [1, 2]. This alternative has been shown in [3] to outperform the nuclear norm in many practical applications. To leverage the capabilities of this alternative in the SPARFA framework, it is important to realize that low rankness can also be imposed via the max-norm, which is defined as [1,2,3].

$$\|C\|_{max} = \min_{U,V} \{\|U\|_{2,\infty} \|V\|_{2,\infty} : C = UV^T\}.$$

Here, $\|A\|_{2,\infty}$ denotes the maximum $l_2$ row norm of the matrix A given by $$\|A\|_{2,\infty} = \max_j \sqrt{\Sigma_k A_{j,k}^2}.$$

Consequently, in the block coordinate descent method that finds an approximate solution to (SPARFA), we can replace the nuclear norm with the max-norm in order to impose low-rankness into C. More specifically, we leverage the squash method in [3] to efficiently project the outcome of the step optimizing for C onto the max-norm. The resulting algorithm efficiently delivers an approximate solution to (SPARFA), where the general norm constraint $\|C\| \leq \eta$ is replaced by the max-norm constraint $\|C\|_{max} \leq \eta$.

IV.2. Concept Knowledge Vs. Latent Factors

In section II, we directly associate the K concepts of (SPARFA) with pre-defined tags. In many applications, the number of tags can be very large, potentially even larger than the number of questions Q. We therefore impose low-rankness into the concept-knowledge matrix C to reduce the number of degrees-of-freedom in the optimization problem. Let us therefore assume that the number of concepts K is very large (since a large number of tags has been specified, for example), but assume that the effective rank of C is smaller, i.e., R=rank(C)<K.

We can decompose the estimated concept-knowledge matrix C obtained by solving (SPARFA) into its (economy size) singular value decomposition (SVD) according to $C = USV^T$, where U has orthogonal columns and is of dimension K×R, S is diagonal and of dimension R×R, and V has orthogonal columns and is of dimension N×R, where K is the number of concepts, R the rank of C, and N the number of learners. Now assume that a new learner enters the system, and we wish to estimate his K-dimensional concept knowledge vector c*, while avoiding to solve the entire (SPARFA) problem from scratch. A straightforward way would be to solve the following standard (logit or probit) regression problem $$\text{minimize}_{c:\|c\| \leq \eta} - \Sigma_{i \in \Omega_{obs}} \log p(Y_i^* \mid w_i^T c).$$

where $Y_i^*$ are the graded responses provided by the new learner. It is important to realize that this approach ignores the fact that all learners come from a low dimensional linear model (with fewer than K degrees of freedom). With the SVD $C = USV^T$, however, we can incorporate the fact that all learners are assumed to stem from a low-dimensional model, i.e., each student can be fully described by R latent factors only. We therefore propose to solve one of the following (logit or probit) regression problems:

$$\text{minimize}_{v:\|v\| \leq 1} - \Sigma_{i \in \Omega_{obs}} \log p(Y_i^* \mid w_i^T USv). \quad (R1)$$

$$\text{minimize}_{q:\|q\| \leq \eta} - \Sigma_{i \in \Omega_{obs}} \log p(Y_i^* \mid w_i^T Uq). \quad (R2)$$

where the resulting R-dimensional vectors v* and q*, referred to as normalized and unnormalized latent factor vectors, respectively, fully describe the student in question (note that R≤K). With both regression methods, we can extract the concept knowledge vector c* of the student in question by computing either c*=USv* or c*=Uq*, where the matrix U maps R-dimensional latent factor vectors to the K-dimensional concept knowledge domain. This approach takes into account the fact that the concept knowledge vector c* can be described by lower-dimensional concept understanding vectors v* and q*, since the matrix U is tall and skinny, in general (a consequence of the low rank assumption implying K≥R).

In summary, imposing a low-rank model on C enables us to distinguish between concept knowledge and latent factor domains, where the K-dimensional concept knowledge vector c* represents the understanding of each concept and the R-dimensional latent factor vectors v* and q* are abstract latent factor vectors governing the learner's concept knowledge (but do not provide direct interpretability).

IV.3 References

[1] N. Srebro, J. Rennie, and T. Jaakkola, "Maximum margin matrix factorization," in *NIPS*, 2004.

[2] N. Srebro and A. Shraibman, "Rank, trace-norm and max-norm," In 18th Annual Conference on Learning Theory (COLT), June 2005.

[3] J. Lee, B. Recht, R. Salakhutdinov, N. Srebro, and J. A. Tropp, "Practical large-scale optimization for max-norm regularization," in *NIPS*, 2010.

In one set of embodiments, a method 4.1 for determining the latent factor knowledge of a new learner may include the operations shown in FIG. 4.1. (The method 4.1 may also include any subset of the features, elements and embodiments described above.)

At 4.1.10, a computer system may receive input data including a $Q \times N_T$ association matrix W, an $N_T \times N$ concept-knowledge matrix C and graded response data. The matrix W includes entries that represent strength of association between each of Q questions and each of $N_T$ concepts. The matrix C includes entries that represent an extent to which each of N learners has knowledge of each of the $N_T$ concepts. The graded response data includes a set of grades that have been assigned to answers provided by a new learner (i.e., not one of the N learners) in response to the Q questions.

At 4.1.20, the computer system may perform a singular value decomposition on the matrix C to obtain a factorization of the form $C=USV^T$, where U is an $N^T \times R$ matrix whose columns are orthogonal, where S is a R×R diagonal matrix, where V is an N×R matrix whose columns are orthogonal, where R=rank(C).

At 4.1.30, the computer system may compute a latent knowledge vector v* for the new learner by estimating a minimum of an objective function with respect to vector argument v, subject to one or more conditions including a norm constraint on the vector argument v. The entries of the latent knowledge vector v* represent the extent of the new learner's knowledge of each of R latent factors (underlying conceptual categories) implicit in the matrix C. The objective function may include the expression $$\Sigma_{i \in \Omega_{obs}} -\log p(Y_i^* | w_i^T USv),$$

where $\Omega_{obs}$ is an index set indicating which of the Q questions were answered by the new learner, where $Y_i^*$ represents the grade assigned to the $i^{th}$ question answered by the new learner, where $w_i^T$ represents the $i^{th}$ row of the matrix W. The computer system may store the latent knowledge vector v* in a memory.

In some embodiments, the method 4.1 may also include: computing a concept-knowledge vector for the new learner by multiplying the matrix product US by the latent knowledge vector v*; and storing the concept-knowledge vector in the memory.

In some embodiments, the method 4.1 may also include transmitting the latent knowledge vector v* and/or the concept-knowledge vector to the new learner (so he/she will known how well he/she performed on the test comprising the Q questions).

V. Sparse Factor Analysis to Discern User Content Preferences and Content-Concept Associations In one set of embodiments, a method 5.1 for discerning user content preferences and content-concept associations may include the operations shown in FIG. 5.1.

At 5.1.10, a computer system may receive input data that includes response data, where the response data includes a set of preference values that have been assigned to content items by content users.

At 5.1.20, the computer system may compute output data based on the input data using a statistical model, where the output data includes at least an estimate of an association matrix W and an estimate of a concept-preference matrix C, where the association matrix W includes entries that represent strength of association between each of the content items and each of a plurality of concepts, where the matrix C includes entries that represent the extent to which each content user prefers (e.g., has an interest in) each concept, where the statistical model characterizes a statistical relationship between entries $(WC)_{i,j}$ of the product matrix WC and corresponding preference values $Y_{i,j}$ of the set of preference values.

In some embodiments, the content items are content items that have been viewed or accessed or used by the content users.

In some embodiments, the content items are content items that are made available to the content users by an online content provider (For example, the online content provider may maintain a network that provides content items to the content users.)

In some embodiments, the method 5.1 may also include: receiving user input from a content user, where the user input indicates the content user's extent of preference for an identified one of the content items; and updating the response data based on the user input.

In some embodiments, the content items are movies or videos or audiobooks or articles or news items or online educational materials or documents or images or photographs or any combination thereof.

In some embodiments, a column of the estimated matrix C is used to predict content items which the corresponding content user is likely to have an interest in. For example, the computer system may select (from the subset of content items the content user has not already viewed or used or accessed) one or more content items whose corresponding entries in the column have relatively large positive values.

VI. Computer System

FIG. 6.1 illustrates one embodiment of a computer system 600 that may be used to perform any of the method embodiments described herein, or, any combination of the method embodiments described herein, or any subset of any of the method embodiments described herein, or, any combination of such subsets.

Computer system 600 may include a processing unit 610, a system memory 612, a set 615 of one or more storage devices, a communication bus 620, a set 625 of input devices, and a display system 630.

System memory 612 may include a set of semiconductor devices such as RAM devices (and perhaps also a set of ROM devices).

Storage devices 615 may include any of various storage devices such as one or more memory media and/or memory access devices. For example, storage devices 615 may include devices such as a CD/DVD-ROM drive, a hard disk, a magnetic disk drive, magnetic tape drives, etc.

Processing unit 610 is configured to read and execute program instructions, e.g., program instructions stored in system memory 612 and/or on one or more of the storage devices 615. Processing unit 610 may couple to system memory 612 through communication bus 620 (or through a system of interconnected busses, or through a network). The program instructions configure the computer system 600 to implement a method, e.g., any of the method embodiments described herein, or, any combination of the method embodiments described herein, or, any subset of any of the method embodiments described herein, or any combination of such subsets.

Processing unit 610 may include one or more processors (e.g., microprocessors).

One or more users may supply input to the computer system 600 through the input devices 625. Input devices 625 may include devices such as a keyboard, a mouse, a touch-sensitive pad, a touch-sensitive screen, a drawing pad, a track ball, a light pen, a data glove, eye orientation and/or head orientation sensors, one or more proximity sensors, one or more accelerometers, a microphone (or set of microphones), or any combination thereof.

The display system 630 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 600 may include other devices, e.g., devices such as one or more graphics accelerators, one or more speakers, a sound card, a video camera and a video card, a data acquisition system.

In some embodiments, computer system 600 may include one or more communication devices 635, e.g., a network interface card for interfacing with a computer network (e.g., the Internet). As another example, the communication device 635 may include one or more specialized interfaces for communication via any of a variety of established communication standards or protocols.

The computer system may be configured with a software infrastructure including an operating system, and perhaps also, one or more graphics APIs (such as OpenGL®, Direct3D, Java 3D™)

VII. Method for Learning and Content Analytics

In one set of embodiments, a method 7.1 for facilitating personalized learning may include the operations shown in FIG. 7.1. (The method 7.1 may also include any subset of the features, elements and embodiments described above.) The method 7.1 may be implemented by a computer that executes stored program instructions.

At 7.1.10, the computer system receives input data that includes graded response data. The graded response data includes a set of grades that have been assigned to answers provided by learners in response to a set of questions, e.g., questions that have been administered (or posed) to the learners as part of one or more tests. The grades are drawn from a universe of possible grades. Various possibilities for the universe are described further below.

At 7.1.15, the computer system may compute output data based on the input data using a latent factor model, e.g., as variously described above in sections I through VI. The output data may include at least: (1) an association matrix that defines a set of K concepts implicit in the set of questions, where K is smaller than the number of questions in the set of questions, where, for each of the K concepts, the association matrix defines the concept by specifying strengths of association between the concept and the questions; and (2) a learner-knowledge matrix including, for each learner and each of the K concepts, an extent of the learner's knowledge of the concept.

In some embodiments, the computer system may display (or direct the display of) a visual representation of at least a subset of the association strengths in the association matrix and/or at least a subset of the extents in the learner-knowledge matrix, as indicated at 7.1.20. In the context of a client-server based architecture, the computer system may be a server. Thus, the action of displaying the visual representation may involve directing a client computer (e.g., a computer of one of the learners or a computer of an instructor or grader or question author or domain expert) to display the visual representation.

In some embodiments, the action of computing the output data may include: (a) performing a maximum likelihood sparse factor analysis (SPARFA) on the input data using the latent factor model; and/or (b) performing a Bayesian sparse factor analysis on the input data using the latent factor model. Various methods for performing maximum likelihood SPARFA and Bayesian SPARFA are described above in sections I through VI.

In some embodiments, the above-described action of displaying the visual representation may include displaying a graph based on the association matrix. The graph may depict the strengths of association between at least a subset of the questions and at least a subset of the K concepts, e.g., as variously described above. For example, see FIGS. 1.1B, 1.2(a), 1.7(a), 1.9(a), 2.3(a), 2.4(a), 3.2 and 3.3.

In some embodiments, for each question, the above-described output data includes a corresponding estimate of difficulty of the question, and, the action of displaying the graph includes displaying the difficulty estimate for each question. For example, the difficulty estimate for each question may be displayed within or near the corresponding question node, e.g., as a numeric value.

In some embodiments, the graph may indicate the difficulty of each question, e.g., as a color according to some color coding scheme (i.e., mapping of colors to difficulty values), or as a symbol according to some symbol coding scheme, or as an icon according to some icon coding scheme, etc.

In some embodiments, the action of displaying the visual representation includes displaying a bipartite graph that includes: (a) concept nodes corresponding to the concepts; (b) question nodes corresponding to the questions; and (c) links between at least a subset of the concept nodes and at least a subset of the question nodes, where each of the links is displayed in a manner that visually indicates the strength of association between a corresponding one of the concepts and a corresponding one of the questions, e.g., as variously described above.

In some embodiments, for each question, the output data includes a corresponding estimate of difficulty $\mu_i$ of the question. In these embodiments, the method 7.1 may also include modifying the set of questions to form a modified question set, e.g., automatically, or in response to user input (e.g., user input after having displayed the visual representation). The action of modifying the question set may include removing one or more of the questions. In one embodiment, a software program may remove any question that is too easy, e.g., any question whose respective difficulty value $\mu_i$ is less than a given difficulty threshold. In another embodiment, a software program may remove any question that is too difficult, e.g., any question whose respective difficulty value $\mu_i$ is greater than a given difficulty threshold. In yet another embodiment, a software program may remove any question that is not sufficiently strongly associated with any of the concepts as indicated by the association matrix. For example, a question may be removed if the corresponding row of the association matrix has infinity-norm less than a given threshold value. In yet another embodiment, a software program may receive user input from a user (e.g., after having displayed the visual representation), where the user input identifies the one or more questions to be removed.

In some embodiments, the method 7.1 may also include appending one or more additional questions to the set of questions to obtain a modified question set. In one embodiment, the method 7.1 may include receiving user input from a content author, where the user input specifies or identifies one or more additional questions for a particular one of concepts, e.g., a concept that is associated with fewer questions than other ones of the concepts. The action of receiving the user input may occur after having displayed the visual representation.

In some embodiments, the method 7.1 may also include: (a) receiving user input from a content author, e.g., after having displayed the visual representation, where the user input specifies edits to a selected one of the questions (e.g., edits to a question that is too easy or too difficult as indicated by the corresponding difficulty estimate); and (b) editing the selected question as specified by the user input.

In some embodiments, the action of receiving the above-described input data (i.e., the input data of operation 7.1.10) may include receiving the set of grades from one or more remote computers over a network, e.g., from one or more remote computers operated by one or more instructors or graders.

In some embodiments, the method 7.1 may also include receiving the answers from the learners, i.e., the answers to the questions. For example, the computer system of method 7.1 may be a server computer configured to administer the questions to the learners and receive answers from the learners via a computer network such as the Internet. The learners may operate respective client computers in order to access the server.

In some embodiments, the computer system is operated by an Internet-based educational service, e.g., as part of a network of servers that provide educational services to online users.

In some embodiments, the computer system is a portable device, e.g., an e-reader, a tablet computer, a laptop, a portable media player, a mobile phone, a specialized learning computer, etc.

In some embodiments, the above-described output data (i.e., the output data of operation 7.1.15) is useable to select one or more new questions for at least one of the learners. For example, an instructor and/or an automated software algorithm may select one or more new questions for a learner based on an identification of one or more of the K concepts for which the learner-knowledge matrix indicates that the learner has an extent of concept knowledge less than a desired threshold. In some embodiments, the learner may himself/herself select the one or more new questions, e.g., for further testing.

In some embodiments, not all the learners have answered all the questions. The output data is usable to select and/or recommend for a given learner a subset of that learner's unanswered questions for additional testing. For example, if a column of the learner-knowledge matrix, i.e., a column corresponding to a given learner, has one or more concept entries smaller than a given threshold, the computer system may select the subset based on (a) the one or more corresponding columns of the association matrix and (b) information indicating which of the questions were not answered by the learner.

In some embodiments, the method 7.1 may also include displaying one or more new questions via a display device, e.g., in response to a request submitted by the learner.

In some embodiments, the method 7.1 may also include, for a given one of the learners, determining one or more of the concepts that are not sufficiently understood by the learner based on a corresponding column of the learner-knowledge matrix, and selecting educational content material for the learner based on said one or more determined concepts. Entries in the column that are smaller than a given threshold indicate insufficient understanding of the corresponding concepts.

In some embodiments, the method 7.1 may also include transmitting a message (e.g., an email message or instant message or voicemail message) to the given learner indicating the selected educational content material.

In some embodiments, the method 7.1 may also include transmitting a message to a given one of the learners, where the message contains the values (or, a visual or audible representation of the values) of entries in a selected column of the knowledge matrix, i.e., the column that corresponds to the given learner.

In some embodiments, the method 7.1 may also include, for a given one of the learners, determining one or more of the concepts that are not sufficiently understood by the learner based on a corresponding column of the knowledge matrix, and selecting one or more additional questions (e.g., easier questions, or questions explaining the one or more concepts in a different way, or questions with more provided context, or questions posed for a different user modality preference—graphical, verbal, mathematical proof, auditory) for the learner based on said one or more determined concepts.

In some embodiments, the method 7.1 may also include transmitting a message to the given learner indicating the selected one or more additional questions.

Binary-Valued SPARFA

In some embodiments, the universe of possible grades consists of two elements (e.g., {TRUE, FALSE}, {VALID, INVALID}, {GOOD JOB, KEEP STUDYING}). For each question, the output data may include a corresponding estimate of difficulty of the question. The latent factor model characterizes a statistical relationship between $(WC)_{i,j}+\mu_i$ and a corresponding grade $Y_{i,j}$ of the set of grades, where $\mu_i$ represents the difficulty of the $i^{th}$ question, where $(WC)_{i,j}$ denotes the $(i,j)^{th}$ entry of the product matrix WC. Furthermore, W is the association matrix, C is the knowledge matrix, i is a question index, and j is a learner index.

In some embodiments, the latent factor model is of the form:

$$Z_{i,j}=(WC)_{i,j}+\mu_i$$

$$Y_{i,j}\sim Ber(\Phi(Z_{i,j})),$$

where Ber(z) represents the Bernoulli distribution with success probability z, where $\Phi(z)$ denotes an inverse link function that maps a real value z to the success probability of a binary random variable.

In some embodiments, the function $\Phi$ is an inverse logit function or an inverse probit function.

Binary-Valued SPARFA-M (Max Likelihood Approach)

In some embodiments, the association matrix W is augmented with an extra column including the difficulties $\mu_i$, and the knowledge matrix C is augmented with an extra row including all ones. The action of computing the output data based on the input data includes estimating a minimum of an objective function over a space defined by the matrices W and C subject to the condition that the entries of the association matrix W are non-negative. The objective function may include a combination (e.g., a linear combination or a bilinear combination) of: (a) the negative of a log likelihood of the graded response data parameterized by the matrix W and the matrix C; (b) a sparsity-enforcing term involving the rows of the matrix W; (c) a W-regularizing term involving the rows of the matrix W; and (d) for each of the columns of the matrix C, a column-regularizing term involving a norm of the column.

In some embodiments, the association matrix W is augmented with an extra column including the difficulties $\mu_i$, and the knowledge matrix C is augmented with an extra row including all ones, and the action of computing the output data based on the input data includes estimating a minimum of an objective function over a space defined by the matrices W and C subject to the condition that the entries of the association matrix W are non-negative, where the objective function includes a combination (e.g., a linear combination or a bilinear combination) of: (a) the negative of a log likelihood of the graded response data parameterized by the matrix W and the matrix C; (b) a sparsity-enforcing term involving the rows of the matrix W; (c) a W-regularizing term involving the rows of the matrix W; and (d*) a C-regularizing term involving a norm of the matrix C.

In some embodiments, the action of estimating the minimum of the objective function includes executing a plurality of outer iterations. Each of the outer iterations may include: (1) for each row of the matrix W, estimating a minimum of a corresponding row-related subobjective function over a space defined by that row, subject to the condition that entries within the row are non-negative, where the corresponding row-related subobjective function includes said negative of the log likelihood, a sparsity-enforcing term for that row and a regularizing term for that row; and (2) for each column of the matrix C, estimating a minimum of a corresponding column-related subobjective function over a space defined by that column, where the corresponding column-related subobjective function includes said negative of the log likelihood and a regularizing term for the column.

In some embodiments, the method 7.1 may also include, for an $i^{th}$ one of the questions that was not answered by the $j^{th}$ learner, predicting a probability that the $j^{th}$ learner would achieve a grade of correct if he/she had answered the $i^{th}$ question, where said predicting includes: (a) computing a dot product between the $i^{th}$ row of the estimated matrix W and the $j^{th}$ column of the estimated matrix C; (b) adding the computed dot product to the estimated difficulty $\mu_i$ of the $i^{th}$ question to obtain a sum value; and (c) evaluating the inverse link function on the sum value.

Binary-Valued SPARFA-B (Bayesian Approach)

In some embodiments, the action of computing the output data based on the input data includes executing a plurality of Monte Carlo iterations to determine posterior distributions for the entries of the matrix W, the columns of the matrix C and the difficulty values $\mu_i$ assuming prior distributions on the entries of the matrix W, the columns of the matrix C and the difficulty values $\mu_i$, e.g., as variously described above.

In some embodiments, the method 7.1 may also include computing expected values (i.e., averages) of the posterior distributions to obtain the estimate for the matrix W and the estimate for the matrix C as well as an estimate for the difficulty values.

In some embodiments, each of said Monte Carlo iterations includes: for each index pair (i,j) where the $j^{th}$ learner did not answer the $i^{th}$ question, drawing a sample grade $Y_{i,j}(k)$ according to the distribution $$\text{Ber}(\Phi(W_i C_j + \mu_i)),$$

where k is an iteration index, where $W_i$ is a current estimate for the $i^{th}$ row of the matrix W, where $C_j$ is a current estimate for the $j^{th}$ column of the matrix C. The set $\{Y_{i,j}(k)\}$ of samples represents a probability distribution of the grade that would be achieved by the $j^{th}$ learner if he/she were to answer the $i^{th}$ question.

In some embodiments, the method 7.1 may also include computing a probability that the $j^{th}$ learner would achieve a correct grade on the $i^{th}$ question based on the set $\{Y_{i,j}(k)\}$ of samples. The computed probability may be displayed to the $j^{th}$ learner (e.g., in response to a request from that learner), and/or, displayed to an instructor (e.g., in response to a request from the instructor).

In some embodiments, each of said Monte Carlo iterations includes the following operations. (1) For each index pair (i,j) where the $j^{th}$ learner did not answer the $i^{th}$ question, draw a grade value $Y_{i,j}$ according to the probability distribution parameterized by $\text{Ber}(\Phi(W_i C_j + \mu_i))$, where k is an iteration index, where $W_i$ is a current estimate for the $i^{th}$ row of the matrix W, where $C_j$ is a current estimate for the $i^{th}$ column of the matrix C. (2) For each index pair (i,j) in a global set corresponding to all possible question-learner pairs, compute a value for variable $Z_{i,j}$ using a corresponding distribution whose mean is $(WC)_{i,j} + \mu_i$ and whose variance is a predetermined constant value, and truncate the value $Z_{i,j}$ based on the corresponding grade value $Y_{i,j}$. (3) Compute a sample for each of said posterior distributions using the grade values $\{Y_{i,j}:(i,j)$ in the global set$\}$.

Ordinal SPARFA

In some embodiments, the universe of possible grades is an ordered set of P labels, e.g., a set of integers, a set of non-negative integers, a set of rational numbers, a set of real numbers. P is greater than or equal to two. For each question, the output data may include a corresponding estimate of difficulty of the question, where the latent factor model characterizes a statistical relationship between $(WC)_{i,j} + \mu_i$ and a corresponding grade $Y_{i,j}$ of the set of grades, where $\mu_i$ represents the difficulty of the $i^{th}$ question, where $(WC)_{i,j}$ denotes the $(i,j)^{th}$ entry of the product matrix WC. Furthermore, W is the association matrix, where C is the learner-knowledge matrix, i is a question index, and j is a learner index.

In some embodiments, the number of grades P is greater than two. In some embodiments, the universe of possible grades corresponds to the set (or range) of values attainable by a floating point variable or integer variable or digital word in some programming language.

In some embodiments, the latent factor model is of the form:

$$Z_{i,j} = (WC)_{i,j} + \mu_i$$

$$Y_{i,j} = g(Z_{i,j} + \epsilon_{i,j}),$$

where $Z_{i,j}$ represents an ideal real-valued grade for the answer provided by the $j^{th}$ learner to the $i^{th}$ question, where $\epsilon_{i,j}$ represents random measurement noise or uncertainty in measurement, where g is a quantizer function that maps from the real line into the set of labels.

Ordinal SPARFA-M (Maximum Likelihood Approach)

In some embodiments, the matrix W is augmented with an extra column including the difficulties $\mu_i$, and the matrix C is augmented with an extra row including all ones. In these embodiments, the action of computing the output data based on the input data may include estimating a minimum of an objective function over a space defined by the matrix W, the matrix C and the reliabilities $\{\tau_{i,j}\}$, subject to constraints including a non-negativity constraint on the entries of matrix W, a positivity constraint on the reliabilities $\{\tau_{i,j}\}$, and one or more norm constraints on the matrix C. The objective function may include a combination (e.g., a linear combination or a bilinear combination) of: (1) the negative of a log likelihood of the graded response data parameterized by the matrix W, the matrix C and the reliabilities $\{\tau_{i,j}\}$ and (2) a sparsity-enforcing term involving the rows of the matrix W.

In some embodiments, the action of estimating the minimum of the objective function includes executing a plurality of outer iterations. Each of the outer iterations may include the following operations. (1) For each row of the matrix W, estimate a minimum of a corresponding row-related subobjective function over a space defined by that row, subject to the condition that entries within the row are non-negative, where the corresponding row-related subobjective function includes said negative of the log likelihood and a sparsity-enforcing term for that row. (2) Estimate a minimum of a C-related subobjective function over a space defined by that the matrix C, subject to the one or more norm constraints on the matrix C, where the C-related subobjective function includes said negative of the log likelihood. (3) Estimate a minimum of said negative of the log likelihood over the space defined by the reliabilities $\{\tau_{i,j}\}$ subject to the positivity constraint on the reliabilities $\{\tau_{i,j}\}$.

In some embodiments, for each row of the matrix W, the action of estimating the minimum of the corresponding row-related subobjective function includes performing a plurality of descent-and-shrink (DAS) iterations. Each of the DAS iterations may include: a gradient-descent step on a function f defined by said negative of the log likelihood; and a shrinkage step that (a) displaces entries of the row in the negative direction based on a current step size and (b) applies a thresholding operation to the displaced entries to enforce non-negativity of the displaced entries.

In some embodiments, the action of estimating the minimum of the C-related subobjective function includes performing a plurality of descent-and-shrink (DAS) iterations. Each of the DAS iterations may include: a gradient-descent step on a function f defined by said negative of the log likelihood; and a shrinkage step that scales the matrix C so that it has a matrix norm equal to η if its matrix norm is not already less than or equal to η, where η is a predetermined positive value. The matrix norm may be, e.g., a Frobenius norm or a nuclear norm.

In some embodiments, the method 7.1 may also include, for an $i^{th}$ one of the questions that was not answered by the $j^{th}$ learner, predicting a probability that the $j^{th}$ learner would achieve any grade in the set of P labels if he/she had answered the $i^{th}$ question. The action of predicting may include: (a) computing a dot product between the $i^{th}$ row of the estimated matrix W and the $j^{th}$ column of the estimated matrix C; (b) adding the computed dot product to the estimated difficulty $\mu_i$ of the $i^{th}$ question to obtain a sum value; and (c) evaluating an inverse link function that corresponds to the quantizer function g on the sum value.

In some embodiments, the method 7.1 may also include, predicting the expected grade that the $j^{th}$ learner would achieve if he/she had answered the $i^{th}$ question, where the predicted grade is determined by taking the expectation (i.e., computing the average) of the predicted grade distribution over the P labels.

In some embodiments, the matrix W is augmented with an extra column including the difficulties $\mu_i$, where the matrix C is augmented with an extra row including all ones, where said computing the output data based on the input data includes estimating a minimum of an objective function over a space defined by the matrix W and the matrix C, subject to constraints including a non-negativity constraint on the entries of matrix W, and one or more norm constraints on the matrix C, where the objective function includes a combination (e.g., a linear combination or a bilinear combination) of: the negative of a log likelihood of the graded response data parameterized by the matrix W and the matrix C; and a sparsity-enforcing term involving the rows of the matrix W.

In some embodiments, the set of grades does not include a grade for every possible learner-question pair. (Some of the learners may leave some of the questions unanswered.) Thus, the input data may include an index set identifying each learner-question pair for which there is a corresponding grade in the set of grades. The action of computing the output data may be limited to the set of grades using the index set.

In some embodiments, the universe of possible grades includes two or more elements that represent corresponding grade categories.

In some embodiments, the universe of possible grades includes arbitrary text string up to a maximum string length.

In some embodiments, the input data also includes the answers provided by the learners.

In various embodiments, one or more of the following features may be implemented: (a) the questions include multiple choice questions, and, the answers include answers to the multiple choice questions; (b) the answers include drawings (e.g., graphs or circuit diagrams or paintings or architectural drawings, etc.) produced by the learners in response to the questions; (c) the answers includes text (e.g., short written answers or essays) produced by the learners in response to the questions; (d) the answers include video files and/or photographs produced and/or modified by the learners in response to the questions.

Tag Post-Processing

In some embodiments, the method 7.1 may also include the following operations. (1) Receive additional input data that includes a collection of M tags (e.g., character strings) and information specifying a Q×M matrix T, where Q is the number of questions in the set of questions, where, for each question in the set of Q questions, a corresponding subset of the M tags have been assigned to the question (e.g., by instructors, content domain experts, authors of the questions, crowd sourcing, etc.), where for each question in the set of Q questions, the matrix T identifies the corresponding subset of the M tags, where the association matrix W includes entries that represent the strength of association between each of the Q questions and each concept in the set of K concepts. (2) Compute an estimate of an M×K matrix A, where entries of the matrix A represent strength of association between each of the M tags and each of the K concepts.

In some embodiments, the M tags are character strings that have been defined by one or more users. Each of the M tags may represent a corresponding idea or principle. For example, the tags may represent ideas that are relevant to the content domain for which the questions have been designed.

In some embodiments, the method 7.1 may also include displaying a bipartite graph based on the estimated matrix A. The bipartite graph may include tag nodes and concept nodes and links between at least a subset of the tag nodes and at least a subset of the concept nodes. The tag nodes represent the M tags, and the concept nodes represent the K concepts. The bipartite graph of this paragraph may be interpreted as an example of the visual representation displayed in operation 7.1.20 of FIG. 7.1.

In some embodiments, the method 7.1 may also include one or more of the following: receiving user input from one or more users (e.g., via the Internet or other computer network) that defines the collection of M tags, e.g., as character strings; and receiving user input from one or more users (e.g., via the Internet or other computer network) that assigns one or more tags from the collection of M tags to a currently-identified one of the Q questions.

In some embodiments, for each column $a_k$ of the matrix A, the action of computing the estimate of the matrix A includes estimating a minimum of a corresponding objective function subject to a constraint that the entries in the column $a_k$ are non-negative, where the objective function comprises a combination of: (a) a first term that forces a distance between the matrix-vector product $Ta_k$ and the corresponding column $w_k$ of the association matrix W to be small; and (b) a second term that enforces sparsity on the column $a_k$. The matrix A may be stored in memory.

In some embodiments, for at least one of the rows $a_k$ of the matrix A, the corresponding objective function is a linear combination of the first term and the second term. The first term may be the squared two-norm of the difference $w_k - Ta_k$, and the second term may be the one-norm of the column $a_k$.

In some embodiments, for each row $a_k$ of the matrix A, the action of estimating the minimum of the corresponding objective function subject to the non-negativity constraint includes performing a plurality of iterations. Each of the iterations may include: performing a gradient descent step with respect to the first term; and performing a projection step with respect to the second term and subject to the non-negativity constraint.

In some embodiments, the method 7.1 may also include, for each of the K concepts, analyzing the corresponding column $a_k$ of the matrix A to determine a corresponding subset of the M tags that are strongly associated with the concept. Furthermore, the method 7.1 may also include, for one or more of the K concepts, displaying the one or more corresponding subsets of tags.

In some embodiments, the method 7.1 may also include multiplying the estimated matrix A by the learner-knowledge matrix C to obtain product matrix U=AC, where each entry $U_{m,j}$ of the product matrix U represents the extent of the $j^{th}$ learner's knowledge of the category defined by the $m^{th}$ tag. The product matrix U may be stored in memory, e.g., for further processing.

In some embodiments, the method 7.1 also includes transmitting a column $U_j$ (or a subset of the column) of the product matrix U to a remote computer operated by the $j^{th}$ learner, thereby informing the $j^{th}$ learner of his/her extent of knowledge of each of the M tags.

In some embodiments, the method 7.1 also includes: operating on row $U_m$ of the product matrix U to compute a measure of how well the learners understood the category defined by the $m^{th}$ tag, e.g., by averaging the entries in the row $U_m$; and storing the measure in a memory medium. The method 7.1 may also include one or more of the following: transmitting the measure to a remote computer (e.g., a computer operated by an instructor) in response to a request from the remote computer; and displaying the measure via a display device.

In some embodiments, the method 7.1 may also include operating on rows of the product matrix U to compute corresponding measures of how well the N learners as a whole understood the categories defined by the respective tags of the collection of M tags. The computed measures may be stored in a memory medium.

In some embodiments, the method 7.1 may also include selecting future instructional content for at least a subset of the N learners based on the computed measures, e.g., based on the one or more tags whose computed measures are less than a given threshold.

In some embodiments, the above-described input data may also include a set of $N_T$ tags and tag assignment information, where $N_T$ is greater than or equal to K. The tag assignment information indicates, for each of the questions, which of the $N_T$ tags have been assigned to that question. The action of operating on the input data may include performing a maximum-likelihood-based factor analysis using an objective function. The objective function may include a term involving a restriction of the association matrix W, where the restriction is specified by the tag association information.

Ordinal SPARFA-Tag (with Number of Labels P≥2)

In some embodiments, each of the grades has been selected from an ordered set of P labels, where P is greater than or equal to two. Furthermore, the input data may also include a collection of tags and a question-tag (QT) index set, where the QT index set indicates, for each of the questions, which of the tags have been assigned to that question. The latent factor model may characterize a statistical relationship between entries $(WC)_{i,j}$ of the product matrix WC and corresponding grades $Y_{i,j}$ of the set of grades, where i is a question index, j is a learner index, W is the association matrix, and C is the learner-knowledge matrix.

In some embodiments, the number $N_T$ of tags in the collection of tags is equal to the number of concepts K.

In some embodiments, the action of computing the output data based on the input data includes estimating a minimum of an objective function over a search space including a first subspace defined by the association matrix W and a second subspace defined by the knowledge matrix C, subject to conditions including a non-negativity constraint on the entries of the association matrix W and one or more norm constraints on the knowledge matrix C. The objective function may include a combination (e.g., a linear combination or a bilinear combination) of: (1) a negative of a log likelihood of the graded response data parameterized by the association matrix W and the knowledge matrix C; (2) a sparsity-enforcing term involving restrictions of rows of the association matrix W to entries specified by a complement of the QT index set; (3) a regularizing term involving restrictions of rows of the association matrix W to entries specified by the QT index set.

In some embodiments, the number of tags $N_T$ equals the rank of the learner-knowledge matrix C. In other embodiments, the number of tags $N_T$ is greater than the rank of the knowledge matrix C.

In some embodiments, not all the questions have been answered by all the learners. Thus, the input data may also include a learner-question (LQ) index set, where the LQ index set indicates, for each of the learners, which of the questions were answered by that learner. The log likelihood may be restricted to index pairs (i,j) such that the $j^{th}$ learner answered the $i^{th}$ question, as indicated by the LQ index set.

In some embodiments, the above-described combination comprises a linear combination of the negative log likelihood, the sparsity enforcing term and the regularizing term, where a coefficient of the sparsity enforcing term in the linear combination is used to control an extent to which the method is able to learn new question-concept relationships not indicated (or implied) by the QT index set.

In some embodiments, for each question, the output data may include a corresponding estimate of difficulty of the question, where the latent factor model is of the form:

$$Z_{i,j} = (WC)_{i,j} + \mu_i$$

$$Y_{i,j} = g(Z_{i,j} + \epsilon_{i,j}),$$

where $Z_{i,j}$ represents an ideal real-valued grade for the answer provided by the $j^{th}$ learner to the $i^{th}$ question, where $\epsilon_{i,j}$ represents random measurement noise or uncertainty in measurement, where g is a quantizer function that maps from the real number line into the set of labels, where $\mu_i$ represents the difficulty of the $i^{th}$ question.

In some embodiments, the noise $\epsilon_{i,j}$ is modeled by a random variable with zero mean and variance equal to $1/\tau_{i,j}$, where $\tau_{i,j}$ represents reliability of observation of the answer provided by the $j^{th}$ learner to the $i^{th}$ question, where the log likelihood of the graded response data is also parameterized by the reliabilities, where the search space also includes a third subspace corresponding to the reliabilities, where the constraints also include a positivity constraint on the reliabilities $\{\tau_{i,j}\}$. In one embodiment, all of the reliabilities $\tau_{i,j}$ are equal.

Ordinal SPARFA-Tag M (Max Likelihood Approach)

In some embodiments, the association matrix W is augmented with an extra column including the difficulties $\mu_i$, and the knowledge matrix C is augmented with an extra row including all ones. Furthermore, the action of estimating the minimum of the objective function may include executing a plurality of outer iterations. Each of the outer iterations may include: (1) for each row of the association matrix W, estimating a minimum of a corresponding first row-related subobjective function over a space defined by a first restriction vector, which is a restriction of the row to entries selected by the complement of the QT index set, where the corresponding first row-related subobjective function includes said negative of the log likelihood and a sparsity-enforcing term for that first restriction vector; and (2) for each row of the matrix W, estimating a minimum of a corresponding second row-related subobjective function over a space defined by a second restriction vector, which is a restriction of the row to entries selected by the QT index set, where the corresponding second row-related subobjective function includes said negative of the log likelihood and a regularizing-term for that second restriction vector.

In some embodiments, each outer iteration may also include: (3) estimating a minimum of a C-related subobjective function over the second subspace defined by the knowledge matrix C, subject to the one or more norm constraints on the knowledge matrix C, where the C-related subobjective function includes said negative of the log likelihood; and (4) estimating a minimum of said negative of the log likelihood over the third space defined by the reliabilities $\{\tau_{i,j}\}$, subject to the positivity constraint on the reliabilities $\{\tau_{i,j}\}$.

Joint Analysis of Learner Responses and Text Information

In some embodiments, the input data also includes word frequency data, where each of the questions is associated with a corresponding set of text. The word frequency data is related to a vocabulary of words (or, a dictionary of terms) that has been derived, e.g., from a union of the text sets over the questions. The word frequency data indicates the frequency of occurrence of each vocabulary word in the text set of each question. In these embodiments, the output data may also include a word-concept matrix T comprising strengths of association between the vocabulary words and the K concepts. The action of computing the output data may include minimizing an objective with respect to the association matrix W, the knowledge matrix C and the word-concept matrix T. The objective may include at least: a negative log likelihood of the graded response data parameterized at least by the association matrix and the knowledge matrix; and a negative log likelihood of the word frequency data parameterized at least by the association matrix and the word-concept matrix T. The output data may be stored in memory, e.g., for further processing.

In some embodiments, the input data also includes a word-frequency matrix B, and the universe of possible grades is an ordered set of P labels, where P is greater than or equal to two. Furthermore, each of the questions may be associated with a corresponding set of text, where the matrix B is related to a vocabulary of words (or, a dictionary of terms) that has been derived from a union of the text sets taken over the questions. The matrix B includes entries $B_{i,v}$ that indicate the frequency of occurrence of each vocabulary word in the text set of each question. The action of computing the output data based on the input data may use a second latent factor model in addition to the first latent factor model described above (in operation 7.1.15). The output data may also include a word-concept matrix T, where the matrix T includes entries $T_{k,v}$ that represent a strength of association between each vocabulary word and each of the K concepts. The first latent factor model characterizes a statistical relationship between entries $(WC)_{i,j}$ of the product matrix WC and corresponding grades $Y_{i,j}$ of the set of grades, where W is the association matrix, where C is the knowledge matrix, where i is a question index, where j is a learner index. The second latent factor model characterizes a statistical relationship between entries $(WT)_{i,v}$ of the product matrix WT and entries $B_{i,v}$ of the matrix B.

In some embodiments, the text set for each question includes one or more of the following: a text of the question; a solution text for the question (e.g., a solution text provided by an instructor or an author of the question); feedback text for the question (i.e., feedback text for one or more of the learners, e.g., feedback provided by the test designers, content experts, education experts, etc.); one or more documents that are related to the question.

In some embodiments, the method 7.1 may also include displaying one or more of the following using a display device: (1) a graph based on the matrix T, where the graph includes concept nodes, word nodes, and links between the words nodes and the concept nodes, where the concept nodes correspond to the K concepts, where the word nodes correspond to a least a subset of the vocabulary words, where each of the links indicates the strength of association between a respective one of the K concepts and a respective one of the vocabulary words; and (2) a table based on the estimated matrix T, where the table displays the K concepts, and for each concept, a corresponding list of one or more of the vocabulary words that are associated with the concept. (For example, a threshold may be applied to select the one or more words that are most strongly associated with each concept. The word list for each concept may be ordered according to strength of word-concept association.)

In some embodiments, the method 7.1 may also include generating the vocabulary from the text sets. The action of generating the vocabulary may involve excluding from the vocabulary any words in the text sets that occur on a list of stop words.

In some embodiments, one or more of the words in the vocabulary are compound terms, where each compound term includes two or more atomic words.

In some embodiments, the method 7.1 may also include: receiving user input (e.g., from one or more instructors) specifying text to be included in the text set associated with a selected one of the questions (e.g., prior to generation of the vocabulary); and incorporating the specified text into the text set associated with the selected question in response to said user input.

In some embodiments, the method 7.1 may also include adding a new question to the set of questions in response to user input, where the action of adding the new question includes: receiving question text (and, perhaps also solution text) for the new question, and creating a text set for the new question, where the text set includes the question text (and perhaps also the solution text, if provided).

In some embodiments, the action of displaying the visual representation of 7.1.20 includes displaying a graph based on the estimated matrix W. The graph may include: (a) concept nodes corresponding to the concepts; (b) question nodes corresponding to the questions; and (c) links between at least a subset of the concept nodes and at least a subset of the question nodes, where each of the concept nodes is labeled with a corresponding subset of one or more vocabulary words selected based on a corresponding row of the matrix T (e.g., based on entries in the corresponding row that are larger than a given threshold).

In some embodiments, the method 7.1 may also include: (1) receiving user input identifying a word in the vocabulary, where the user input is received from one of the learners (e.g., from a remote computer via the internet or other computer network); (2) selecting a concept corresponding to the identified word based on a corresponding column of the matrix T (e.g., based on the entry in the corresponding column with largest magnitude); (3) selecting one or more questions based on a column of the association matrix W that corresponds to the selected concept (e.g., based on one or entries of the column that exceed a given threshold); and (4) providing (or transmitting) the one or more questions to the learner.

In some embodiments, the method 7.1 may also include computing a vector of weight values for a $j^{th}$ one of the learners, where each of the weight values in said vector represents the extent of the $j^{th}$ learner's knowledge of a category defined by a respective one of the words in the vocabulary. For example, the vector of weight values may be computed by multiplying a transpose of the $j^{th}$ column of the matrix C by a trimmed version of the matrix T. The trimmed version of the matrix T may be generated by keeping only the $n_{trim}$ largest entries in each row of the matrix T. (Recall, each row of the matrix corresponds to respective one of the concepts, and has entries corresponding to the words in the vocabulary.) The number $n_{trim}$ is less than (e.g., small compared to) the number of words in the vocabulary.

In some embodiments, the method 7.1 may also include: selecting one or more words in the vocabulary based on entries in the vector of weight values that are less than a given threshold; and transmitting (or displaying) the selected one or more words to the $j^{th}$ learner (e.g., as an indication of ideas that he/she needs to study further).

In some embodiments, not all the questions have been answered by all the learners. Thus, the input data may also include a learner-question (LQ) index set, where the LQ index set indicates, for each of the learners, which of the questions were answered by that learner. Furthermore, the log likelihood of the graded response data may be restricted based on index pairs (i,j) such that the $j^{th}$ learner answered the $i^{th}$ question, as indicated by the LQ index set.

In some embodiments, the action of computing the output data based on the input data includes estimating a minimum of an objective function over a search space defined by the association matrix W, the knowledge matrix C and the matrix T, subject to conditions including a non-negativity constraint on the entries of the association matrix W and the entries of the matrix T. The objective function may include a combination (e.g., a linear combination or a bilinear combination) of: (a) a negative of a log likelihood of the graded response data parameterized by the matrix W and the matrix C; (b) a negative of a log-likelihood of the entries of the matrix B parameterized by the matrix W and the matrix C; (c) a sparsity-enforcing term involving rows of the matrix W; (d) a first regularizing term involving columns of the matrix C; and (e) a second regularizing term involving columns of the matrix T. The estimated association matrix W and the estimated concept-knowledge matrix C and the estimated word-concept matrix T may be stored in memory, e.g., for further processing.

In some embodiments, the above-described combination is a linear combination, where a coefficient of the sparsity enforcing term in the linear combination is used to control how sparse is the matrix W, where a coefficient of the first regularizing term in the linear combination is used to control an extent of regularization imposed on the columns of the matrix C, where a coefficient of the second regularizing term in the linear combination is used to control an extent of regularization imposed on the columns of the matrix T.

In some embodiments, the number P of labels is two, and, for each question, the output data includes a corresponding estimate of difficulty of the question. The first latent factor model may be of the form:

$$Z_{i,j}=(WC)_{i,j}+\mu_i$$

$$Y_{i,j} \sim Ber(\Phi(\tau_{i,j}Z_{i,j})),$$

where $Z_{i,j}$ represents an ideal real-valued grade for the answer provided by the $j^{th}$ learner to the $i^{th}$ question, where $\mu_i$ represents the difficulty of the $i^{th}$ question, where $\Phi(x)$ represents an inverse link function, where Ber(z) denotes the Bernoulli distribution evaluated at z, where $\tau_{i,j}$ represents a reliability of measurement of the corresponding grade $Y_{i,j}$ of the set of grades. In some embodiments, all $\tau_{i,j}$ are equal.

In some embodiments, the second latent factor model is of the form: $B_{i,v} \sim Pois\{(WT)_{i,v}\}$, where Pois{x} denotes the Poisson distribution evaluated at x.

In some embodiments, the matrix W is augmented with an extra column including the difficulties $\mu_i$, and the matrix C is augmented with an extra row including all ones. The action of estimating the minimum of the objective function may include executing a plurality of outer iterations. Each of the outer iterations may include: (1) estimating a minimum of a first subobjective function over a space defined by the matrix C, where the first subobjective function includes (a) and (d); (2) for each column of the matrix T, estimating a minimum of a corresponding column-related subobjective function over a space defined by that column, subject to a non-negativity constraint on the entries of that column, where the corresponding column-related subobjective function includes a combination of (b) and a regularizing term for the column; (3) for each row of the matrix W, estimating a minimum of a corresponding row-related subobjective function over a space defined by that row, subject to a non-negativity constraint on the entries of that row, where the corresponding row-related subobjective function includes a combination of (a), (b) and a sparsity-enforcing term for the row.

Computation of Latent-Factor Knowledge for New Learner (i.e., after the Association Matrix W and Concept-Knowledge Matrix C Have been Determined).

In some embodiments, the input data also includes a second set of grades that have been assigned to answers provided by a new learner (i.e., not a member of the original set of learners) in response to the questions. In these embodiments, the method 7.1 may also include: (1) performing a singular value decomposition on the knowledge matrix C to obtain a factorization of the form $C=USV^T$, where U is an matrix whose columns are orthogonal, where S is an R×R diagonal matrix, where V is a matrix whose columns are orthogonal, where R=rank(C); and (2) computing a latent knowledge vector v* for the new learner by estimating a minimum of an objective function with respect to vector argument v, subject to one or more conditions including a norm constraint on the vector argument v, where entries of the latent knowledge vector v* represent the extent of the new learner's knowledge of each of R latent factors (underlying conceptual categories) implicit in the knowledge matrix C.

In some embodiments, the objective function comprises $$\Sigma_{i \in \Omega_{obs}} -\log p(Y_i^* | w_i^T U S v)$$

where $\Omega_{obs}$ is an index set indicating which of the questions were answered by the new learner, where $Y_i^*$ represents the grade assigned to the $i^{th}$ question answered by the new learner, where $w_i^T$ represents the $i^{th}$ row of the matrix W. The latent knowledge vector $v^*$ may be stored in memory, e.g., for further processing. The latent knowledge vector $v^*$ may be transmitted to the new learner so he/she will know how well he/she has performed on the test including the Q questions.

In some embodiments, the method 7.1 may also include: computing a concept-knowledge vector for the new learner by multiplying the matrix product US by the latent knowledge vector $v^*$; and storing the concept-knowledge vector in memory. The concept-knowledge vector may be transmitted to the new learner so the new learner will know how well he/she has performed on the test including the Q questions.

VIII. Method for Analysis of User Content Preferences

In one set of embodiments, a method 8.1 for analyzing user content preferences may include the operations shown in FIG. 8.1. (The method 8.1 may also include any subset of the features, elements and embodiments described above.) The method 8.1 may be implemented by a computer system executing stored program instructions.

At 8.1.10, the computer system may receive input data that includes response data, where the response data includes a set of preference values that have been assigned to content items by content users. The content items may be digital content items offered or made available by a content provider. (Alternatively, the content items may be physical content items such as books, magazines, photographs, paintings, etc.) The preference values are drawn from a universe of possible values. The universe of possible values includes at least two values.

At 8.1.15, the computer system may compute output data based on the input data using a latent factor model. The output data may include at least: (1) an association matrix that defines a set of K concepts associated with content items, where K is smaller than the number of the content items, where, for each of the K concepts, the association matrix defines the concept by specifying strengths of association between the concept and the content items; and (2) a concept-preference matrix including, for each content user and each of the K concepts, an extent to which the content user prefers the concept.

In some embodiments, the computer system may display (or direct the display of) a visual representation of at least a subset of the association strengths in the association matrix and/or at least a subset of the extents in the concept-preference matrix, as indicated at 8.1.20

In some embodiments, the action of computing the output data includes: performing a maximum likelihood sparse factor analysis on the input data using the latent factor model, and/or, performing a Bayesian sparse factor analysis on the input data using the latent factor model, e.g., as variously described above.

In some embodiments, the content items are content items that have been viewed or accessed or used or purchased by the content users.

In some embodiments, the content items are content items that are made available to the content users by an online content provider. For example, the online content provider may maintain a network that provides content items to the content users.

In some embodiments, the method 8.1 may also include: receiving user input from a content user, where the user input indicates the content user's extent of preference for an identified one of the content items; and updating the response data based on the user input.

In some embodiments, the content items include one or more of the following types of content items: movies, videos, audiobooks, articles, news items, online educational materials, documents, images, photographs.

In some embodiments, a column of the content-preference matrix is used to predict one or more content items which the corresponding content user is likely to have an interest in.

In some embodiments, the action of displaying the visual representation includes displaying a graph (e.g., a bipartite graph) based on the association matrix. The graph may depict the strengths of association between at least a subset of the content items and at least a subset of the K concepts.

Note that any of the embodiments discussed in sections I through VII may be interpreted as an embodiment of method 8.1 by replacing the idea of "learner" with "content user", replacing the idea of "grade for answer to question" with "preference value for content item", and replacing the idea of "extent of learner knowledge" with "extent of user preference".

Binary-Valued SPARFA

In some embodiments, the universe of possible values consists of two elements (e.g., {LIKE, DISLIKE}). Furthermore, the latent factor model may characterize a statistical relationship between $(WC)_{i,j}$ and a corresponding preference value $Y_{i,j}$ of the set of preference values, where $(WC)_{i,j}$ denotes the $(i,j)^{th}$ entry of the product matrix WC, where W is the association matrix, where C is the content-preference matrix, where i is a content item index, where j is a content user index.

In some embodiments, the latent factor model is of the form:

$$Z_{i,j} = (WC)_{i,j}$$

$$Y_{i,j} \sim \text{Ber}(\Phi(Z_{i,j})),$$

where Ber(z) represents the Bernoulli distribution with success probability z, where $\Phi(z)$ denotes an inverse link function that maps a real value z to the success probability of a binary random variable.

Ordinal SPARFA

In some embodiments, the universe of possible values is an ordered set of P labels (e.g., a set of integers, a set of non-negative integers, a set of rational numbers, a set of real numbers), where P is greater than or equal to two. Furthermore, the latent factor model may characterize a statistical relationship between $(WC)_{i,j}$ and a corresponding preference value $Y_{i,j}$ of the set of preference values, where $(WC)_{i,j}$ denotes the $(i,j)^{th}$ entry of the product matrix WC, where W is the association matrix, where C is the content-preference matrix, where i is a content item index, where j is a content user index.

In some embodiments, P is greater than two.

In some embodiments, the latent factor model is of the form:

$$Z_{i,j} = (WC)_{i,j}$$

$$Y_{i,j} = g(Z_{i,j} + \epsilon_{i,j}),$$

where $Z_{i,j}$ represents an ideal real-valued preference value corresponding to the $j^{th}$ content user for the $i^{th}$ content item, where $\epsilon_{i,j}$ represents random measurement noise or uncertainty in measurement, where g is a quantizer function that maps from the real line into the set of labels.

In some embodiments, the method 8.1 also includes receiving additional input data that includes a collection of M tags (e.g., character strings) and information specifying a Q×M matrix T, where Q is the number of the content items. For each of the content items, a corresponding subset of the M tags have been assigned to the content item (e.g., by reviewers, content domain experts, authors of the content items, crowd sourcing, etc.). For each content item, the matrix T identifies the corresponding subset of the M tags. The association matrix W includes entries that represent the strength of association between each of the Q content items and each concept in the set of K concepts. The method 8.1 may also include computing an estimate of an M×K matrix A, where entries of the matrix A represent strength of association between each of the M tags and each of the K concepts.

In some embodiments, the M tags are character strings that have been defined by one or more users. Each of the M tags may represent a corresponding idea or principle or property. The tags may represent ideas that are relevant to the content items. For example, when the content items are movies, the tags might include character strings such as "comedy", "documentary", "action", "sports", "biography", "romance", "sci-fi", "history", etc. For example, when the content items are music recordings, the tags might include character strings such as "rock", "blues", "classical", "country", "electronic", etc.

In some embodiments, the method 8.1 may also include displaying a bipartite graph based on the estimated matrix A, where the bipartite graph includes tag nodes and concept nodes and links between at least a subset of the tag nodes and at least a subset of the concept nodes. The tag nodes represent the M tags, and the concept nodes represent the K concepts.

Ordinal SPARFA-Tag (with Number of Labels P≥2)

In some embodiments, each of the preference values has been selected from an ordered set of P labels, where P is greater than or equal to two. The input data may also include a collection of tags and an item-tag index set, where the item-tag index set indicates, for each of the content items, which of the tags have been assigned to that content item. Furthermore, the latent factor model may characterize a statistical relationship between entries $(WC)_{i,j}$ of the product matrix WC and corresponding preference values $Y_{i,j}$ of the set of preference values, where i is a content item index, where j is a content user index, where W is the association matrix, and C is the content-preference matrix.

In some embodiments, the number $N_T$ of tags in the collection of tags is equal to the number of concepts K.

Joint Analysis of Content User Responses and Text Information

In some embodiments, the input data also includes word frequency data, and each of the content items is associated with a corresponding set of text. The word frequency data is related to a vocabulary of words (or, a dictionary of terms) that has been derived, e.g., from a union of the text sets over the content items. The word frequency data indicates the frequency of occurrence of each vocabulary word in the text set of each content item. (The text set for a content item may include, e.g., the text of comments on the content item provided by reviewers and/or content users and/or content authors, etc.) Furthermore, the output data may also include a word-concept matrix T comprising strengths of association between the vocabulary words and the K concepts. The action of computing the output data may include minimizing an objective with respect to the association matrix W, the content-preference matrix C and the word-concept matrix T. The objective may include at least: a negative log likelihood of the response data parameterized at least by the association matrix and the content-preference matrix; and a negative log likelihood of the word frequency data parameterized at least by the association matrix and the word-concept matrix T. The output data may be stored in memory, e.g., for further processing.

In some embodiments, the input data may also include a word-frequency matrix B, where the universe of possible values is an ordered set of P labels, where P is greater than or equal to two, where each of the content items is associated with a corresponding set of text. The matrix B is related to a vocabulary of words (or, a dictionary of terms) that has been derived, e.g., from a union of the text sets taken over the content items. The matrix B includes entries $B_{i,v}$ that indicate the frequency of occurrence of each vocabulary word in the text set of each content item. Furthermore, the action of computing the output data based on the input data may use a second latent factor model in addition to the first latent factor model discussed above. The output data may also include a word-concept matrix T, where the matrix T includes entries $T_{k,v}$ that represent a strength of association between each vocabulary word and each of the K concepts. The first latent factor model may characterize a statistical relationship between entries $(WC)_{i,j}$ of the product matrix WC and corresponding preference values $Y_{i,j}$ of the set of preference values, where W is the association matrix, where C is the content-preference matrix, where i is a content item index, where j is a content user index. The second latent factor model may characterize a statistical relationship between entries $(WT)_{i,v}$ of the product matrix WT and entries $B_{i,v}$ of the matrix B.

Computation of Latent-Factor Preferences for New Content User (i.e., after the Association Matrix W and Content-Preference Matrix C have been Determined.

In some embodiments, the input data also includes a second set of preference values that have been assigned to the content items, where the second set of preference values have been provided by a new content user (i.e., not one of the original set of content users). In these embodiments, the method 8.1 may also include: (1) performing a singular value decomposition on the content-preference matrix C to obtain a factorization of the form $C=USV^T$, where U is an matrix whose columns are orthogonal, where S is an R×R diagonal matrix, where V is a matrix whose columns are orthogonal, where R=rank(C); and (2) computing a latent preference vector v* for the new content user by estimating a minimum of an objective function with respect to vector argument v, subject to one or more conditions including a norm constraint on the vector argument v, where entries of the latent preference vector v* represent the extent of the new content user's preference for each of R latent factors (underlying conceptual categories) implicit in the content-preference matrix C.

In some embodiments, a content provider may use the latent preference vector v* to direct targeted advertising to the content user, e.g., to suggest new content items that the user is likely to be interested in viewing or using or auditing or purchasing or accessing.

In some embodiments, the objective function comprises $$\Sigma_{i \in \Omega_{obs}} - \log p(Y_i^* | w_i^T USv),$$

where $\Omega_{obs}$ is an index set indicating which of the content items were rated by the new content user, where $Y_i^*$ represents the preference value assigned to the $i^{th}$ content item by the new content user, where $w_i^T$ represents the $i^{th}$ row of the matrix W. The latent preference vector v* may be stored in memory, e.g., for further processing.

Any of the various embodiments described herein may be realized in any of various forms, e.g., as a computer-implemented method, as a computer-readable memory medium, as a computer system. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, an image acquisition device, a video acquisition device, a computer embedded in a living organism, etc.

Any of the various embodiments described herein may be combined to form composite embodiments. Furthermore, any of the various features, embodiments and elements described in U.S. Provisional Application No. 61/790,727 (filed on Mar. 15, 2013) may be combined with any of the various embodiments described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method comprising: receiving input data that includes response data, wherein the response data includes a set of preference values that have been assigned to content items by content users, wherein the content items are content items that have been viewed or accessed or used by the content users, wherein the preference values are drawn from a universe of possible values, wherein said receiving is performed by a computer system; computing output data based on the input data using a first latent factor model, wherein said computing is performed by the computer system, wherein the output data includes at least:

an association matrix that defines a set of K concepts associated with the content items, wherein K is smaller than the number of the content items, wherein, for each of the K concepts, the association matrix defines the concept by specifying strengths of association between the concept and the content items; and a concept-preference matrix including, for each content user and each of the K concepts, an extent to which the content user prefers the concept, wherein a row or column of the content-preference matrix is used to predict one or more content items which the corresponding content user is likely to have an interest in;

displaying, via a display device, a visual representation of at least a subset of the association strengths in the association matrix, wherein said displaying the visual representation includes displaying a graph based on the association matrix, wherein the graph depicts the strengths of association between at least a subset of the content items and at least a subset of the K concepts.

2. The method of claim 1, wherein said computing output data includes one or more of the following:
performing a maximum likelihood sparse factor analysis on the input data using the first latent factor model;
performing a Bayesian sparse factor analysis on the input data using the first latent factor model.

3. The method of claim 1, wherein the content items are content items that are made available, via the Internet, to the content users by an online content provider, the method further comprising:
displaying a visual representation of at least a subset of the extents in the concept-preference matrix.

4. The method of claim 3, further comprising:
receiving user input from a content user, wherein the user input indicates the content user's extent of preference for an identified one of the content items; and
updating the response data based on the user input.

5. The method of claim 1, wherein the content items include one or more of the following:
movies or videos or audiobooks or articles or news items or online educational materials or documents or images or photographs.

6. The method of claim 1, wherein the universe of possible values consists of two elements, wherein the first latent factor model characterizes a statistical relationship between $(WC)_{i,j}$ and a corresponding preference value $Y_{i,j}$ of the set of preference values, wherein $(WC)_{i,j}$ denotes the $(i,j)^{th}$ entry of the product matrix WC, wherein W is the association matrix, wherein C is the content-preference matrix, wherein i is a content item index, wherein j is a content user index.

7. The method of claim 6, wherein the first latent factor model is of the form:

$$Z_{i,j} = (WC)_{i,j}$$

$$Y_{i,j} \sim \text{Ber}(\Phi(Z_{i,j})),$$

wherein Ber(z) represents the Bernoulli distribution with success probability z, wherein $\Phi(z)$ denotes an inverse link function that maps a real value z to the success probability of a binary random variable.

8. The method of claim 1, wherein the universe of possible values is an ordered set of P labels, wherein P is greater than or equal to two, wherein the first latent factor model characterizes a statistical relationship between (WC)$_{i,j}$ and a corresponding preference value Y$_{i,j}$ of the set of preference values, wherein (WC)$_{i,j}$ denotes the (i,j)$^{th}$ entry of the product matrix WC, wherein W is the association matrix, wherein C is the content-preference matrix, wherein i is a content item index, wherein j is a content user index.

9. The method of claim 8, wherein P is greater than two.

10. The method of claim 8, wherein the first latent factor model is of the form:

$$Z_{i,j}=(WC)_{i,j}$$

$$Y_{i,j}=g(Z_{i,j}+\epsilon_{i,j}),$$

wherein Z$_{i,j}$ represents an ideal real-valued preference value corresponding to the j$^{th}$ content user for the i$^{th}$ content item, wherein $\epsilon_{i,j}$ represents random measurement noise or uncertainty in measurement, wherein g is a quantizer function that maps from the real line into the set of labels.

11. The method of claim 1, further comprising:
receiving additional input data that includes a collection of M tags and information specifying a Q×M matrix T, wherein Q is the number of the content items, wherein, for each of the content items, a corresponding subset of the M tags have been assigned to the content item, wherein for each content item, the matrix T identifies the corresponding subset of the M tags, wherein the association matrix W includes entries that represent the strength of association between each of the Q content items and each concept in the set of K concepts;
computing an estimate of an M×K matrix A, wherein entries of the matrix A represent strength of association between each of the M tags and each of the K concepts.

12. The method of claim 11, further comprising:
displaying a bipartite graph based on the estimated matrix A, wherein the bipartite graph includes tag nodes and concept nodes and links between at least a subset of the tag nodes and at least a subset of the concept nodes, wherein the tag nodes represent the M tags, wherein the concept nodes represent the K concepts.

13. The method of claim 1, wherein each of the preference values has been selected from an ordered set of P labels, wherein P is greater than or equal to two, wherein the input data also includes a collection of tags and an item-tag index set, wherein the item-tag index set indicates, for each of the content items, which of the tags have been assigned to that content item, wherein the first latent factor model characterizes a statistical relationship between entries (WC)$_{i,j}$ of the product matrix WC and corresponding preference values Y$_{i,j}$ of the set of preference values, wherein i is a content item index, wherein j is a content user index, wherein W is the association matrix, wherein C is the content-preference matrix.

14. The method of claim 1, wherein the input data also includes word frequency data, wherein each of the content items is associated with a corresponding set of text, wherein the word frequency data is related to a vocabulary of words that has been derived from a union of the text sets over the content items, wherein the word frequency data indicates the frequency of occurrence of each vocabulary word in the text set of each content item;
wherein the output data also includes a word-concept matrix T comprising strengths of association between the vocabulary words and the K concepts, wherein said computing includes minimizing an objective with respect to the association matrix W, the content-preference matrix C and the word-concept matrix T, wherein the objective includes at least:
a negative log likelihood of the response data parameterized at least by the association matrix and the content-preference matrix;
a negative log likelihood of the word frequency data parameterized at least by the association matrix and the word-concept matrix T;
storing the output data in a memory.

15. The method of claim 1, wherein the input data includes a word-frequency matrix B, wherein the universe of possible values is an ordered set of P labels, wherein P is greater than or equal to two, wherein each of the content items is associated with a corresponding set of text, wherein the matrix B is related to a vocabulary of words that has been derived from a union of the text sets taken over the content items, wherein the matrix B includes entries B$_{i,v}$ that indicate the frequency of occurrence of each vocabulary word in the text set of each content item;
wherein said computing the output data based on the input data uses a second latent factor model in addition to the first latent factor model, wherein the output data also includes a word-concept matrix T, wherein the matrix T includes entries T$_{k,v}$ that represent a strength of association between each vocabulary word and each of the K concepts, wherein the first latent factor model characterizes a statistical relationship between entries (WC)$_{i,j}$ of the product matrix WC and corresponding preference values Y$_{i,j}$ of the set of preference values, wherein W is the association matrix, wherein C is the content-preference matrix, wherein i is a content item index, wherein j is a content user index, wherein the second latent factor model characterizes a statistical relationship between entries (WT)$^{i,v}$ of the product matrix WT and entries B$_{i,v}$ of the matrix B.

16. The method of claim 1, wherein the input data also includes a second set of preference values that have been assigned to the content items, wherein the second set of preference values have been provided by a new content user, the method further comprising:
performing a singular value decomposition on the content-preference matrix C to obtain a factorization of the form C=USV$^T$, wherein U is an matrix whose columns are orthogonal, wherein S is an R×R diagonal matrix, wherein V is a matrix whose columns are orthogonal, wherein R=rank(C);
computing a latent preference vector v* for the new content user by estimating a minimum of an objective function with respect to vector argument v, subject to one or more conditions including a norm constraint on the vector argument v, wherein entries of the latent preference vector v* represent the extent of the new content user's preference for each of R latent factors implicit in the content-preference matrix C.

17. The method of claim 16, wherein the objective function comprises $$\Sigma_{i\in\Omega_{obs}}-\log p(Y_i^*|w_i^T USv),$$

wherein $\Omega_{obs}$ is an index set indicating which of the content items were rated by the new content user, wherein Y$_i$* represents the preference value assigned to the i$^{th}$ content item by the new content user, wherein w$_i^T$ represents the i$^{th}$ row of the matrix W.

18. A non-transitory memory medium storing program instructions, wherein the program instructions, when executed by a computer, cause the computer to implement:
receiving input data that includes response data, wherein the response data includes a set of preference values that have been assigned to content items by content users, wherein the content items are content items that have been viewed or accessed or used by the content users, wherein the preference values are drawn from a universe of possible values, wherein said receiving is performed by a computer system; computing output data based on the input data using a first latent factor model, wherein said computing is performed by the computer system, wherein the output data includes at least:

an association matrix that defines a set of K concepts associated with the content items, wherein K is smaller than the number of the content items, wherein, for each of the K concepts, the association matrix defines the concept by specifying strengths of association between the concept and the content items; and a concept-preference matrix including, for each content user and each of the K concepts, an extent to which the content user prefers the concept, wherein a row or column of the content-preference matrix is used to predict one or more content items which the corresponding content user is likely to have an interest in;

displaying, via a display device, a visual representation of at least a subset of the association strengths in the association matrix, wherein said displaying the visual representation includes displaying a graph based on the association matrix, wherein the graph depicts the strengths of association between at least a subset of the content items and at least a subset of the K concepts.

19. A system comprising: a processor; and memory storing program instructions, wherein the program instructions, when executed by the processor, cause the processor to implement: receiving input data that includes response data, wherein the response data includes a set of preference values that have been assigned to content items by content users, wherein the content items are content items that have been viewed or accessed or used by the content users, wherein the preference values are drawn from a universe of possible values, wherein said receiving is performed by a computer system; computing output data based on the input data using a first latent factor model, wherein said computing is performed by the computer system, wherein the output data includes at least:

an association matrix that defines a set of K concepts associated with the content items, wherein K is smaller than the number of the content items, wherein, for each of the K concepts, the association matrix defines the concept by specifying strengths of association between the concept and the content items; and a concept-preference matrix including, for each content user and each of the K concepts, an extent to which the content user prefers the concept, wherein a row or column of the content-preference matrix is used to predict one or more content items which the corresponding content user is likely to have an interest in;

displaying, via a display device, a visual representation of at least a subset of the association strengths in the association matrix, wherein said displaying the visual representation includes displaying a graph based on the association matrix, wherein the graph depicts the strengths of association between at least a subset of the content items and at least a subset of the K concepts.

20. The non-transitory memory medium of claim 18, wherein said computing output data includes one or more of the following:
performing a maximum likelihood sparse factor analysis on the input data using the first latent factor model;
performing a Bayesian sparse factor analysis on the input data using the first latent factor model.

21. The non-transitory memory medium of claim 18, wherein the program instructions further cause the computer to implement:
receiving user input from a content user, wherein the user input indicates the content user's extent of preference for an identified one of the content items; and
updating the response data based on the user input.

22. The system of claim 19, wherein the universe of possible values consists of two elements, wherein the first latent factor model characterizes a statistical relationship between $(WC)_{i,j}$ and a corresponding preference value $Y_{i,j}$ of the set of preference values, wherein $(WC)_{i,j}$ denotes the $(i,j)^{th}$ entry of the product matrix WC, wherein W is the association matrix, wherein C is the content-preference matrix, wherein i is a content item index, wherein j is a content user index.

23. The system of claim 19, wherein the universe of possible values is an ordered set of P labels, wherein P is greater than or equal to two, wherein the first latent factor model characterizes a statistical relationship between $(WC)_{i,j}$ and a corresponding preference value $Y_{i,j}$ of the set of preference values, wherein $(WC)_{i,j}$ denotes the $(i,j)^{th}$ entry of the product matrix WC, wherein W is the association matrix, wherein C is the content-preference matrix, wherein i is a content item index, wherein j is a content user index.

24. The system of claim 19, wherein the input data also includes word frequency data, wherein each of the content items is associated with a corresponding set of text, wherein the word frequency data is related to a vocabulary of words that has been derived from a union of the text sets over the content items, wherein the word frequency data indicates the frequency of occurrence of each vocabulary word in the text set of each content item;

wherein the output data also includes a word-concept matrix T comprising strengths of association between the vocabulary words and the K concepts, wherein said computing includes minimizing an objective with respect to the association matrix W, the content-preference matrix C and the word-concept matrix T, wherein the objective includes at least:
a negative log likelihood of the response data parameterized at least by the association matrix and the content-preference matrix;
a negative log likelihood of the word frequency data parameterized at least by the association matrix and the word-concept matrix T;
storing the output data in a memory.

* * * * *